United States Patent [19]
Takashimizu et al.

[11] Patent Number: 5,956,161
[45] Date of Patent: Sep. 21, 1999

[54] IMAGE READING APPARATUS HAVING A STEEPLY INCLINED PAPER TRANSPORT PATH

[75] Inventors: Yoshihiro Takashimizu; Masahiro Yoshida; Toshiaki Anzai; Hirotoshi Kakegawa; Noriaki Yamazaki; Toshio Saito; Hiroyuki Maruyama; Fumiaki Harada; Seigo Umeda; Yoshio Tabata, all of Kawasaki, Japan

[73] Assignee: Fujitsu Limited, Kawasaki, Japan

[21] Appl. No.: 08/962,355

[22] Filed: Oct. 31, 1997

Related U.S. Application Data

[63] Continuation of application No. 08/398,370, Mar. 3, 1995, abandoned.

[30] Foreign Application Priority Data

Apr. 7, 1994 [JP] Japan .................................. 6-069827

[51] Int. Cl.⁶ .................................................. G03G 21/00
[52] U.S. Cl. ........................................ 358/496; 358/498
[58] Field of Search .................................... 358/496, 498, 358/488, 473; 271/185–187; 399/16–17, 306, 309, 361, 364–365, 374

[56] References Cited

U.S. PATENT DOCUMENTS

| | | | |
|---|---|---|---|
| 4,848,765 | 7/1989 | Torii | 271/274 |
| 5,296,966 | 3/1994 | Hasuo | 358/498 |
| 5,339,139 | 8/1994 | Fullerton et al. | 355/215 |
| 5,430,536 | 7/1995 | Fullerton et al. | 355/320 |

FOREIGN PATENT DOCUMENTS

| | | |
|---|---|---|
| 0 364 827 A1 | 4/1990 | European Pat. Off. . |
| 0 568 080 A1 | 11/1993 | European Pat. Off. . |
| 4018123A1 | 12/1990 | Germany . |
| 3-11872 | 1/1991 | Japan . |
| 3-11875 | 1/1991 | Japan . |
| 3-209970 | 9/1991 | Japan . |
| 4-68756 | 3/1992 | Japan . |

OTHER PUBLICATIONS

United Kingdom Search Report dated Jul. 11, 1995, citing above listed references.

*Primary Examiner*—Thomas D. Lee
*Assistant Examiner*—Stephen Brinich
*Attorney, Agent, or Firm*—Armstrong, Westerman, Hattori, McLeland & Naughton

[57] ABSTRACT

An improved image reading apparatus suitable for use with an image scanner which can read a large number of paper sheets successively and rapidly and cope with various paper sizes from a small size to a large size. The image reading apparatus includes a paper supply mechanism, a paper transport mechanism, an optical image reading mechanism for optically reading information on a paper sheet being transported by the paper transport mechanism, and a paper stacking mechanism. The paper transport mechanism includes a paper transport path including an inclined transport path and a paper reversing transport path contiguous to the inclined transport path, a plurality of paper transport rollers disposed in a spaced relationship from each other by a distance smaller than the length of a paper sheet in its transportation direction along the paper transport path, a roller driving mechanism for driving the paper transport rollers, and a roller driving mechanism control apparatus for controlling the roller driving mechanism. The optical image reading mechanism includes an optical image reading unit, and an image information extraction control apparatus for controlling extraction of image information obtained by the optical image reading unit.

29 Claims, 78 Drawing Sheets

F I G. 5
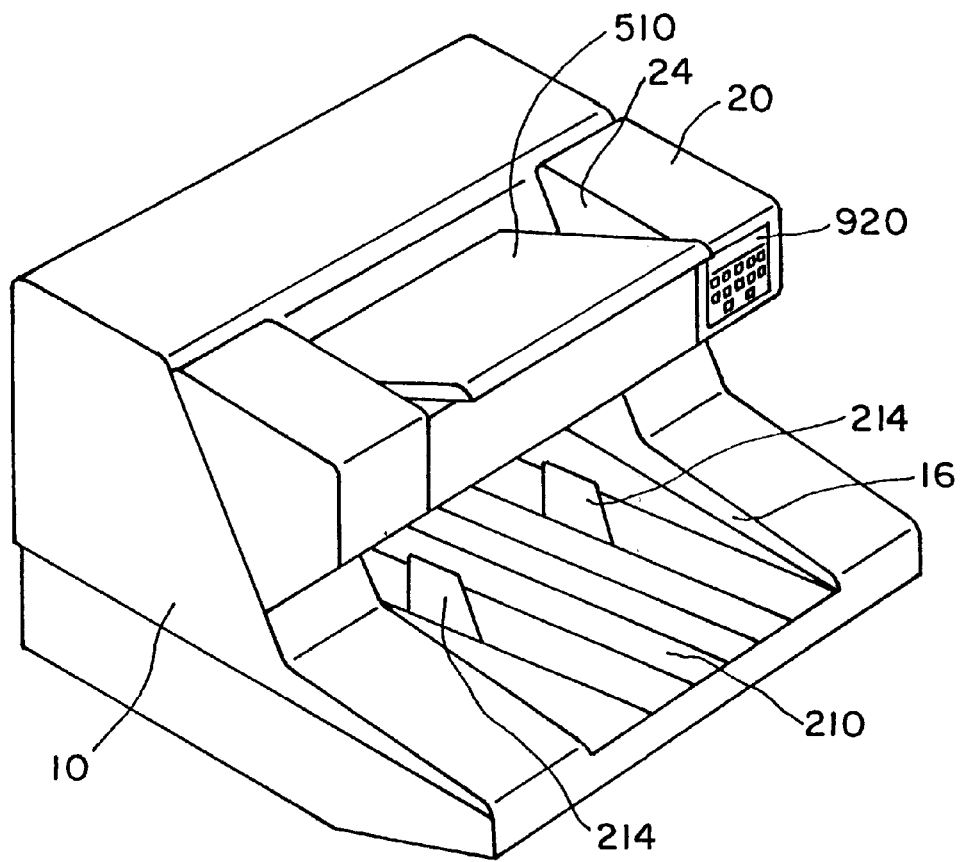

FIG. 11
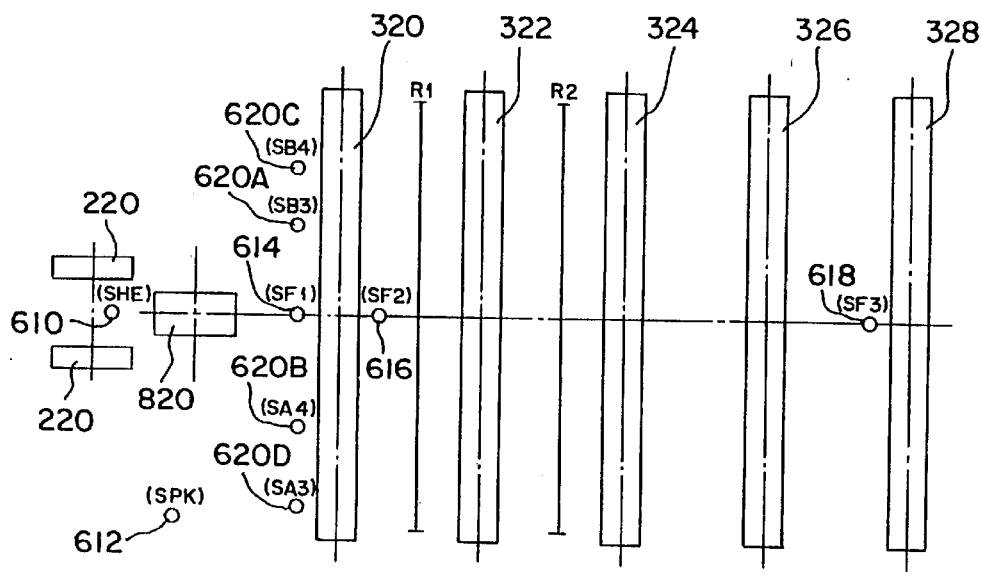
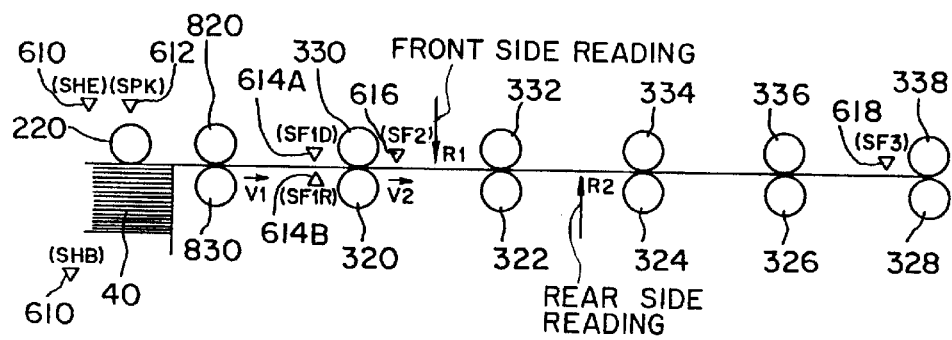

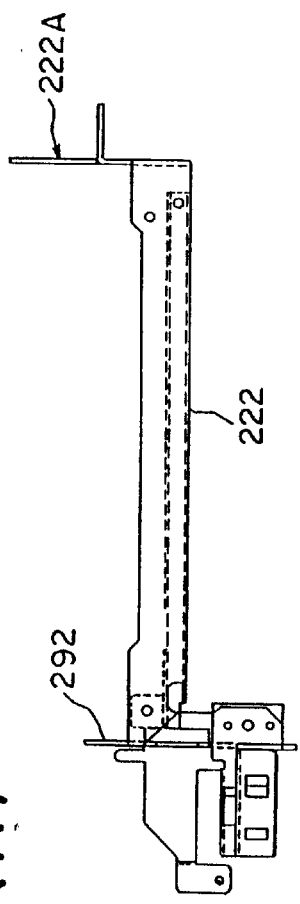
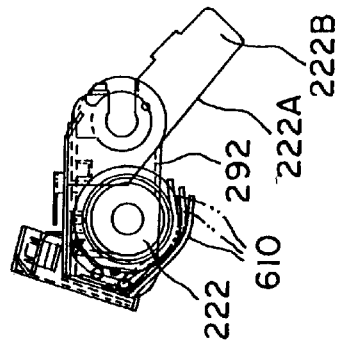
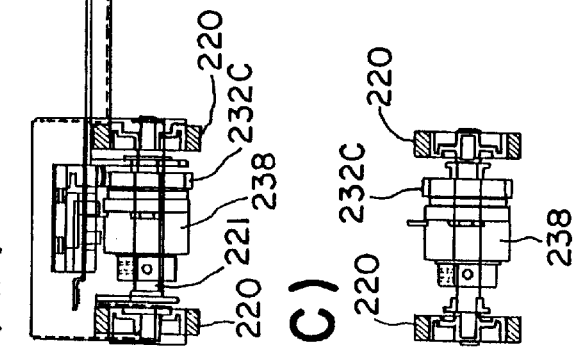
FIG. 16(A)
FIG. 16(B)
FIG. 16(C)
FIG. 16(D)

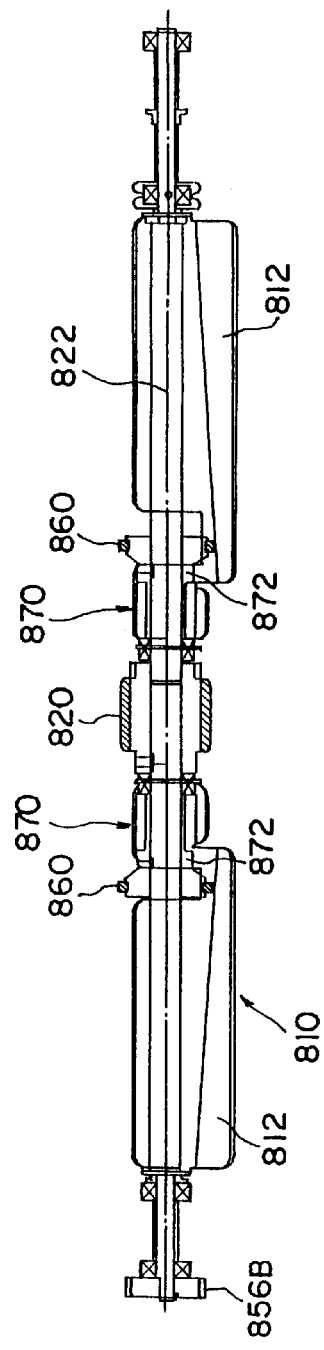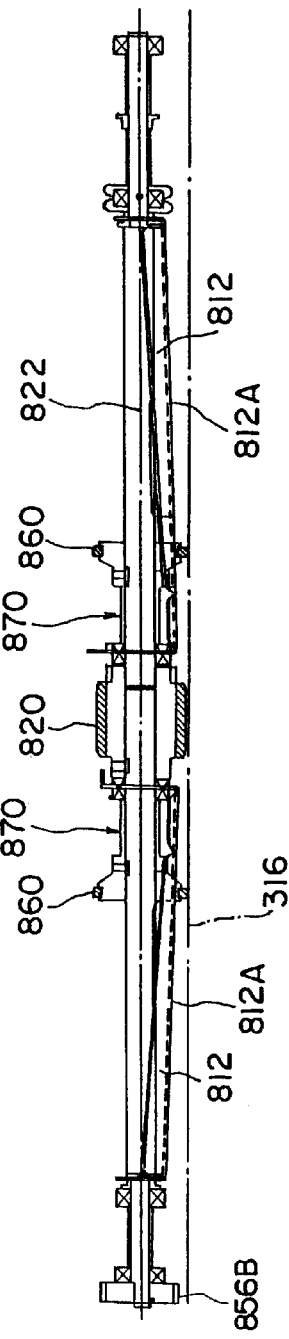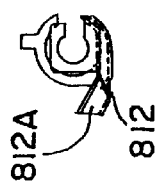

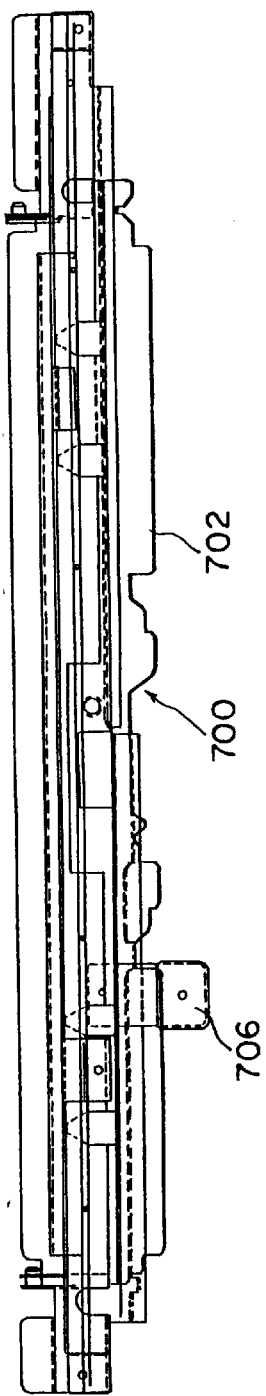

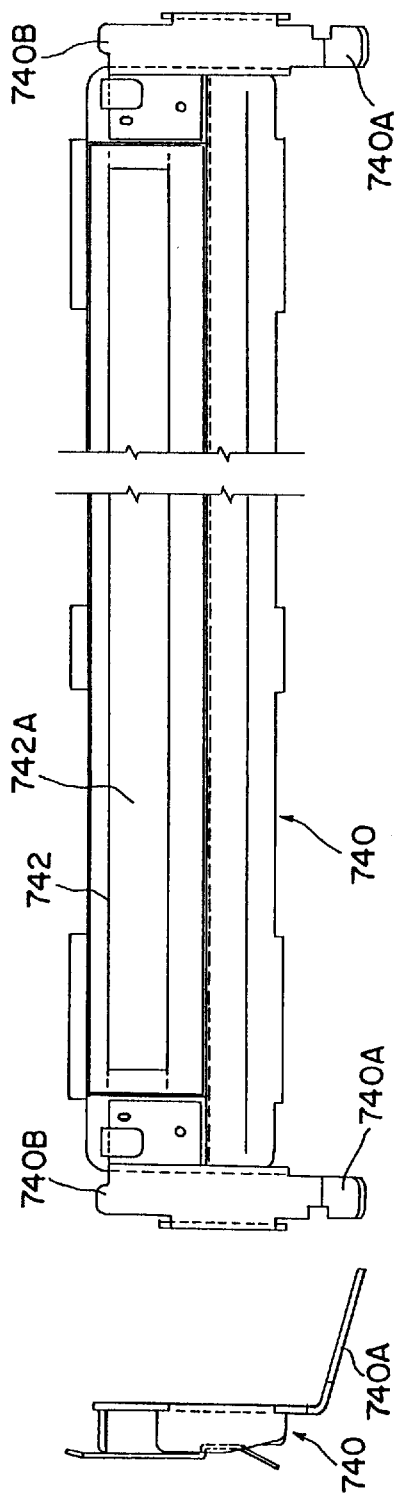
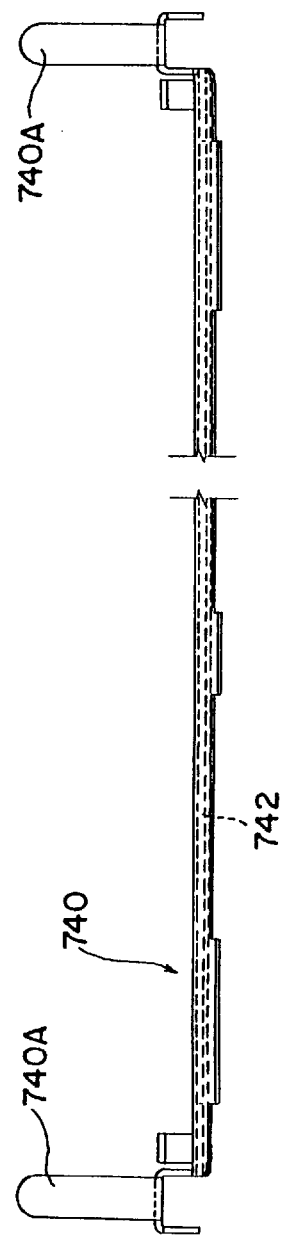
FIG. 27(A)
FIG. 27(B)
FIG. 27(C)

F I G. 31
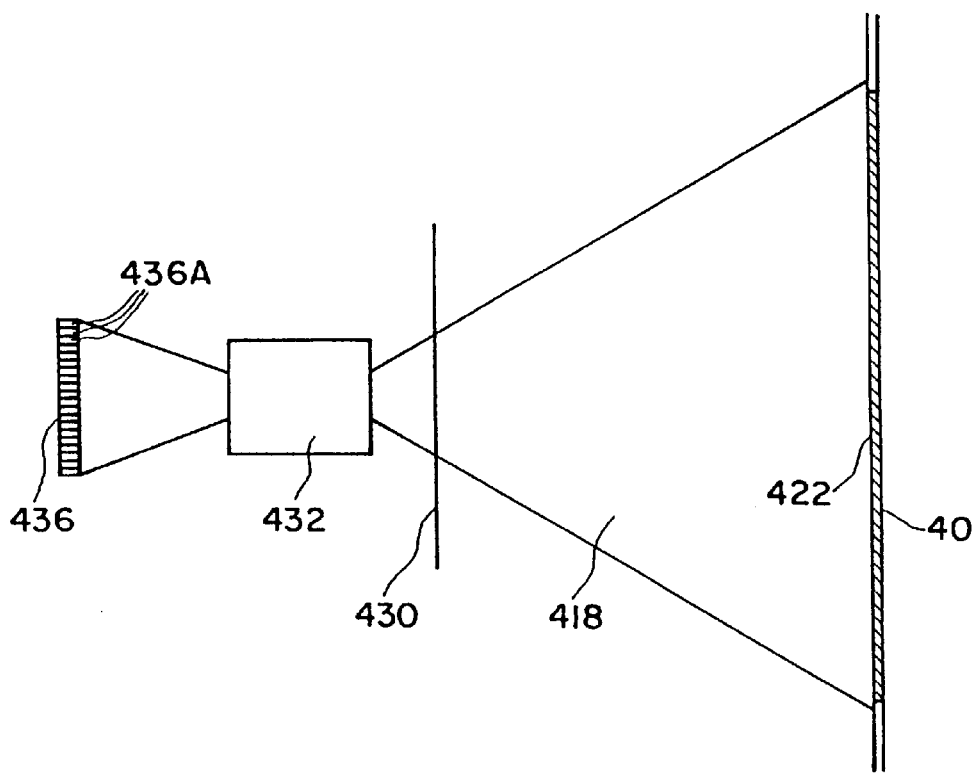

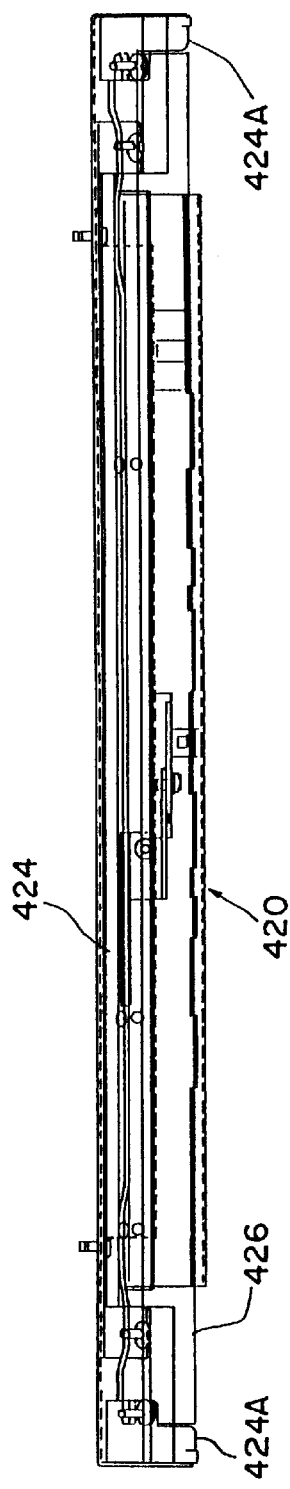
F I G. 32 (A)
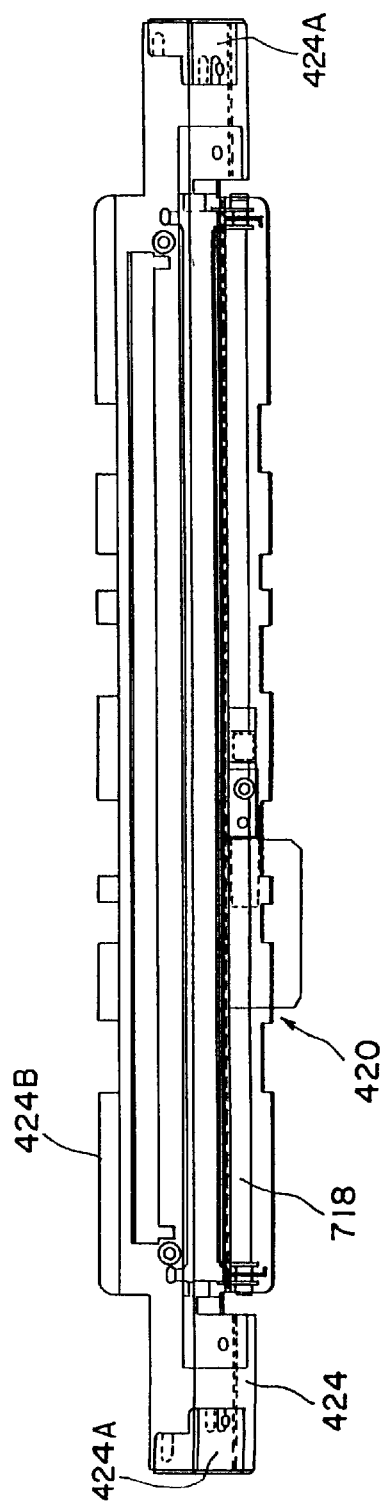
F I G. 32 (B)

PRESENT CONTROL IS NOT PERFORMED WHEN BOTTOM
SENSOR ALREADY DETECTS LOWER END OF TABLE

L1: OVERRUN AMOUNT

L2: MANUAL INSERTION OVERRUN AMOUNT
T3: MANUAL INSERTION START TIME
T4: STACKER DISCHARGE TIME AFTER START OF PAPER SUPPLY

FIG. 41

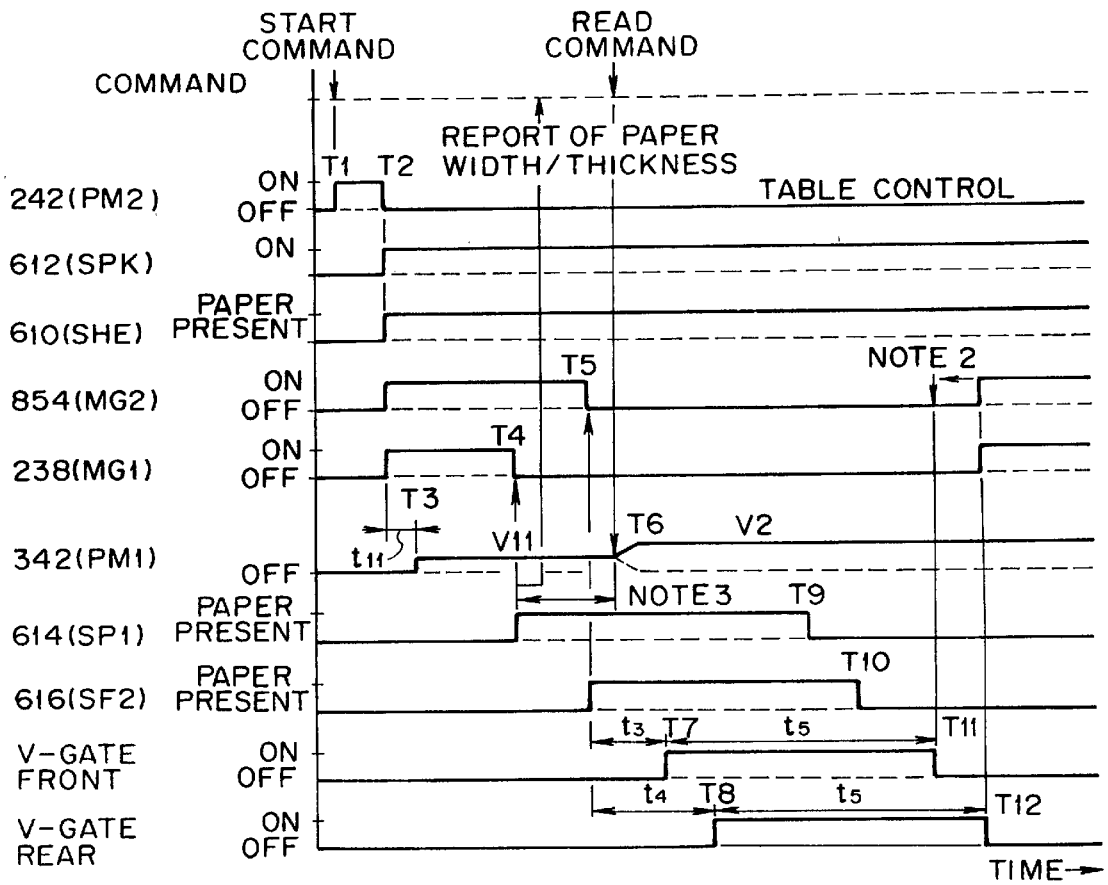

- $t_3$ ---- TIME REQUIRED FOR PAPER TO PASS FROM SF2 TO READING POINT R1 $t_3 = L_2/V_2$
- $t_4$ ---- TIME REQUIRED FOR PAPER TRAILING END TO PASS FROM SF2 TO READING POINT R2 $t_4 = L_1/V_2$
- $t_5$ ---- TIME REQUIRED TO FETCH IMAGE
  $t_5$ = READ LINE NUMBER × INTEGRATION TIME
- $V_1$ ---- PAPER TRANSPORT VELOCITY OF SEPARATE ROLLER (SR)
  WHEN VELOCITY FOR FIRST PAPER SHEET IS $V_{11}$, VELOCITY FOR SECOND OR FOLLOWING PAPER SHEET OF THICKNESS WITHIN SPECIFICATIONS IS SET HIGHER THAN $V_{11}$, BUT VELOCITY FOR PAPER SHEET OUTSIDE SPECIFICATIONS IS SET TO $V_{11}$
- $V_2$ ---- PAPER TRANSPORT VELOCITY OF FR1 TO FR5 ROLLERS

NOTE 2, NOTE 3 ---- REFER TO FIG. 42

FIG. 42

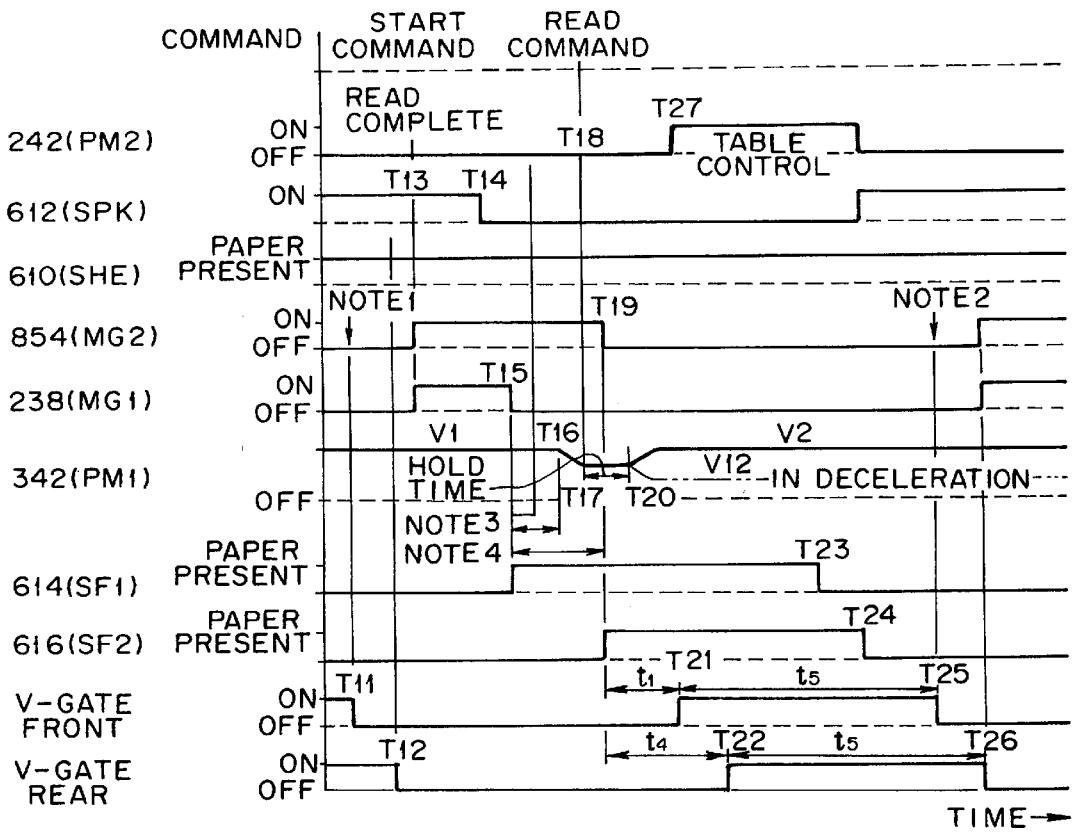

NOTE 1: FOR ONE FACE READING, READ COMPLETE IS RETURNED WHEN V-GATE IS TURNED OFF

NOTE 2: FOR ONE FACE READING, CLUTCH IS ENGAGED SIMULTANEOUSLY WITH TURNING OFF OF V-GATE

NOTE 3: AFTER PS1 PULSES AFTER PAPER LEADING END PASSES SF1, DECELERATION IS STARTED, & DECELERATION IS CONTINUED TO $V_{12}$

NOTE 4: WHEN NO READ COMMAD IS RECEIVED WITHIN PS2(>PS1) PULSES AFTER PAPER LEADING END PASSES SF1, TRANSPORTATION IS STOPPED TO WAIT READ COMMAND. WHEN READ COMMAND IS RECEIVED WITHIN THAT PERIOD, MOTOR IS ACCELERATED OR DECELERATED IN RESPONSE TO READING SPEED.

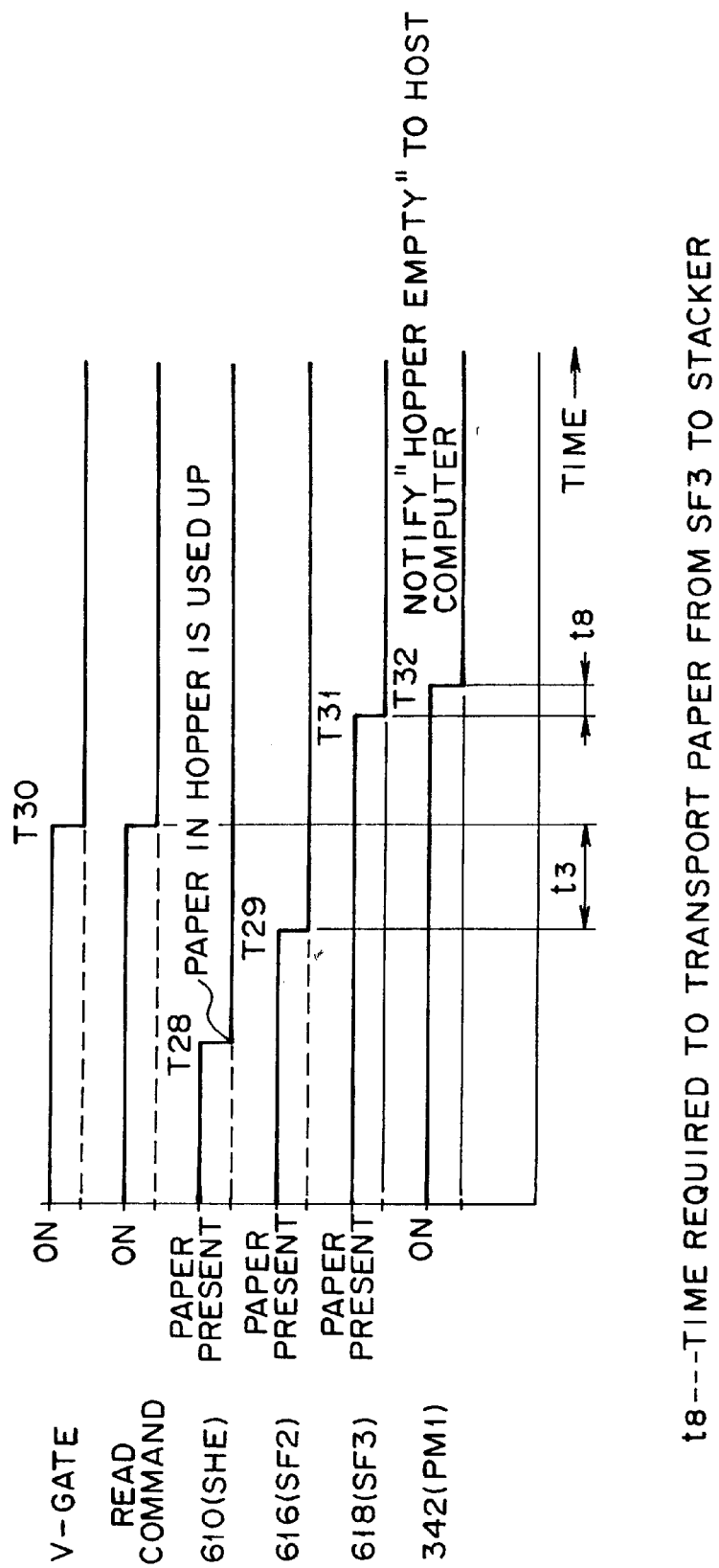

F I G. 71
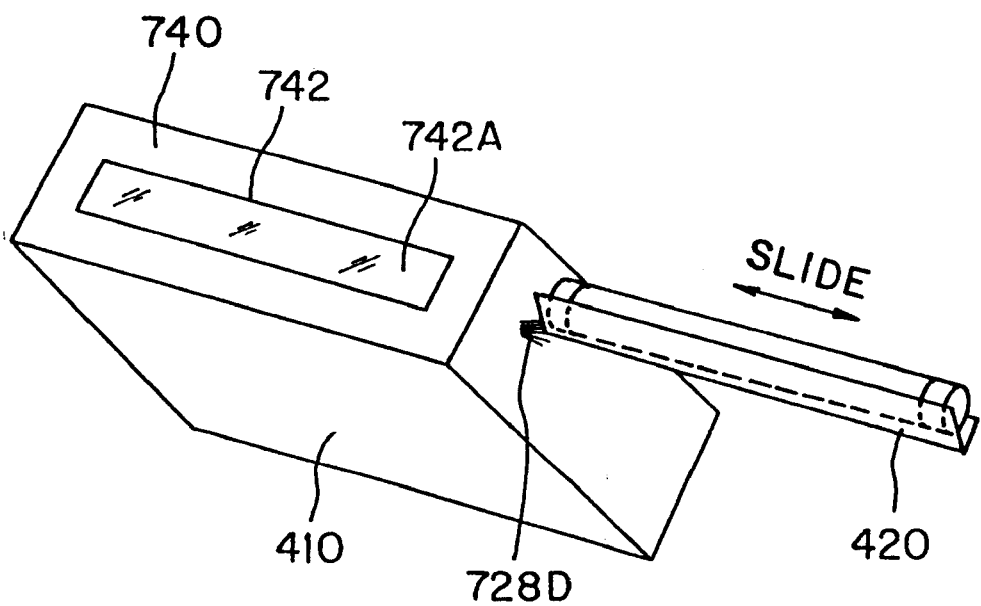

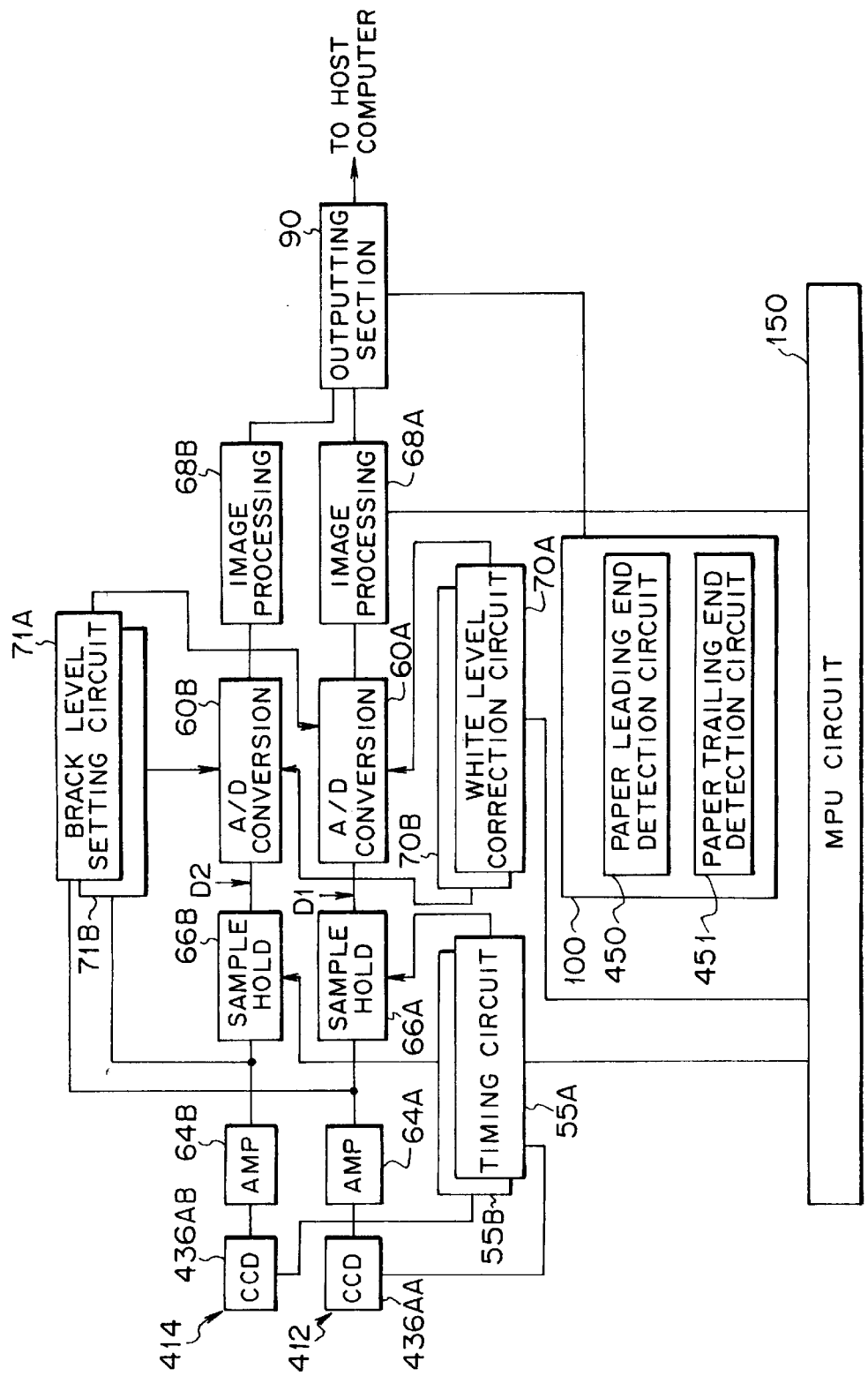

F I G. 82
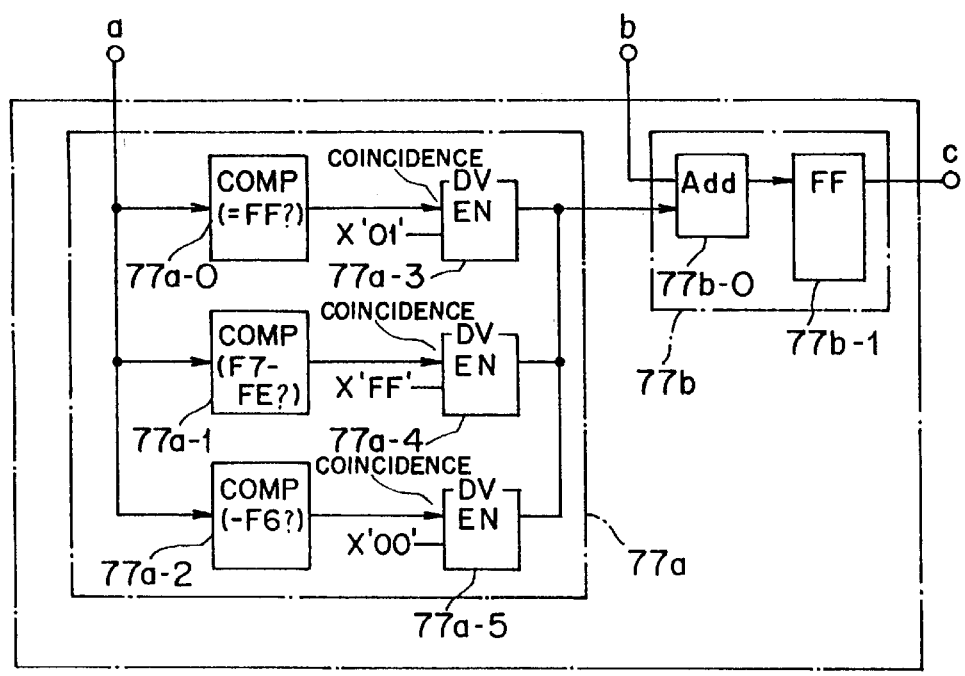

IMAGE READING APPARATUS HAVING A STEEPLY INCLINED PAPER TRANSPORT PATH

This application is a continuation of application Ser. No. 08/398,370 filed Mar. 3, 1995, now abandoned.

BACKGROUND OF THE INVENTION

1). Field of the Invention

This invention relates to an image reading apparatus which is suitably applied to an image scanner and can be used to read an image in a facsimile or a like apparatus.

2). Description of the Related Art

In recent years, image reading apparatuses such as image scanners have been and are being developed in order to input image information to a computer or a like apparatus.

Such conventional image reading apparatuses, however, suffer from a reading speed which is not sufficiently high and the capacity for information (quantity of paper sheets) which can be read at a time is not sufficiently high. In order to solve this problem, not only is it necessary to improve the performance of an image reading mechanism itself which is a principal portion of an image reading apparatus, but it is also necessary to develop a mechanism which can accommodate a large number of paper sheets to be read therein and transport the paper sheets one-by-one with certainty. In particular, the sequence of operations of taking out paper sheets, which are accommodated in large numbers in a hopper and are subjected to reading, one-by-one with certainty, transporting the thus taken out paper sheets, reading the paper sheets during transportation and placing the paper sheets successively into a stacker, must be performed as rapidly and certainly as possible.

Further, also with regard to the paper size, it is desired that an image reading apparatus can feasibly handle paper sheets of various sizes from a small size to a large size.

SUMMARY OF THE INVENTION

It is an object of the present invention to provide an image reading apparatus which can read a large number of paper sheets successively and rapidly and can feasibly handle paper sheets of various sizes from a small size to a large size.

In order to attain the object described above, according to one aspect of the present invention, there is provided an image reading apparatus, which comprises a paper supply mechanism for successively supplying paper sheets set in position, a paper transport mechanism for transporting a paper sheet supplied thereto from the paper supply mechanism, an optical image reading mechanism for optically reading information on a paper sheet being transported by the paper transport mechanism, and a paper stacking mechanism for stacking paper sheets discharged from the paper transport mechanism, the paper transport mechanism including a paper transport path including an inclined transport path for transporting a paper sheet supplied thereto from the paper supply mechanism in an inclined condition and a paper reversing transport path contiguous to the inclined transport path for reversing a paper sheet having been transported by the inclined transport path, a plurality of paper transport rollers disposed in a spaced relationship from each other by a distance less than the length of a paper sheet in its transportation direction along the paper transport path, a roller driving mechanism for driving the paper transport rollers, and roller driving mechanism control means for controlling the roller driving mechanism, the optical image reading mechanism including an optical image reading unit for optically reading information on a paper sheet being transported along the inclined transport path, and image information extraction control means for controlling extraction of image information obtained by the optical image reading unit.

In the image reading apparatus, since the paper transport path is formed from the inclined transport path and the paper reversing transport path and reading of a paper sheet is performed by the optical image reading mechanism while the paper sheet is being transported along the inclined transport path, there is no need to require a horizontal transport path portion, and the depthwise space required for a paper transport path can be reduced. Accordingly, an advantage of the image reading apparatus is that a paper sheet can be transported rapidly and image reading of the paper sheet can be performed at high speed. The image reading apparatus has another advantage in that the entire apparatus can be reduced in size while the space for accommodating paper sheets to be read (that is, a paper hopper) or the space for stacking paper sheets (that is, a paper stacker) can be increased. Consequently, it is facilitated to read a large amount of paper rapidly by successive operations with a compact apparatus or to cope with various paper sheets from small size paper sheets to large size paper sheets.

Some of the paper transport rollers may be constructed as rollers having fine particles sticking to the surfaces thereof. The fine particles on the surfaces of the paper transport rollers increase the coefficient of friction of the outer surfaces. Consequently, an otherwise possible slip of a paper sheet during transportation is prevented and image reading at a high speed can be performed smoothly.

The image reading apparatus may further comprise a paper supply sensor for detecting a paper sheet supplied by the paper supply mechanism, a transport sensor for detecting a paper sheet being transported along the inclined transport path, and a discharge sensor for detecting a paper sheet discharged from the paper reversing transport path into the paper stacking mechanism, the roller driving mechanism control means and the image information extraction control means executing their controls in response to results of detection from the paper supply sensor, the transport sensor and the discharge sensor. Thus, an image reading operation can be performed appropriately in accordance with a transportation condition of a paper sheet detected by the sensors. The occurrence of paper jamming along the paper transport path, can be detected promptly, and operation of the apparatus can be stopped rapidly. Preferably, the roller driving mechanism control means and the image information extraction control means execute their control in a synchronized relationship with each other. Such synchronized control ensures a paper transporting operation and an image reading operation even where the processing speed in image reading is increased. Consequently, the image reading apparatus has a high processing speed and improved reliability.

The optical image reading mechanism may include a first optical image reading unit and a second optical image reading unit for optically reading information on a front face and a rear face of a paper sheet being transported along the inclined transport path, respectively, in order to optically read information on the front and rear faces of the paper sheet being transported along the paper transport mechanism, and image information extraction control means for controlling extraction of image information obtained by the first optical image reading unit and the second optical image reading unit. Thus, image information on the opposite faces of a paper sheet can be read rapidly, and consequently, the processing speed of an original which has information to be read on the opposite faces thereof is greatly increased. Preferably, the first optical image reading unit and the second optical image reading unit have common specifications. This results in equal degrees of accuracy in reading of front face information and rear face information of a paper sheet. Further, since parts of the two units are common, the cost required for production of the image reading apparatus can be reduced.

The image reading apparatus may further comprise an additional optical image reading unit having a common profile and structure with but having different specifications from the first-mentioned optical image reading unit, any of the first-mentioned optical image reading unit and the additional optical image reading unit being capable of being selectively mounted in the image reading apparatus. Where such optical image reading units are available, the reading accuracy and the cost can be balanced in such a manner that an optical image reading unit having a high precision is used to read a face of a paper sheet which requires a high precision in reading of image information while another optical image reading unit having a lower precision and lower cost is used to read the other face of the paper sheet which does not require a high precision in reading of image information. Besides, since such optical image reading units having different specifications but having a common profile and structure can be selectively mounted, an optical image reading unit to be mounted can be changed readily at a low cost. Accordingly, types of image reading apparatuses can be increased readily in accordance with applications.

Preferably, the image reading apparatus further comprises a sheet guide disposed along the inclined transport path in an opposing relationship to the optical image reading unit and having a backing portion for providing a color reference to a paper sheet, the backing portion being offset from a paper guiding portion of the sheet guide, which is provided for guiding a paper sheet, with a step defined therebetween. Due to the offset, possible soiling of the backing portion by passage of a paper sheet is prevented, and consequently, a color reference to a paper sheet can be provided appropriately. Consequently, precision in image reading can be assured for a long period of time and maintenance of the apparatus is easy. Preferably, the sheet guide is resiliently biased toward the optical image reading unit. This eliminates an error in reading resolution or magnification of information by the image reading unit, and consequently, the reliability of the apparatus is further improved. Further preferably, the sheet guide resiliently biased toward the optical image reading unit is contacted with and stopped at a predetermined position by a contacting member on the optical image reading unit. This makes a paper sheet be guided to an appropriate position with respect to the image reading unit, and accordingly, image reading can be performed with a high degree of accuracy.

Preferably, the image reading apparatus further comprises a backing member located along the inclined transport path in an opposing relationship to the optical image reading unit for providing a color reference to a paper sheet, the backing member being formed as a rotatable member. This prevents otherwise possible soiling to the backing portion by passage of a paper sheet, and consequently, a color reference to a paper sheet can be provided appropriately. Consequently, the precision in image reading can be assured for a long period of time and maintenance of the apparatus is easy. Preferably, the rotatable member of the backing member is rotated at an equal speed to the speed of and in a same direction as the direction of transportation of a paper sheet by the paper transport mechanism. This prevents possible soiling of the backing portion by passage of a paper sheet with a higher degree of certainty, and consequently, a color reference to a paper sheet can be provided further appropriately. Consequently, the precision in image reading can be assured for a long period of time and maintenance of the apparatus is easy. Alternatively, the image reading apparatus may comprise a brush provided in sliding contact with an outer circumferential face of the backing member for cleaning the outer circumferential face. This also prevents possible soiling of the backing portion by passage of a paper sheet with a higher degree of certainty, and consequently, a color eference to a paper sheet can be provided further appropriately. Consequently, the precision in image reading can be assured for a long period of time and maintenance of the apparatus is easy.

Preferably, the image reading apparatus further comprises an apparatus body and an apparatus lid unit connected for pivotal motion to each other so as to be opened or closed relative to each other from or to the plane of the paper transport path, a backing member located adjacent the inclined transport path in an opposing relationship to the optical image reading unit for providing a color reference to a paper sheet, an interlocking mechanism for interlocking the backing member with an opening or closing movement of the apparatus lid unit to move, and a brush for contacting, after the backing member is moved by a closing movement of the apparatus lid unit, with the backing member to clean the backing member. With the construction, maintenance of the paper transport path can be performed readily. Further, since the backing member is cleaned automatically and a color reference to a paper sheet can be perovided appropriately, the precision in image reading can be assured for a long period of time and maintenance of the apparatus is easy. Preferably, the backing member is constructed as a rotatable member, and the image reading apparatus further comprises an interlocking mechanism for interlocking the backing member with an opening or closing movement of the apparatus lid unit to rotate, the brush being constructed so as to contact, when the backing member is rotated by an opening or closing movement of the apparatus lid unit, with the backing member to clean the backing member. This prevents possible soiling of the backing portion by passage of a paper sheet with a higher degree of certainty, and consequently, a color reference to a paper sheet can be provided further appropriately. Consequently, the precision in image reading can be assured for a long period of time and maintenance of the apparatus is easy.

Preferably, the image reading apparatus further comprises a sheet guide disposed along the inclined transport path in an opposing relationship to the optical image reading unit and having a backing portion for providing a color reference to a paper sheet, the sheet guide further having a protrusion provided at a portion thereof immediately prior to the backing portion. This prevents possible soiling of the backing portion by passage of a paper sheet with a high degree of certainty, and consequently, a color reference to a paper sheet can be provided appropriately. Consequently, the precision in image reading can be assured for a long period of time and maintenance of the apparatus is easy.

Preferably, the image reading apparatus further comprises a sheet guide with an opening disposed in an opposing relationship to the optical image reading unit at a location along the inclined transport path corresponding to an image reading point by the optical image reading unit, and a backing member disposed at a location in the opening on the opposite side to the location of the optical image reading unit with respect to the inclined transport path for providing a color reference to a paper sheet. This ensures guidance of a paper sheet and consequently ensures reading of an image of the paper sheet and detection of a color reference to the paper sheet. This is particularly effective where the image reading unit is disposed in the direction of gravity relative to the paper transport path.

Preferably, the image information extraction control means includes paper leading end detection means for detecting a leading end of a paper sheet from an amount of variation of the output of the optical image reading unit, the image information extraction control means controlling extraction of image information from optical image reading unit in response to a result of detection by the paper leading end detection means. This assures efficient reading of image information and allows an increase in processing speed in image reading while assuring reliability.

According to a second aspect of the present invention, there is provided an image reading apparatus which comprises a paper supply mechanism for successively supplying paper sheets set in position, a paper transport mechanism for transporting a paper sheet supplied thereto from the paper supply mechanism, an optical image reading mechanism for optically reading information on a front face and a rear face of a paper sheet being supplied by the paper transport mechanism, a paper stacking mechanism for stacking paper sheets discharged from the paper transport mechanism, the paper transport mechanism including a paper transport path including an inclined transport path for transporting a paper sheet supplied thereto from the paper supply mechanism in an inclined condition and a paper reversing transport path contiguous to the inclined transport path for reversing a paper sheet having been transported by the inclined transport path, a plurality of paper transport rollers disposed in a spaced relationship from each other by a distance less than the length of a paper sheet in its transportation direction along the paper transport path, a roller driving mechanism for driving the paper transport rollers, and roller driving mechanism control means for controlling the roller driving mechanism, the optical image reading mechanism including a first optical image reading unit for optically reading information on a front face of a paper sheet being transported along the inclined transport path, a second optical image reading unit for optically reading information on a rear face of a paper sheet being transported along the inclined transport path, and image information extraction control means for controlling extraction of image information obtained by the first optical image reading unit and the second optical image reading unit, and paper reading selection means for selecting whether one or both of front and rear faces of a paper sheet should be read, the image information extraction control means controlling extraction of image information obtained by the first optical image reading unit and the second optical image reading unit in response to a result of selection by the paper reading selection means.

With the image reading apparatus, there is no necessity of assuring a horizontal transport path portion, and accordingly, the image reading apparatus has an advantage in that the paper transport path can be shortened and a paper sheet can be transported rapidly and image reading of the paper sheet can be performed at a high speed. The image reading apparatus has a further advantage in that the entire apparatus can be reduced in size while the space for accommodating paper sheets to be read (that is, a paper hopper) or the space for stacking paper sheets (that is, a paper stacker) can be increased. Furthermore, reading of image information can be performed efficiently, and the processing speed in image reading can be increased while assuring reliability.

Preferably, each of paper sheets has a discrimination mark applied thereto which is indicative of whether one or both of front and rear faces of the paper sheet should be read, and the image information extraction control means controls extraction of image information obtained by the first optical image reading unit and the second optical image reading unit in response to a result of selection by the paper reading selection means and the discrimination mark read from the paper sheet. Such control assures efficient reading of image information and allows an increase in processing speed in image reading while assuring reliability.

Preferably, the discrimination mark is applied at a leading end portion including the leading end of each of paper sheets. Where the discrimination mark is applied at the specific location, immediately before image information of the paper sheet is read, information of whether one or both of front and rear faces of the paper sheet should be read is obtained. Consequently, subsequent reading of the image information can be controlled immediately in accordance with the thus read information. Accordingly, reading of image information can be performed further efficiently, and the processing speed in image reading can be greatly increased while assuring reliability.

Alternatively, the discrimination mark may be formed from a combination of a plurality of marks. This allows simultaneous reading of information other than information regarding a face or faces to be read such as, for example, information of an area or areas to be read. Consequently, reading of image information can be performed further efficiently, and the processing speed in image reading can be inreased very much while assuring reliability.

Preferably, the image information extraction control means includes discrimination mark image erasure means for erasing an image of the discrimination mark. Due to the provision of the discrimination mark image erasure means, while reading of image information is performed efficiently to increase the processing speed in image reading, the image reading apparatus is controlled so that only image information to be originally read, which does not include image information of the discrimination mark, is read or fetched. Consequently, appropriate image information can be obtained.

Preferably, the discrimination mark is recorded in a dropout color which cannot be read by any of the first optical image reading unit and the second optical image reading unit, and the image reading apparatus further comprises an optical discrimination mark image reading unit for reading the discrimination mark, the image information extraction control means controlling extraction of image information obtained by the first optical image reading unit and the second optical image reading unit in response to a result of selection by the paper reading selection means and the discrimination mark read by the optical discrimination mark image reading unit. Due to the provision of the optical discrimination mark image reading unit, while reading of image information is performed efficiently to increase the processing speed in image reading, only image information to be originally read, which does not include image information of the discrimination mark, is read or fetched. Consequently, appropriate image information can be obtained.

Preferably, the first optical image reading unit and the second optical image reading unit are constructed as optical image reading units having common specifications, and the image reading apparatus further comprises detection means for detecting whether each of the optical image reading units has been used to read a front face or a rear face of a paper sheet, the image information extraction control means controlling extraction of image information in response to a result of detection by the detection means. The detection means appropriately detects whether each of the optical image reading units is used to read a front face or a rear face of a paper sheet. Accordingly, read information can be processed appropriately.

Preferably, the image reading apparatus further comprises an apparatus body and an apparatus lid unit connected for pivotal motion to each other so as to be opened or closed relative to each other from or to the plane of the paper transport path, and a body-lid unit locking mechanism for holding the closed condition of the apparatus body and the apparatus lid unit at a plurality of different closed condition holding stages. Due to this structure, the transporting force can be suitably adjusted in accordance with a type of a paper sheet to be transported, and accordingly, the paper sheet can be transported at a high speed by a suitable transporting force to the paper sheet without causing such a trouble as paper jamming. Consequently, the processing speed in image reading can be raised.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 5 is a perspective view showing an outer profile of the image reading apparatus of FIG. 4;

FIG. 11 is a diagrammatic view schematically showing, in plan, a paper transport system of the image reading apparatus of FIG. 4;

FIGS. 16(A) and 16(B) are a plan view and a front elevational view, respectively, of a paper supply roller system of the paper supply mechanism of FIG. 14, FIG. 16(C) is a front elevational view showing only part of the paper supply roller system, and FIG. 16(D) is a side elevational view showing, in an enlarged scale, the paper supply roller system;

FIGS. 17(A), 17(B) and 17(C) are a plan view, a front elevational view and a side elevational view, respectively, of a separation roller system of the image reading apparatus of FIG. 4;

FIGS. 26(A) and 26(B) are a plan view and a side elevational view, respectively, showing a sheet guide system of the paper transport system of the image reading apparatus of FIG. 4;

FIGS. 27(A), 27(B) and 27(C) are a plan view, a front elevational view and a side elevational view, respectively, showing the sheet guide system of the paper transport system of FIG. 4;

FIG. 31 is a diagrammatic view schematically showing the construction of an optical image reading mechanism of the image reading apparatus of FIG. 4;

FIGS. 32(A) and 32(B) are a plan view and a front elevational view, respectively, showing a fluorescent lamp unit of the optical image reading mechanism of the image reading apparatus of FIG. 4;

FIG. 41 is a sequence diagram illustrating operation of a transport system of the image reading apparatus of FIG. 4 and particularly showing a transport starting sequence for a first paper sheet;

FIG. 42 is a similar view but particularly showing a transport starting sequence for a second or following paper sheet;

FIG. 43 is a similar view but particularly showing a transport starting sequence upon end of transportation;

FIG. 71 is a perspective view of a form of a cleaning structure for a sheet guide with an opening of the image reading apparatus of FIG. 4;

FIG. 80 is a block diagram showing an image data processing system of the image reading apparatus of FIG. 4;

FIG. 82 is a block diagram showing a white level algorithm circuit of the white level information correction apparatus shown in FIG. 81;

DESCRIPTION OF THE PREFERRED EMBODIMENT

Figure 1:
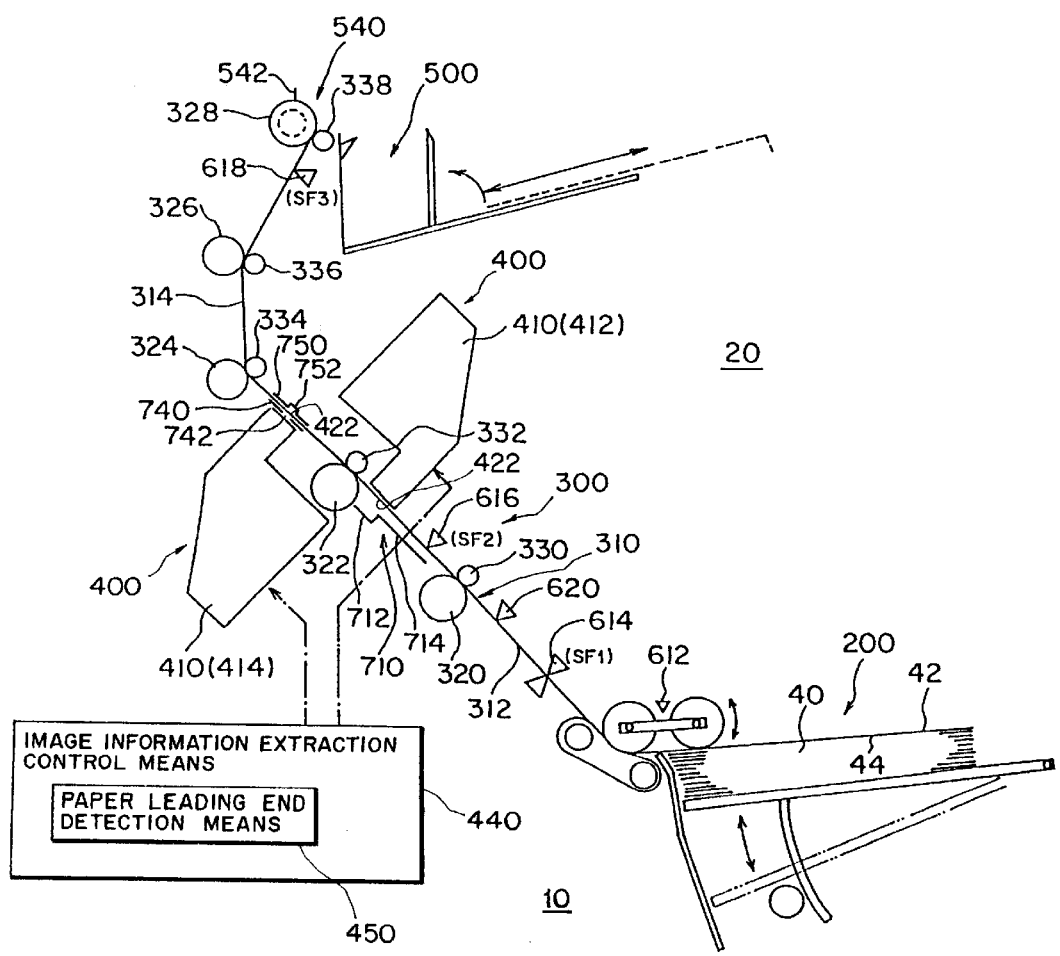
FIG. 1 is a diagrammatic view schematically showing, in side elevation, an arrangement of principal components of an image reading apparatus according to the present invention.
Figure 2:
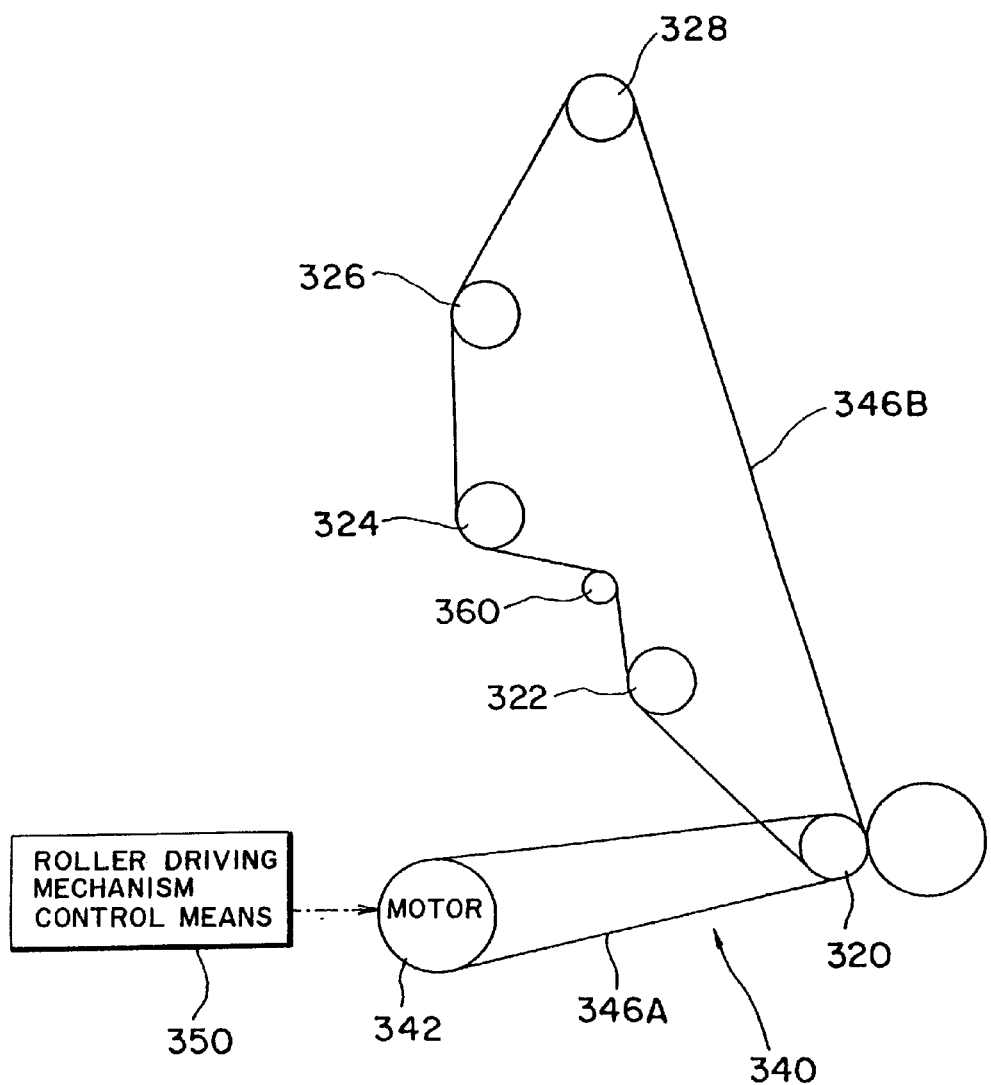
FIG. 2 is a diagrammatic view schematically showing, in side elevation, a driving system of another image reading apparatus according to the present invention.

Referring first to FIGS. 1 and 2, there is shown an image reading apparatus according to an aspect of the present invention. The image reading apparatus shown includes a paper supply mechanism 200 and a paper transport mechanism 300.

The paper supply mechanism 200 supplies paper sheets 40 set in position in advance therein one after another to the paper transport mechanism 300, and the paper transport mechanism 300 transports a paper sheet 40 supplied thereto in this manner.

The paper transport mechanism 300 includes a paper transport path 310, a plurality of paper transport rollers 320 to 328 disposed along the paper transport path 310, a roller driving mechanism 340 for driving the paper transport rollers 320 to 328, and roller driving mechanism control means 350 for controlling the roller driving mechanism 340.

Particularly, the paper transport path 310 includes an inclined transport path 312 for transporting a paper sheet 40 supplied thereto from the paper supply mechanism 200 in an inclined condition and a paper reversing transport path 314 contiguous to the inclined transport path 312 for reversing a paper sheet 40 having been transported by the inclined transport path 312.

Meanwhile, the paper transport rollers 320 to 328 are disposed in a spaced relationship from each other by a distance less than the length of a paper sheet 40 in its transportation direction along the paper transport path 310.

It is to be noted that, in the image reading apparatus shown in FIG. 1, the paper transport rollers 320 to 328 are constructed as driving rollers which are driven directly by the roller driving mechanism 340, and rollers 330 to 338 are constructed as follower rollers which are not driven directly by the roller driving mechanism 340 but can rotate freely. The follower rollers 330 to 338 are biased so as to be in contact with the respective opposing driving rollers 320 to 328. Consequently, the follower 330 to 338 are rotated by rotation of the driving rollers 320 to 328 with a paper sheet 40 held between them to assist the paper sheet 40 to be transported in a particular direction.

The image reading apparatus further includes an optical image reading mechanism 400 which optically reads information on a paper sheet 40 being transported by the paper transport mechanism 300. The optical image reading mechanism 400 includes an optical image reading unit 410 located intermediately of the paper transport mechanism 300 for optically reading information on a paper sheet 40, and image information extraction control means 440 for controlling extraction of image information obtained by the optical image reading unit 410.

The image reading apparatus further includes a paper stacking mechanism 500 for stacking paper sheets 40 discharged from the paper transport mechanism 300 after information has been optically read by the optical image reading mechanism 400.

In the image reading apparatus according to the aspect of the present invention described above, paper sheets 40 set in position in advance in the paper supply mechanism 200 are supplied one after another to the paper transport mechanism 300 by the paper supply mechanism 200. The paper transport mechanism 300 transports the paper sheet 40 supplied thereto in this manner along the paper transport path 310. Such transportation is performed by the plurality of paper transport rollers 320 to 328 disposed in a spaced relationship from each other by a distance smaller than the length of the paper sheet 40 in its transportation direction along the paper transport path 310. In this instance, the paper transport rollers 320 to 328 are driven to rotate by the roller driving mechanism 340 which is controlled by the roller driving mechanism control means 350.

During the transportation of the paper sheet 40 by the paper transport mechanism 300, information on the paper sheet 40 is optically read by the optical image reading mechanism 400. In this instance, the information is read by the optical image reading unit 410 provided in the optical image reading mechanism 400. Further, extraction of the image information obtained by the optical image reading unit 410 is controlled by the image information extraction control means 440 provided in the optical image reading mechanism 400.

The paper sheet 40 whose information has been optically read by the optical image reading mechanism 400 in this manner is discharged from the paper transport mechanism 300 and stacked into the paper stacking mechanism 500.

Accordingly, in the image reading apparatus of the present aspect, since the paper transport path is constituted from the inclined transport path and the paper reversing transport path and reading of a paper sheet is performed by the optical image reading mechanism while the paper sheet is being transported along the inclined transport path, there is no necessity of assuring a horizontal transport path portion, and the depthwise space required for a paper transport path can be reduced. Accordingly, the image reading apparatus is advantageous in that a paper sheet can be transported rapidly and image reading of the paper sheet can be performed at a high speed. The image reading apparatus is further advantageous in that the entire apparatus can be reduced in size while the space for accommodating paper sheets to be read (that is, a paper hopper) or the space for stacking paper sheets (that is, a paper stacker) can be increased. Consequently, it is facilitated to read a large amount of paper rapidly by successive operations with the apparatus of a compact size or to cope with various paper sheets from small size paper sheets to large size paper sheets.

It is to be noted that, in the construction described above, some or all of the paper transport rollers 320 to 328 may be constructed as rollers having fine particles sticking to the surfaces thereof. In this instance, such fine particles may be deposited on the entire surfaces or part of the surfaces of the rollers.

The fine particles on the surfaces of the paper transport rollers 320 to 328 increase the coefficient of friction of the outer surfaces of the paper transport rollers 320 to 328 so that an otherwise possible slip of the paper sheet 40 during transportation by the paper transport rollers 320 to 328 is prevented. Consequently, the image reading apparatus is advantageous in that a possible slip of a paper sheet upon transportation is prevented and image reading at a high speed can be performed smoothly.

The image reading apparatus may be constructed such that it further comprises a paper supply sensor 612 for detecting a paper sheet 40 supplied by the paper supply mechanism 200, a transport sensor 614 or 616 for detecting a paper sheet 40 being transported along the inclined transport path 312, and a discharge sensor 618 for detecting a paper sheet 40 discharged from the paper reversing transport path 314 into the paper stacking mechanism 500, and the roller driving mechanism control means 350 and the image information extraction control means 440 execute their controls in response to results of detection from the paper supply sensor 612, the transport sensor 614 or 616 and the discharge sensor 618.

In the image reading apparatus of the construction just described, controls by the roller driving mechanism control means 350 and the image information extraction control means 440 are executed in response to results of detection from the paper supply sensor 612 for detecting a paper sheet 40 supplied by the paper supply mechanism 200, the transport sensor 614 or 616 for detecting a paper sheet 40 being transported along the inclined transport path 312, and the discharge sensor 618 for detecting a paper sheet 40 discharged from the paper reversing transport path 314 into the paper stacking mechanism 500.

Accordingly, an image reading operation can be performed appropriately in accordance with a transportation condition of a paper sheet detected by the sensors. Further, even if paper jamming occurs intermediately of the paper transport path, this can be detected promptly, and operation of the apparatus can be stopped rapidly.

Further, the image reading apparatus may be constructed such that the roller driving mechanism control means 350 and the image information extraction control means 440 execute their controls in a synchronized relationship with each other.

Where controls by the roller driving mechanism control means 350 and the image information extraction control means 440 are synchronized with each other in this manner, the timings of a paper transporting operation and an image reading operation can be made coincide with each other. Accordingly, even where the processing speed in image reading is raised, a paper transporting operation and an image reading operation can be performed with certainty. Consequently, the image reading apparatus can realize a high processing speed and a high degree of reliability.

Accordingly, since a paper transporting operation and an image reading operation can be performed with certainty even where the processing speed in image reading is raised, the image reading apparatus can realize a high processing speed and a high degree of reliability.

Further, the image reading apparatus may be constructed such that the optical image reading mechanism 400 includes a first optical image reading unit 412 and a second optical image reading unit 414 for optically reading information on a front face 42 and a rear face 44 of a paper sheet 312 being transported along the inclined transport path 312, respectively, in order to optically read information on the front and rear faces 42 and 44 of the paper sheet 40 being transported by the paper transport mechanism 300, and image information extraction control means 440 for controlling extraction of image information obtained by the first optical image reading unit 412 and the second optical image reading unit 414.

Where the optical image reading mechanism 400 includes the first optical image reading unit 412 and the second optical image reading unit 414 in this manner, information on the front face of a paper sheet 40 is optically read by the first optical image reading unit 412, and information on the rear face of the paper sheet 40 is optically read by the second optical image reading unit 414. Then, the image information extraction control means 440 controls extraction of image information obtained by the first optical image reading unit 412 and the second optical image reading unit 414.

Accordingly, image information on the opposite faces of a paper sheet can be read rapidly, and consequently, the processing speed of an original which has information to be read on the opposite faces thereof is raised very much.

The first optical image reading unit 412 and the second optical image reading unit 414 may have common specifications.

Where the first optical image reading unit 412 and the second optical image reading unit 414 have common specifications in this manner, front face information and rear face information of a paper sheet 40 can be read with approximately equal degrees of accuracy. Further, in production of the apparatus, common parts can be used for the two units.

Accordingly, the degrees of accuracy in reading of front face information and rear face information of a paper sheet become equal to each other, and since parts of the two units are common, the cost required for production of the image reading apparatus can be reduced.

The image reading apparatus may be constructed such that it further comprises, in addition to the optical image reading unit 410, that is, in addition to the first optical image reading unit 412 and/or the second optical image reading unit 414, a different optical image reading unit or units having a common profile and structure with but having different specifications from the optical image reading unit 410, and any of the optical image reading unit 410 and the additional optical image reading unit or units is capable of being selectively mounted in the image reading apparatus.

Due to the construction, an optical image reading apparatus for a particular application can be constructed readily, and different models can be provided readily.

Accordingly, the reading accuracy and the cost can be balanced in such a manner that an optical image reading unit having a high precision is used to read a face of a paper sheet which requires a high precision in reading of image information while another optical image reading unit having a lower precision but superior in terms of the cost is used to read the other face of the paper sheet which does not require a high precision in reading of image information. Besides, since such optical image reading units having different specifications but having a common profile and structure can be selectively mounted, an optical image reading unit to be mounted can be changed readily at a low cost. Accordingly, types of image reading apparatus can be increased readily and at a low cost in accordance with applications.

The image reading apparatus may be constructed such that it further comprises a sheet guide 710 or 750 disposed along the inclined transport path 312 in an opposing relationship to the optical image reading unit 410 and having a backing portion 712 or 752 for providing a color reference to a paper sheet 40 and the backing portion 712 or 752 is offset from a paper guiding portion 714 or 754 of the sheet guide 710 or 750, which is provided for guiding a paper sheet 40, with a step 716 or 756 defined therebetween.

Where the sheet guide 710 or 750 is provided in this manner, a paper sheet 40 during transportation is guided by the paper guiding portion 714 or 754 of the sheet guide 710 or 750, and a color reference to the paper sheet 40 is provided by the backing portion 712 or 752 provided on the sheet guide 710 or 750. Particularly since the backing portion 712 or 752 is offset from the paper guiding portion 714 or 754 with the step 716 or 756 defined therebetween, the paper sheet 40 does not contact directly with the backing portion 712 or 752. Consequently, otherwise possible soiling to the backing portion 712 or 752 by passage of the paper sheet 40 is prevented, and consequently, a color reference to the paper sheet 40 can be provided appropriately.

Consequently, since otherwise possible soiling to the backing portion by passage of a paper sheet is prevented and a color reference to the paper sheet can be provided appropriately, the precision in image reading can be assured for a long period of time and maintenance of the apparatus is easy.

The sheet guide 710 or 750 may be resiliently biased toward the optical image reading unit 410.

Where the sheet guide 710 or 750 is resiliently biased toward the optical image reading unit 410 in this manner, a paper sheet 40 is guided to an appropriate position with respect to the image reading unit 410 corresponding to the focal length, and an error in reading resolution or magnification of information of the paper sheet by the image reading unit 410 is not caused.

Accordingly, since an error in reading resolution or magnification of information by the image reading unit is not caused, the reliability of the apparatus is improved very much.

Further, the image reading apparatus may be constructed such that the sheet guide 710 or 750 resiliently biased toward the optical image reading unit 410 is contacted with and stopped at a predetermined position by a contacting member (not shown in FIGS. 1 and 2) on the optical image reading unit 410.

Where the sheet guide 710 or 750 resiliently biased toward the optical image reading unit 410 is contacted with the contacting member in this manner, the sheet guide 710 or 750 is controlled to the predetermined position with a higher degree of certainty, and also the position of a paper sheet 40 with respect to the image reading unit 410 can be guided appropriately.

Accordingly, a paper sheet can be guided to an appropriate position with respect to the image reading unit, and accordingly, image reading can be performed with a high degree of accuracy.

The image reading apparatus may further comprise a backing member (not shown in FIGS. 1 and 2) located along the inclined transport path 312 in an opposing relationship to the optical image reading unit 410 for providing a color reference to a paper sheet 40, the backing member being formed as a rotatable member.

Where the backing member is provided along the inclined transport path 312, a color reference to a paper sheet 40 is provided by the backing member. Further, where the backing member is formed as a rotatable member, otherwise possible soiling to the surface (corresponding to the image reading section) of the rotatable member by passage of a paper sheet 40 is prevented by rotation of the backing member, and consequently, a color reference to a paper sheet can be provided appropriately.

Accordingly, since possible soiling to the backing portion by passage of a paper sheet is prevented with certainty and a color reference to the paper sheet can be provided appropriately, the precision in image reading can be assured for a long period of time and maintenance of the apparatus is easy.

The rotatable member of the backing member may be rotated at an equal speed to the speed of and in a same direction as the direction of transportation of a paper sheet 40.

Where the rotatable member of the backing member is rotated at an equal speed to the speed of and in a same direction as the direction of transportation of a paper sheet 40 in this manner, the surface of the backing member does not slip on a paper sheet 40, and accordingly, otherwise possible soiling to the backing member by passage of the paper sheet 40 is prevented with a higher degree of certainty, and consequently, a color reference to the paper sheet 40 can be provided further appropriately.

Accordingly, since otherwise possible soiling to the backing member by passage of a paper sheet is prevented with a higher degree of certainty and a color reference to the paper sheet can be provided further appropriately, the precision in image reading can be assured for a long period of time and maintenance of the apparatus is easy.

The image reading apparatus may comprise a brush provided in sliding contact with an outer circumferential face of the backing member for cleaning the outer circumferential face.

Where the brush slidably contacts with the outer circumferential face of the backing member in this manner, the outer circumferential face is cleaned by the brush, and consequently, a color reference to a paper sheet 40 can be provided appropriately.

Accordingly, since otherwise possible soiling to r the backing portion by passage of a paper sheet is prevented with a higher degree of certainty and a color reference to the paper sheet can be provided further s appropriately, the precision in image reading can be assured for a long period of time and maintenance of the apparatus is easy.

Referring to FIG. 1 again, the image reading apparatus may further include an apparatus body 10 and an apparatus lid unit 20. The apparatus body 10 and the apparatus lid unit 20 may be separate from each other along the boundary provided by the plane of the paper transport path 30, and the apparatus lid unit 20 may be connected for pivotal motion to the apparatus body 10 so as to be opened or closed relative to the apparatus body 10 from or to the plane of the paper transport path 310. Further, a backing member (not shown in FIGS. 1 and 2) for providing a color reference to a paper sheet 40 may be located adjacent the inclined transport path 312 in an opposing relationship to the optical image reading unit 410 such that it is moved by an interlocking mechanism (not shown in FIGS. 1 and 2) which operates in response to an opening or closing movement of the apparatus lid unit 20. A brush (not shown in FIGS. 1 and 2) may be provided for contacting, when the backing member is moved by a closing movement of the apparatus lid unit 20, with the backing member to clean the backing member.

Where the apparatus lid unit 20 is connected for pivotal motion to the apparatus body 10 so as to be opened or closed relative to the apparatus body 10 from or to the plane of the paper transport path 310 in this manner, maintenance of the paper transport path 310, which is an important object for maintenance, can be performed readily since the paper transport path 310 is opened by opening the apparatus lid unit 20. Further, where the backing member for providing a color reference to a paper sheet 40 is provided such that it is moved by the interlocking mechanism which operates in response to an opening or closing movement of the apparatus lid unit 20 and the brush is provided for contacting with the backing member to clean the backing member, upon an opening or closing movement of the apparatus lid unit 20, the backing member is moved by such movement, and simultaneously, the brush is contacted with the backing member to clean the backing member. Consequently, a color reference to the paper sheet 40 is provided appropriately.

Consequently, since maintenance of the paper transport path can be performed readily and the backing member is cleaned automatically so that a color reference to a paper sheet can be provided appropriately, the precision in image reading can be assured for a long period of time and maintenance of the apparatus is easy.

The backing member may be constructed as a rotatable member such that it is rotated by an interlocking mechanism which operates in response to an opening or closing movement of the apparatus lid unit 20, the brush being constructed so as to contact, when the backing member is rotated, with the backing member to clean the backing member.

Where the backing member is constructed as a rotatable member which is rotated by the interlocking mechanism, upon an opening or closing movement of the apparatus lid unit 20, the rotary member as the backing member is rotated by such movement, whereupon the brush is contacted with the rotating rotatable member (backing member) to clean the rotatable member. Consequently, a color reference to a paper sheet 40 can be provided appropriately.

Accordingly, otherwise possible soiling to the backing portion by passage of a paper sheet is prevented with a higher degree of certainty, and consequently, a color reference to a paper sheet can be provided further appropriately. Consequently, the precision in image reading can be assured for a long period of time and maintenance of the apparatus is easy.

The image reading apparatus may further comprise a sheet guide 710 or 750 disposed along the inclined transport path 312 in an opposing relationship to the optical image reading unit 410 and having a backing portion 712 or 752 for providing a color reference to a paper sheet 40, the sheet guide 710 or 750 further having a protrusion (not shown) provided at a portion thereof immediately prior to an image reading point 422 by the image reading unit 410.

Where the sheet guide 710 or 750 has the protrusion provided at the portion thereof immediately prior to the image reading point 422 by the image reading unit 410, a paper sheet 40 is spaced away from the sheet guide 710 or 750 by the protrusion. Consequently, the paper sheet 40 no more contacts directly with the backing portion 712 or 752, and accordingly, a color reference to the paper sheet 40 is provided appropriately.

Accordingly, since otherwise possible soiling to the backing portion by passage of a paper sheet can be prevented with a high degree of certainty and a color reference to a paper sheet can be provided appropriately, the precision in image reading can be assured for a long period of time and maintenance of the apparatus is easy.

The image reading apparatus may further include a sheet guide 740 with an opening 742 disposed in an opposing relationship to the optical image reading unit 410 at a location along the inclined transport path 312 corresponding to the image reading point 422 by the optical image reading unit 410, and a backing member 752 disposed at a location in the opening 742 on the opposite side to the location of the optical image reading unit 410 with respect to the inclined transport path 312 for providing a color reference to a paper sheet 40.

Where the sheet guide 740 with the opening 742 is disposed at the location corresponding to the image reading point 422 by the optical image reading unit 410 and the backing member 752 for providing a color reference to a paper sheet 40 is disposed at the location in the opening 742 on the opposite side to the location of the optical image reading unit 410 with respect to the inclined transport path 312, while a paper sheet 40 is contacted with and guided by, during transportation thereof, the paper sheet 40 with the opening 742, reading of an information and detection of the color reference from the backing member 752 can be performed through the opening 742.

Accordingly, while a paper sheet is guided with certainty, reading of an image of the paper sheet and detection of a color reference to the paper sheet can be performed with certainty. This is particularly effective where the image reading unit is disposed in the direction of the force of gravity with respect to the paper transport path.

The image information extraction control means 440 may include paper leading end detection means 450 for detecting a leading end portion 46 of a paper sheet 40 from an amount of variation of the output of the optical image reading unit 410, the image information extraction control means 440 controlling extraction of image information from the optical image reading unit 410 in response to a result of detection by the paper leading end detection means 450.

In this manner, the paper leading end detection means 450 detects a leading end portion 46 of a paper sheet 40 from an amount of variation of the output of the optical image reading unit 410, and the image information extraction control means 440 controls extraction of image information from the optical image reading unit 410 in response to a result of detection by the paper leading end detection means 450.

Accordingly, reading of image information is performed efficiently, and an increase in processing speed in image reading can be achieved while assuring reliability.

Figure 3:
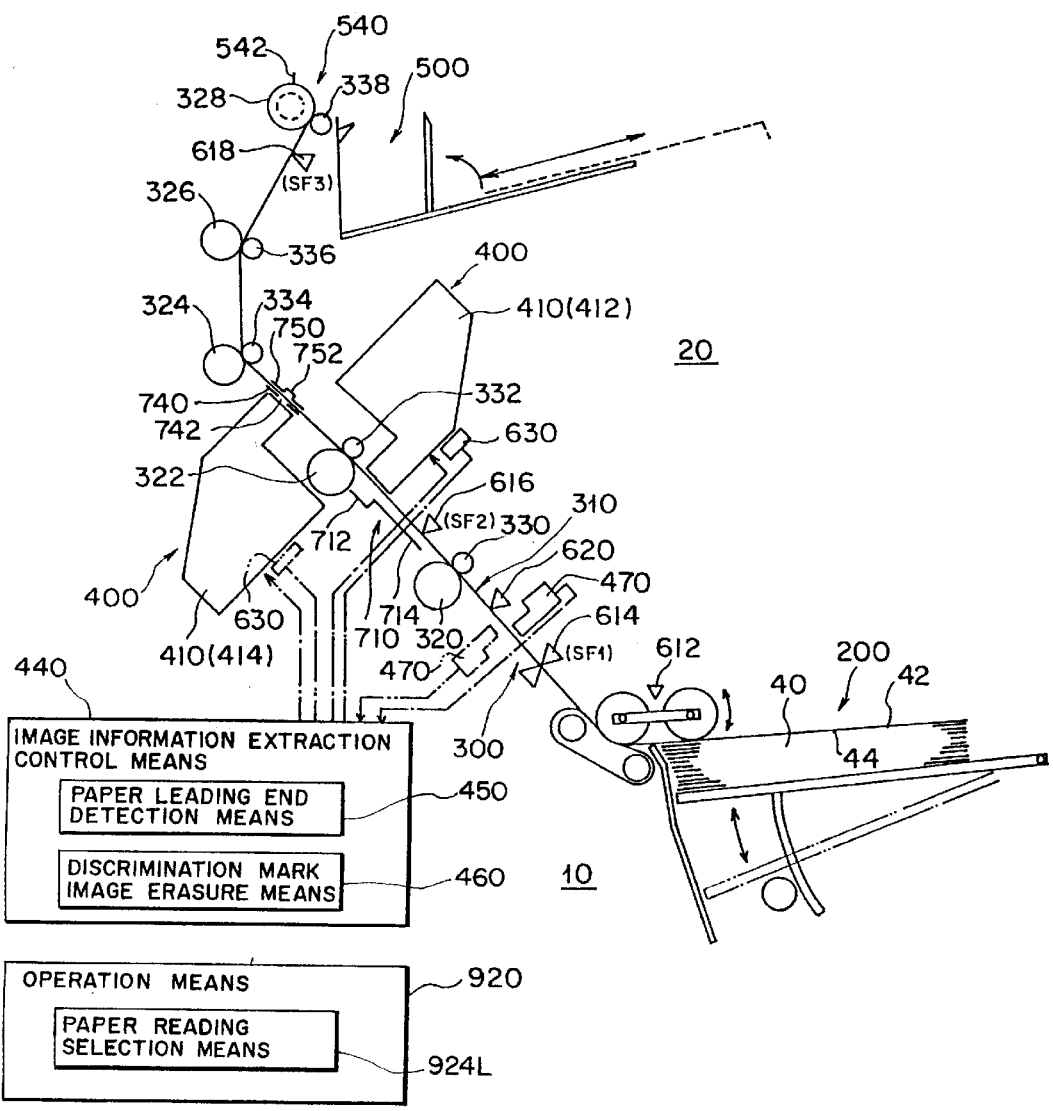
FIG. 3 is a diagrammatic view schematically showing, in side elevation, an arrangement of principal components of a further image reading apparatus according to the present invention.

Referring now to FIG. 3, there is shown an image reading apparatus according to a second aspect of the present invention. Since the driving system of the image reading apparatus is similar to that described hereinabove with reference to FIG. 2, the image reading apparatus will be described below with reference to FIGS. 2 and 3.

Referring to FIGS. 2 and 3, the image reading apparatus shown includes a paper supply mechanism 200 and a paper transport mechanism 300.

The paper supply mechanism 200 supplies paper sheets 40 set in position in advance therein one after another to the paper transport mechanism 300, and the paper transport mechanism 300 transports a paper sheet 40 supplied thereto in this manner.

The paper transport mechanism 300 includes a paper transport path 310, a plurality of paper transport rollers 320 to 328 disposed along the paper transport path 310, a roller driving mechanism 340 for driving the paper transport rollers 320 to 328, and roller driving mechanism control means 350 for controlling the roller driving mechanism 340.

Particularly, the paper transport path 310 includes an inclined transport path 312 for transporting a paper sheet 40 supplied thereto from the paper supply mechanism 200 in an inclined condition and a paper reversing transport path 314 contiguous to the inclined transport path 312 for reversing a paper sheet 40 having been transported by the inclined transport path 312.

Meanwhile, the paper transport rollers 320 to 328 are disposed in a spaced relationship from each other by a distance smaller than the length of a paper sheet 40 in its transportation direction along the paper transport path 310.

It is to be noted that, in the image reading apparatus shown in FIG. 3, the paper transport rollers 320 to 328 are constructed as driving rollers which are driven directly by the roller driving mechanism 340, and rollers 330 to 338 are constructed as follower rollers which are not driven directly by the roller driving mechanism 340 but can rotate freely. The follower rollers 330 to 338 are biased so as to be contacted with the respective opposing driving rollers 320 to 328. Consequently, the follower 330 to 338 are rotated by rotation of the driving rollers 320 to 328 with a paper sheet 40 held between them to assist the paper sheet 40 to be transported in a particular direction.

The image reading apparatus further includes an optical image reading mechanism 400 for optically reading information on a front face 42 and a rear face 44 of a paper sheet 40 being supplied by the paper transport mechanism 300. To this end, the optical image reading mechanism 400 includes a first optical image reading unit 412 for optically reading information on the front face 42 of a paper sheet 40, a second optical image reading unit 414 for optically reading information on the rear face 44 of the paper sheet 40, and image information extraction control means 440 for controlling extraction of image information obtained by the first optical image reading unit 412 and the second optical image reading unit 414.

The image reading apparatus further includes paper reading selection means 924L for selecting whether one or both of front and rear faces 42 and 44 of a paper sheet 40 should be read. The paper reading selection means 924L is provided in operation means (operation panel) 920 which is operated by an operator. The image information extraction control means 440 controls extraction of image information obtained by the first optical image reading unit 412 and the second optical image reading unit 414 in response to a result of selection by the paper reading selection means 924L.

The image reading apparatus further includes a paper stacking mechanism 500 for stacking paper sheets 40 discharged from the paper transport mechanism 300 after information has been optically read by the optical image reading mechanism 400.

In the image reading apparatus according to the present aspect of the present invention described above, paper sheets 40 set in position in advance in the paper supply mechanism 200 are supplied one after another to the paper transport mechanism 300 by the paper supply mechanism 200. The paper transport mechanism 300 transports the paper sheet 40 supplied thereto in this manner along the paper transport path 310. Such transportation is performed by the plurality of paper transport rollers 320 to 328 disposed in a spaced relationship from each other by a distance smaller than the length of the paper sheet 40 in its transportation direction along the paper transport path 310. In this instance, the paper transport rollers 320 to 328 are driven to rotate by the roller driving mechanism 340 which is controlled by the roller driving mechanism control means 350.

During the transportation of the paper sheet 40 by the paper transport mechanism 300, information on the paper sheet 40 is optically read by the optical image reading mechanism 400. Upon such information reading, if it is selected by the paper reading selection means 924L that only one face of the paper sheet 40 should be read, then the image information extraction control means 440 in the optical image reading mechanism 400 controls so that image information is extracted only from one of the first optical image reading unit 412 and the second optical image reading unit 414 which is provided to read the selected face (front face or rear face) of the paper sheet 40. On the other hand, if it is selected by the paper reading selection means 924L that both faces of the paper sheet 40 should be read, then the image information extraction control means 440 in the optical image reading mechanism 400 controls so that image information of both faces (front face and rear face) of the paper sheet 40 is extracted from both of the first optical image reading unit 412 and the second optical image reading unit 414.

The paper sheet 40 whose information has been optically read by the optical image reading mechanism 400 in this manner is discharged from the paper transport mechanism 300 and stacked into the paper stacking mechanism 500.

In this manner, the image reading apparatus of the present aspect is advantageous in that there is requirement of a horizontal transport path portion and the paper transport path can be formed short and consequently, a paper sheet can be transported rapidly and image reading of the paper sheet can be performed at a high speed. The image reading apparatus is further advantageous in that the entire apparatus can be reduced in size while the space for accommodating paper sheets to be read (that is, a paper hopper) or the space for stacking paper sheets (that is, a paper stacker) can be increased. Further, image information can be read efficiently, and an increase in processing speed in image reading can be achieved while assuring reliability.

Where each of paper sheets 40 has a discrimination mark (not shown in FIGS. 2 and 3) applied thereto and indicative of whether one or both of front and rear faces of the paper sheet 40 should be read, the image information extraction control means 440 may control extraction of image information obtained by the first optical image reading unit 412 and the second optical image reading unit 414 in response to a result of selection by the paper reading selection means 924L and the discrimination mark applied to the paper sheet 40.

Where a paper sheet 40 has a discrimination mark applied thereto which indicates whether one or both of front and rear faces of the paper sheet 40 should be read, the image information extraction control means 440 controls extraction of image information obtained by the first optical image reading unit 412 and the second optical image reading unit 414 in response to a result of selection by the paper reading selection means 924L and the discrimination mark applied to the paper sheet 40.

For example, when one face reading originals are mixed in both face reading originals, if the discrimination mark which designates one face reading is applied to each of the one face reading originals the quantity of which is smaller than that of the both face reading originals and it is selectively set by way of the original selection switch 924L that both faces of each paper sheet 40 should be read, then image information on both faces of a paper sheet 40 is normally read by both of the first optical image reading unit 412 and the second optical image reading unit 414. However, when a discrimination mark is detected from a paper sheet 40, image information only on the front face or the rear face of the paper sheet 40 is read by the first optical image reading unit 412 or the second optical image reading unit 414.

On the contrary, when both face reading originals are mixed in one face reading originals, if a discrimination mark which designates double face reading is applied to each of the double face reading originals the quantity of which is smaller than that of the one face reading originals and it is selectively set by way of the original selection switch 924L that one face of each paper sheet 40 should be read, then image information only on the front face or the rear face of a paper sheet 40 is normally read by the first optical image reading unit 412 or the second optical image reading unit 414. However, when a discrimination mark is detected from a paper sheet, image information on the both faces of the paper sheet 40 is read by both of the first optical image reading unit 412 and the second optical image reading unit 414.

Consequently, reading of image information can be performed efficiently, and the processing speed in image reading can be increased while assuring reliability.

Preferably, the discrimination mark is applied at a leading end portion 46 including the leading end 46A of each of paper sheets 40.

Where the discrimination mark is applied at the leading end portion 46 including the leading end 46A of each of paper sheets 40, for example, at a point of time when the leading end 46 of the paper sheet 40 arrives at one of the first optical image reading unit 412 and the second optical image reading unit 414, the discrimination mark is read by the first optical image reading unit 412 or the second optical image reading unit 414, and both faces or one case of the paper sheet 40 is read in response to a result of the reading.

Accordingly, immediately before image information of a paper sheet is read, information of whether one or both of front and rear faces of the paper sheet should be read is obtained. Consequently, subsequent reading of the image information can be controlled immediately in accordance with the thus read information. Accordingly, reading of image information can be performed further efficiently, and the processing speed in image reading can be increased very much while assuring reliability.

The discrimination mark may be constituted from a combination of a plurality of marks.

Where the discrimination mark is constituted from a combination of a plurality of marks in this manner, information other than information regarding a face or faces to be read such as, for example, information of an area or areas to be read can be read simultaneously.

Accordingly, since information other than information regarding a face or faces to be read such as, for example, information of an area or areas to be read can be read simultaneously, reading of image information can be performed further efficiently, and the processing speed in image reading can be increased very much while assuring reliability.

The image information extraction control means 440 may include discrimination mark image erasure means 460 for erasing an image of the discrimination mark.

Where the image information extraction control means 440 includes the discrimination mark image erasure means 460 in this manner, the discrimination mark image erasure means 460 erases an error of the discriminate mark, and consequently, only image information to be originally read, which does not include image information of the discrimination mark, is read or fetched.

Accordingly, since only image information to be originally read, which does not include image information of the discrimination mark, is read or fetched while reading of image information is performed efficiently to increase the processing speed in image reading, appropriate image information can be obtained.

Where the discrimination mark is recorded in a drop-out color which cannot be read by any of the first optical image reading unit 412 and the second optical image reading unit 414, the image reading apparatus may further comprise an optical discrimination mark image reading unit 470 for reading the discrimination mark and may be constructed such that the image information extraction control means 440 controls extraction of image information obtained by the first optical image reading unit 412 and the second optical image reading unit 414 in response to a result of selection by the paper reading selection means 924L and the discrimination mark read by the optical discrimination mark image reading unit 470.

Where the discrimination mark is recorded in a drop-out color which cannot be read by any of the first optical image reading unit 412 and the second optical image reading unit 414 in this manner, the first optical image reading unit 412 and the second optical image reading unit 414 read only image information to be originally read, which does not include image information of the discrimination mark. Then, the discrimination mark is read by the optical discrimination mark image reading unit 470 for exclusive use, and the image information extraction control means 440 controls extraction of image information obtained by the first optical image reading unit 412 and the second optical image reading unit 414 in response to a result of selection by the paper reading selection means 924L and the discrimination mark read by the optical discrimination mark image reading unit 470.

Consequently, since only image information to be originally read, which does not include image information of the discrimination mark, is read or fetched while reading of image information is performed efficiently to increase the processing speed in image reading, appropriate image information can be obtained.

The image reading apparatus may be constructed such that the first optical image reading unit 412 and the second optical image reading unit 414 are constructed as optical image reading units 410 having common specifications, that it further includes detection means 630 for detecting whether each of the optical image reading units 410 has been used to read the front face 42 or the rear face 44 of a paper sheet 40, and that the image information extraction control means 440 controls extraction of image information in response to a result of detection by the detection means 630.

Where the first optical image reading unit 412 and the second optical image reading unit 414 are constructed as optical image reading units 410 having common specifications and the detection means 630 is provided for the optical image reading units 410, the detection means 630 detects whether each of the optical image reading units 410 as the first optical image read unit 412 and the second optical image reading unit 414 has been used to read the front face 42 or the rear face 44 of a paper sheet 40. Then, the image information extraction control means 440 controls extraction of image information in response to a result of detection by the detection means 630.

Consequently, it is detected appropriately whether each of the optical image reading units is used to read the front face or the rear face of a paper sheet, and read information can be processed appropriately.

Further, the image reading apparatus may be constructed such that it further includes an apparatus body 10 and an apparatus lid unit 20 which are separate from each other along the boundary provided by the plane of the paper transport path 310 while the apparatus lid unit 20 is connected for pivotal motion to the apparatus body 10 so as to be opened or closed relative to the apparatus body 10 from or to the plane of the paper transport path 310, and a body-lid unit locking mechanism (not shown in FIGS. 1 to 3) for holding the closed condition of the apparatus body 10 and the apparatus lid unit 20 at a plurality of different closed condition holding stages.

Where the image reading apparatus is constructed in this manner, the gap of the paper transport path 310 or the contacting condition between an apparatus body side member and an apparatus lid unit side member of the paper transport path 310 is adjusted by varying the closed condition between the apparatus body 10 and the apparatus lid unit 20. Consequently, the transporting force of the paper transport path 310 is adjusted to a transporting force suitable to a type of a paper to be transported.

Accordingly, since the transporting force can be adjusted suitably in accordance with a type of a paper sheet to be transported, the paper sheet can be transported at a high speed by a suitable transporting force to the paper sheet without causing such a trouble as paper jamming. Consequently, the processing speed in image reading can be raised.

b. Embodiment of the Invention

An image reading apparatus according to a preferred embodiment of the present invention will be described in detail below with reference to the accompanying drawings.

1. General Construction of the Image Reading Apparatus

Referring first to FIGS. 4 to 7, there is shown an image reading apparatus according to a preferred embodiment of the present invention. The general structure of the image reading apparatus shown can be divided into an apparatus body 10 and an apparatus lid unit 20. The apparatus lid unit 20 is mounted for pivotal motion around a fulcrum 32 to open or close the apparatus body 10. When the image reading apparatus is used, the apparatus lid unit 20 is fixed to such a closing condition as indicated by solid lines in FIGS. 4 to 6 by a body-lid unit locking mechanism 30. Various other components of the image reading apparatus are mounted on the apparatus body 10 and the apparatus lid unit 20.

Figure 4:
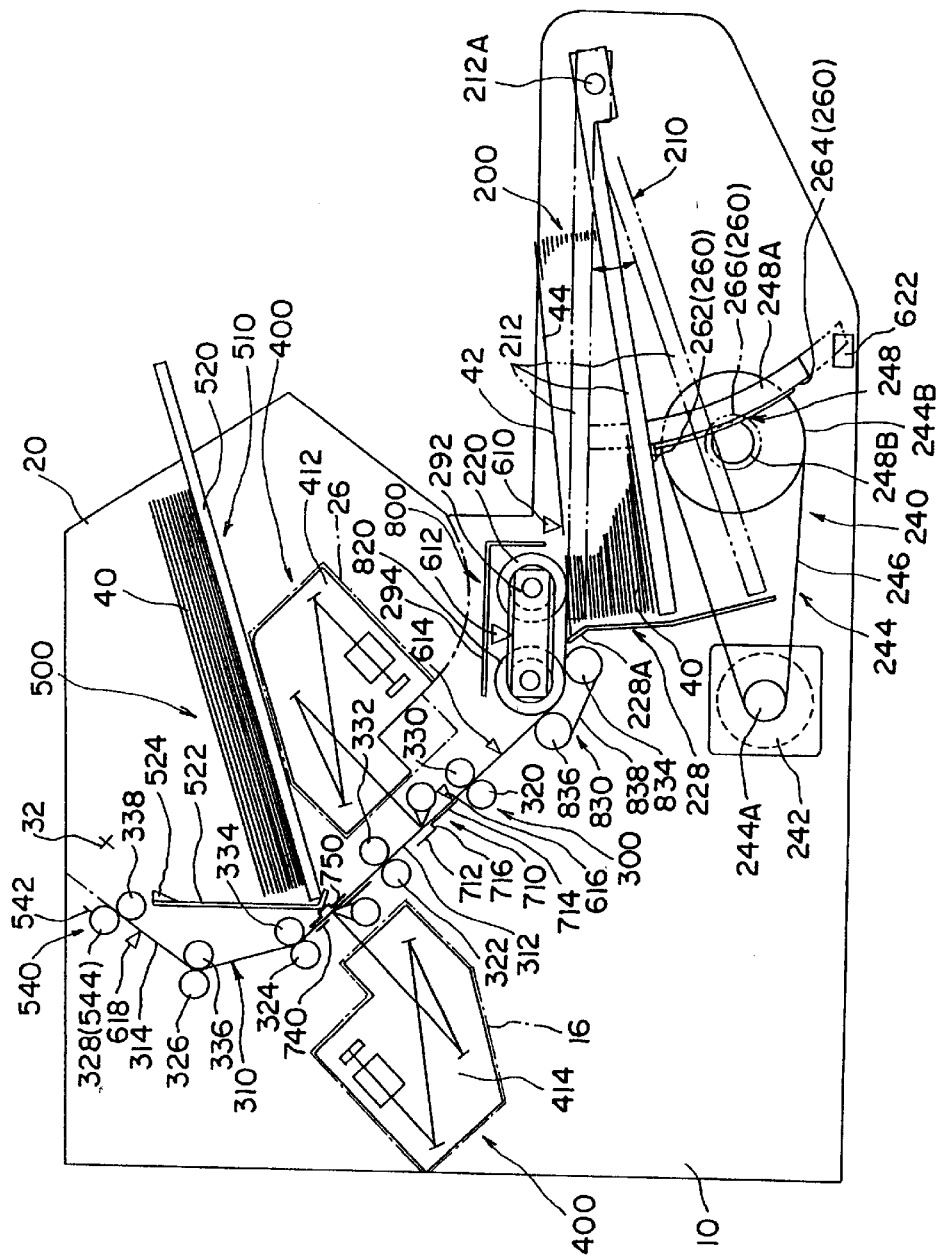
FIG. 4 is a schematic side elevational sectional view of an image reading apparatus showing a preferred embodiment of the present invention.
Figure 6:
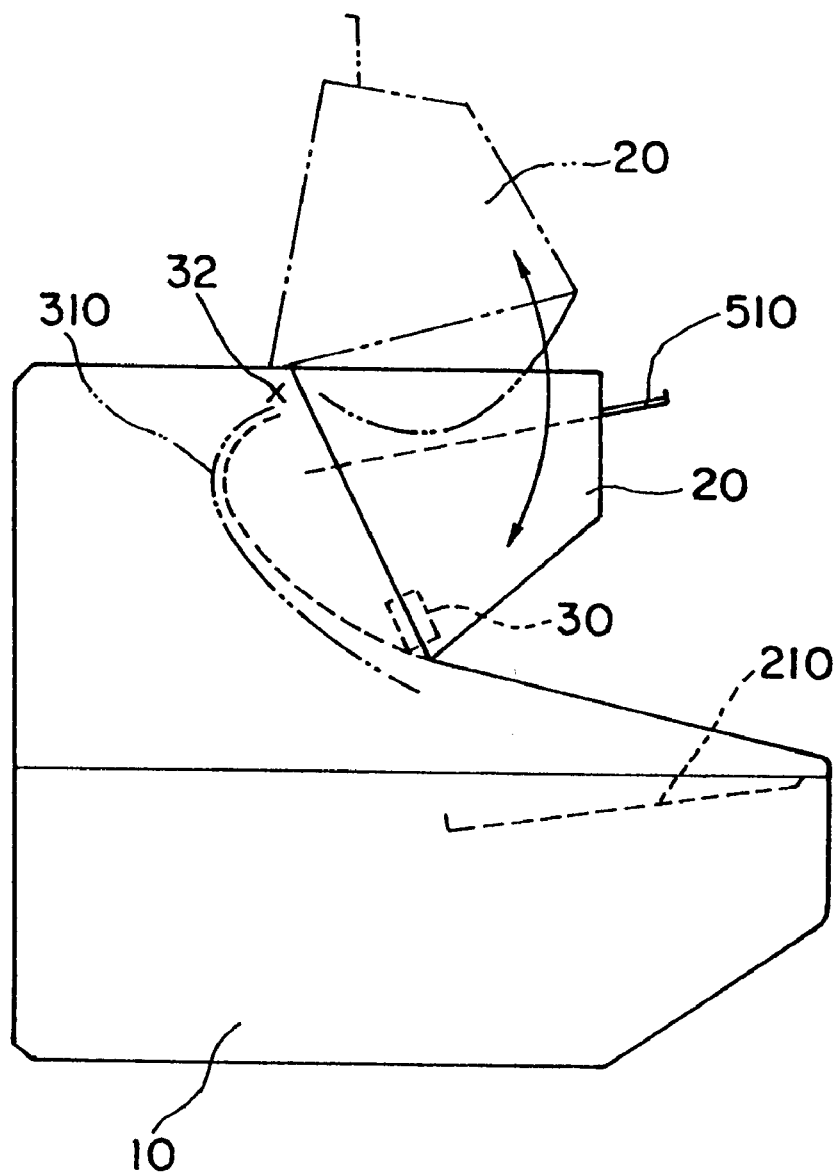
FIG. 6 is a schematic side elevational view showing an outer profile of the image reading apparatus of FIG. 4.
Figure 7:
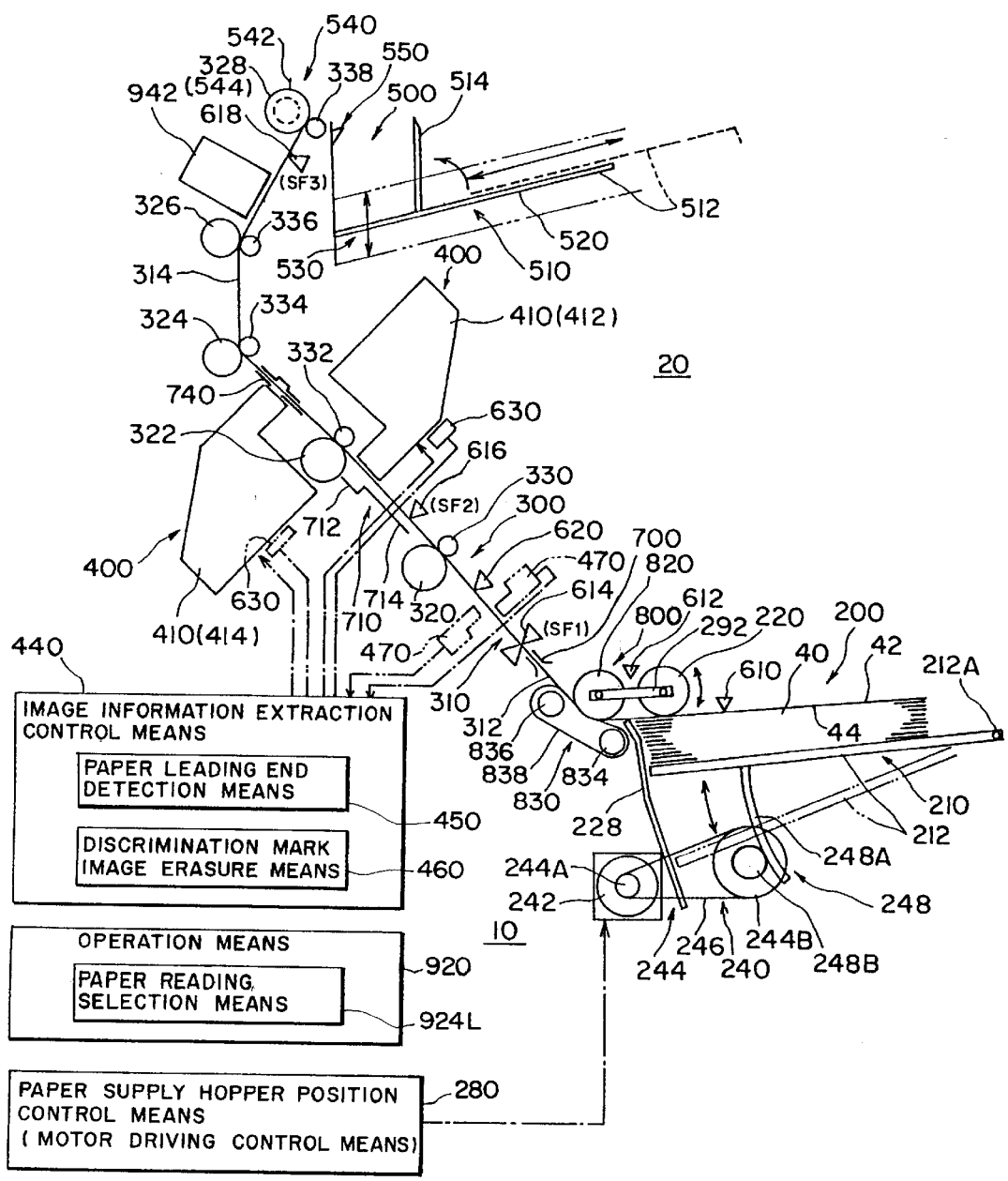
FIG. 7 is a diagrammatic view schematically showing, in side elevation, an arrangement of principal components of the image reading apparatus of FIG. 4.

Referring to FIGS. 4 and 7, the image reading apparatus includes, as components thereof, a paper supply mechanism 200 which can successively supply paper sheets 40 accommodated therein, a paper transport mechanism 300 for transporting a paper sheet 40 supplied from the paper supply mechanism 200, an optical image reading mechanism 400 for optically reading information on a paper sheet 40 being transported by the paper transport mechanism 300, and a paper stacking mechanism 500 for receiving a paper sheet 40 discharged from the paper transport mechanism 300 to stack such paper sheets 40.

The paper supply mechanism 200 includes a paper supply hopper 210 which can accommodate therein paper sheets 40 to be read, a paper supply roller 220 located above the paper supply hopper 210 for supplying one of paper sheets 40 accommodated in the paper supply hopper 210 toward the paper transport mechanism 300 which will be hereinafter described, a paper supply roller driving mechanism 230 for driving the paper supply roller 220 to rotate, a paper supply hopper driving mechanism 240 for driving the paper supply hopper 210 to an inclined position in response to the amount of paper sheets 40 accommodated in the paper supply hopper 210, and a paper separation mechanism 800 located on the downstream side of the paper supply hopper 210 in the paper transporting direction for preventing two or more paper sheets supplied by the paper supply roller 220 from being fed to the paper transport mechanism 300.

The paper supply hopper 210 includes a hopper table 212 supported for pivotal motion on a rotatable shaft 212A located at a rear end portion of the image reading apparatus. The hopper table 212 is driven at an end portion (left end portion in FIGS. 4 and 7) thereof by a rack-and-pinion mechanism 248 of the paper supply hopper driving mechanism 240 so that it is pivoted upwardly and downwardly and adjusted to a predetermined inclined position. The hopper table 212 includes, as shown in FIG. 5, a pair of tiltable paper edge guide members 214 for guiding the opposite side edges of the paper sheets 40 accommodated in the paper supply hopper 210.

The paper supply hopper driving mechanism 240 includes, as a driving source, a hopper motor 242 constituted from a stepper motor. The driving force of the hopper motor 242 is transmitted to the rack-and-pinion mechanism 248 by way of a belt-and-pulley mechanism 244.

Meanwhile, the paper supply roller 220 is supported for rocking motion around an axis of a separation roller 820, which will be hereinafter described, by way of a rockable arm 292 such that it can be retracted upwardly from a space above the paper supply hopper 210. Particularly, here, a rocking arm position control member not shown which can contact with the rockable arm 292 so as to define an uppermost position of the paper supply roller 220 is provided. The rocking arm position control member is projected, for example, when the paper supply hopper 210 is moved down to its lowermost or bottom position, to restrict the rockable arm 292, but when the image reading apparatus is started, the rocking arm position control member is retracted to cancel the restriction of the rockable arm 292.

Thus, a paper supply roller retraction mechanism 270 is constituted from the rocking structure for the rockable arm 292 and the rocking arm position control member described above.

When it is attempted to accommodate paper sheets 40 into the paper supply hopper 210, the paper supply roller 220 is automatically retracted upwardly from the space above the paper supply hopper 210 by the paper supply roller retraction mechanism 270 to facilitate such accommodation of paper sheets.

On the other hand, when the image reading apparatus is operative, unless the paper supply roller 220 is artificially retracted upwardly, the paper supply roller 220 is normally at a position suitably moved down by the weight of the paper supply roller 220 itself or by means of a spring not shown. Then, when the paper supply hopper 210 is pivoted, the paper supply roller 220 is moved upwardly by a required amount in response to the position of the upper face of the paper sheets 40 accommodated in the hopper table 212 which is moved upwardly or downwardly by pivotal motion of the paper supply hopper 210.

Referring now to FIGS. 4 and 7 to 9, the paper supply roller driving mechanism 230 for driving the paper supply roller 220 to rotate includes, as a driving source, a transport motor 342 constituted from a stepper motor. The paper supply roller driving mechanism 230 further includes a first belt-and-pulley mechanism 344 and first to third gear mechanisms 852, 856 and 232 interposed between the transport motor 342 and the paper supply roller 220. A pick clutch 238 constituted from an electromagnetic clutch is provided at an inputting portion of the driving force to the paper supply roller 220 from the third gear mechanism 232.

The paper supply roller driving mechanism 230 is controlled by paper supply roller driving mechanism control means 250 in response to the paper supplying position (hopper paper supplying position) of the paper supply hopper 210. More particularly, the paper supply roller driving mechanism control means 250 controls the pick clutch 238 between on and off states to control operation of the paper supply roller driving mechanism 230, that is, the rotation condition of the paper supply roller 220.

The paper separation mechanism 800 includes a separation roller 820, a rotation member 830 disposed in an opposing relationship to the separation roller 820, and a separation roller driving mechanism 850 for driving the separation roller 820 to rotate.

The rotation member 830 is located below the separation roller 820 and includes a pair of pulleys 834 and 836 disposed in a spaced relationship from each other in the paper transporting direction and an endless belt 838 wound between and around the pulleys 834 and 836.

The separation roller driving mechanism 850 is constituted from components substantially common to those of the paper supply roller driving mechanism 230 described hereinabove. In particular, as shown in FIGS. 4 and 7 to 9, the separation roller driving mechanism 850 includes the transport motor 342 described hereinabove as a driving source and further includes the first belt-and-pulley mechanism 344 and the first and second gear mechanisms 852 and 856 interposed between the transport motor 342 and the paper supply roller 220. A separation clutch 854 constituted from an electromagnetic clutch is interposed in the first gear mechanism 852. In short, the paper supply roller driving mechanism 230 has a construction wherein the third gear mechanism 232 is provided in addition to the separation roller driving mechanism 850. It is to be noted that operation of the separation clutch 854 is controlled by separation clutch control means 858.

Meanwhile, the paper transport mechanism 300 includes a paper transport path 310 for transporting a paper sheet 40 supplied thereto from the paper supply mechanism 200, a plurality of paper transporting rollers 320 to 328 disposed along the paper transport path 310, a roller driving mechanism 340 for driving the paper transporting rollers 320 to 328, and roller driving mechanism control means 350 for controlling the roller driving mechanism 340. Idler rollers 330 to 338 are provided corresponding to the paper transporting rollers 320 to 328, respectively.

The paper transport path 310 includes an inclined transport path 312 for transporting a paper sheet 40 supplied thereto from the paper supply mechanism 200 in an inclined condition, and a paper reversing transport path 314 provided contiguously to the inclined transport path 312 for reversing the paper sheet 40 transported by the inclined transport path 312.

Due to the construction of the paper transport path 310, the posture of one of the paper sheets 40 supplied from the paper supply hopper 210 is changed first from a substantially horizontal posture in the paper supply hopper 210 to a rearwardly inclined posture in the inclined transport path 312 and is then reversed by the paper reversing transport path 314, and then, in this posture, the paper sheet 40 is discharged to the paper stacking mechanism 500.

Consequently, a paper sheet which is directed upwardly in the paper supply hopper 210 is directed downwardly in the paper stacking mechanism 500, and the paper sheets 40 accommodated one on another in the paper supply hopper 210 are successively stacked into the paper stacking mechanism 500 without changing the order of them.

Meanwhile, the paper transporting rollers 320 to 328 and the idler rollers 330 to 338 are disposed in a condition distributed discretely at a distance smaller than the length of the paper sheets 40 in the transporting direction as seen from FIGS. 4 and 7 to 9.

The roller driving mechanism 340 includes the transport motor 342 described above as a driving source and further includes a second belt-and-pulley mechanism 348 in addition to the first belt-and-pulley mechanism 344. The first and second belt-and-pulley mechanisms 344 and 348 will be described here. The first belt-and-pulley mechanism 344 includes a pulley 344A mounted on a rotary shaft of the transport motor 342, another pulley 344B mounted on a rotary shaft 320A of the paper transporting roller 320, and a belt 346A wound between and around the pulleys 344A and 344B. The second belt-and-pulley mechanism 348 includes pulleys 320B to 328B mounted on the rotary shafts 320A to 328A of the paper transporting rollers 320 to 328, and a belt 346B wound between and around the pulleys 320B to 328B.

Accordingly, when the transport motor 342 operates, the driving force is transmitted from the rotary shaft of the transport motor 342 to the pulley 344B by way of the pulley 344A and the belt 346A so that the rotary shaft 320A of the paper transporting roller 320 is driven to rotate. Further, from the pulley 320B, the rotary shafts 322A to 328A of the other paper transporting rollers 322 to 328 are driven to rotate by way of the belt 346A and the pulleys 322B to 328B so that the paper transporting rollers 320 to 328 are driven to rotate simultaneously. It is to be noted that reference numeral 360 denotes a tension pulley which applies a suitable tensile force to the belt 346A so that the driving force may be transmitted with certainty between the belt 346A and the pulleys 320B to 328B.

Figure 9:
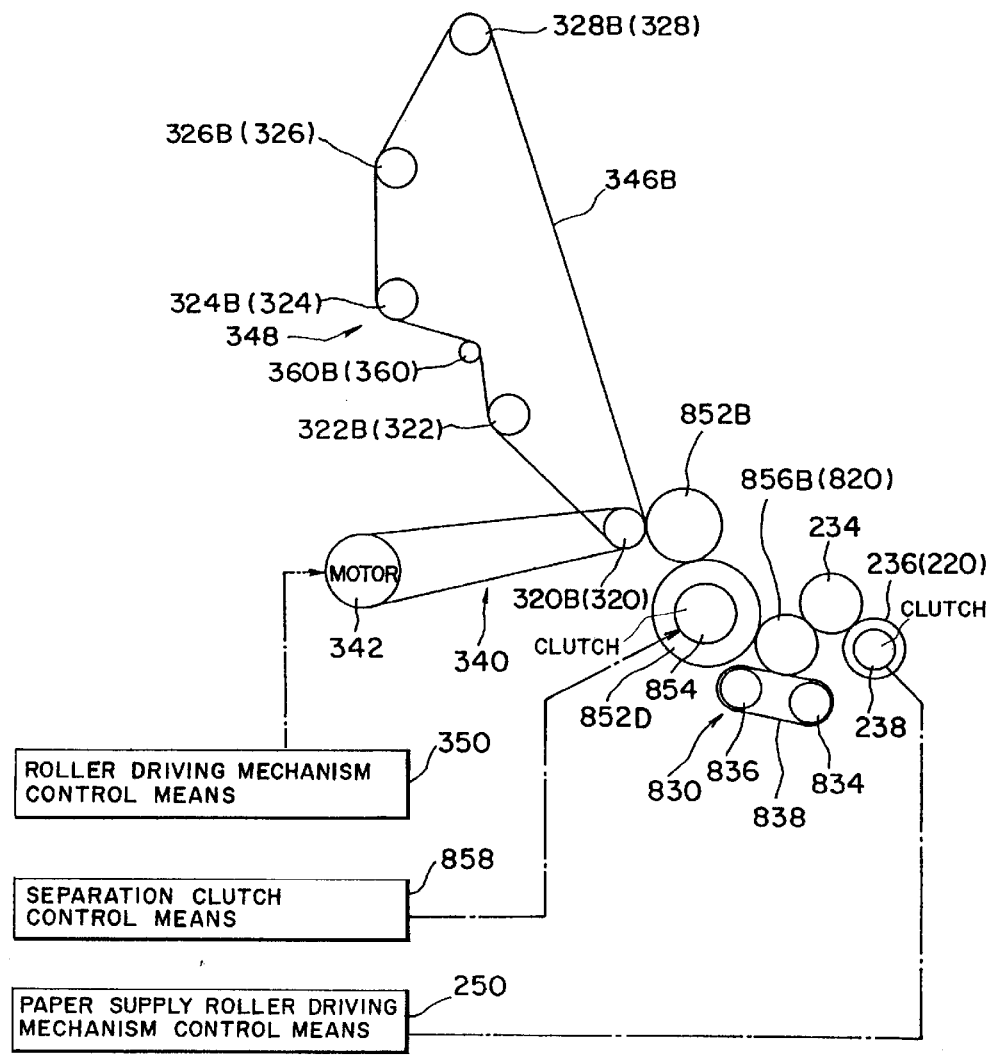
FIG. 9 is a diagrammatic view schematically showing, in side elevation, the driving system shown in FIG. 8.
Figure 10:
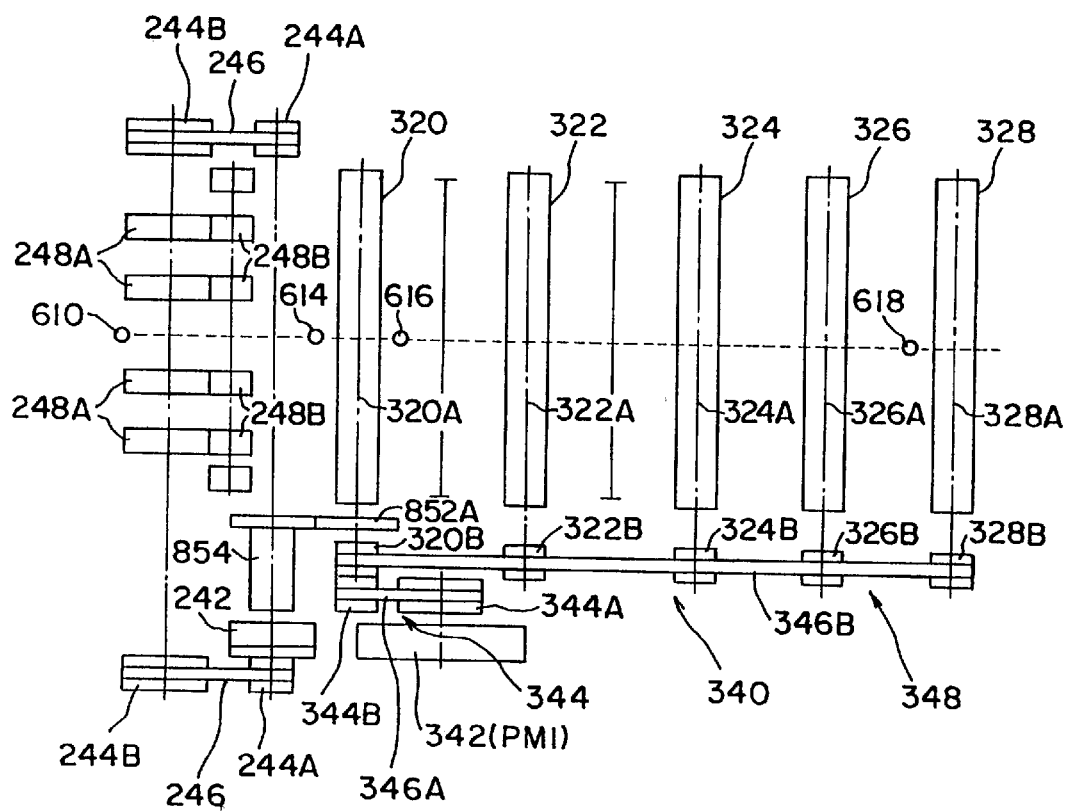
FIG. 10 is a diagrammatic view schematically showing, in plan, the driving system shown in FIG. 8.

The paper transport mechanism 300 described above is schematically shown in FIGS. 10 and 11. Referring to FIGS. 10 and 11, the components are shown such that the paper supply hopper 210 is positioned on the left side while a paper stacker 510 is positioned on the right side and a paper sheet 40 is transported from the left to the right side reversely to those in FIGS. 4 to 9 so as to conform to time charts (sequence diagrams shown in FIGS. 38 to 43) which will be hereinafter described.

Figure 12:
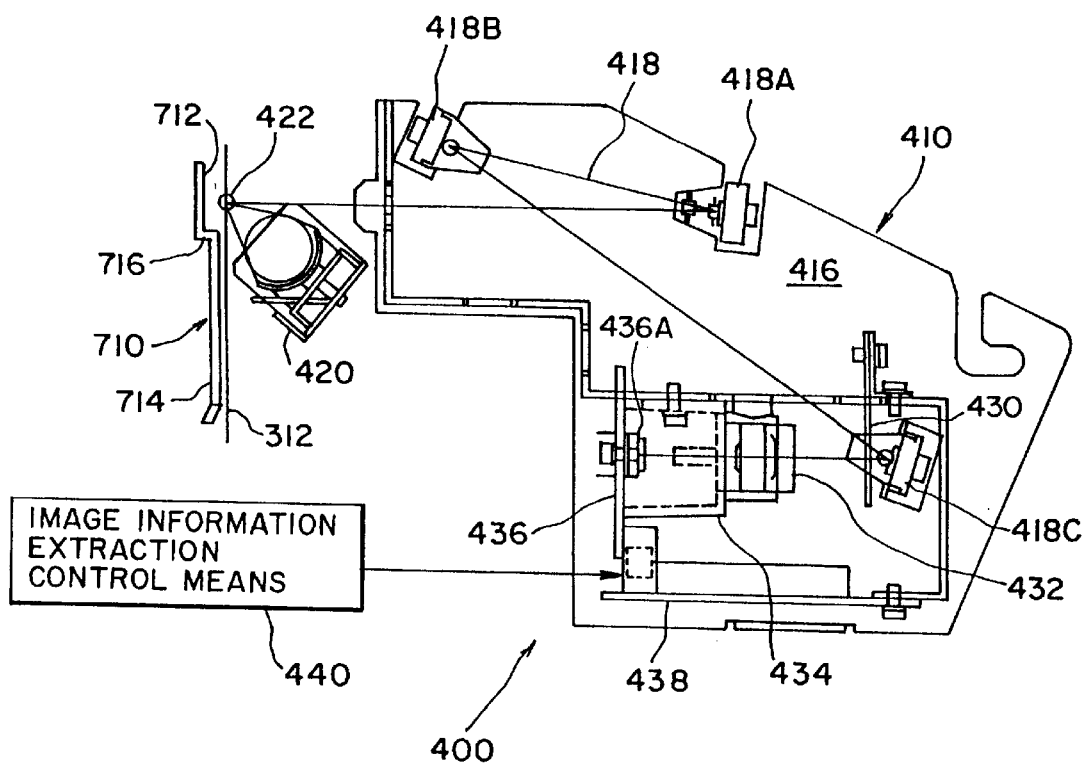
FIG. 12 is a schematic side elevational view showing the construction of an image reading unit of the image reading apparatus of FIG. 4.

Referring now to FIG. 12, the optical image reading mechanism 400 includes an optical image reading unit 410 having a reading point 422 located on the inclined transport path 312 for optically reading information on a paper sheet 40, and image information extraction control means 440 for controlling extraction of image information read by the optical image reading unit 410.

Referring to FIGS. 4 and 7, the optical image reading unit 410 includes, in the arrangement shown, two units of a first optical image reading unit 412 and a second optical image reading unit 414. The optical image reading units 412 and 414 are located intermediately of the inclined transport path 312, and the first optical image reading unit 412 optically reads information on the front face 42 of a paper sheet 40 while the second optical image reading unit 414 optically reads information on the rear face 44 of the paper sheet 40.

Here, each of the optical image reading units 412 and 414 is constituted as an image reading unit of common specifications. For example, FIG. 12 is a side elevational view showing the construction of the image reading unit of common specifications. Referring to FIG. 12, the optical image reading unit 410 includes a fluorescent lamp unit 420 serving as a lighting element for irradiating light upon the reading point 422 on the inclined transport path 312, a CCD (charge coupled device) circuit board 436 including a CCD camera 436A for optically reading information on a paper sheet 40, and a video circuit board 438 for processing information from the CCD camera 436A.

A light path 418 from the reading point 422 to the CCD camera 436A is constituted from a plurality of (three in the arrangement shown) mirrors 418A, 418B and 418C for reflecting light. A shading plate 430 and a lens 432 are located intermediately of the light path 418 between the mirror 418C and the CCD camera 436A so that an image from the mirror 418C may be introduced into the CCD camera 436A by way of the lens 432 after peripheral portions thereof, which are liable to be distorted, are corrected by the shading plate 430.

Since the light path 418 is formed by the plurality of mirrors 418A, 418B and 418C for reflection of light, the light path 418 can have a sufficient length while the reading point 422 and the CCD circuit board 436 are located at comparatively near locations to each other. Consequently, even where the lens 432 has a great focal length, the reading point 422 can be disposed at a focus position of the lens 432.

A paper sheet 40 from which information has been read by the optical image reading mechanism 400 in this manner is discharged from the paper transport mechanism 300 to the paper stacking mechanism 500. Here, at the terminal end of the paper transport mechanism 300, a paper discharge roller mechanism 540 is located so that the paper sheet 40 may be discharged to the paper stacking mechanism 500 while being driven by the paper discharge roller mechanism 540.

The paper stacking mechanism 500 includes a stacker table 520 having, at the bottom thereof, the paper stacker 510 on which paper sheets 40 can be stacked. A paper trailing end guide mechanism 550 for guiding the rear end 48 of a paper sheet 40 to be stacked into the paper stacker 510.

Referring back to FIGS. 4, 7 and 11, several sensors 610 to 618, 620A to 620D and 622 are provided. Thus, operations of the driving systems described above, that is, operations of the hopper motor 242 of the paper supply hopper driving mechanism 240, the pick clutch 238 of the paper supply roller driving mechanism 230, the separation clutch 854 and the roller driving mechanism 340 of the separation roller driving mechanism 850, and the transport motor 342 for the separation roller driving mechanism 850 and the paper supply roller driving mechanism 230 and extraction operations of the image information extraction control means 440 of the first optical image reading unit 412 and the second optical image reading unit 414 are controlled in response to detection signals from the sensors 610 to 618 and 620A to 620D.

The sensor (SHE) 610 is a hopper empty sensor for detecting whether or not the paper supply hopper 210 is empty. The sensor (SPK) 612 is a paper supply sensor for detecting whether or not the posture of the paper supply hopper 210 is in an optimum condition (that is, a hopper paper supplying position) for supplying a paper sheet. Here, since the paper supply roller 220 is put into a paper supplying position (optimum condition) in response to the paper supplying position of the paper supply hopper 210, the sensor 612 actually detects whether or not the paper supply hopper 210 and the paper supply roller 220 are in their individual paper supplying positions. The hopper empty sensor 610 and the paper supply sensor 612 may each be constituted from, for example, a photo-interrupter.

The sensor (SF1) 614 and the sensor (SF2) 616 are transport sensors for detecting a paper sheet 40 is transported by the paper transport mechanism 300. Of the two sensors 614 and 616, the transport sensor 616 detects a reading timing for an image. Meanwhile, the sensor (SF3) 618 is a discharge sensor for detecting whether or not a paper sheet 40 is discharged from the paper transport mechanism 300 to the paper stacking mechanism 500. The transport sensors 614 and 616 and the discharge sensor 618 may each be constituted from, for example, a photo-sensor. Here, the transport sensor 614 is a transmission type photo-sensor which includes a light emitting element and a light receiving element located on the opposite sides of the paper transport mechanism 300, and each of the transport sensor 616 and the discharge sensor 618 is a reflection type sensor wherein a light emitting element and a light receiving element are provided as a unitary member.

The sensor (SB5) 620A, the sensor (SA4) 620B, the sensor (SB4) 620C and the sensor (SA3) 620D are sheet width detection sensors constituting paper size detection means 620. In particular, the sensor 620A is a B5 width detection sensor provided for detection of a paper width of a paper sheet of the "B5 size"; the sensor 620B is an A4/LT width detection sensor provided for detection of a paper width of a paper sheet of the "A4 size" or "LT size"; the sensor 620C is a B4 width detection sensor provided for detection of a paper width of a paper sheet of the "B4 size"; and the sensor 620D is an A4/DL width sensor provided for detection of a paper width of a paper sheet of the "A3 size" or "DL size". The sensors 620A to 620D may each be constituted from, for example, a photo-sensor. In the arrangement shown, a reflection type photo-sensor is employed for the sensors 620A to 620D.

Meanwhile, the sensor 622 is a bottom sensor for discriminating whether or not the hopper table 212 of the paper supply hopper 210 is at its lowermost position (bottom position). The sensor 622 may be, for example, a photo-interrupter. The sensors mentioned above will be hereinafter described in detail.

For starting and stopping operations, setting of an operation condition and so forth of the image reading apparatus described above, an operation panel 920 is provided at the front of the image reading apparatus as shown, for example, in FIG. 5.

2. Construction of Essential Part of the Image Reading Apparatus

In the following, the construction of essential part of the image reading apparatus will be described in detail for the individual components.

2-1. Paper supply Mechanism

A. Paper Hopper System

The paper supply hopper driving mechanism 240 for driving the paper supply hopper 210 will first be described in detail. Referring to FIGS. 4 and 7, the paper supply hopper driving mechanism 240 includes, as described hereinabove, the hopper motor 242 constituted from a stepper motor, the belt-and-pulley mechanism 244 and the rack-and-pinion mechanism 248.

The belt-and-pulley mechanism 244 includes a pair of pulleys 244A and 244B and a belt 246. The pulley 244A is mounted on a rotary shaft of the hopper motor 242, and the pulley 244B is provided coaxially with a pinion 248B.

The rack-and-pinion mechanism 248 includes a rack 248A and the pinion 248B mentioned above which are held in meshing engagement with each other. The rack 248A is formed along an arc and mounted on the hopper table 212 such that, when the pinion 248B is rotated, the hopper table 212 is pivoted around an axis of the rotary shaft 212A together with the rack 248A by the rotation of the rack-and-pinion mechanism 248 to move the free end portion thereof upwardly or downwardly.

The hopper motor 242 is controlled in operation by motor control means 280 serving as paper supply hopper position control means in response to information from the paper supply sensor 612 serving as paper supply position detection means to adjust the inclined position of the hopper table 212 so that the uppermost one of the paper sheets 40 accommodated on the hopper table 212 of the paper supply hopper 210 may be positioned optimally to supply the paper sheet (this is the hopper paper supply position mentioned hereinabove).

Such control of the hopper motor 242 by the motor control means 280 is performed normally during reading operation. However, upon paper accommodation wherein paper sheets 40 are accommodated into the paper supply hopper 210, control of an initialization mode is performed. In particular, in response to an operation starting instruction (that is, a control starting instruction) provided by, for example, throwing in of the power supply to the image reading apparatus, the motor control means 280 controls so that the hopper motor 242 is rotated in a direction to move the hopper table 212 downwardly, and then when the hopper table 212 reaches its lowermost position, whereupon the bottom sensor 622 is switched to an on-state, the motor control means 280 controls so that the hopper motor 242 is stopped.

Thereafter, the motor control means 280 controls the hopper motor 242 so that the paper supply hopper 210 in which the paper sheets 40 are accommodated is moved to its hopper paper supply position.

Here, the hopper paper supply position will be described. A gate 228 is provided at the end of the paper supply hopper 210 in the paper supplying direction adjacent the front end of the hopper table 212 such that ends 46A of the paper sheets 40 may be restricted within the paper supply hopper 210. The gate 228 is formed such that an upper end portion 228A thereof is inclined a little in the paper supplying direction so as to approach the separation roller 820 at a location a little downstream (in the paper supplying direction) of the paper supply roller 220 so that the paper sheets 40 in the paper supply hopper 210 may be supplied smoothly one by one toward the separation roller 820 side.

The paper supply roller 220 drives the top face of the paper sheets 40 in the paper supply hopper 210 to supply the top one paper sheet 40. In order to drive, upon such paper supplying operation, the paper sheets 40 smoothly one by one from the top of the paper sheets 40, the top one of the paper sheets 40 in the paper supply hopper 210 is supplied preferably riding over the upper end portion 228A of the gate 228, and the position of the top face of the paper sheets 40 must not be excessively high nor low with respect to the upper end portion 228A of the gate 228. The inclined position of the hopper table 212 which is suitable to such paper supplying operation is defined as hopper paper supply position.

Figure 14:
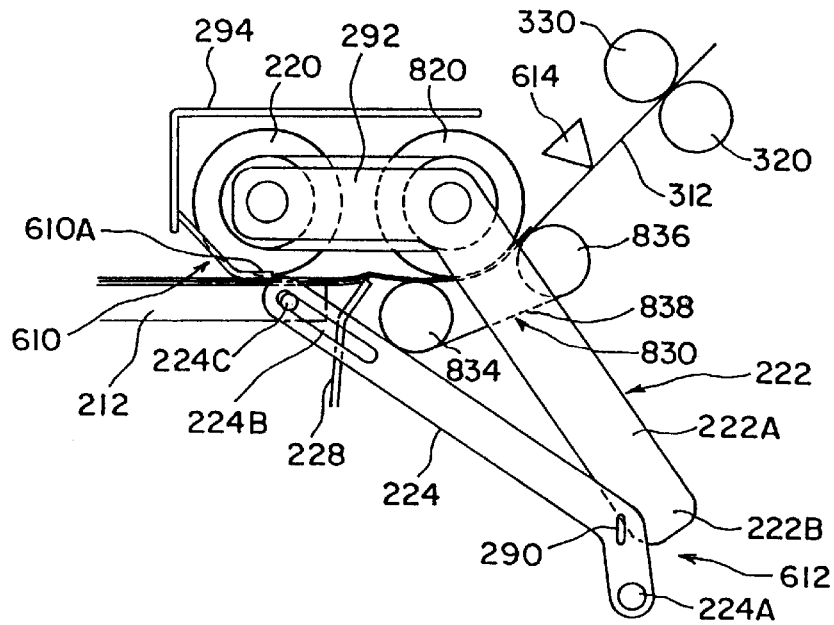
FIG. 14 is a side elevational view of part of a paper supply mechanism in the image reading apparatus of FIG. 4 when paper sheets remain by a small amount in a paper supply hopper.

By the way, the paper sheets 40 in the paper supply hopper 210 lie substantially horizontally as shown in FIG. 14 when the quantity (number) thereof is small, and as the quantity (number) thereof increases, they are inclined forwardly downwardly in the paper supplying direction with the trailing ends thereof in the paper feeding direction raised relative to the leading ends thereof. Accordingly, the hopper paper supply position varies in response to the quantity (number) of the paper sheets 40. Meanwhile, since the paper supply roller 220 is rocked to a position corresponding to the height of the top of the paper sheets 40 to incline the paper supply hopper 210, the position (height) and/or the posture of the paper sheets 40 can be detected as the rocking position of the paper supply roller 220. Accordingly, the hopper paper supply position can be detected from the rocking position of the paper supply roller 220 and the inclination of the paper supply hopper 210 itself.

Figure 15:
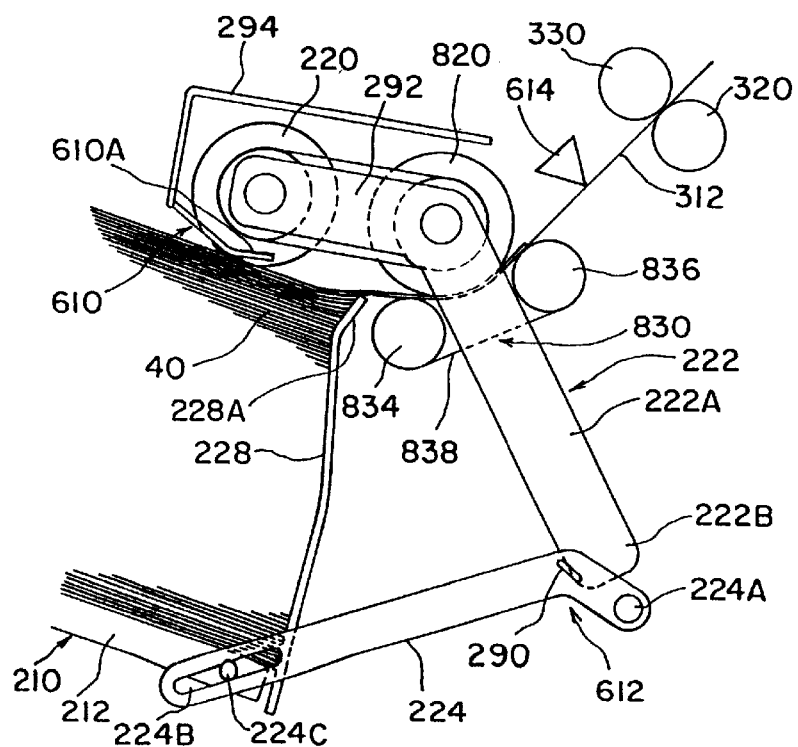
FIG. 15 is a side elevational view showing part of the paper supply mechanism of FIG. 14 but when paper sheets remain by a large amount in the paper supply hopper.
Figure 18A:
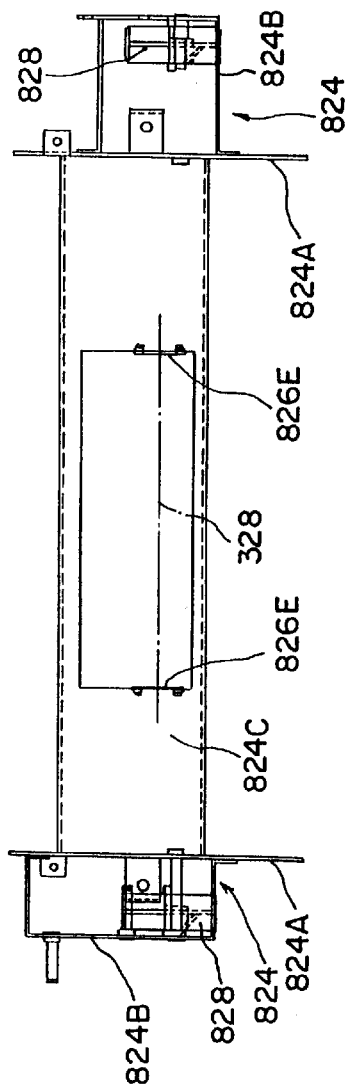
FIGS. 18(A) and 18(B) are a plan view (a view as viewed in the direction of an arrow mark A in FIG. 19) and an oblique front elevational view (a view as viewed in the direction of an arrow mark B in FIG. 19), respectively, showing a bearing system of the separation roller system shown in FIGS. 17(A) to 17(D)
Figure 18B:
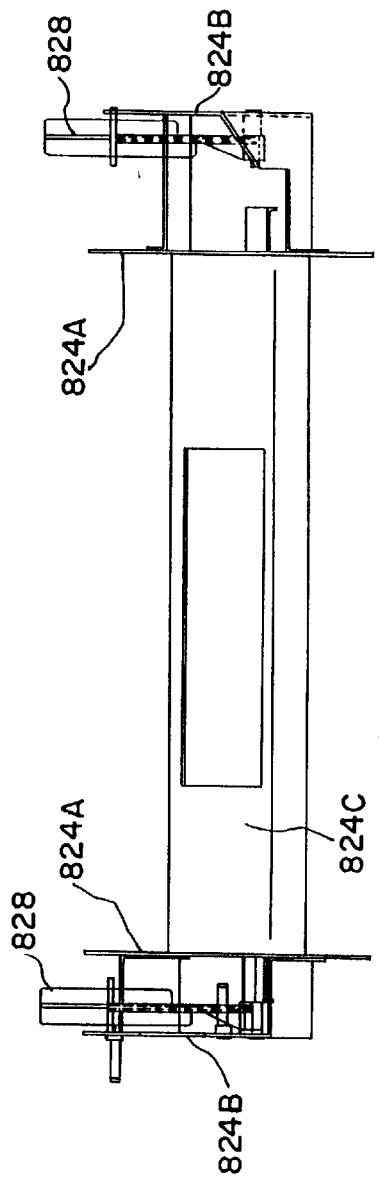

Therefore, in the present embodiment, the paper supply sensor 612 serving as paper supply position detection means includes, as shown in FIGS. 14 and 15, a first interlocking member 222 which operates in response to a rocking movement (rocking position) of the paper supply roller 220, a second interlocking member 224 which operates in response to a pivotal movement (inclined position) of the hopper table 212 itself of the paper supply hopper 210, and a switch 290 which operates on or off in response to a relative movement between the first and second interlocking members 222 and 224.

Referring to FIGS. 14 to 16, the first interlocking member 222 includes a switch arm 222A which is provided integrally with and extends obliquely downwardly from the rocking arm 292 on which the center of rotation of the paper supply roller 220 is supported for rotation so that the paper supply roller 220 may be rocked around the axis of rotation of the separation roller 820. Due to the construction of the first interlocking member 222, when the paper supply roller 220 is rocked, also the switch arm 222A of the first interlocking member 222 is rocked in response to the rocking movement of the first interlocking member 222.

Meanwhile, the second interlocking member 224 is formed as an L-shaped arm which is supported for pivotal motion around an arm fulcrum 224A at a location forwardly of a lower portion of the gate 228 in the paper supplying direction (rightwardly in FIGS. 14 and 15). A pin 224C is provided at a side portion of a front end portion of the hopper table 212 and is loosely fitted in an elongated hole 224B formed at a rocking end portion of the second interlocking member 224 such that the second interlocking member 224 may be rocked around the pin 224C when the hopper table 212 is moved upwardly or downwardly.

The switch 290 may be a photo-interrupter. The photo-interrupter switch 290 is provided at an intermediate portion (bent portion) of the second interlocking member 224 adjacent the arm fulcrum 224A. When a rocking end portion 222B of the switch arm 222A of the first interlocking member 222 comes to a position on an optic axis of the photo-interrupter switch 290, the photo-interrupter switch 290 is switched on, but when the rocking end portion 222B moves out of the optic axis of the photo-interrupter switch 290, the photo-interrupter switch 290 is switched off.

Accordingly, when the hopper table 212 is raised to a high position as seen in FIG. 14, the second interlocking member 224 is pivoted in the clockwise direction in FIG. 14 so that the switch 290 approaches the rocking end portion 222B of the first interlocking member 222. Consequently, even if the paper supply roller 220 is rocked little and the first interlocking member 222 is pivoted little, the rocking end portion 222B of the first interlocking member 222 reaches the switch 290 to switch the switch 290 on.

On the other hand, when the hopper table 212 is moved down to a low position as seen in FIG. 15, the second interlocking member 224 is pivoted in the counterclockwise direction in FIG. 15 so that the switch 290 is spaced away from the rocking end portion 222B of the first interlocking member 222. Consequently, unless the paper supply roller 220 is rocked by a certain amount, the rocking end portion 222B of the first interlocking member 222 does not reach the switch 290 to switch the switch 290 on.

The hopper motor 242 operates to drive the hopper table 212 of the paper supply hopper 210 to move upwardly until the paper supply sensor 612 detects the hopper paper supply position. Naturally, immediately after paper sheets 40 are accommodated into the paper supply hopper 210, the paper supply hopper 210 is at a sufficiently lowered position, and accordingly, the hopper motor 242 drives the hopper table 212 of the paper supply hopper 210 to move to the hopper paper supply position.

Then, when paper is supplied, since the quantity of the paper sheets 40 in the paper supply hopper 210 decreases each time a paper sheet 40 is supplied, also the hopper paper supply position varies accordingly. Also in this instance, the hopper motor 242 operates in response to such detection information of the paper supply sensor 612 so that the paper supply hopper 210 is always adjusted to the hopper paper supply position (that is, the position optimum to supply the paper sheets 40).

Meanwhile, the bottom sensor 622 mentioned hereinabove may be a photo-interrupter and is provided at a lower location in the apparatus body 10. The rack 248A is positioned so that, when the hopper table 212 comes to its lowermost position (bottom position), the lower end of the rack 248A comes to an optic axis of the photo-interrupter of the bottom sensor 622. In this instance, the bottom position can be detected as the photo-interrupter is switched on.

Since operation of the paper supply hopper 210 is normally controlled in response to the hopper empty sensor 610, the paper supply sensor 612 and the bottom sensor 622, the paper supply hopper 210 is pivoted within a fixed range. In order to prevent the paper supply hopper 210 from being pivoted beyond the fixed range due to a malfunction of an associated control system or driving system, the image reading apparatus of the present embodiment includes a paper supply hopper excessive pivotal motion prevention mechanism 260.

The paper supply hopper excessive pivotal motion prevention mechanism 260 includes a stopper 262 provided at an upper end portion of the rack 248A, a non-toothed portion 264 provided at an upper end portion of the rack 248A, and a torque limiter 266 provided between the pulley 244B and the pinion 248B.

In particular, when the paper supply hopper 210 comes to its lowermost position, the upper stopper 262 is contacted with an abutting portion (not shown) on the pinion 248B to stop pivoting motion of the pinion 248B thereby to stop the paper supply hopper 210 at the lowermost position (bottom position). Further, in this instance, the input power from the hopper motor 242 to the pinion 248B is limited within a fixed range by an action of the torque limiter 266 so that the rack-and-pinion mechanism 248 may not be damaged inadvertently.

Meanwhile, the non-toothed portion 264 is formed by removing some teeth of the rack 248A provided for meshing engagement with the pinion 248B. Thus, when the paper supply hopper 210 comes to the uppermost position, the pinion 248B comes to the non-toothed portion 264 so that further rotation of the pinion 248B is not transmitted to the rack 248A any more. Consequently, the paper supply hopper 210 is stopped at the uppermost position.

By the way, the image reading apparatus of the present embodiment not only has an automatic mode in which an image is read while the paper sheets 40 in the paper supply hopper 210 are automatically supplied and transmitted successively one by one but also has a manual paper insertion mode in which paper sheets are manually inserted one by one into the image reading apparatus. The manual paper insertion mode can be set by way of insertion mode selection means 924C provided on the operation panel 920 which will be hereinafter described.

When such manual paper insertion mode is set, the motor control means 280 controls so that the hopper table 212 of the paper supply hopper 210 may be driven by the paper supply hopper driving mechanism 240 to move to the paper supply position and thereafter keep the paper supply position. In the manual paper insertion mode, since paper sheets are inserted one by one, if the hopper table 212 is held at the paper supply position in this manner, the paper sheet always keeps an optimum height with respect to the gate 228.

B. Paper Supply Roller System

The paper supply roller 220 is supported for rocking motion on the separation roller 820 by way of the rocking arm 292 as described above. Actually, however, the paper supply roller 220 is provided by a pair located in a leftwardly and rightwardly symmetrical positions with respect to the center line of the paper supplying direction as seen in FIGS. 16(B) and 16(C). The left and right paper supply rollers 220 are disposed in a mutually neighboring relationship in the proximity of the center line of the paper supplying direction so that also a paper sheet of a comparatively small width can be supplied with certainty.

The paper supply roller driving mechanism control means 250 controls operation of the pick clutch 238 of the paper supply roller driving mechanism 230 in response to a result of detection of the paper supply sensor 612 described above. Accordingly, the paper supply roller driving mechanism control means 250 is referred to herein also as pick clutch control means. In particular, if it is discriminated by the paper supply sensor 612 that the paper supply hopper 210 is at the hopper paper supply position, then also the positions of the paper supply rollers 220 in their rocking direction are the hopper paper supply positions, and the paper supply roller driving mechanism control means 250 controls the pick clutch 238 of the paper supply roller driving mechanism 230 so as to drive the paper supply rollers 220.

On the contrary, if it is not discriminated by the paper supply sensor 612 that the paper supply hopper 210 is at the hopper paper supply position (that is, if it is discriminated that the paper supply hopper 210 is not at the hopper paper supply position), then also the positions of the paper supply rollers 220 themselves in the rocking direction are not the hopper paper supply positions, and the paper supply roller driving mechanism control means 250 controls the pick clutch 238 of the paper supply roller driving mechanism 230 so as to stop driving of the paper supply rollers 220.

For example, if it is discriminated that the paper supply hopper 210 is at the hopper paper supply position, then the paper supply roller driving mechanism control means 250 couples the pick clutch 238 so that the paper supply rollers 220 are driven by the paper supply roller driving mechanism 230 to operate to supply the top one of the paper sheets 40 in the paper supply hopper 210. After the top paper sheet 40 is supplied from the paper supply hopper 210, the paper supply rollers 220 are rocked downwardly by a distance equal to the thickness of the paper sheet 40.

As such downward rocking movement of the paper supply rollers 220 occurs and is accumulated successively, the switch arm 222A of the first interlocking member 222 is finally spaced away from the switch 290, whereupon the switch 290 is switched off. Consequently, it is discriminated now that the paper supply hopper 210 is not at the hopper paper supply position, and the paper supply roller driving mechanism control means 250 disconnects the pick clutch 238 to stop the paper supply roller driving mechanism 230. Simultaneously, the motor control means 280 renders the hopper motor 242 operative in response to information from the paper supply sensor 612 so that the paper supply hopper 210 is driven to move to the hopper paper supply position.

As a result, the paper supply roller driving mechanism control means 250 controls so that the paper supply roller driving mechanism 230 may operate again. As such a sequence of operations as just described is repeated, the position of the top face of the paper sheets 40 is always kept within an optimum range, and in this condition, the paper supply rollers 220 operate. On the contrary, if the position of the top face of the paper sheets 40 does not remain within such optimum range, the paper supply rollers 220 do not operate.

Referring to FIGS. 14 to 16(D), a cover 294 is provided integrally with the rocking arm 292 such that it covers over the paper supply rollers 220 and the separation roller 820 from the side adjacent the paper supply hopper 210. The hopper empty sensor 610 mentioned hereinabove is provided on the cover 294. The hopper empty sensor 610 includes a rockable arm 610A mounted for movement, for example, such that an end portion thereof can be moved down into a groove not shown formed on the hopper table 212, and a photo-interrupter not shown provided at a rocking portion of the rockable arm 610A. The photo-interrupter is disposed such that it is switched on (closed) when the end of the rockable arm 610A is moved down.

The rockable arm 610A is so light in weight that, even if only one paper sheet 40 is present on the hopper table 212, downward movement of the end of the rockable arm 610A is prevented by the paper sheet 40 so that the photo-interrupter remains in an off-state, but if all of the paper sheets 40 on the hopper table 212 are supplied from the hopper table 212, then the end of the rockable arm 610A is moved down so that the photo-interrupter is turned on.

The hopper empty sensor 610 may alternatively constructed in such a manner as described below. In particular, the hopper empty sensor 610 may be constructed as a transmission type photo-sensor including a light emitting element 614A and a light receiving element 614B disposed in pair on the front face and the rear face of the hopper table 212, respectively. Meanwhile, the hopper table 212 has a hole (not shown) perforated therein so that, if a paper sheet 40 is placed on the hopper table 212, transmission of light from the light emitting element 614A to the light receiving element 614B through the hole is prevented by the paper sheet 40, and consequently, accommodation of the paper sheet 40 is detected. However, if no paper sheet 40 remains on the hopper table 212, light is transmitted from the light emitting element 614A to the light receiving element 614B through the hole. Consequently, absence of any paper sheet 40 is detected.

C. Paper Separation Mechanism System

As described hereinabove, the paper separation mechanism 800 includes the separation roller 820, the rotation member 830 disposed in an opposing relationship to and below the separation roller 820, and the separation roller driving mechanism 850 for driving the separation roller 820 to rotate. The paper separation mechanism 800 is constructed such that, when a plurality of paper sheets 40 are supplied from the paper supply rollers 220, it separates only an uppermost one of the paper sheets 40 from the other paper sheet or sheets 40 between the separation roller 820 and the rotation member 830 and takes out and transports the thus separated one paper sheet 40.

The rotation member 830 is located below the separation roller 820, that is, adjacent the apparatus body 10 with respect to the separation roller 820, with a small gap left from the separation roller 820. The rotation member 830 includes the pair of pulleys 834 and 836 disposed in a spaced relationship from each other in the paper transporting direction and the endless belt 838 wound between and around the pulleys 834 and 836.

The separation roller driving mechanism 850 is constituted from components substantially common to those of the paper supply roller driving mechanism 230 described hereinabove. In particular, the separation roller driving mechanism 850 includes the transport motor 342 described hereinabove as a driving source and further includes the first belt-and-pulley mechanism 344 and the first and second gear mechanisms 852 and 856 interposed between the transport motor 342 and the paper supply rollers 220. The separation clutch 854 is interposed in the first gear mechanism 852. In short, the paper supply roller driving mechanism 230 has a construction wherein the third gear mechanism 232 is provided in addition to the separation roller driving mechanism 850. The first gear mechanism 852 includes gears 852A to 852D; the second gear mechanism 856 includes gears 856A and 856B; and the third gear mechanism 232 includes gears 232A to 232C. In FIGS. 9 and 10, some of the gears mentioned above are omitted.

Figure 8:
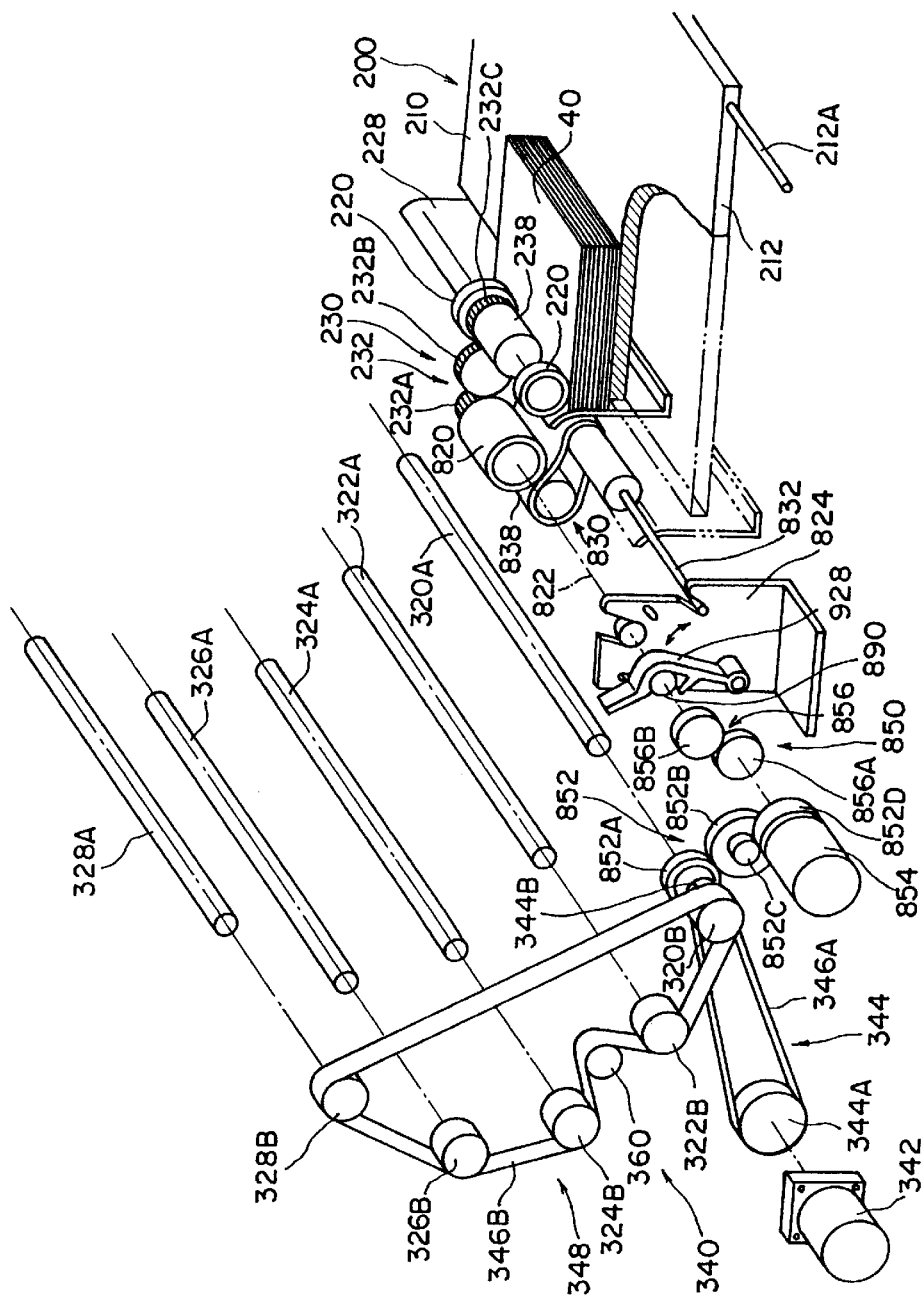
FIG. 8 is an exploded perspective view schematically showing a driving system of the image reading apparatus of FIG. 4.

In the image reading apparatus of the present embodiment, the rotary shaft 822 of the separation roller 820 is supported for rotation on a pair of separation roller system bearing members 824 provided outwardly of the left and right ends of a front portion of the paper supply hopper 210 on the apparatus body 10 as seen in FIG. 8. The separation roller 820 is provided at a central portion of the rotary shaft 822 as seen from FIG. 17(A) and 17(B).

The paper separation mechanism 800 includes a paper skew prevention mechanism 810 as shown in FIG. 17(A) and 17(B). The paper skew prevention mechanism 810 includes a pair of movable guide members 812 provided at left and right locations with respect to the separation roller 820.

The movable guide members 812 are plate-like members mounted on the rotary shaft 822 of the separation roller 820 in an opposing relationship to a paper passing region below the separation roller 820. The movable guide members 812 restrict otherwise possible upward lateral floating movement or deformation of a paper sheet driven by the paper supply rollers 220 so that the paper sheet may be transported at a high speed and in a stable posture.

In particular, since a paper sheet driven by the paper supply rollers 220 becomes liable to move laterally as the speed increases and it is driven by the paper supply rollers 220 while it is pressed at central portions thereof in its widthwise direction from above by the paper supply rollers 220, it is fed to the separation roller 820 in such a deformed condition that the opposite left and right end portions thereof are turned up laterally. Since such lateral movement or deformation of a paper sheet makes a cause of a skew, the paper sheet must be introduced to the separation roller 820 while suppressing such lateral movement or deformation of the paper sheet.

To this end, the movable guide members 812 are provided, and a guide face 812A for guiding a paper sheet is formed on the lower face of each of the movable guide members 812. The movable guide members 812 are loosely fitted on the rotary shaft 822 such that they can be rocked around the rotary shaft 822 or moved upwardly or downwardly within a fixed range so that the guide faces 812A thereof may follow up the type or deformation of a paper sheet transported thereto.

The guide faces 812A of the movable guide members 812 are formed such that, taking possible upward lateral movement of the opposite left and right end portions of a paper sheet into consideration, portions thereof in the proximity of the center of the paper sheet in its widthwise direction are positioned in the proximity of a paper passage reference plane 316, but portions thereof adjacent the opposite ends of the paper sheet in the widthwise direction remote from the separation roller 820 are spaced away from the paper passage reference plane 316.

Since the guide faces 812A of the movable guide members 812 hold down a paper sheet by a greater amount (paper holding down amount) at a position nearer to the paper passage reference plane 316, they are shaped such that a greater paper holding amount is obtained at central portions in the widthwise direction, but a smaller paper holding amount is obtained at the opposite end portions in the widthwise direction.

Figure 19:
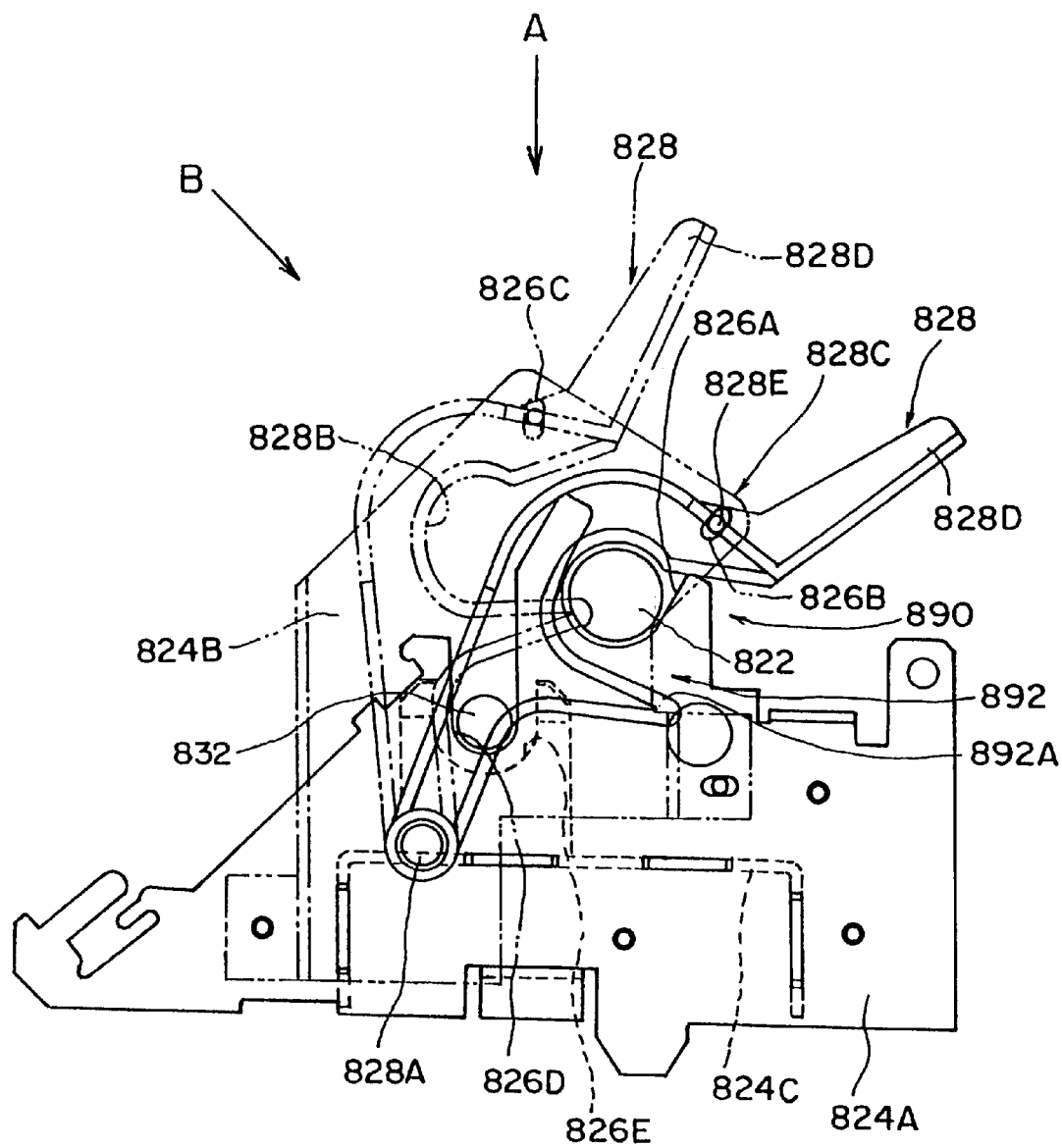
FIG. 19 is a side elevational view of the bearing system of the separation roller system shown in FIGS. 18(A) and 18(B) showing a rotary shaft of a separation roller in a fixed condition.
Figure 20:
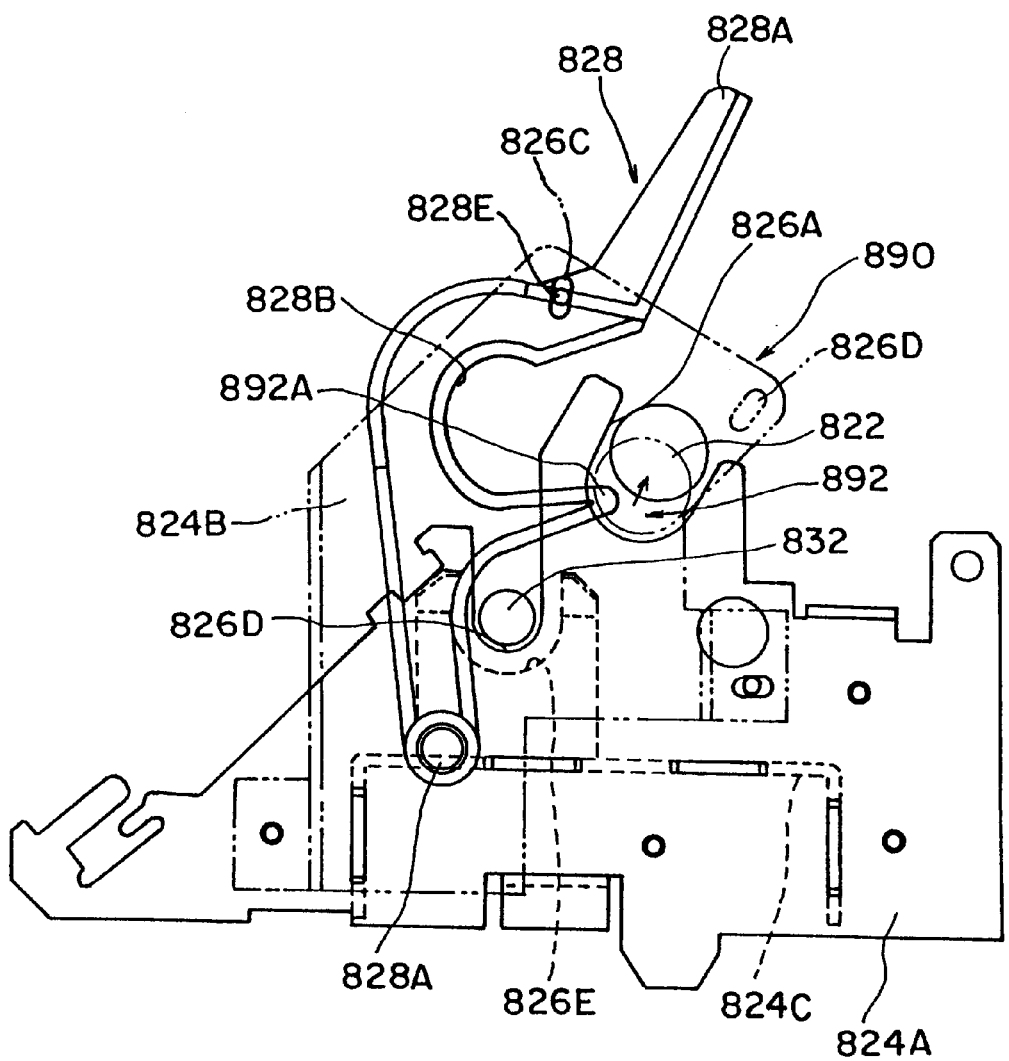
FIG. 20 is a similar view but showing the rotary shaft of the separation roller in a displaced condition.

Further, the guide faces 812A of the movable guide members 812 are inclined such that they are spaced, at entrance portions thereof adjacent the paper supply rollers 220, by a greater distance from the paper passage reference plane 316 so that the end portion 46A of a paper sheet 40 in an upwardly laterally curved condition may be caught with certainty by the guide faces 812A (refer to FIGS. 19 and 20). Accordingly, the distance of the guide faces 812A of the movable guide members 812 from the paper passage reference plane 316 decreases gradually toward the paper supplying and transporting direction. Consequently, the paper sheet 40 is reformed against deformation and controlled from lateral movement which it passes along the guide faces 812A.

Referring now to FIGS. 19 and 20, the separation roller system bearing members 824 include a pair of body plates 824A provided uprightly in the vertical direction adjacent the opposite left and right ends of the paper transport path 310, a pair of side plates 824A coupled to the outer faces of the body plates 824A, and a base plate 824C having a channel-shaped cross section and coupling the left and right body plates 824A to each other. A rotary shaft locking mechanism 890 for locking the rotary shaft 822 of the separation roller 820 from movement is provided between each of the body plates 824A and an associated one of the side plates 824A.

Referring to FIGS. 8 and 18 to 20, each of the rotary shaft locking mechanisms 890 includes a bearing hole 826A formed at an upper portion of an associated one of the body plates 824A in such a manner as to open upwardly, a rockable lever 828 supported for rocking motion on an associated one of the separation roller system bearing members 824 by means of a pin 828A, a bearing hole 828B formed in the rockable lever 828 and having an opening, and a latch mechanism 828C for latching the rockable lever 828 between a locking position and an unlocking position.

The rockable lever 828 can be pivoted between such a locking position as indicated by a solid line in FIG. 19 and such an unlocking position as indicated by a chain line in FIG. 19. The rockable lever 828 can be manually pivoted at a tongue 828D formed at a rocking end portion thereof. Further, the latch mechanism 828C includes a resilient pin 828E extending from the rockable lever 828 toward an associated one of the side plates 824A, and a pair of pin holes 826B and 826C formed in the side plate 824A.

When the rockable lever 828 is moved to its locking position, the pin 828E is engaged in the pin hole 826B to lock the rockable lever 828. However, when the rockable lever 828 is moved to its unlocking position, the pin 828E is engaged in the other pin hole 826C to lock the rockable lever 828. On the other hand, if an operation force is applied to the rockable lever 828 against the resilient force for biasing the pin 828E in its projecting direction, then the pin 828E is resiliently retracted and is now contacted with a wall face of the side plate 824A. In this condition, the rockable lever 828 can be pivoted freely between the locking position and the unlocking position.

The rotary shaft 822 is supported, when it is mounted, in such a fixed condition that, as indicated by a solid line in FIG. 19, it is held between the bearing holes 826A of the body plates 824A and the bearing holes 828B of the rockable levers 828 in the locking position.

Each of the locking mechanisms further includes separation roller moving away means 892 for moving the separation roller 820 in a direction in which it is spaced away from the rotation member 830. The separation roller moving away means 892 is constituted from a projection 892A formed on the rockable lever 828 such that an opening end portion of the bearing hole 828B of the rockable lever 828 adjacent the center of rotation of the rotary shaft 822 extends laterally by a great extent. The projection 892A is formed such that, when the rockable lever 828 is pivoted toward the unlocking position, it is contacted with the lower face of the rotary shaft 822 of the separation roller 820 to push up the rotary shaft 822.

Consequently, if paper jamming should occur, for example, between the separation roller 820 and the belt 838 of the rotation member 830, then if the rockable levers 828 are pivoted to the individual unlocking positions as seen in FIG. 20, then the projections 892A of the separation roller moving away means 892 move the rotary shaft 822 upwardly from a position indicated by a chain line in FIG. 20 to another position indicated by a solid line in FIG. 20. Consequently, the separation roller 820 and the belt 838 are spaced away from each other,.and accordingly, the paper can be taken out readily. In this instance, the rotary shaft 822 is naturally held in a floating condition in the bearing hole 826A.

Referring to FIGS. 18(A) to 20, a bearing portion 826D is formed on each of the left and right body plates 824A, and a pair of bearing portions 826E are provided projectingly at upper left and right locations of the base plate 824C. The bearing portions 826D and 826E support, from below, a shaft 832 of the rotation member 830, which will be hereinafter described, located below the separation roller 820.

Referring to FIGS. 17(A) to 17(C), a pair of auxiliary rollers 860 are supported for rotation on and coaxially with the rotary shaft 822 at left and right positions sidewardly of the separation roller 820. In the image reading apparatus of the present embodiment, the auxiliary rollers 860 are positioned between the separation roller 820 and the movable guide members 812. The auxiliary rollers 860 act to help transportation of a paper sheet by the separation roller 820 to enhance the paper transporting force. To this end, a driving system 870 for driving the auxiliary rollers 860 is provided.

The driving system 870 serves also as a driving system for the separation roller driving mechanism 850 from the transport roller 342 to the rotary shaft 822, and from the driving systems, the auxiliary rollers 860 are driven by way of the rotary shaft 822 together with the separation roller 820. Further, the driving system 870 includes a pair of one-way clutches 872.

The one-way clutches 872 are interposed, for example, between the rotary shaft 822 and the auxiliary rollers 860 and allow the auxiliary rollers 860 to rotate at a higher speed than that at which they are driven to rotate by way of the driving system 870.

Accordingly, the auxiliary rollers 860 can help a paper sheet to be transported without making an obstacle to transportation of the paper sheet to provide a resistance to transportation of the paper sheet or without causing paper jamming.

The rotation member 830 located below the separation roller 820 includes the pair of pulleys 834 and 836 spaced away from each other in the paper transporting direction at a central portion in the widthwise direction in an opposing relationship to the separation roller 820. Of the pulleys 834 and 836, the pulley 834 adjacent the paper supply rollers 220 is supported for rotation on and with respect to the shaft 832. A torque limiter 846 is interposed between the shaft 832 and the pulley 834 so that rotation of the pulley 834 may be restricted suitably.

Referring to FIGS. 8, 19 and 20, the shaft 832 is supported on the bearing portions 826D and 826E of the pair of left and right separation roller system bearing members 824. The bearing portions 826D and 826E are open at the tops thereof. However, when the separation roller 820 is fixed in a use condition, the shaft 832 is fixed at lower portions in the bearing portions 826D and 826E since it is acted upon by a downwardly pressing force from the separation roller 820 by way of the pulley 834. Accordingly, if the separation roller 820 is removed upwardly, then also the shaft 832 can be removed from the separation roller system bearing members 824.

Figure 21C:
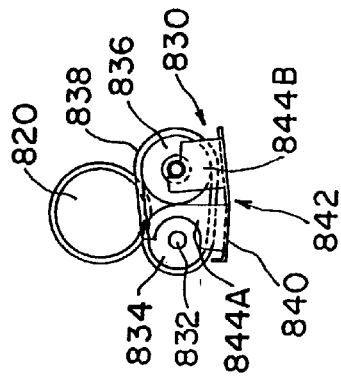
FIGS. 21(A), 21(B) and 21(C) are a plan view, a front elevational view and a side elevational view, respectively, showing a rotary member of the separation roller system shown in FIGS. 17(A) to 17(C)
Figure 21A:
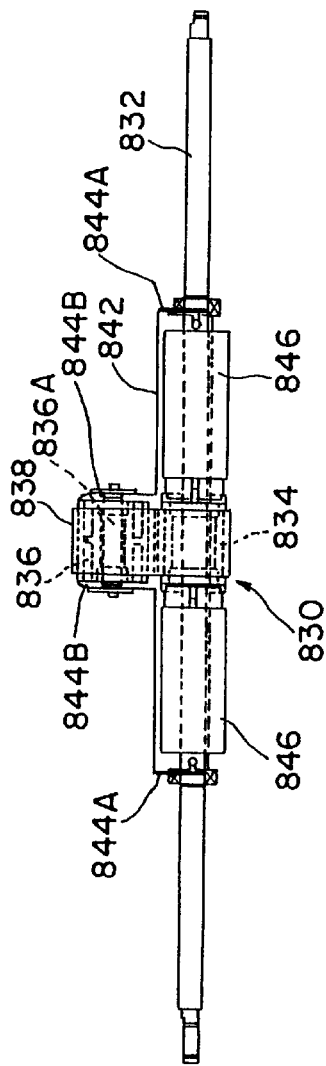
Figure 21B:
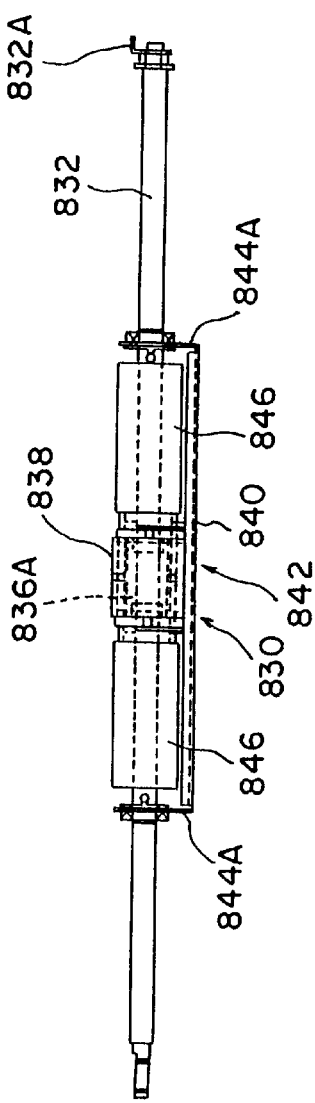

The other pulley 836 is supported for rotation on and relative to a bearing member 842 which is removably mounted on the shaft 832 as shown in FIGS. 21(A) to 21(C). The bearing member 842 includes a pair of base leaf springs 840 each formed from a leaf spring and serving as a base portion of the bearing member 842, a fitting arm portion 844A formed projectingly at an end of each of the base leaf springs 840 such that it is fitted on the shaft 832 of the pulley 834, and a bearing arm portion 844B provided projectingly at the other end of each of the base leaf springs 840 for supporting the pulley 836 for rotation thereon.

Each of the base leaf springs 840 is formed in an L-shape and applies a biasing force in a direction to move the axes of the pulleys 834 and 836 away from each other to provide a suitable tensile force to the belt 838 wound between and around the pulleys 834 and 836. The biasing forces of the base leaf springs 840 are set so that the base leaf springs 840 may be suitably resiliently deformed artificially in the direction in which the axes of the pulleys 834 and 836 are spaced away from each other.

Figure 22A:
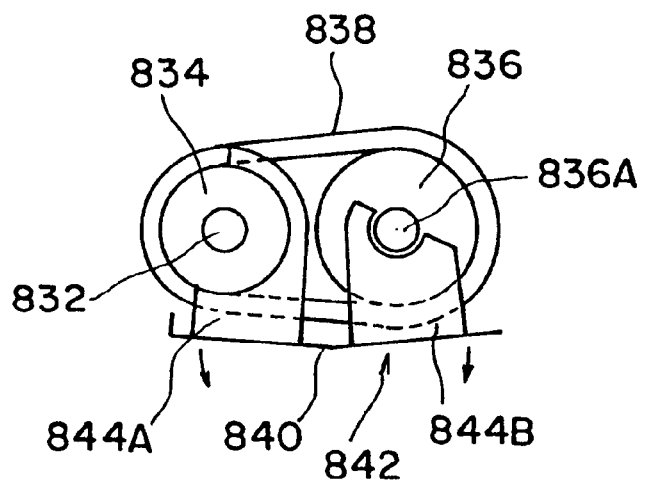
FIG. 22(A) is a side elevational view showing the rotary member of the separation roller system of FIGS. 21(A) to 21(C) in a mounted condition.
Figure 22B:
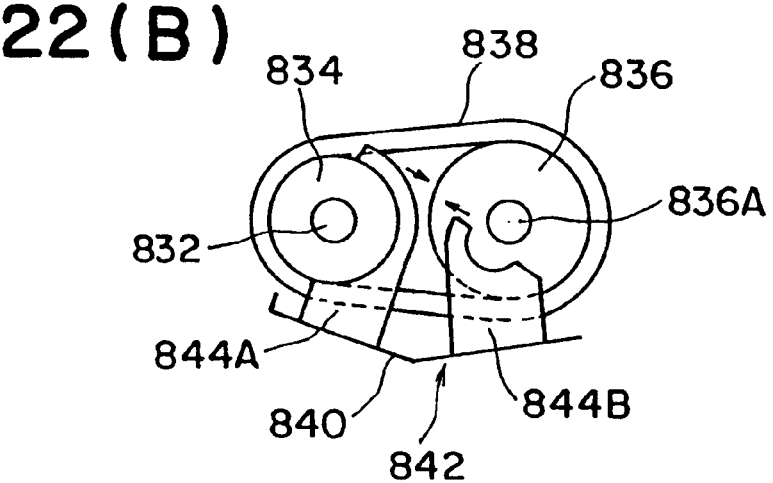
FIG. 22(B) is a similar view but showing the rotary member in a removed condition.

Therefore, if the base leaf springs 840 are resiliently deformed from such a mounted condition as seen in FIGS. 21(A) and 22(A) to such a condition as shown in FIG. 22(B) to move the arm portions 844A and 844B toward each other, then at least one of the arm portions 844A and 844B is removed from the shaft 832 or a shaft portion of the pulley 836 so that the pulley 836 can be removed readily.

On the contrary, in order to mount the pulley 836, the pulley 836 is first positioned in the inside of the belt 838 wound around the pulley 834, and then the base leaf springs 840 are resiliently deformed to move the arm portions 844A and 844B toward each other, and in this condition, the arm portions 844A and 844B are fitted onto the shaft 832 and a shaft portion 836A of the pulley 836.

As a result, the pulley 836 is mounted in such a manner as shown in FIG. 22(A). In this mounted condition, the base leaf springs 840 exert a resilient force to move the arm portions 844A and 844B away from each other. Meanwhile, the belt 838 acts to restrict such movement of the arm portions 844A and 844B away from each other. Consequently, the pulley 836 is supported on the shaft 832 in a condition wherein the force of the base leaf springs 840 and the force of the belt 838 are balanced with each other. Also the tensile force of the belt 838 is adjusted by the resilient force of the base leaf springs 840.

2-2. Paper Transport Mechanism

A. Paper Transport Path and Paper Transporting Roller System

Referring to FIGS. 7 and 9, the paper transport path 310 is defined by the plurality of paper transporting rollers 320 to 328 and the plurality of idler rollers 330 to 338, sheet guides 700, 710, 740 and 750 provided between adjacent ones of the paper transporting rollers 320 to 328 and between adjacent ones of the idler rollers 330 to 338, and so forth.

The rotary shafts 320A to 324A and 330A to 334A of the rollers 320, 322, 324 and 330, 332, 334 of the paper transport path 310 on the upstream side are disposed along a straight line as viewed from a side and form the inclined transport path 312. Meanwhile, the rotary shafts 324A to 328A and 334A to 338A of the rollers 324, 326, 328 and 334, 336, 338 of the paper transport path 310 on the downstream side are disposed along a curved line as viewed from the side and form the paper reversing transport path 314.

Figure 23:
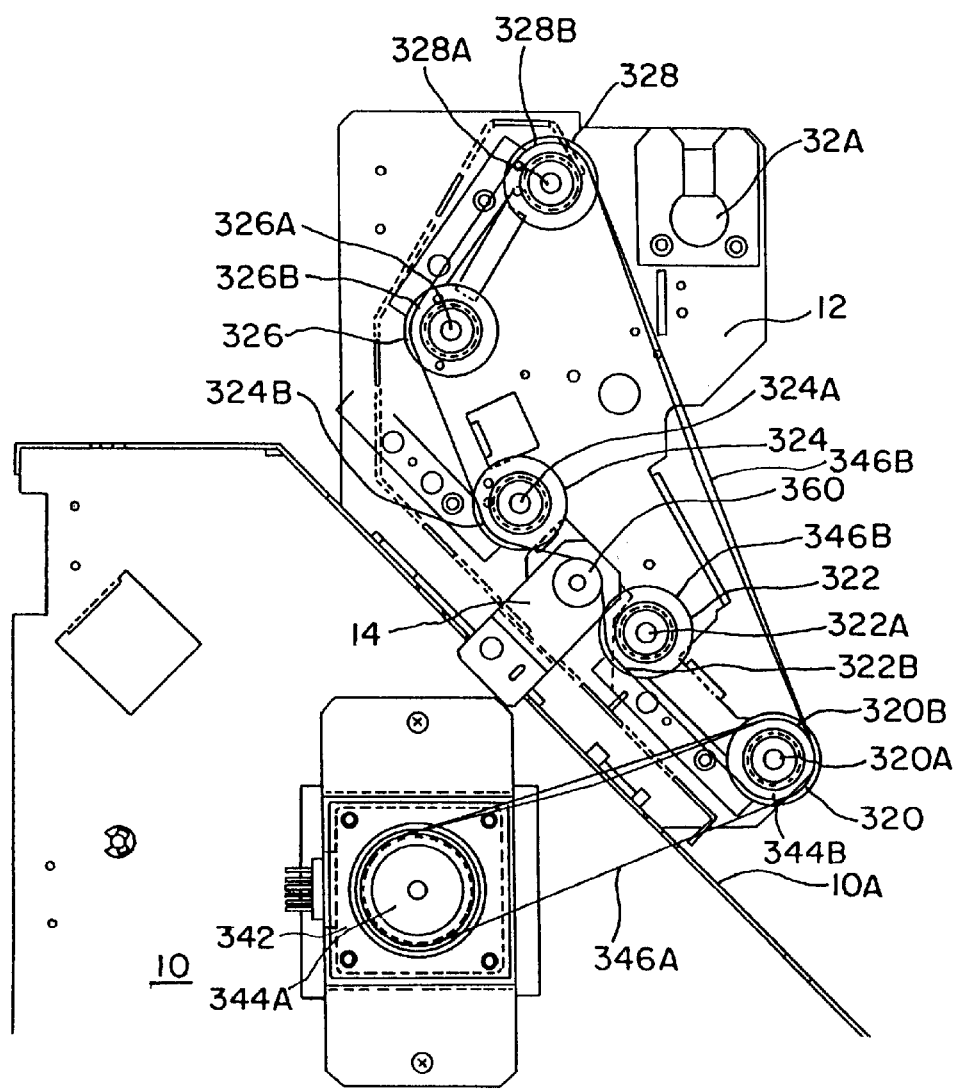
FIG. 23 is a side elevational view of an upper portion of an apparatus body showing the paper transport system of the image reading apparatus of FIG. 4.

The rotary shafts 320A to 328A of the paper transporting rollers 320 to 328 which are driven by the transport roller 342 to rotate to transport a paper sheet are provided on the apparatus body 10 as seen in FIG. 23. In particular, an upper portion 10A of the apparatus body 10 is inclined toward the paper supply hopper 210 side or the paper stacker 510 side (rightwardly in FIG. 23), and a pair of bearing walls 12 are provided uprightly at upper left and right end portions of the body inclined portion 10A. The rotary shafts 320A to 328A of the rollers 320 to 328 are supported on the bearing walls 12.

The paper transporting rollers 320 to 328 are provided on the rotary shafts 320A to 328A described above, respectively. Each of the paper transporting rollers 320 to 328 is provided by a plural number in a suitably spaced relationship from each other on the respective rotary shaft.

Each of the paper transporting rollers 320 to 328 has fine particles of alumina or some other suitable material deposited on part of the surface or the entire surface thereof so that the surface of the roller may have a sufficiently high coefficient of friction.

Also the tension pulley 360 is supported on a bearing member 14 provided projectingly on the apparatus body 10. A pin hole 32A for supporting the apparatus lid 20 for rotation is formed at an upper end portion of each of the bearing walls 12.

Figure 24:
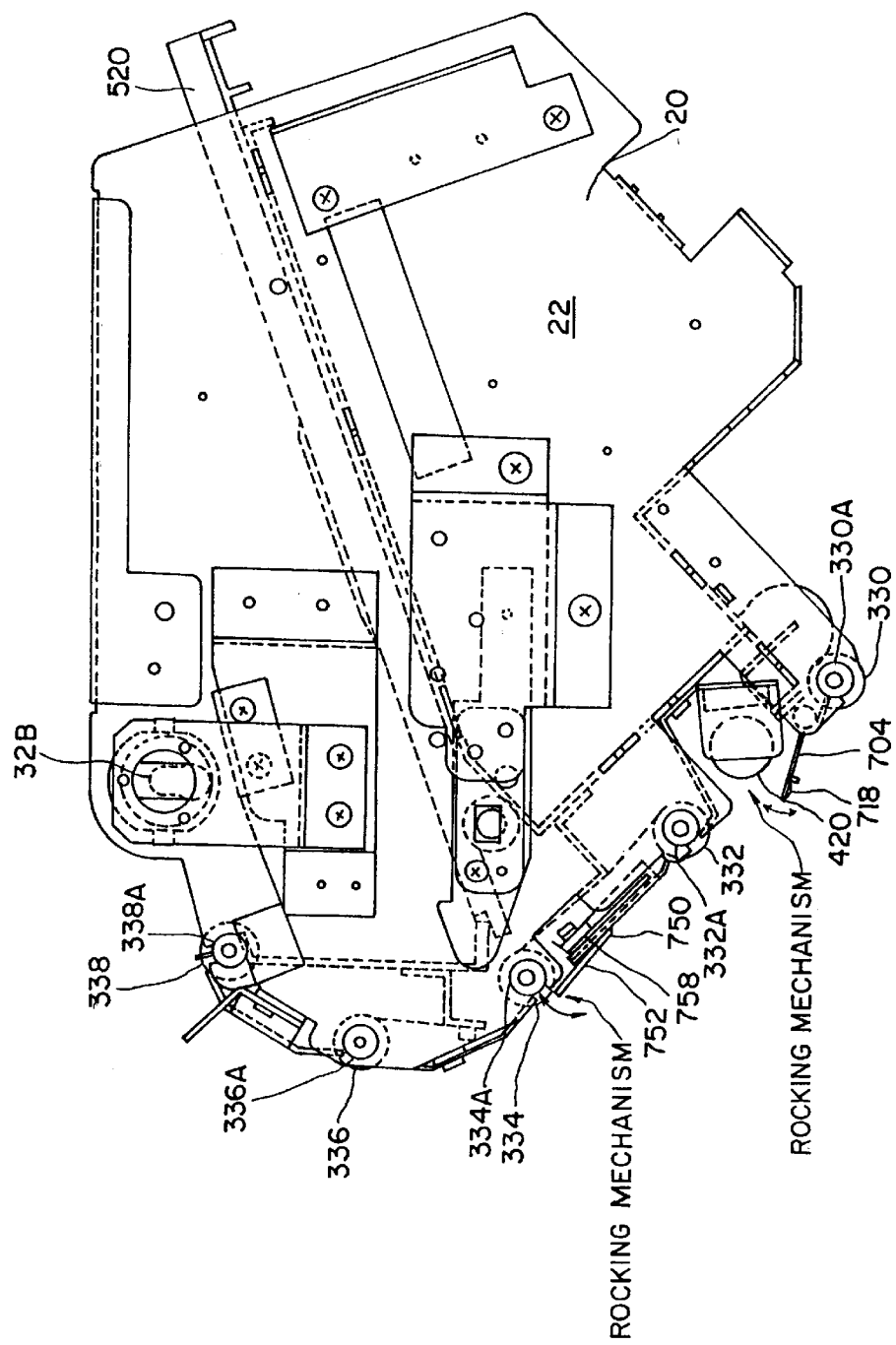
FIG. 24 is a side elevational view of an apparatus lid unit showing the paper transport system of the image reading apparatus of FIG. 4.

In contrast, the idler rollers 330 to 338 are provided on the apparatus lid 20 as seen in FIG. 24. In particular, a pair of walls 22 are provided uprightly at the left and right end portions of the apparatus lid 20, and the rotary shafts 330A to 338A of the idler rollers 330 to 338 are supported at end edges of the walls 22 adjacent the body inclined portion 10A.

Also the idler rollers 330 to 338 are provided on the rotary shafts 330A to 338A in an opposing relationship to the paper transporting rollers 320 to 328, respectively, and each of the idler rollers 330 to 338 is provided by a plural number in a suitably spaced relationship from each other on the respective rotary shaft.

Further, the rotary shafts 330A to 338A are supported by way of resilient members such as leaf springs so that the idler rollers 330 to 338 may be resiliently contacted with the corresponding paper transporting rollers 320 to 328, respectively.

Figure 25:
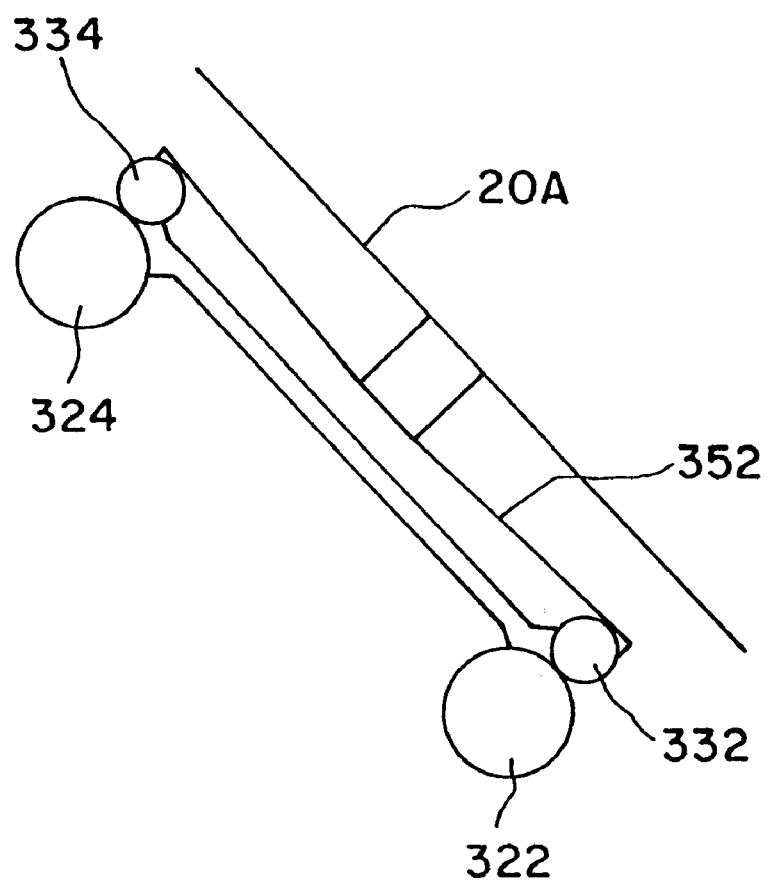
FIG. 25 is a schematic side elevational view showing a roller contacting structure in the paper transport system shown in FIG. 24.

For example, FIG. 25 is a schematic side elevational view showing the supported conditions of the 332 and 334. Referring to FIG. 25, the idler rollers 332 and 334 are supported on a frame 20A of the apparatus lid 20 by way of a leaf spring 352 so that they may be resiliently contacted with the corresponding 322 and 324, respectively.

Since the body-lid locking mechanism 30 for holding the apparatus body 10 and the apparatus lid 20 in a closed condition can hold the closed condition at any of a plurality of stages, the biasing forces of the idler rollers 330 to 338 toward the paper transporting rollers 320 to 328 and the contacting condition between the sheet guides and the auxiliary sheet guides are adjusted by way of the body-lid locking mechanism 30.

A pin 32B is provided at an upper portion of each of the walls 22. The apparatus lid 20 is mounted on the apparatus body 10 with the pins 32B fitted for rotation in the pin holes 32A of the apparatus body 10.

B. Sheet Guide System

The sheet guides 700, 710, 740 and 750 are provided between adjacent ones of the paper transporting rollers 320 to 328 and between adjacent ones of the idler rollers 330 to 338 arranged along the paper transport path 310 and define the paper transport path 310. Within the range of the inclined transport path 312 which extends substantially linearly, the sheet guides 700, 710, 740 and 750 are located below the inclined transport path 312 in the vertical direction, but within the paper reversing transport path 314 which extends along a curve, the sheet guides 700, 710, 740 and 750 are provided at least on the outside of the curved portion of the paper reversing transport path 314. Naturally, sheet guides (which will be referred to as auxiliary sheet guides) are provided at required locations above the inclined transport path 312 in the vertical direction and on the inner side of the curved portion of the paper reversing transport path 314.

For example, such a sheet guide 700 as shown in FIG. 4 is provided in the proximity of an exit of the separation roller 820. The sheet guide 700 is secured to the apparatus body 10 such that it is inclined in conformity with the inclined transport path 312 as shown in FIG. 26(B). Here, the sheet guide 700 is constructed as a sheet guide apparatus 702 which includes an integral auxiliary sheet guide 704 mounted for pivotal motion around a shaft 704A to open or close the sheet guide 700. It is to be noted that L.L in FIG. 26(B) denotes a horizontal line.

The sheet guide 700 and the auxiliary sheet guide 704 are opposed in parallel to each other with guide faces thereof located adjacent each other. However, end portions (left lower ends in FIG. 26(B)) of the sheet guide 700 and the auxiliary sheet guide 704 adjacent the separation roller 820 are bent outwardly from the paper transport path 310 such that they are spaced away from each other to form an opening therebetween so that a paper sheet from the separation roller 820 may be introduced with certainty between the sheet guide 700 and the auxiliary sheet guide 704.

The auxiliary sheet guide 704 is mounted for movement on the shaft 704A such that it is resiliently fixed, during use, at such a closed position in the proximity of the sheet guide 700 as indicated by a solid line in FIG. 26, but when not in use, it can be pivoted to its open position spaced away from the sheet guide 700 as indicated by a chain line in FIG. 26(B). In particular, the auxiliary sheet guide 704 includes sheet guide moving away means 760 by which the auxiliary sheet guide 704 can be pivoted from the closed position to the open position so that it is spaced away from the opposing sheet guide 700.

The sheet guide moving away means 760 includes a pair of levers 706 provided integrally at the opposite end portions of the auxiliary sheet guide 704, and a spring mechanism 708 for resiliently fixing the auxiliary sheet guide 704 at the closed position. The spring mechanism 708 is formed as such a center-over or toggle spring that, when the levers 706 shown in FIG. 26 are moved a little toward the closed position with respect to an intermediate position or dead center 706A thereof, the spring mechanism 708 exerts a biasing force toward the closed position, but when the levers 706 are moved a little toward the open position with respect to the intermediate location 706A, the spring mechanism 708 exerts a biasing force toward the open position.

Accordingly, the auxiliary sheet guide 704 at the closed position is moved to its open position by moving the levers 706 in the direction indicated by an arrow mark P1 in FIG. 26 until they exceed the intermediate position 706A. On the contrary, by moving the levers 706 in the opposite direction indicated by another arrow mark P2 in FIG. 26 until they exceed the intermediate position 706A, the auxiliary sheet guide 704 is moved to the closed position and thereafter held at the closed position by the biasing force of the spring mechanism 708.

For example, when paper jamming occurs, the auxiliary sheet guide 704 can be opened in this manner and the paper can be removed readily.

Such sheet guides as described above are located between adjacent ones of the rollers on the paper transport path 310. However, the sheet guides 710 and 740 which are located at the reading points 422 of the optical image reading unit 410 act not only to guide a paper sheet but also to provide a color reference (generally a white reference) for a paper sheet 40 to be read by the optical image reading unit 410.

For example, the sheet guide 710 provided at the reading point 422 of the first optical image reading unit 412 is provided on the opposite side to the first optical image reading unit 412 with respect to the inclined transport path 312 and opposed to the first optical image reading unit 412 as shown in FIGS. 4, 7 and 12. The sheet guide 710 has, at a position opposed to but remote from the reading point 422, a stepped portion 716 by which a backing portion 712 which provides a color reference to a paper sheet 40 is offset with respect to a paper guiding portion 714 for guiding the paper sheet 40.

The reason why the backing portion 712 is offset in this manner is that it is intended to prevent possible soiling to the backing portion 712. In particular, if the backing portion 712 otherwise guides a paper sheet like the paper guiding portion 714, then paper powder of the paper sheet or ink printed on the paper sheet sometimes sticks to soil the backing portion 712, and soling of such paper powder or ink to the backing portion 712, which provides a color reference for a paper sheet 40, results in variation or degradation of the color reference. Thus, in order to eliminate such a possible trouble, the backing portion 712 is offset so that it may not contact directly with a paper sheet.

The sheet guide 710 is resiliently pressed toward the first optical image reading unit 412 while it is contacted with a contacting member 718 (FIG. 32(B)) on the first optical image reading unit 412 so that it is controlled to a predetermined position. By the sheet guide 710 controlled to its appropriate position in this manner, a paper sheet 40 is guided so that it may pass an appropriate position conforming to a focal length of the first optical image reading unit 412. It is to be noted here that the contacting member 718 is provided, as shown in FIG. 32(B), on the fluorescent lamp unit 420 of the first optical image reading unit 412, which will be hereinafter described.

Meanwhile, for example, the sheet guide 740 provided at the reading point 422 of the second optical image reading unit 414 is constructed, as shown in FIGS. 4 and 7, as a sheet guide with an opening provided on the same side as the first optical image reading unit 412 with respect to the inclined transport path 312 and opposed to the second optical image reading unit 414, and has an opening 742 at a location thereof opposing to the reading point 422. A backing member 752 for providing a color reference to a paper sheet 40 is provided in an opposing relationship to the opening 742 at a position corresponding to the reading point 422 on the opposite side to the first optical image reading unit 412 with respect to the inclined transport path 312.

In particular, since the second optical image reading unit 414 is provided below the inclined transport path 312 in the vertical direction, the sheet guide 740 is naturally positioned between the second optical image reading unit 414 and the inclined transport path 312. Accordingly, the sheet guide 740 makes an obstacle to reading of information of the rear face 44 of a paper sheet by the second optical image reading unit 414. Therefore, the sheet guide 740 is formed as a sheet guide with an opening wherein it is removed to open at the portion thereof which makes the obstacle so that it can read information of the rear face 44 of a paper sheet through the opening 742.

The sheet guide sheet guide 740 is constructed, for example, in such a manner as shown in FIGS. 27(A) to 27(C). Referring to FIGS. 27(A) and 27(C), a glass plate 742A is mounted in the opening 742 of the sheet guide 740 so that it may guide a paper sheet being transmitted while information on the rear face of the paper sheet is read through the glass plate 742A. The sheet guide 740 is positioned in register with the reading point 422 of the second optical image reading unit 414 with the opposite ends thereof attached to the apparatus body 10. The sheet guide 740 can be mounted onto and removed from the apparatus body 10 by operation of a pair of lever portions 740A provided at the opposite end portions of the sheet guide 740.

In the mean time, the backing member 752 for providing a color reference to a paper sheet must be provided on the opposite side of the second optical image reading unit 414 with respect to the inclined transport path 312. Here, the backing member 752 is constructed as a portion (accordingly as a backing portion) of the sheet guide 750 opposed to the sheet guide 740.

Figure 28:
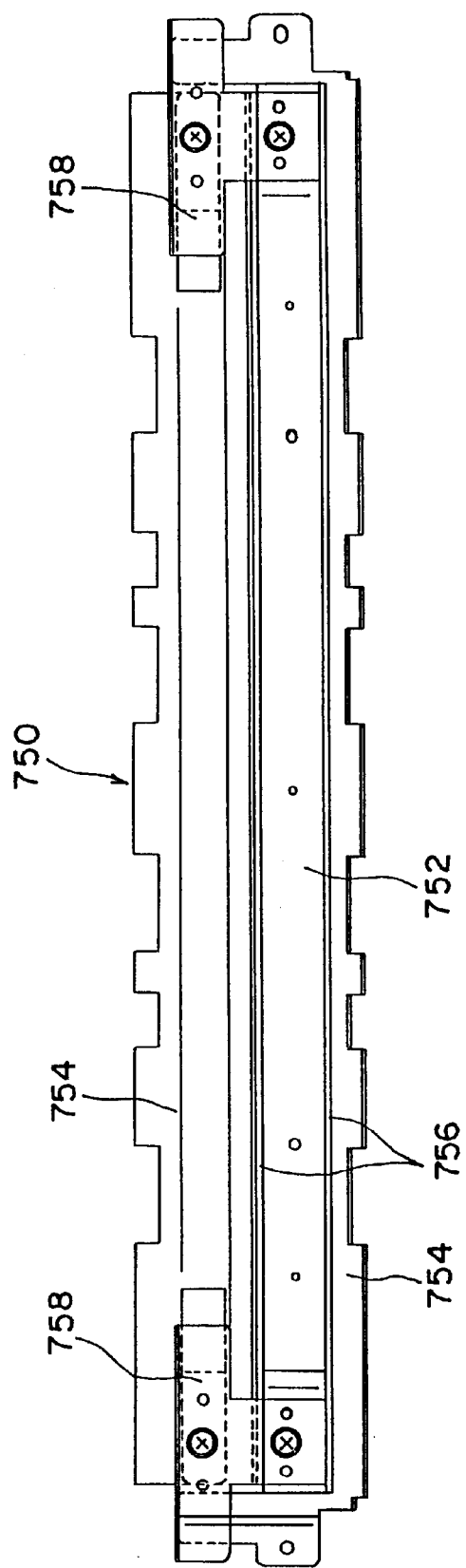
FIG. 28 is a plan view showing the sheet guide system of the paper transport system of FIG. 4.

The sheet guide 750 is constructed, for example, in such a manner as shown in FIG. 28 and is mounted on the apparatus lid 20 such that, as shown in FIG. 24, a downstream side portion (left upper portion in FIG. 24) thereof can be pivoted in a direction toward and away from the inclined transport path 312 around an upstream side portion (right lower portion in FIG. 24) thereof in the paper transporting direction which is secured to the apparatus lid 20. The backing member 752 is offset, similarly to the backing portion 712 of the sheet guide 710, by forming a step 756 on a paper guiding portion 754 for guiding a paper sheet.

A pair of contacting elements 758 each formed from a leaf spring are provided at the opposite ends of an auxiliary sheet guide 746 and resiliently contact with a pair of contacting faces 740B at the opposite ends of the sheet guide 740 (refer to FIG. 27) to restrict rocking motion of the downstream side portion of the sheet guide 750 in the paper transporting direction. Consequently, the sheet guide 750 is fixed to an appropriate position with respect to the inclined transport path 312 by a resilient biasing force.

It is to be noted that, while the biasing force for contacting each of the sheet guides and an associated auxiliary sheet guide with each other is set to such a low level as will not provide transportation resistance to a paper sheet being transported, it can be adjusted in a similar manner to the biasing forces between the rollers 330 to 338 and the rollers 320 to 328 by adjusting the closed condition between the apparatus body 10 and the apparatus lid 20 by way of the body-lid locking mechanism 30 described hereinabove.

C. Paper Discharge Roller Mechanism

Figure 29:
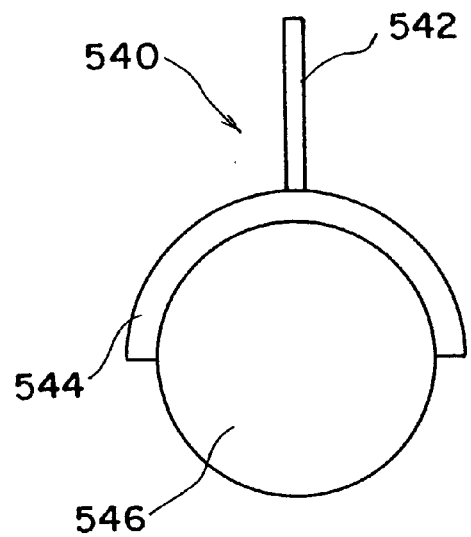
FIG. 29 is a schematic side elevational view showing a paper discharge roller mechanism in the paper transport system of FIG. 4.

The paper discharge roller mechanism 540 is provided at a trailing end portion of the paper transport mechanism 300 as described hereinabove and includes, as shown in FIG. 29, a paper discharge roller 544 mounted on a rotary shaft 546 which receives and is rotated by a driving force. Here, the rotary shaft 328A of the paper transport roller 328 serves also as the rotary shaft 546 of the paper discharge roller 544, and driving of the paper discharge roller 544 is performed together with driving of the paper transport roller 328 by the roller driving mechanism 340.

The paper discharge roller 544 is provided between each adjacent ones of a plurality of paper transport rollers 328 disposed in a suitably spaced relationship from each other on the rotary shaft 328A.

The paper discharge roller 544 has an outwardly projecting projection 542 which is in the form of a tab extending outwardly from an outer periphery of the paper discharge roller 544 and formed from such a resilient flexible material as to allow the projection 542 to be yieldably deformed when it is contacted by the opposing idler roller 338.

Figure 30:
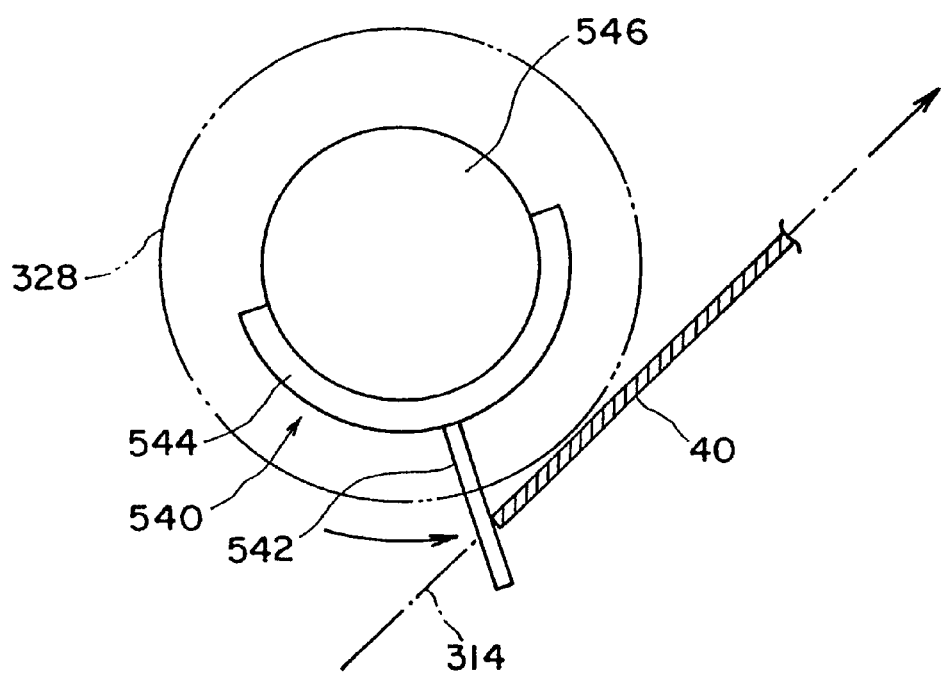
FIG. 30 is a schematic side elevational view illustrating a movement of the paper discharge roller mechanism shown in FIG. 29.

As shown in FIG. 30, when it projects toward the paper reversing transport path 314 of the paper transport path 310, it pushes up the trailing end of a paper sheet 40 being transported along the paper reversing transport path 314 to guide the paper sheet 40 being discharged to the paper stacking mechanism 500.

2-3. Image Reading Mechanism

The light path 418 from the reading point 422 to the CCD circuit board 336 in the optical image reading unit 410 is schematically shown in FIG. 31 in such a manner that expansion of the light path 418 in the widthwise direction of a paper sheet may be seen omitting the reflections by the mirrors 418A, 418B and 418C and representing the light path 418 generally as a straight line. Referring to FIG. 31, pieces of image information arranged in the widthwise direction of a paper sheet 40 are collected by the lens 432 and come to the CCD circuit board 436. The CCD circuit board 436 is constituted from a plurality of CCD cameras 436A arranged in a juxtaposed relationship to each other so as to catch the pieces of information arranged in the widthwise direction.

The shading plate 430 located forwardly of the lens 432 corrects the image information since the image information is distorted by a greater amount toward the opposite left and right ends 40A and 40B of the paper sheet 40.

The CCD cameras 436A are located in a black box 434 and are controlled by respective CCD drivers to put video gates thereof not shown into an on-state to detect information. The CCD cameras 436A stop detection of image information by putting the video gates into an off-state. The thus detected image information is sent to and processed by a video circuit not shown provided on the video circuit board 438. It is to be noted that the on/off control of the video gates is performed in response to detection of passage of a paper sheet by the transport sensor 616 which detects a reading timing.

Image information obtained by the optical image reading units 412 and 414 in this manner is extracted under the control of the image information extraction control means 440 as seen from FIG. 7. In this instance, the image information extraction control means 440 performs extraction control of image information in response to detection by paper end detection means 450. In particular, the paper end detection means 450 detects a leading end 46 from an amount of variation of the output of the optical image reading unit 410 and is provided in the image information extraction control means 440. Extraction of image information is performed when the leading end 46 of a paper sheet 40 advances into the optical image reading unit 410.

Further, in the image reading apparatus of the present embodiment, since the two optical image reading units 412 and 414 are provided near to each other, image reading may possibly be performed simultaneously by the two units optical image reading units 412 and 414. Therefore, the image information extraction control means 440 controls so that information from the second optical image reading unit 414 which reads information of the rear face of a paper sheet is stored once into a buffer storage apparatus of a reading board 984 (refer to FIG. 37) and is then recalled from the buffer storage apparatus after information of the front face of the paper sheet from the first optical image reading unit 412 is sent out.

The image information extraction control means 440 is further constructed such that extraction control of image information obtained by the first optical image reading unit 412 and the second optical image reading unit 414 is performed in response to a result of selection by an original selection switch 924L serving as paper reading selection means which will be hereinafter described and a discrimination mark 50 applied to a paper sheet 40.

Figure 13:
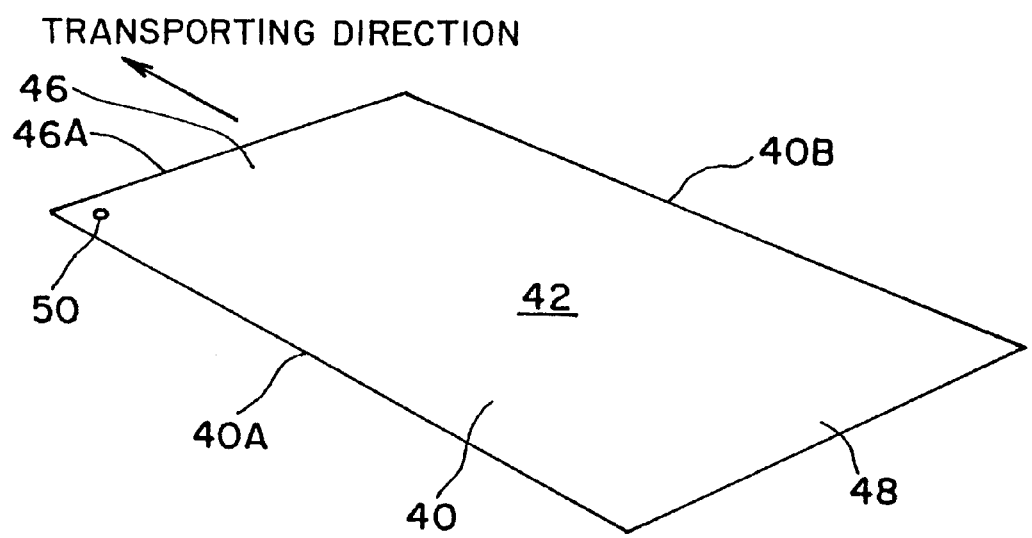
FIG. 13 is a schematic perspective view of a paper sheet employed in the image reading apparatus of FIG. 4.

In particular, it can be selected by the original selection switch 924L whether both face reading should be performed or one face reading should be performed, and the image information extraction control means 440 performs reading control in response to a result of the selection by the original selection switch 924L. However, paper sheets which require both face reading and paper sheets which allow one face reading may possibly be present in a mixed condition. In this instance, when paper sheets should be read in a different manner from other paper sheets in which the paper sheets are mixed, a discrimination mark 50 is applied to each of the paper sheets so that they may be read in a different manner. The discrimination mark 50 is provided for discrimination whether the paper sheet should be read by one face reading or by both face reading, and is applied to a location outside an original reading area such as, for example, a corner of the leading end of the paper sheet 40 as shown in FIG. 13 so that it may be distinguished from image information in the original reading area which should originally be read.

Therefore, for example, when one face reading originals are mixed in both face reading originals, if a discrimination mark 50 which designates one face reading is applied to each of the one face reading originals the quantity of which is smaller than that of the both face reading originals and it is selectively set by way of the original selection switch 924L that both faces of each paper sheet 40 should usually be read, then image information on both faces of a paper sheet 40 is normally read by both of the first optical image reading unit 412 and the second optical image reading unit 414. However, when a discrimination mark 50 is detected, image information only on the front face or the rear face of the paper sheet 40 is read by the first optical image reading unit 412 or the second optical image reading unit 414.

On the contrary, when both face reading originals are mixed in one face reading originals, if a discrimination mark 50 which designates double face reading is applied to each of the double face reading originals the quantity of which is smaller than that of the one face reading originals and it is selectively set by way of the original selection switch 924L that one face of each paper sheet 40 should usually be read, then image information only on the front face or the rear face of a paper sheet 40 is normally read by the first optical image reading unit 412 or the second optical image reading unit 414. However, when a discrimination mark 50 is detected, image information on the both faces of the paper sheet 40 is read by both of the first optical image reading unit 412 and the second optical image reading unit 414.

The image information extraction control means 440 further includes discrimination mark image erasure means 460 so that the image of such discrimination mark 50 applied to a paper sheet 40 may be erased and only image information to be read originally may be outputted.

By the way, the apparatus body 10 or the apparatus lid 20 assures an upper mounting space (space for the front face reading unit) 26 and a lower mounting space (space for the rear face reading unit) 16 having substantially similar sizes and shapes to each other to allow the optical image reading units 412 and 414 to be mounted in them, respectively (refer to FIG. 4). In the meantime, the optical image reading unit 410 is prepared by a plural number having different specifications having different performances but having substantially common sizes and profiles.

While, in the image reading apparatus of the present embodiment, the first optical image reading unit 412 and the second optical image reading unit 414 are constructed with common specifications, it is easy to construct the first optical image reading unit 412 and the second optical image reading unit 414 so as to have different specifications such that, for example, the optical image reading unit for front face reading of the construction described above has higher performances than the optical image reading unit for rear face reading of the construction described above.

Further, each of the optical image reading units 410 includes detection means (front/rear face detection means) 630 which can detect that it is installed as a unit for front face reading when it is installed in the upper mounting space 26 but detect that it is installed as a unit for rear face reading when it is installed in the lower mounting space 16.

Information detected by the detection means 630 is sent to the image information extraction control means 440 and used for extraction control of image information.

It is to be noted that the detection means 630 may be constructed in the following manner. For example, a front surface detection projection (not shown) is provided only in the upper mounting space 26 while a rear face detection projection (not shown) is provided only in the lower mounting space 16, and a front face detection switch (not shown) which is automatically contacted, when it is installed in the upper mounting space 26, by the front face detection projection to switch to an on-state and a rear face detection switch (not shown) which is automatically contacted, when it is installed in the lower mounting space 16, by the rear face detection projection to switch to an on-state are provided on each of the optical image reading units 410.

By the way, in each of the optical image reading units 410, the fluorescent lamp unit 420 is provided in order to make the reading point 422 light. The fluorescent lamp unit 420 is constructed, for example, in such a manner as shown in FIGS. 32 and 33.

In particular, the fluorescent lamp unit 420 includes a mounting base 424 and a fluorescent lamp 426 mounted on the mounting base 424. As shown in FIG. 32, a pair of sockets 424A are provided projectingly at the opposite ends of the mounting base 424, and the mounting base 424 is mounted on and between the sockets 424A. The mounting base 424 itself is mounted in an inclined relationship to the inclined transport path 312 as seen in FIG. 33 to assure the light path 418 to the CCD cameras 436A.

Figure 33:
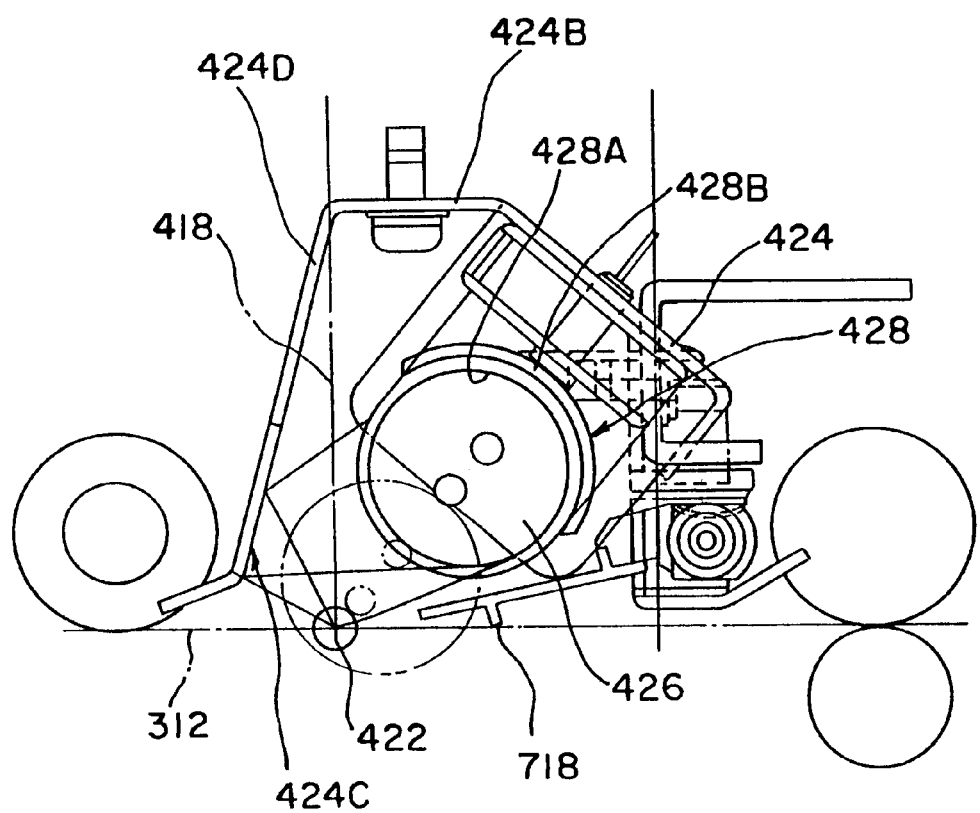
FIG. 33 is a side elevational view showing the fluorescent lamp unit shown in FIGS. 32(A) and 32(B)

A heater 428 is provided along the rear face of the fluorescent lamp 426 and covers over the fluorescent lamp 426 as seen in FIG. 33. The inner face of the heater 428 adjacent the fluorescent lamp 426 is formed as a reflection plate 428A which converges light of the fluorescent lamp 426 to the reading point 422, and a heat generation element 428B is provided on the rear face side of the heater 428. Generally, since the fluorescent lamp 426 does not emit much light at a low temperature, it cannot illuminate the reading point 422 sufficiently until the fluorescent lamp 426 becomes warm after it is started. However, with the present fluorescent lamp unit 420, since the fluorescent lamp 426 is warmed up by the heat generation element 428B, after it is started, the fluorescent lamp 426 becomes warm rapidly and can illuminate the reading point 422 with a sufficient amount of light.

A lamp house 424B is provided on the mounting base 424 adjacent the light path 418 such that it covers over the fluorescent lamp 426, and the inner face of the lamp house 424B is formed as a reflection plate 424C which converges light of the fluorescent lamp 426 to the reading point 422. Naturally, the lamp house 424B has a slit 424D formed therein so that it does not intercept the light path 418.

Further, the contacting member 718 mentioned hereinabove is mounted and resiliently supported on the mounting base 424 adjacent the inclined transport path 312 such that it may be rocked toward the inclined transport path 312. The contacting member 718 restricts the sheet guide 710 to a predetermined position as described hereinabove, and a face of the contacting member 718 adjacent the fluorescent lamp 426 functions also as a reflection plate which reflects light of the fluorescent lamp 426 so that the light may not be projected other than to the reading point 422.

2-4. Stacking Mechanism

Figure 34:
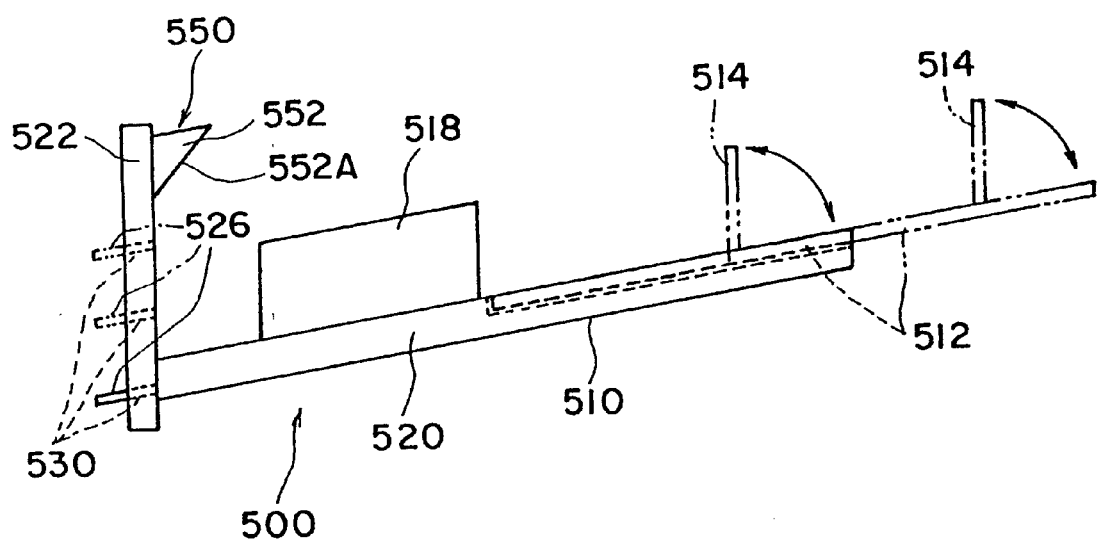
FIG. 34 is a schematic side elevational view showing a stacker mechanism of the image reading apparatus of FIG. 4.
Figure 35:
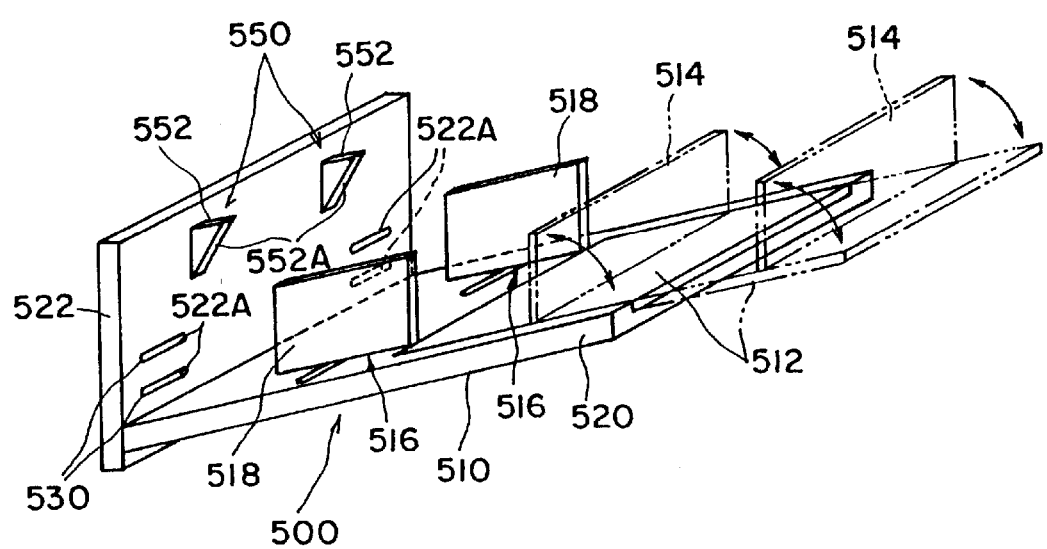
FIG. 35 is a schematic perspective view showing the stacker mechanism shown in FIG. 34.

Referring now to FIGS. 34 and 35, the paper stacker 510 of the paper stacking mechanism 500 includes a stacker table 520 at the bottom thereof and further includes an end frame 522 at an interior end thereof from which a paper sheet 40 is discharged. A pair of paper trailing end guide members 552 which constitute a paper trailing end guide mechanism 550 are provided projectingly at upper portions of the end frame 522.

The paper trailing end guide members 552 guide, at guide faces 552A thereof, the trailing end 48 of a paper sheet 40 to be stacked into the paper stacker 510 so that paper sheets 40 may be stacked in a predetermined posture on the stacker table 520.

A paper stacker position variation mechanism 530 is provided on the stacker table 520 so that the vertical position of the stacker table 520 may be adjusted. Here, while the stacker table 520 is mounted on the end frame 522, the paper stacker position variation mechanism 530 is constructed so that the vertical position of the stacker table 520 may be adjusted by removing and mounting the stacker table 520 from and onto the end frame 522.

In particular, pairs of left and right fitting projections 526 are formed at a front end (paper discharging side end) of the stacker table 520 while pairs of left and right insertion holes 522A are formed in the end frame 522 corresponding to the fitting projections 526. Then, the stacker table 520 is mounted onto the end frame 522 by inserting the fitting projections 526 into the insertion holes 522A, but the stacker table 520 is removed from the end frame 522 by pulling off the fitting projections 526 from the insertion holes 522A.

The paper stacker position variation mechanism 530 is constituted from such mounting structure of the stacker table 520 and the structure including the plurality of (three in the arrangement shown) left and right pairs of insertion holes 522A. In particular, the vertical position of the stacker table 520 can be adjusted by selectively inserting the fitting projections 526 into the insertion holes 522A provided at the different heights.

The stacker table 520 further includes a slide element 512 provided thereon for sliding movement in the paper discharging direction, and a paper stopper 514 is mounted for up and down pivotal motion on the slide element 512.

The paper stopper 514 is located at a paper discharging side end portion of the stacker table 520 and prevents, when it is at an uprightly pivoted position as indicated by chain lines in FIG. 35, the stacked paper sheets 40 from moving in the discharging direction. When such prevention of movement of the paper sheets is not required, the paper stopper 514 will be pivoted down so that the stacker table 520 can be used wide.

Further, if the paper sheets have a great length in the discharging direction, then the slide element 512 will be drawn out as indicated by chain lines in FIG. 35 so that the stacker table 520 may present a greater area. Also in this instance, if the paper stopper 514 is pivoted to the upright position, movement of the paper sheets is prevented by the paper stopper 514, but when it is not particularly necessary to prevent movement of the paper sheets, the paper stopper 514 will be pivoted down to its horizontal position so that the stacker table 520 may be used with a wider area.

The stacker table 520 further has a pair left and right slide elements 516 mounted thereon for sliding movement in the paper width direction, and a paper stopper 518 is mounted for up and down pivotal motion on each of the slide elements 516. Thus, by moving the slide elements 516 to adjust the paper stoppers 518 to the width of a paper sheet 40, also the position in the widthwise direction of a discharged paper sheet is controlled appropriately. Naturally, if the width of the paper sheet 40 is so large that movement of the slide elements 516 to maximum limit positions does not allow accommodation of the paper sheet 40 between the left and right paper stoppers 518, the paper stoppers 518 will be pivoted down so that the maximum width of the stacker table 520 may be utilized. In this instance, wall faces 24 (refer to FIG. 5) of the apparatus lid which are provided uprightly on the opposite sides of the stacker table 520 control the position of a paper sheet in the widthwise direction in place of the left and right paper stoppers 518.

2-5. Control System

A. Operation Panel

Figure 36:
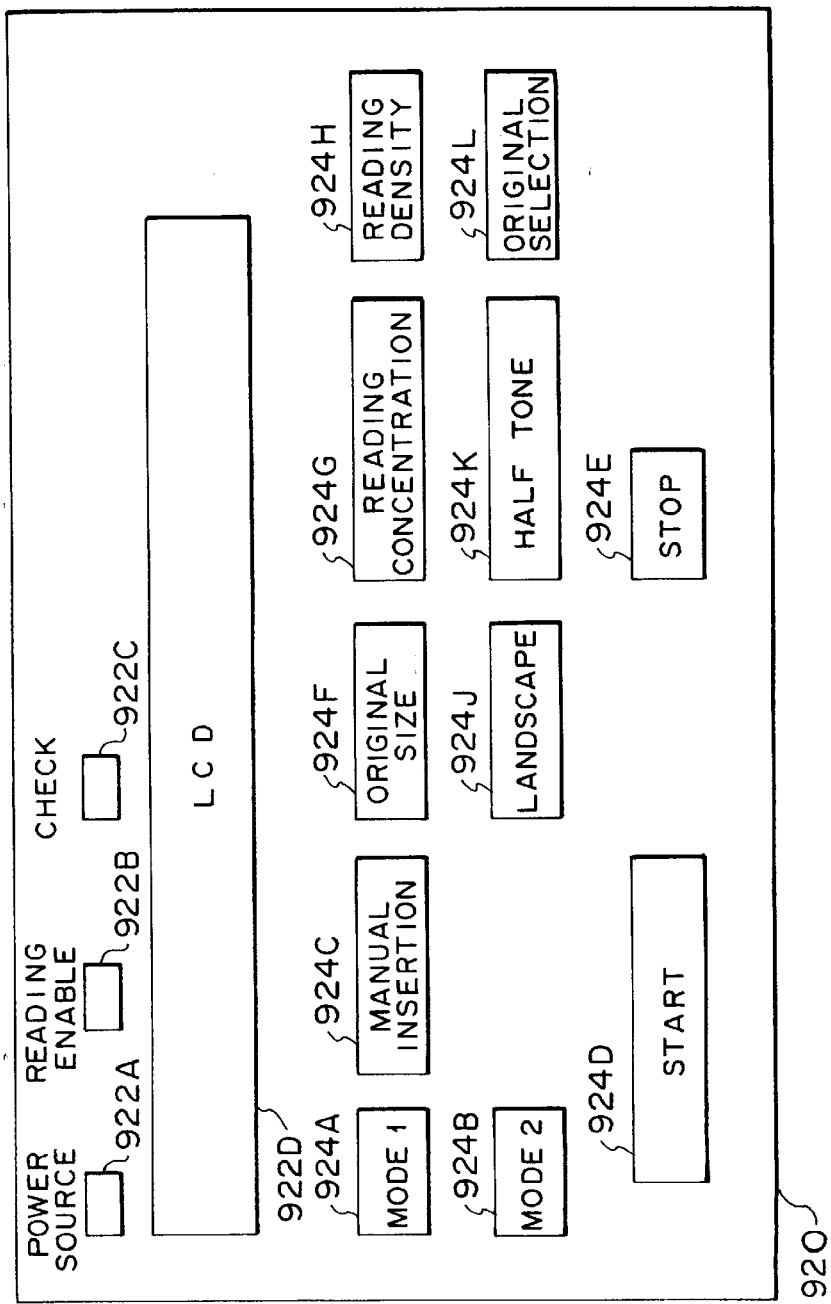
FIG. 36 is a front elevational view showing an operation panel of the image reading apparatus of FIG. 4.

Referring now to FIG. 36, the operation panel 920 has provided thereon various indication lamps including a power source input indication lamp 922A, a reading enable indication lamp 922B and a check lamp 922C, and a liquid crystal display unit 922D for displaying various information by characters. The liquid crystal display unit 922D suitably displays, for example, information of an operation input, an error message, and so forth.

The operation panel 920 further has provided thereon a plurality of automatic reading mode setting switches 924A and 924B each serving as insertion mode selection means for selectively setting one of a plurality of (two including a mode 1 and a mode 2 here) automatic reading modes, a manual insertion mode setting switch 924C serving as insertion mode selection means for setting a manual insertion mode, a start switch 924D for starting the image reading apparatus in an automatic reading mode, and a stop switch 924E for stopping the image reading apparatus.

It is to be noted that the mode 1 and the mode 2 are different, for example, in terms of the transport speed (reading speed). When automatic reading should be performed, the mode 1 or the mode 2 will be selected first, and then the start switch 924D will be depressed to start the image reading apparatus. However, for manual insertion, the manual insertion mode setting switch 924C will be depressed to start the image reading apparatus.

The operation panel 920 further has provided thereon an original size inputting switch 924F, a reading concentration setting switch 924G, a reading density setting switch 924H, a landscape switch 924J, a half tone setting switch 924K, and the original selection switch (paper reading selection means) 924L. The original selection switch 924L is a switch by which it can be set whether both face reading of an original should be performed or one face reading only of the front face or the rear face should be performed.

B. General Construction of the Control System Referring now to FIG. 37 which schematically shows the mechanical components described above and control sections for controlling the mechanical components, a control section 930 includes a mechanical section control means (mechanism driver) 932 including a control circuit for controlling mechanical operations of the mechanical components, and image reading system control means (mother board) 934 including a control circuit for controlling operation of the image reading system. A pair of power source adjustment sections 940A and 940B for transforming an external power source to required voltages are connected to the image reading system control means 934.

The mechanical section control means 932 controls operation of the transport systems (that is, the paper supply mechanism 200, the paper transport mechanism 300, the paper stacking mechanism 500 and so forth) and the heater 428 of the fluorescent lamp unit 420 and an invertor of the fluorescent lamp 426 in accordance with an instruction signal received by way of the image reading system control means 934 and detection information from the various sensors of the mechanical components. The mechanical section control means 932 also controls operation of a cooling fan 936 for the control section 930 itself. The paper supply hopper position control means (motor control means) 280, the pick clutch control means 250 serving as paper supply roller driving mechanism control means, the separation clutch control means 858 and the roller driving mechanism control means 350 described hereinabove are included in the mechanical section control means 932.

The image reading system control means 934 controls operation of CCD driver units of the first optical image reading unit 412 and the second optical image reading unit 414, a video circuit and a rear face reading board 944 and outputting to an outputting interface board 938 in response to setting information of the operation panel 920 and information from the mechanical section control means 932. The image information extraction control means 440, the paper end detection means 450 and the discrimination mark image erasure means 460 described hereinabove are provided in the image reading system control means 934.

Figure 37:
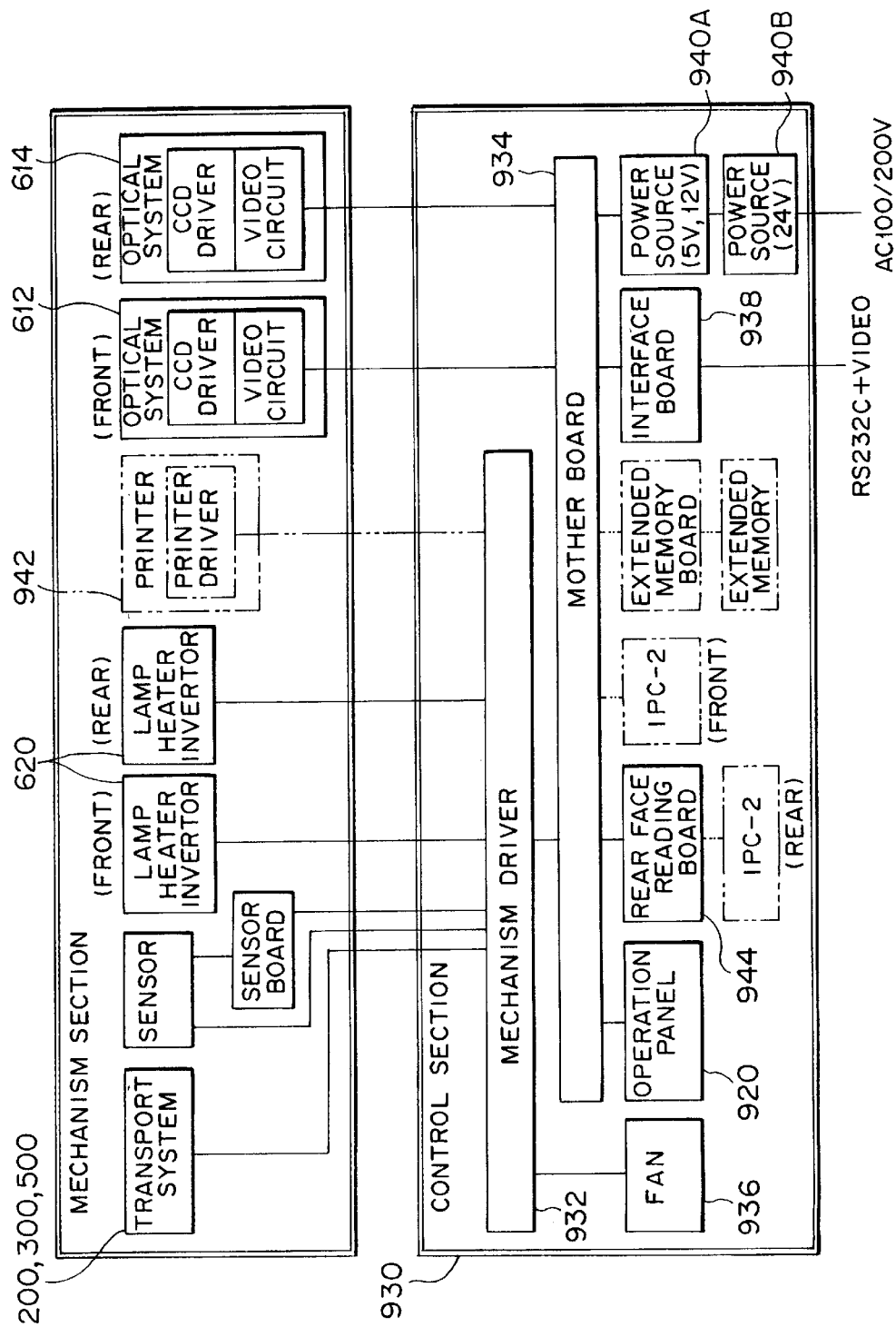
FIG. 37 is a block diagram schematically showing the construction of the image reading apparatus of FIG. 4.
Figure 38:
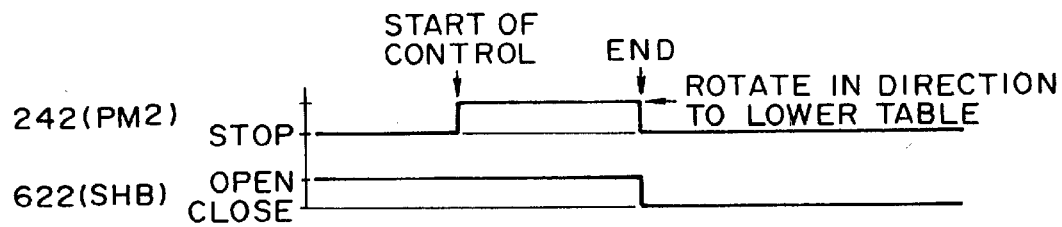
FIG. 38 is a sequence diagram illustrating initialization operation of a hopper system of the image reading apparatus of FIG. 4.

Thus, the paper supply hopper position control means 280, the pick clutch control means 250, the separation clutch control means 858 and the roller driving mechanism control means 350 perform various controls in a synchronized relationship with a control timing of the image information extraction control means 440 by way of the mechanical section control means 932 and the image reading system control means 934.

Where an endorser (endorsing printer) 942 is provided in the proximity of the terminal end of the paper transport path 310 as shown in FIG. 7, also a driver for the endorser 942 is controlled by the image reading system control means 934 as seen from FIG. 37. Also where an extension memory board and/or an auxiliary printed circuit board (IPC-2) are provided, they are controlled by the image reading system control means 934.

3. Operation

The image reading apparatus constructed in such a manner as described above operates in the following manner.

Operations of the hopper motor 242, the pick clutch 238, the separation clutch 854 and the transport motor 342 and control by the image information extraction control means 440 proceed, for example, in such a manner as illustrated in time charts of FIGS. 38 to 43.

First, control of the hopper motor 242 will be described. Upon starting of the control, control of an initialization mode is performed as seen from FIG. 38. In particular, in response to an operation starting instruction (that is, a control starting instruction) for the image reading apparatus such as, for example, throwing in of a power source to the apparatus, the hopper motor 242 is rotated in a direction to lower the hopper table 212. Then, when the hopper table 212 comes to its lowermost position, the bottom sensor 622 switches from an off-state (open) to an on-state (closed), and the hopper motor 242 stops in response to such detection signal of the bottom sensor 622. Naturally, the control is not performed if, upon reception of the control starting instruction, the hopper table 212 is already at the lowermost position and the bottom sensor 622 is in an on-state (closed).

The control of the hopper motor 242 after this is different between an automatic reading mode and the manual insertion mode in response to setting information of the switches.

Figure 39:
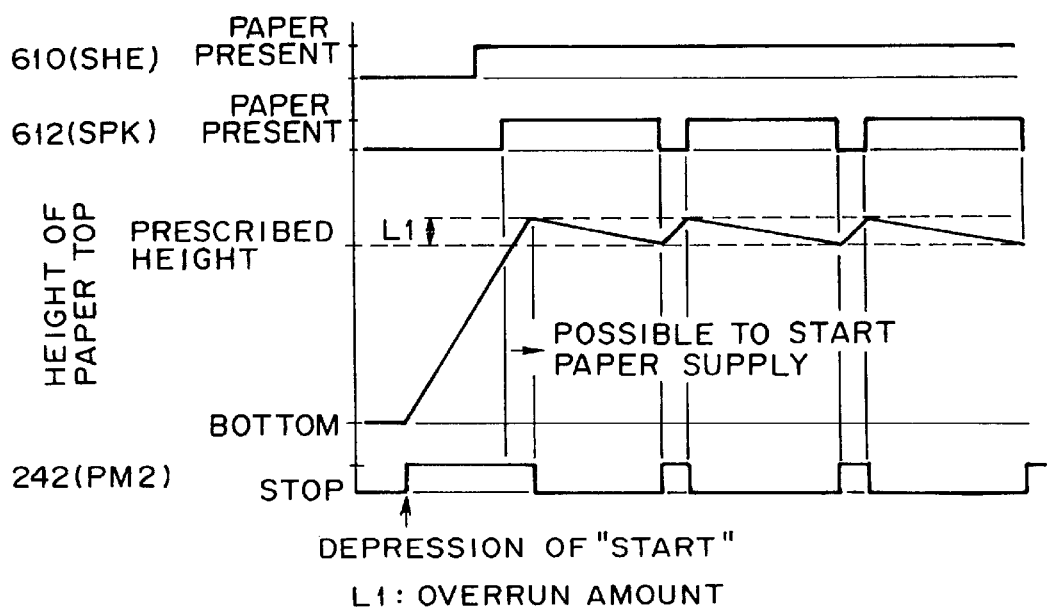
FIG. 39 is a sequence diagram illustrating operation of the hopper system in an automatic reading mode.

In particular, if paper sheets 42 are accommodated into the hopper table 212 and an automatic reading mode is selected and then a starting operation (depression of the start button) is performed, then the hopper motor 242 is rotated in a direction to raise the hopper table 212 as seen from FIG. 39. Then, when the top of the paper sheets 40 in the hopper table 212 rises from a position (bottom position) corresponding to the lowermost position of the hopper table 212, whereupon the hopper empty sensor 610 is turned on ("presence of a paper sheet"), to a prescribed height at which the paper supply sensor 612 is turned on ("presence of a paper sheet").

When the hopper table 212 is raised by an overrun amount $L_1$ after the paper supply sensor 612 is turned on, the hopper motor 242 is stopped. Thereafter, image reading is performed while paper supplying and transporting operations, which will be hereinafter described, are performed. During the process, as the paper sheets 40 are supplied, the height of the top of the stack of paper sheets 40 decreases. Consequently, the paper supply sensor 612 is turned off finally, and in response to this, the hopper motor 242 is rotated in the direction to raise the hopper table 212.

Then, as the height of the top of the stack of paper sheets 40 in the hopper table 212 rises again, it finally reaches the prescribed height, whereupon the paper supply sensor 612 is turned on ("presence of a paper sheet"). While such a sequence of operations as described above is repeated to control the height of the top of the paper sheets within a fixed range (within the range of the overrun amount $L_1$), image reading operation is performed together with paper supplying and transporting operations.

Figure 40:
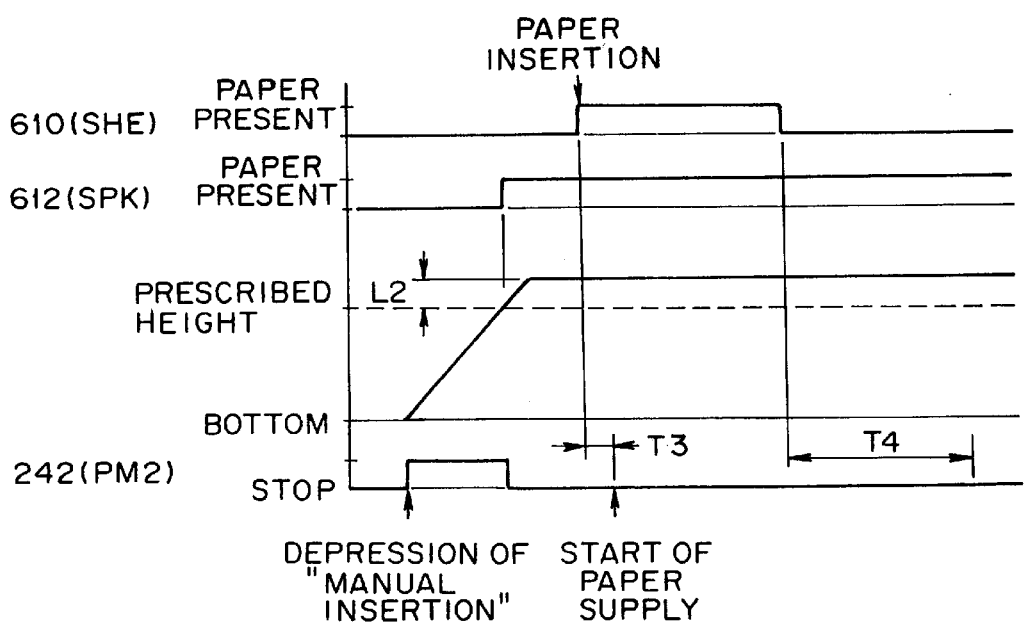
FIG. 40 is a sequence diagram illustrating operation of the hopper system in a manual insertion mode.

On the other hand, if a switch operation for the manual insertion mode (depression of the manual insertion button) is performed, then the hopper motor 242 is rotated in the direction to raise the hopper table 212 as seen from FIG. 40. Then, when the hopper table 212 is raised until the height of the top end thereof comes to a prescribed height, then the paper supply sensor 612 is turned on ("presence of a paper sheet"). When the hopper table 212 is further raised a little by an overrun amount $L_2$ after the paper supply sensor 612 is turned on, the hopper motor 242 is stopped. Thereafter, the hopper motor 242 is kept stopped and the hopper table 212 keeps the position. Then, manual insertion of a paper sheet is performed as can be seen also from an on/off condition of the hopper empty sensor 610.

Subsequently, operations of the pick clutch 238, the separation clutch 854 and the transport motor 342 and control by the image information extraction control means 440 will be described together with operation of the hopper motor 242. Referring to FIG. 41, paper sheets 40 are first accommodated into the paper supply hopper 210 and a read command to instruct starting of image reading is developed (point T1). At this initial stage, since the paper supply hopper 210 is not at the paper supply position, the paper supply sensor 612 is in an off-state. The hopper empty sensor 610 also provides a signal indicating absence of a paper sheet.

Since the paper supply sensor 612 is in an off-state, the hopper motor 242 is rendered operative to raise the paper supply hopper 210 to the paper supply position (point T2). Consequently, the paper supply sensor 612 is turned on. As a result, the hopper motor 242 is stopped, and the pick clutch 238 and the separation clutch 854 are engaged. Thereafter, the transport motor 342 is started (point T3) after a small time lag (30 ms in the example shown) until the pick clutch 238 and the separation clutch 854 are engaged firmly. By the operation of the transport motor 342, the pick rollers 220 and the separation roller 820 are rotated by way of the pick clutch 238 and the separation clutch 854 to supply and transport a first paper sheet 40.

The transport motor 342 can be selectively set to one of a low speed mode of a velocity $V_1$ (for example, 12 to 13 cm/s), a high speed mode of another velocity $V_2$ (for example, about 50 cm/s) and an intermediate speed or mid speed mode of an intermediate velocity. For the first paper sheet upon starting of paper supply, the transport motor 342 operates in the low speed mode. Accordingly, also the transportation speeds of the pick rollers 220 and the separation roller 820 are low.

When the leading end of the paper sheet 40 being transported in this manner passes the transport sensor 614, the transport sensor 614 detects this and is turned on (point T4), and the pick clutch 238 is disengaged. At this point of time, the paper sheet 40 is already at a position at which it can be driven by the separation roller 820, and consequently, the paper sheet 40 is thereafter driven by the separation roller 820.

Then, when the leading end of the paper sheet 40 being transported passes the transport sensor 616, the transport sensor 616 detects this and is turned on (point T5), and the separation clutch 854 is disengaged. At this point of time, the paper sheet 40 is already at a position at which it can be driven by the transport roller 320, and consequently, the paper sheet 40 is thereafter driven by the transport roller 320. Thereafter, the paper sheet 40 is successively driven by the succeeding transport rollers 322 to 328. At the point of time T5, since the transport motor 342 is in the low speed mode, the transportation velocity of the transport roller 320 itself is low.

The transport sensor 616 serves also as a sensor for detecting a reading timing, and when the passage of the leading end of the paper sheet 40 is detected by the transport sensor 616, a read command is developed in response to the detection (point T6). Upon reception of the read command, the transport motor 342 is accelerated from the low speed mode (velocity $V_1$) to the high speed mode (velocity $V_2$). Accordingly, also the speed of rotation of the transport rollers 320 to 328, that is, the transportation speed, increases until high speed transportation is reached.

Then, at a point of time T7 after lapse of a predetermined time $t_3$ after the leading end of the paper sheet 40 passes the transport sensor 616, the first optical image reading unit 412 for reading information of the front face of the paper sheet 40 is put into a reading condition (that is, a video gate on-state). Thereafter, at another point of time T8 after lapse of another predetermined time $t_4$ after the leading end of the paper sheet 40 passes the transport sensor 616, the second optical image reading unit 414 for reading information on the rear face of the paper sheet 40 is put into a reading condition (that is, a video gate on-state).

It is to be noted that the predetermined times $t_3$ and $t_4$ are times required for a paper sheet to pass from the transport sensor 616 to the reading points 412A and 414A of the optical image reading units 412 and 414, respectively, and are given, from the distances $L_1$ and $L_2$ from the transport sensor 616 to the reading points 412A and 414A and the transportation speed $V_2$ by the transport roller 320, by the following equations, respectively;

$$t_3 = L_1/V_2, \ t_4 = L_2/V_2$$

During such image reading, the transport sensors 614 and 616 are switched from on to off (at points T9, T10) when the trailing end of the paper sheet 40 passes the transport sensors 614 and 616, respectively.

The image information read in this manner is extracted under the control of the image information extraction control means 440. In particular, extraction of the image information is performed by the paper end detection means 450 when the leading end 46 of the paper sheet 40 advances into the optical image reading unit 410.

Then, in each of the optical image reading units 412 and 414, when a time $t_5$ required for image reading passes (point T11 or T12), the video gate is switched from on to off, thereby completing reading (Read Complete). It is to be noted that the time $t_5$ is given as a product between the reading line number and the integration time ($t_5$=reading line number×integration time).

In this manner, while the first paper sheet 40 is transported in the high speed mode by the transport rollers 320 to 328, image reading of the front face and the rear face of the paper sheet 40 is performed by the optical image reading units 412 and 414, respectively, and thereafter, the paper sheet 40 is driven by the paper transport roller 328 and the paper discharge roller 544 and stacked into the paper stacker 510.

After reading of the first paper sheet 40 is completed, a start command is developed immediately, and in response to the start command, transportation and reading of a second paper sheet are started. In the operation for the second or following paper sheet, the image reading apparatus operates in such a manner as illustrated in FIG. 42.

In particular, in the present example, since the paper supply hopper 210 is at the paper supply position (that is, the paper supply sensor 612 is in an on-state) when the start command is instructed (point T13), the pick clutch 238 and the separation clutch 854 are engaged simultaneously with the instruction of the start command. Since the transport motor 342 continues to operate in the high speed mode, the pick roller 220 and the separation roller 820 are rotated at a comparatively high speed due to the engagement of the clutches 238 and 854 to transport the second paper sheet. Naturally, in this instance, also the transport rollers 320 to 328 are being rotated by the transport motor 342.

Thereafter, transportation and reading of the second paper sheet are performed in a similar manner to the first paper sheet. However, in transportation and reading of the second or following paper sheet, since the transport motor 342 is operating in the high speed mode from the beginning, the transport motor 342 is controlled to temporarily lower the speed thereof at a point of time when the main element for driving the paper sheet changes over from the separation roller 820 to the transport roller 320, different from the transportation and reading of the first paper sheet.

In particular, when the leading end of the second paper sheet which is supplied and transported at a comparatively high speed by the pick roller 220 and the separation roller 820 passes the transport sensor 614, the transport sensor 614 detects this and is turned on (point T15). Consequently, the pick clutch 238 is disengaged and the paper sheet is thereafter driven by the separation roller 820.

Then, when the leading end of the second paper sheet passes the transport sensor 616, the transport sensor 616 detects this and is turned on (point T19), and the separation clutch 854 is disengaged. Around the point of time T19 (between the points of time T17 to T20), the speed of the transport motor 342 is reduced temporarily from the high speed mode to the intermediate speed mode.

Such speed reduction control is started at a point of time T16 when a required time elapses after the transport sensor 614 is turn on (at a point of time before the leading end of the paper sheet passes the transport sensor 616) and is performed by holding, after the point of time T17 at which the speed drops to an intermediate speed, the intermediate speed till a point of time T20 at which a predetermined time (for example, 50 ms) elapses after the point of time T17.

Due to the speed reduction control, when the main element for driving the paper sheet changes over from the separation roller 820 to the transport roller 320, the transportation speed of the separation roller 820 and the transport roller 320 is suppressed, and consequently, changing over from the separation roller 820 to the transport roller 320 proceeds smoothly. This reduces a cause of a trouble such as paper jamming.

Within the period, a read command is developed (point T18), and similarly as in transportation of the first paper sheet, the first optical image reading unit 412 for reading information of the front face of a paper sheet is put into a reading condition (video gate on-state) at a point of time T21 at which the predetermined time $t_3$ elapses after the leading end of the paper sheet passes the transport sensor 616. Then, at another point of time T22 when the predetermined time $t_4$ elapses after the leading end of the paper sheet passes the transport sensor 616, the second optical image reading unit 414 for reading information of the rear face of a paper sheet is put into a reading condition (video gate on-state). It is to be noted that the predetermined times $t_3$ and $t_4$ mentioned above are given similarly as described hereinabove.

During such image reading, the transport sensors 614 and 616 are changed over from an on-state to an off-state (points T23 and T24) as the trailing end of the paper sheet passes the transport sensors 614 and 616, respectively.

Then, in each of the optical image reading units 412 and 414, the video gate is changed over from an on-state to an off-stage to complete the reading (Read Complete) when the time $t_5$ required for image reading elapses. Also the time $t_5$ is given similarly as described hereinabove.

In this manner, while the second or following paper sheet is transported in the high speed mode by the transport rollers 320 to 328, image reading of the front face and the rear face of the paper sheet is performed by the optical image reading units 412 and 414, respectively, and thereafter, the paper sheet is driven by the paper transport roller 328 and the paper discharge roller 544 and stacked into the paper stacker 510 in a similar manner to the first paper sheet.

If the paper supply sensor 612 is turned off as a result of reduction in quantity of the paper sheets 40 in the paper supply hopper 210 (point T14 in FIG. 42), then the hopper motor 242 is rendered operative at a point of time (T27) at which the operations of the pick roller 220 and the separation roller 820 and the speed reduction control of the transport motor 342 are completed to raise the paper supply hopper 210 to the paper supply position (point T2). Such height control of the paper supply hopper 210 is performed each time the paper supply sensor 612 is turned off as a result of reduction in quantity of the paper sheets 40 while the paper supplying and transporting operations are performed.

Then, when the paper sheets 40 in the paper supply hopper 210 are reduced in quantity until the paper supply hopper 210 becomes empty, the hopper empty sensor 610 changes over from an off-state ("paper present") to an on-state ("paper absent") (point T28) as seen from FIG. 43, and then the transport sensor 616 changes over from an on-state ("during paper passage") to an off-state ("completion of paper passage") (point T29). Thereafter, the video gate of the second optical image reading unit 414 on the downstream side of the transport path is changed over from an on-state to an off-state and simultaneously the read command is changed over from an on-state to an off-state (point T30), and then the discharge sensor 618 changes over from an on-state ("during paper passage") to an off-state ("completion of paper passage") (point T31). The power supply to the transport motor 342 is cut to stop the transport motor 342 after lapse of a predetermined time $t_8$ after the discharge sensor 618 changes over to an off-state. The predetermined time $t_8$ corresponds to a time within which a paper sheet 40 is transported from the discharge sensor 618 to the stacker 500.

It is to be noted that, if a paper sheet to be read requires image reading of only one face thereof and it is intended to read, for example, only the front face of the paper sheet, when reading of the video gate of the first optical image reading unit 412 in FIGS. 41 and 42 comes to an end, it is determined that reading for the paper sheet is completed (Read Complete), and next control is started immediately.

Since transportation and image reading of paper sheets is performed in response to the hopper empty sensor 610, the paper supply sensor 612, the transport sensors 614 and 616 and the discharge sensor 618 in this manner, the image reading operation can be performed appropriately in accordance with a transportation condition of a paper sheet, which is suitable to high speed image reading. Further, if paper jamming should occur intermediately of the paper transport path, this can be detected promptly and the operation of the image reading apparatus can be stopped immediately.

Further, since the control timings by the roller driving mechanism control means 350 and the image information extraction control means 440 are synchronized with each other, even if the processing speed for image reading is increased, the paper transportation operation and the image reading operation can be performed with certainty.

Furthermore, since reading of information of the front face of a paper sheet 40 is performed optically by the first optical image reading unit 412 and reading of information of the rear face of the paper sheet 40 is performed optically by the second optical image reading unit 414, reading of image information on the opposite faces of the paper sheet 40 can be performed rapidly, and the processing speed of a double-side original is improved significantly.

Meanwhile, since extraction of an image is performed when it is detected by the paper leading end detection means 450 that the leading end 46 of a paper sheet 40 advances into the optical image reading unit 410, extraction of the image can be performed rapidly and efficiently.

Further, since the image information extraction control means 440 performs extraction control of image information obtained by the first optical image reading unit 412 and the second optical image reading unit 414 in response to a result of selection by the original selection switch 924L serving as paper reading selection means and the discrimination mark 50 applied to a paper sheet 40, the image reading apparatus is advantageous in that extraction of an image can be performed rapidly and efficiently and the processing speed in image reading can be raised readily.

For example, when one face reading originals are mixed in both face reading originals, if the discrimination mark 50 which designates one face reading is applied to each of the one face reading originals the quantity of which is smaller than that of the both face reading originals and it is selectively set by way of the original selection switch 924L that both faces of each paper sheet 40 should usually be read, then image information on both faces of a paper sheet is normally read by both of the first optical image reading unit 412 and the second optical image reading unit 414. However, when a discrimination mark 50 is detected, image information only on the front face or the rear face of the paper sheet 40 is read by the first optical image reading unit 412 or the second optical image reading unit 414.

As a result, extraction of an image can be performed rapidly and efficiently. Naturally, when both face reading originals are mixed in one face reading originals, similar advantages can be obtained by applying a discrimination mark 50 which designates double face reading to each of the double face reading originals the quantity of which is smaller than that of the one face reading originals and selectively setting by way of the original selection switch original selection switch 924L that one face of each paper sheet 40 should usually be read.

Naturally, if both face reading originals and one face reading originals are not mixed, extraction of image information can be performed rapidly and efficiently by way of selection by the original selection switch 924L.

Further, since the image of the discrimination mark 50 applied to a paper sheet 40 is erased by the discrimination mark image erasure means 460 while only image information which should originally be read is outputted, the discrimination mark will not make an obstacle to extraction of image information.

Further, in the image reading apparatus of the embodiment described above, since the first optical image reading unit 412 for front face reading and the second optical image reading unit 414 for rear face reading are constructed with common specifications, front face information and rear face information of a paper sheet are read in uniform accuracy. Further, common parts can be employed for both of the optical image reading units 412 and 414, and consequently, the cost required for production of the image reading apparatus can be reduced.

Further, since the first optical image reading unit 412 for front face reading and the second optical image reading unit 414 for rear face reading can be constructed readily with different specifications, the reading accuracy and the cost can be balanced well by constructing the image reading apparatus, for example, such that an optical image reading unit which is lower in terms of the accuracy but superior in terms of the cost is employed to read a reading face for which a high degree of accuracy in reading of image information is not required. The image reading apparatus is further advantageous in that various models can be provided readily at a low cost in accordance with applications.

Further, it is appropriately discriminated by the front/rear face detection means 630 whether each optical image reading unit is for front face reading or for rear face reading of a paper sheet, and information thus read can be processed appropriately.

Further, with the image reading apparatus of the present embodiment, the following advantages can be achieved due to its structural characteristics.

In particular, since the paper transport path 310 connected to the paper supply mechanism 200 is constituted from the inclined transport path 312 and the paper reversing transport path 314 without involving a horizontal transport path, the paper transport path 310 requires a comparatively small depthwise space, and accordingly, the image reading apparatus can be reduced in size as much. Further, there is another advantage in that a paper sheet can be transported rapidly from the paper supply mechanism 200 to the stacker mechanism 300 and image reading can be performed at a high speed. Naturally, the reduction in space allows an increase in size of the paper sheet hopper or the paper stacker, which allows reading of a paper sheet of a greater size.

Further, since fine particles are deposited on the surfaces of the transport rollers 320 to 328, the coefficients of friction of the outer surfaces of the transport rollers 320 to 328 are increased by the fine particles. Consequently, an otherwise possible slip of a paper sheet upon transportation is prevented, and accordingly, image reading can be performed smoothly even during transportation of a paper sheet at a high speed.

Furthermore, since a paper sheet 40 is guided during transportation by the paper guiding portions of the sheet guides 700, 710, 740, 750 and so forth, paper jamming occurs less likely. Further, while a color reference for a paper sheet 40 is provided by the backing portions 712 and 752 provided on such sheet guides, since the backing portions 712 and 752 are offset from the paper guiding portions 714 and 754 by way of the steps 716 and 756, a paper sheet 40 will not contact directly with the backing portion 712 or 752. Consequently, soiling to the backing portions 712 and 752 upon passage of a paper sheet 40 is prevented, and a color reference for a paper sheet 40 is provided appropriately. Accordingly, the accuracy in image reading can be assured for a long period of time and also maintenance of the image reading apparatus is facilitated.

Further, since the sheet guides 710 and 750 are resiliently pressed toward the optical image reading unit 410 and contacted with the contacting members, the sheet guides 710 and 750 are controlled with certainty to the predetermined positions with respect to the optical image reading unit 410, and a paper sheet 40 is guided to an appropriate position conforming to a focal length of the optical image reading unit 410. Consequently, an error in reading resolution or magnification of information of a paper sheet 40 by the optical image reading unit 410 is prevented. Naturally, also the positions of the backing portions 712 and 752 provided on the sheet guides 710 and 750 are held appropriately with respect to the optical image reading unit 410, and also the color difference for a paper sheet 40 can be provided appropriately.

Furthermore, while the second optical image reading unit 414 is provided vertically downwardly of the inclined transport path 312, since the sheet guide 740 provided between the second optical image reading unit 414 and the inclined transport path 312 has the opening 742 provided therein, information on the rear face 44 of a paper sheet can be read through the opening 742 while the paper sheet is guided by the sheet guide 740.

Particularly, in the image reading apparatus of the present embodiment, since the glass plate 742A is provided in the opening 742, a paper sheet can be guided also along the opening 742 by the glass plate 742A. Accordingly, the paper transportation performance is improved as much.

By adjusting the manner in which the apparatus body 10 and the apparatus lid 20 are held in a closed condition by way of the body-lid locking mechanism 30, the biasing forces of the idler rollers 330 to 338 to the transport rollers 320 to 328 and the contacting conditions between the sheet guides and the auxiliary sheet guides are adjusted. Consequently, an appropriate transporting force can be obtained readily in accordance with a type of a paper sheet by such adjustment. Accordingly, the image reading apparatus can achieve reliable transportation of a paper sheet free from an error.

4. Modifications and Alternative Forms

In the following, various modifications and alternative forms of several components of the image reading apparatus of the present embodiment will be described.

4-1. Structure of the Paper Hopper

Figure 44:
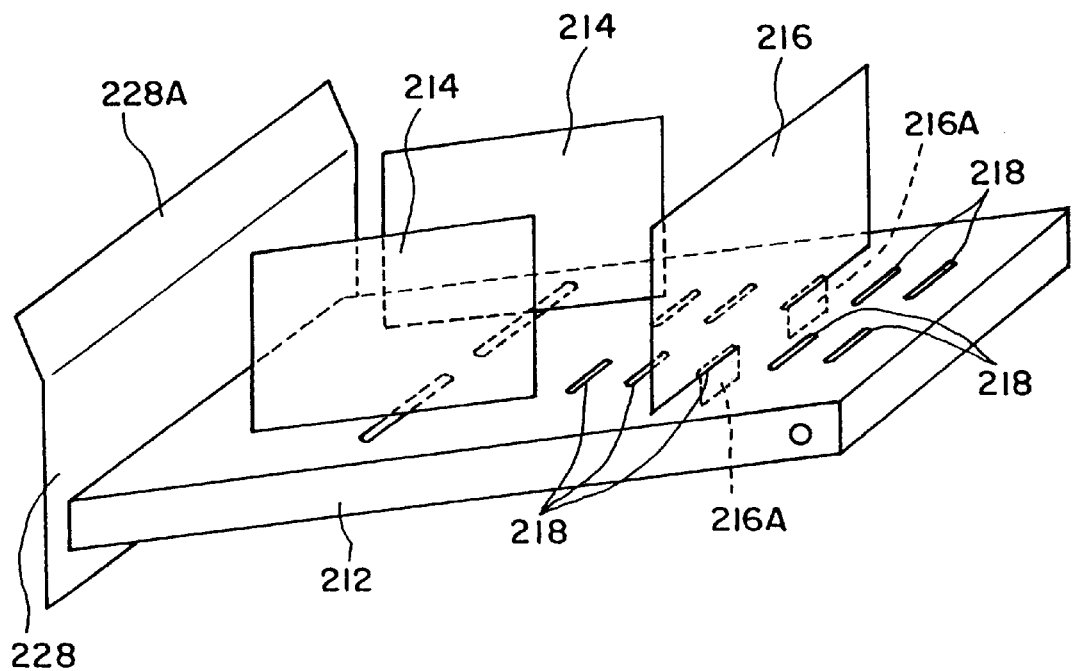
FIG. 44 is a perspective view showing a detailed structure of the paper supply hopper of the image reading apparatus of FIG. 4.

Though not described in detail in the description of the image reading apparatus of the preferred embodiment, a pair of tiltable paper edge guide members 214 for guiding the opposite side edges of paper sheets accommodated in the paper supply hopper 210 are provided in the paper supply hopper 210 as shown in FIG. 44. The tiltable paper edge guide members 214 are mounted on the hopper table 212 of the paper supply hopper 210 for tilting movement and for sliding movement in the widthwise direction of a paper sheet. While the tiltable paper edge guide members 214 are naturally provided in pair at left and right locations, the left and right tiltable paper edge guide members 214 are slidably moved in widthwise directions in an interlocking relationship with each other to positions at which they contact with the side edges of the paper sheets 40 from the left and right sides to hold the paper sheets 40 at an appropriate position in the widthwise direction of the paper sheets 40.

Consequently, the paper sheets 40 can be guided to an appropriate position in the widthwise direction in accordance with the widthwise size of the paper sheets 40 whatever widthwise size the paper sheets 40 may have from a small size to a large size. Further, where the paper width is larger than the range of movement of the tiltable paper edge guide members 214, the tiltable paper edge guide members 214 can be tilted down so that they may not protrude from the hopper table 212, and accordingly, the hopper table 212 can be used with its maximum width. It is to be noted that, in this instance, the left and right wall faces 16 (refer to FIG. 5) of the hopper section of the apparatus body which are provided uprightly on the opposite side portions of the hopper table 212 can be used in place of the left and right tiltable paper edge guide members 214.

Further, a paper trailing end guide member 216 for guiding the trailing end edges of paper sheets 40 accommodated in the paper supply hopper 210 is provided in the paper supply hopper 210. While the paper trailing end guide member 216 is provided in the hopper table 212, the hopper table 212 has a plurality of fitting holes 218 formed therein and serving as mounting portions for mounting the paper trailing end guide member 216.

In particular, the paper trailing end guide member 216 has a fitting projection 216A provided at a lower end thereof and is fixed to the hopper table 212 by fitting the fitting projection 216A of the paper trailing end guide member 216 into one of the fitting holes 218 of the hopper table 212. Here, a pair of left and right fitting projections 216A are provided at the lower end of the paper trailing end guide member 216 while the fitting holes 218 of the hopper table 212 are provided in left and right pairs correspondingly. The plurality of pairs of fitting holes 218 are provided at different locations in the lengthwise direction of a paper sheet (paper supplying direction) so that the paper trailing end guide member 216 can be selectively fixed to a suitable position on the hopper table 212 in accordance with a size of paper sheets to be accommodated onto the hopper table 212. Accordingly, the paper trailing end guide member 216 can guide the trailing ends of paper sheets of various sizes.

4-2. Paper Supply Roller System

Figure 45:
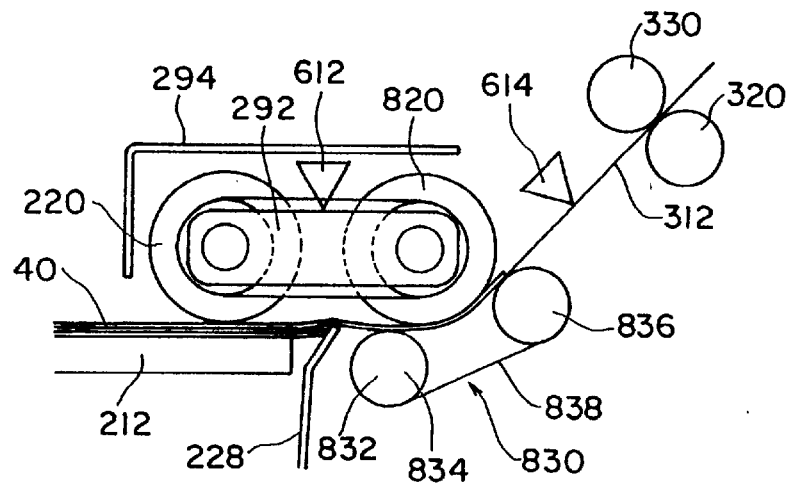
FIG. 45 is a side elevational view showing the paper supply mechanism shown in FIG. 14 at a position when the amount of paper sheets in the paper supply hopper is small where the paper supply mechanism is constructed such that the paper supply roller is not rocked.
Figure 46:
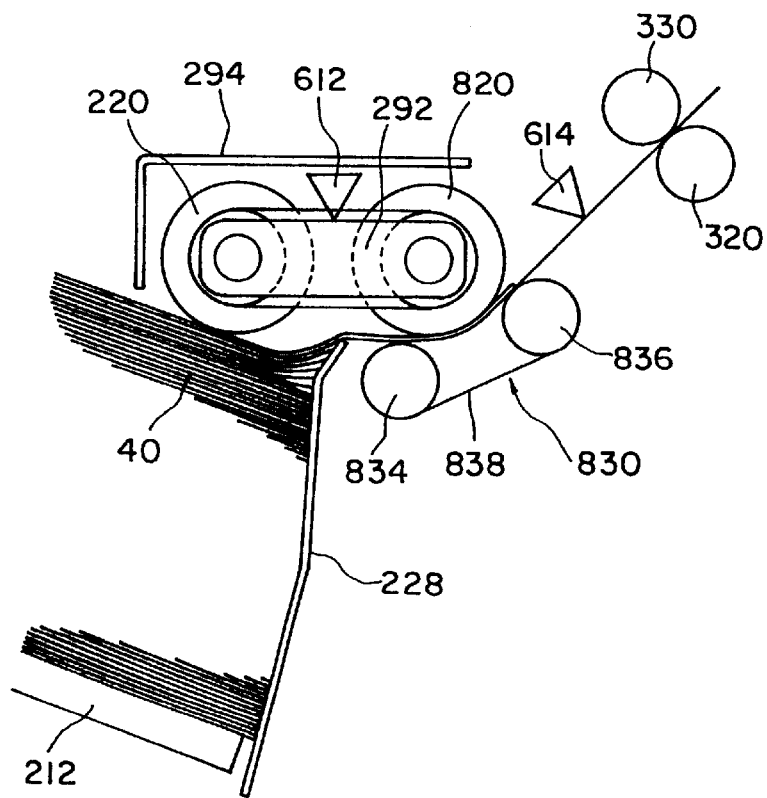
FIG. 46 is a side elevational view showing the paper supply mechanism shown in FIG. 14 at another position when the amount of paper sheets in the paper supply hopper is large where the paper supply mechanism is constructed such that the paper supply roller is not rocked.

By the way, as the height (thickness) of the paper sheets accommodated in the paper supply hopper 210 increases, the amount of pivotal motion by which the paper supply hopper 210 pivots the hopper table 212 so as to tilt forwardly in the paper supplying direction increases. In this instance, naturally the paper sheets accommodated in the hopper table 212 are tilted forwardly, whereupon the top of the paper sheets is naturally tilted forwardly with the front or leading end thereof positioned at a lowermost position. Meanwhile, since the gate 228 constituting the front end of the paper supply hopper 210 is fixed, if the axis of rotation of the paper supply rollers 220 is not rocked and consequently the position of the paper supply rollers 220 is fixed whether the position of the paper supply hopper 210 is higher or lower, then if the gate 228 and the hopper table 212 are set such that the height of the upper end of the gate 228 and the height of the leading end of the top of the paper sheet coincide with each other when the paper supply hopper 210 is, for example, at a high position as shown in FIG. 45, then when the paper supply hopper 210 comes to a low position, the top of the paper sheets is restricted by the paper supply rollers 220 as shown in FIG. 46 so that the height of the front end of the paper sheets becomes lower than the height of the upper end of the gate 228. Consequently, an appropriate paper supplying operation cannot be performed.

In the present apparatus, however, the paper supply rollers 220 are supported for rocking motion around the axis 822 of the separation roller 820 by way of the rockable arm 292, and when the hopper table 212 is driven by the paper supply hopper 210 of the paper supply hopper position control means 280 so that it comes to its high position as shown in FIG. 45, the paper supply rollers 220 assume a substantially horizontal position, but when the hopper table 212 comes to a low position as shown in FIG. 46, the paper supply rollers 220 are rocked upwardly in response to the low position of the hopper table 212.

Figure 47:
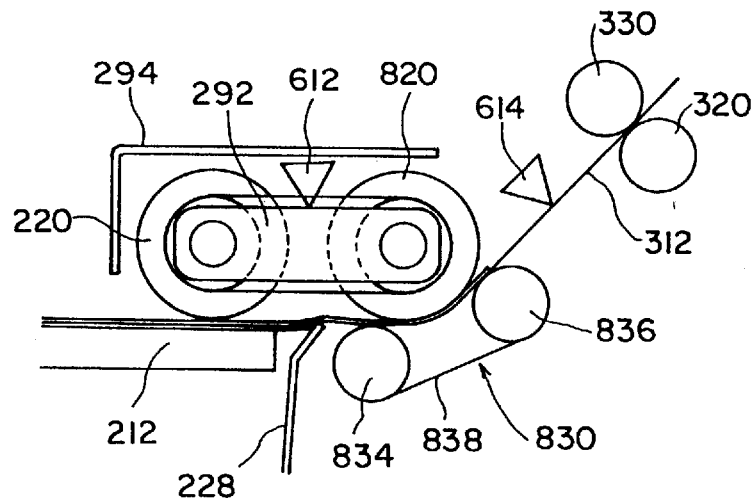
FIG. 47 is a side elevational view showing the paper supply mechanism shown in FIG. 14 at a position when the amount of paper sheets in the paper supply hopper is small where the paper supply mechanism is constructed such that the paper supply roller is rocked.
Figure 48:
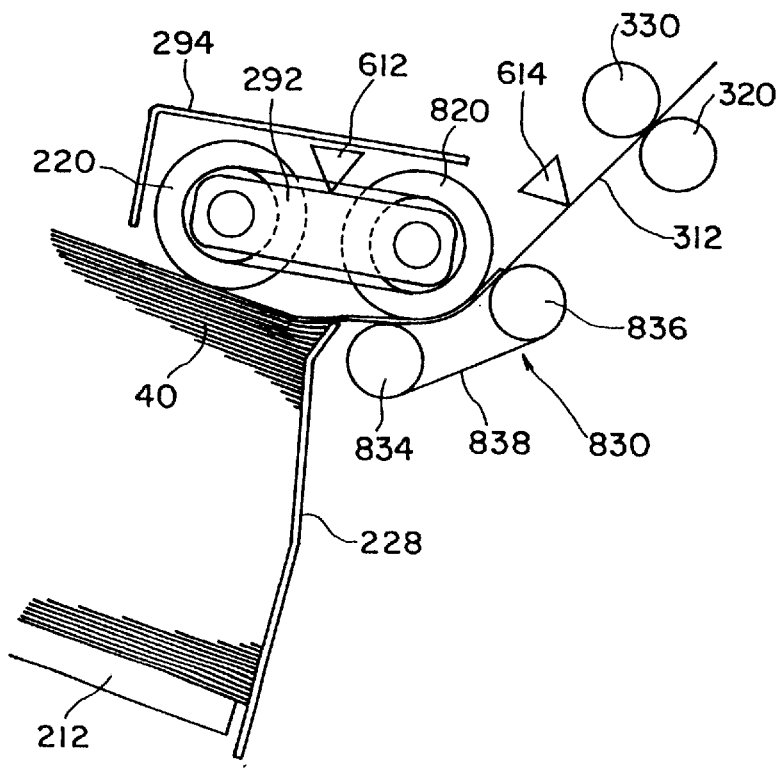
FIG. 48 is a side elevational view showing the paper supply mechanism shown in FIG. 14 at another position when the amount of paper sheets in the paper supply hopper is large where the paper supply mechanism is constructed such that the paper supply roller is rocked.

Accordingly, when the amount of the paper sheets 40 in the paper supply hopper 210 is comparatively small, the hopper table 212 assumes a comparatively high position and the paper supply rollers 220 assume a substantially horizontal position at which the height of the front or leading end of the top of the paper sheets 40 coincides with the height of the upper end of the gate 228 as seen in FIG. 47. In contrast, when the amount of the paper sheets 40 in the paper supply hopper 210 is comparatively large, the hopper table 212 assumes a comparatively low position and the paper supply rollers 220 assume a position rocked upwardly in response to the low position of the hopper table 212 so that, also in this instance, the height of the front end of the top face of the paper sheets coincides with the height of the upper end of the gate 228 as seen in FIG. 48.

In this manner, the top face of the paper sheets 40 normally assumes an appropriate position with respect to the upper end of the gate 228 by the driving control of the paper supply hopper 210 and the interlocking control of the rocking position of the axis of rotation of the paper supply rollers 220 with the paper supply hopper 210. Consequently, there is an advantage in that an appropriate paper supplying operation can be achieved.

4-3. Paper Supply Sensor

By the way, the paper supply sensor 612 is provided in order to adjust the position of the paper supply hopper 210 by way of the paper supply hopper position control means 280. In the embodiment described above, the paper supply sensor 612 detects from the posture of the paper supply rollers 220 and the posture of the paper supply hopper 210 itself whether the paper supply rollers 220 and the paper supply hopper 210 are in respective appropriate positions, that is, in an appropriate paper supplying condition, and the paper supply hopper position control means 280 drives the paper supply hopper 210 in response to a result of detection of the paper supply sensor 612 until the paper supplying condition is detected. The paper supply sensor 612 in the embodiment may be replaced by the following alternative arrangements.

Figure 49:
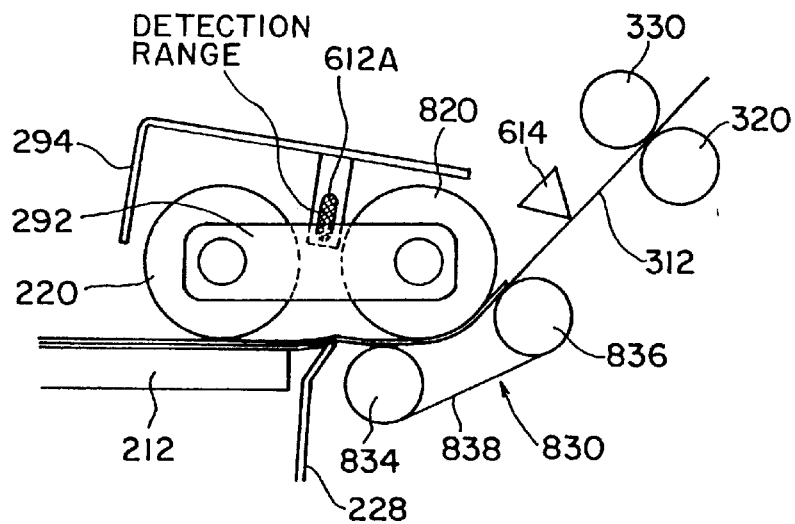
FIG. 49 is a partial side elevational view showing another form of the paper supply mechanism shown in FIG. 14 when the amount of paper sheets in the paper supply hopper is small.
Figure 50:
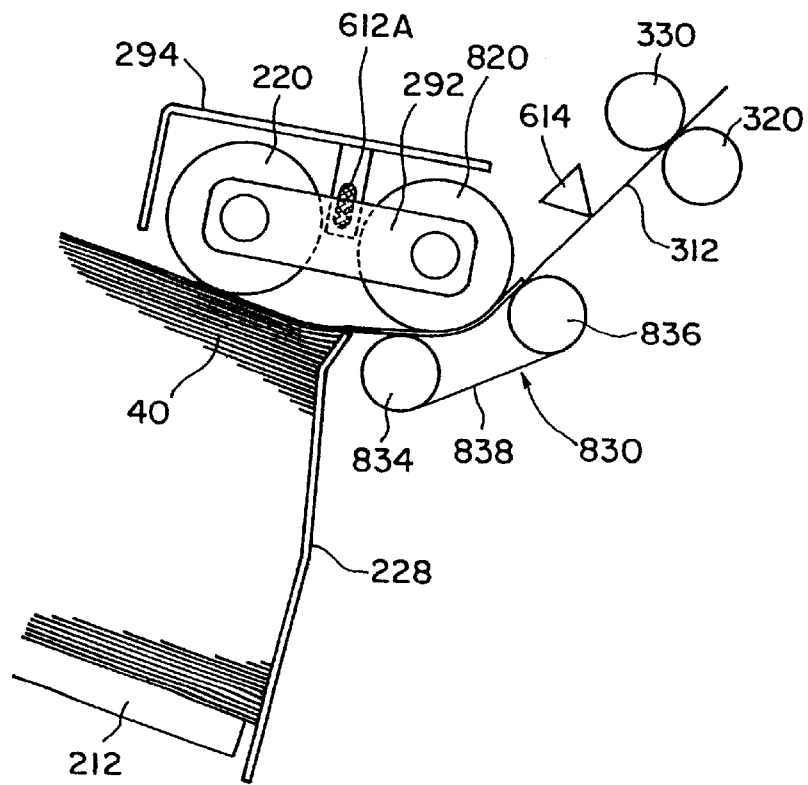
FIG. 50 is a partial side elevational view showing the paper supply mechanism shown in FIG. 49 but when the amount of paper sheets in the paper supply hopper is large.

An alternative arrangement is shown in FIGS. 49 and 50, Referring to FIGS. 49 and 50, in the alternative arrangement shown, while the paper supply rollers 220 are mounted for rocking motion around the axis of the separation roller 820, the cover 294 for the paper supply rollers 220 is mounted in a stationary condition. A paper supply sensor 612A is provided on the stationary cover 294 for detecting a rocked position of the rockable arm 292 to detect a rocked condition of the paper supply rollers 220. The paper supply sensor 612A includes, for example, a large number of photo-interrupters arranged in a vertical column so that a small variation of the rocked position of the rockable arm 292 can be detected.

However, only with the construction described above, the inclined condition of the paper supply hopper 210 is not taken into consideration in detection by the paper supply sensor 612A. Therefore, means (hopper inclination detection means) (not shown) for detecting the inclined condition of the paper supply hopper 210 is provided for the paper supply hopper position control means 280, and the paper supply sensor 612A takes a result of detection of the hopper inclination detection means into consideration.

Here, taking notice of the fact that a hopper driving pulse signal corresponds to the inclined condition of the paper supply hopper 210, the hopper inclination detection means is constituted from calculation means for calculating driving pulses from a reference position (for example, the lowermost position) of the paper supply hopper 210, and the paper supply sensor 612A discriminates the paper supplying condition in accordance with information from the hopper inclination detection means.

In particular, the paper supply sensor 612A discriminates the paper supplying condition by comparing a detection value of the rocked condition of the rockable arm 292 with a discrimination reference value which is modified in response to information from the hopper inclination detection means.

For example, if the paper supply hopper 210 is at a position tilted forwardly by a great amount, the discrimination reference value is modified to a high value, and accordingly, the paper supply sensor 612A discriminates the paper supplying condition where the paper supply rollers 220 is at a position displaced upwardly by a great amount. Then, as the inclination of the paper supply hopper 210 decreases, the discrimination reference value is decreased. Consequently, the paper supply sensor 612A discriminates the paper supplying condition at a stage where the upward displacement of the paper supply rollers 220 is comparatively small.

Even with the arrangement described above, the top face of the paper sheets in the paper supply hopper 210 can always be positioned at an appropriate position and an appropriate paper supplying operation can be performed.

Figure 51:
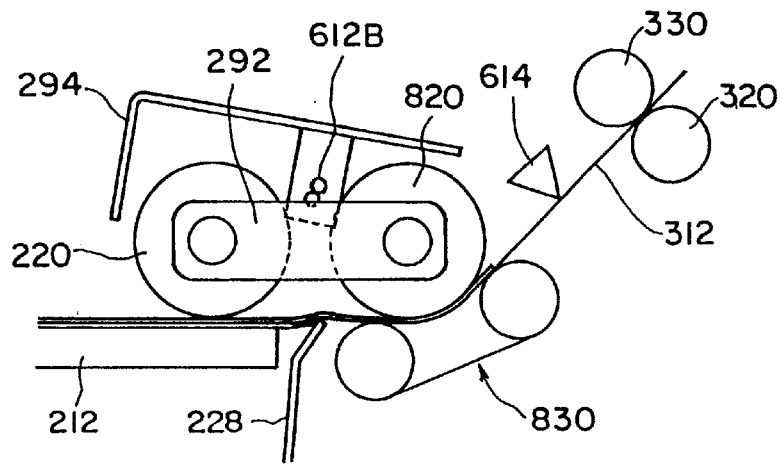
FIG. 51 is a partial side elevational view showing a further form of the paper supply mechanism shown in FIG. 14 when the amount of paper sheets in the paper supply hopper is small.
Figure 52:
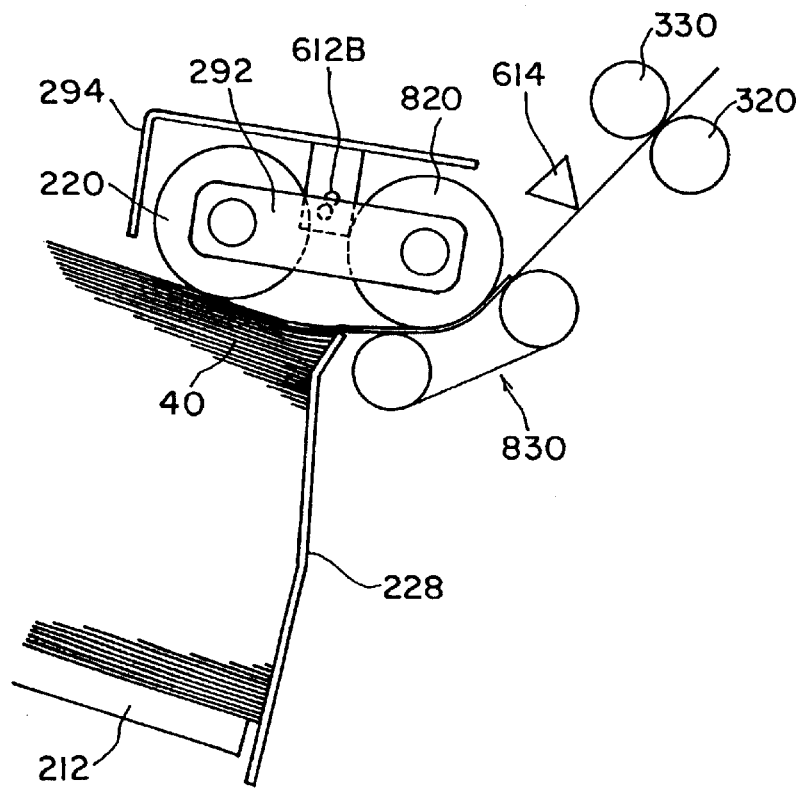
FIG. 52 is a partial side elevational view showing the paper supply mechanism shown in FIG. 51 but when the amount of paper sheets in the paper supply hopper is large.

FIGS. 51 and 52 show another alternative arrangement. Referring to FIGS. 51 and 52, similarly as in the arrangement shown in FIGS. 49 and 50, the paper supply rollers 220 is mounted for rocking motion around the axis of the separation roller 820 but the cover 294 for the paper supply rollers 220 is mounted in a stationary condition, and a paper supply sensor 612B is mounted on the stationary cover 294 for detecting the rocked position of the paper supply rollers 220 based on the rocked position of the rockable arm 292.

The paper supply sensor 612B is constituted from, for example, a plurality of photo-interrupters arranged in a vertical column, and the hopper inclination detection means is provided in the paper supply hopper position control means 280.

In the paper supply sensor 612B, one of the photo-interrupters which is at a position (vertical position) corresponding to a hopper inclination position detected by the hopper inclination detection means is selected, and the paper supplying condition is determined if a required portion of the rockable arm 292 passes the selected photo-interrupter.

Figure 53:
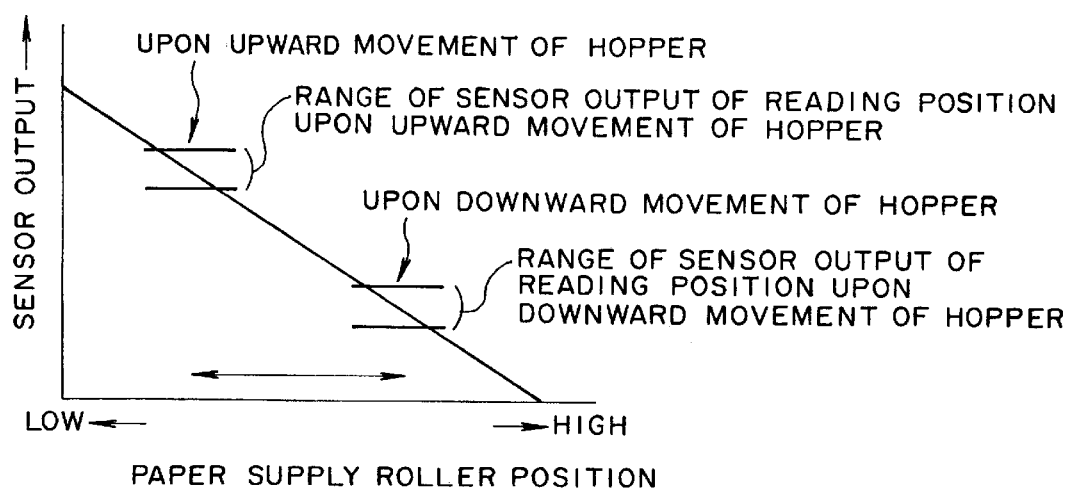
FIG. 53 is a diagrammatic view illustrating detection operation of the paper supply mechanism shown in FIG. 51.

In particular, as seen from FIG. 53, when the paper supply hopper 210 is at a low position at which it is inclined by a great amount, one of the photo-interrupters at an upper position is selected so that the paper supplying condition is determined when the paper supply rollers 220 are moved upwardly high. However, when the paper supply hopper 210 is at a high position at which it is inclined by a small amount, one of the photo-interrupters at a lower position is selected so that the paper supplying condition is determined when the paper supply rollers 220 is moved upwardly by a small amount.

Even with the arrangement described above, the top face of the paper sheets can always be held at an appropriate position with respect to the upper end of the gate 228 and an appropriate paper supplying operation can be performed.

Figure 54:
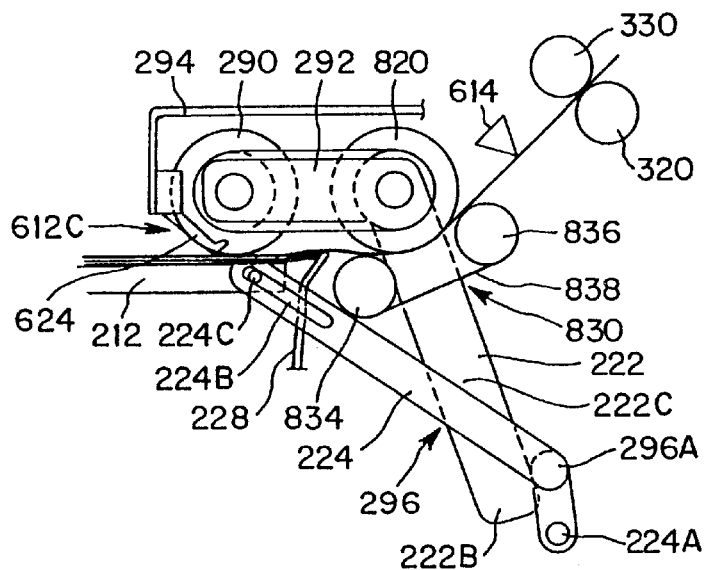
FIG. 54 is a partial side elevational view showing a still further form of the paper supply mechanism shown in FIG. 14 when the amount of paper sheets in the paper supply hopper is small.
Figure 55:
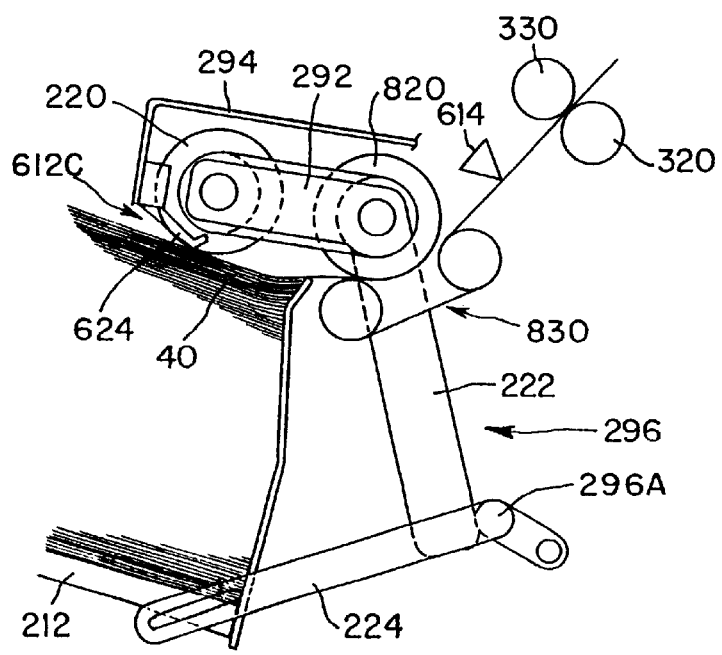
FIG. 55 is a partial side elevational view showing the paper supply mechanism shown in FIG. 54 but when the amount of paper sheets in the paper supply hopper is large.

Also such a further alternative arrangement as shown FIGS. 54 and 55 is available.

Referring to FIGS. 54 and 55, in the arrangement shown, the cover 294 is mounted for rocking motion around the axis of the separation roller 820 integrally with the paper supply rollers 220, and a paper supply sensor 612C is mounted on the cover 294. The paper supply sensor 612C includes a light-weighted rockable arm 624 mounted for pivotal motion to move a free end thereof down to the top face of the paper sheets, and a photo-interrupter not shown provided at a rocking portion of the rockable arm 624. The paper supply sensor 612C determines the paper supplying condition when the top face of the paper sheets comes to a predetermined height corresponding to the paper supply rollers 220.

Meanwhile, an interlocking mechanism 296 is provided for interlocking the height of the paper supply rollers 220, that is, the position of the rockable arm 292, with the inclined condition of the hopper table 212. The interlocking mechanism 296 is constituted from a first interlocking member 222 and a second interlocking member 224 both having similar shapes to those of the embodiment shown in FIGS. 14 and 15, and a stopper pin 296A for causing the first interlocking member 222 and the second interlocking member 224 to cooperate with each other. The position of the rockable arm 292 is controlled by the stopper pin 296A and corresponds to the inclined position of the hopper table 212.

In particular, the first interlocking member 222 has an arm portion 222C which is provided integrally with and extends obliquely downwardly from the rockable arm 292, on which the center of rotation of the paper supply rollers 220 is supported for rotation, so that the paper supply rollers 220 may be rocked around the axis of the separation roller 820. Thus, when the paper supply rollers 220 are rocked, also the arm portion 222C of the first interlocking member 222 is rocked by the paper supply rollers 220.

Meanwhile, the second interlocking member 224 is formed as an arm supported for pivotal motion around an arm fulcrum 224A forwardly of a lower portion of the gate 228 (in the paper supplying direction, that is, in the rightward direction in FIGS. 54 and 55) and has an elongated hole 224B formed at a rocking end portion thereof. A pin 224C provided at a front end portion of the hopper table 212 such that it extends sidewardly is loosely fitted in the elongated hole 224B so that, when the hopper table 212 is moved upwardly or downwardly, the second interlocking member 224 is pivoted by the hopper table 212. Further, the stopper pin 296A is provided at an intermediate bent portion of the second interlocking member 224 in the proximity of the arm fulcrum 224A. An end portion of the arm portion 222C of the first interlocking member 222 is positioned for contacting engagement with an opposing side face of the stopper pin 296A.

Accordingly, when the hopper table 212 is moved upwardly to such a high position as shown in FIG. 54, the second interlocking member 224 is pivoted in the clockwise direction in FIG. 54, whereupon also the stopper pin 296A is turned in the clockwise direction in FIG. 54 around the arm fulcrum 224A until the arm portion 222C of the first interlocking mechanism 222 is contacted with and stopped by the stopper pin 296A at a position at which the rockable arm 292 and the paper supply rollers 220 are rocked little and are in substantially horizontal positions. On the other hand, if the hopper table 212 is moved downwardly to such a low position as shown in FIG. 55, the second interlocking member 224 is pivoted in the counterclockwise direction in FIG. 55, whereupon also the stopper pin 296A is turned in the counterclockwise direction around the arm fulcrum 224A. Accordingly, the arm portion 222C of the first interlocking member 222 will not be contacted with the stopper pin 296A unless the rockable arm 292 and the paper supply rollers 220 are rocked so that the paper supply rollers 220 is moved upwardly.

Since the height or vertical position of the paper supply rollers 220 is normally kept corresponding to the inclined position of the hopper table 212 by way of the interlocking mechanism 296 in this manner, the top face of the paper sheets can normally be held at an appropriate position with respect to the upper end of the gate 228 to assure an appropriate paper supplying operation by driving the paper supply hopper 210 to move upwardly until a detection signal of the paper supplying condition is developed from the paper supply sensor 612C.

Figure 56:
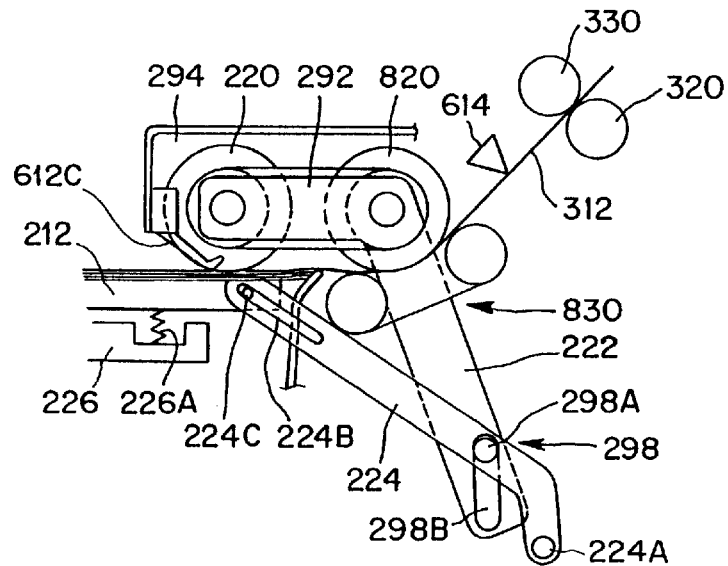
FIG. 56 is a partial side elevational view showing a yet further form of the paper supply mechanism shown in FIG. 14 when the amount of paper sheets in the paper supply hopper is small.
Figure 57:
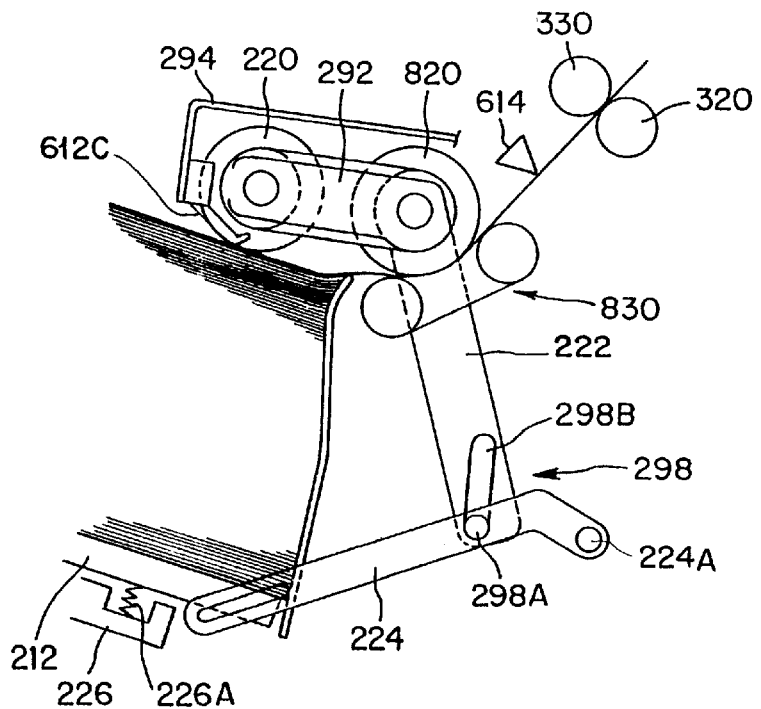
FIG. 57 is a partial side elevational view showing the paper supply mechanism shown in FIG. 56 but when the amount of paper sheets in the paper supply hopper is large.

The interlocking mechanism employed in the arrangement shown in FIGS. 54 and 55 may be modified in such a manner as shown in FIGS. 56 and 57.

Referring to FIGS. 56 and 57, the interlocking mechanism 298 shown includes a first interlocking member 222 and a second interlocking member 224 both having similar profiles to those of the interlocking mechanism in the embodiment shown in FIGS. 14 and 15 or the interlocking mechanism shown in FIGS. 54 and 55, and a pin 298A and an elongated hole 298B for interlocking the first interlocking member 222 and the second interlocking member 224 with each other. The pin 298A is provided at an intermediate bent portion of the second interlocking member 224 in the proximity of the arm fulcrum 224A while the elongated hole 298B is formed in a longitudinal direction in a suitable angle in an end portion of the arm portion 222C of the first interlocking member 222. The pin 298A is loosely fitted in the elongated hole 298B.

With the interlocking mechanism 298, due to the engagement between the elongated hole 298B and the pin 298A, when the hopper table 212 is moved, for example, upwardly as shown in FIG. 56, the second interlocking member 224 is pivoted in the clockwise direction in FIG. 56, whereupon also the pin 298A is turned in the clockwise direction around the arm fulcrum 224A while moving upwardly in the elongated hole 298B to a position at which the rockable arm 292 and the paper supply rollers 220 are rocked little and are in substantially horizontal positions. However, when the hopper table 212 is moved downwardly as shown in FIG. 57, the second interlocking member 224 is pivoted in the counterclockwise direction in FIG. 57, whereupon also the pin 298A is turned in the counterclockwise direction around the arm fulcrum 224A while moving downwardly in the elongated hole 298B to rock the rockable arm 292 and the paper supply rollers 220 in the clockwise direction to move the paper supply rollers 220 upwardly.

Since the height or vertical position of the paper supply rollers 220 is normally kept corresponding to the inclined position of the hopper table 212 by way of the interlocking mechanism 298 in this manner, the top face of the paper sheets can normally be held at an appropriate position with respect to the upper end of the gate 228 to assure an appropriate paper supplying operation by driving the paper supply hopper 210 to move upwardly until a detection signal of the paper supplying condition is developed from the paper supply sensor 612C.

It is to be noted that, in the modified arrangement shown in FIGS. 56 and 57, the hopper table 212 is resiliently supported on a base member 226 by way of a plurality of springs 226A.

Where the paper supply rollers 220 are mounted for rocking motion around the axis 822 of the separation roller 820 and the interlocking mechanism includes the first interlocking member 222 and the second interlocking member 224 while paper supply position detection means 644 is constructed so as to detect the paper supply position in response to movements of the first interlocking member 222 and the second interlocking member 224 in this manner, the paper supply position detection means 644 can be used also as means for detecting that the sheet guide 710 or 740 is not set completely or as means for detecting that locking by the rotary shaft locking mechanism 890 is incomplete.

In particular, the following case is considered here. If, for example, paper jamming occurs, the apparatus lid 20 will be pivoted upwardly to open the paper transport path 310 between the apparatus lid 20 and the apparatus body 10, and then after the image reading apparatus is restored from the paper jamming, the apparatus lid 20 will be pivoted downwardly to put the paper transport path 310 into a closed condition (condition for use).

In this instance, since the paper supply hopper 210 during ordinary use of the image reading apparatus is at the paper supply position, before the apparatus lid 20 is pivoted upwardly, naturally the paper supply hopper 210 is at the paper supply position and consequently the paper supply sensor 610 serving as the paper supply position detection means 644 is in an on-state (paper supply position detection condition).

Then, when the apparatus lid 20 is pivoted down to put the paper transport path 310 into a closed condition again, if the apparatus lid 20 is closed appropriately, then the paper supply sensor 610 is put into an on-state (paper supply position detection condition), but if the apparatus lid 20 is not closed appropriately, then the relative positional relationship between the first interlocking member 222 and the second interlocking member 224 is different from an ordinary one, and consequently, the paper supply sensor 610 remains an off-state. If the apparatus lid 20 is not closed appropriately, then the sheet guides 710 and 740 are not set completely. Accordingly, if the paper supply sensor 610 remains in an off-state after the apparatus lid 20 and the apparatus body 10 are closed with each other, then it can be determined that the sheet guides 710 and 740 are not set completely.

If it is detected by the paper supply position detection means 644 (paper supply sensor 610) that the sheet guides 710 and 740 are not set completely in this manner, then this may be notified to an operator by displaying an error message or the like on the liquid crystal display unit 922D or by lighting an error indication lamp or sounding an alarm. The operator thus can reset the image reading apparatus so that an appropriate paper transporting condition and a correct color reference can be obtained.

Also when the locking by the rotary shaft locking mechanism 890 is incomplete, the relative positional relationship between the first interlocking member 222 and the second interlocking member 224 is different from an ordinary one and the paper supply sensor 610 reacts with this, and accordingly, the incomplete locking of the rotary shaft locking mechanism 890 can be detected. Also in this instance, the detection of the incomplete locking can be notified to an operator so that the image reading apparatus may be reset to establish a correct locking condition of the rotary shaft locking mechanism 890 by the operator.

4-4. Paper Supply Hopper

Figure 58:
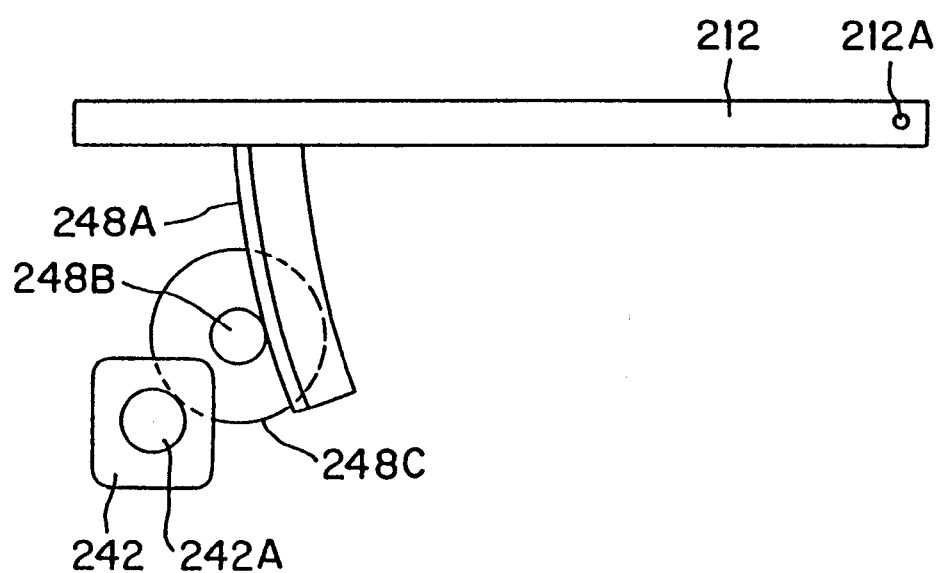
FIG. 58 is a schematic side elevational view showing another form of a paper supply hopper driving mechanism of the image reading apparatus of FIG. 4.

The paper supply hopper driving mechanism 240 may be modified such that the hopper motor 242 and the pinion 248B is coupled directly to each other by way of a gear mechanism as shown in FIG. 58. In particular, referring to FIG. 58, a gear 242A is provided on the rotary shaft of the hopper motor 242 while another gear 248C for meshing engagement with the gear 242A is provided on the rotary shaft of the pinion 248B. The modified arrangement allows compact construction of the paper supply hopper driving mechanism 240.

4-5. Paper Skew Prevention Means

Figure 59:
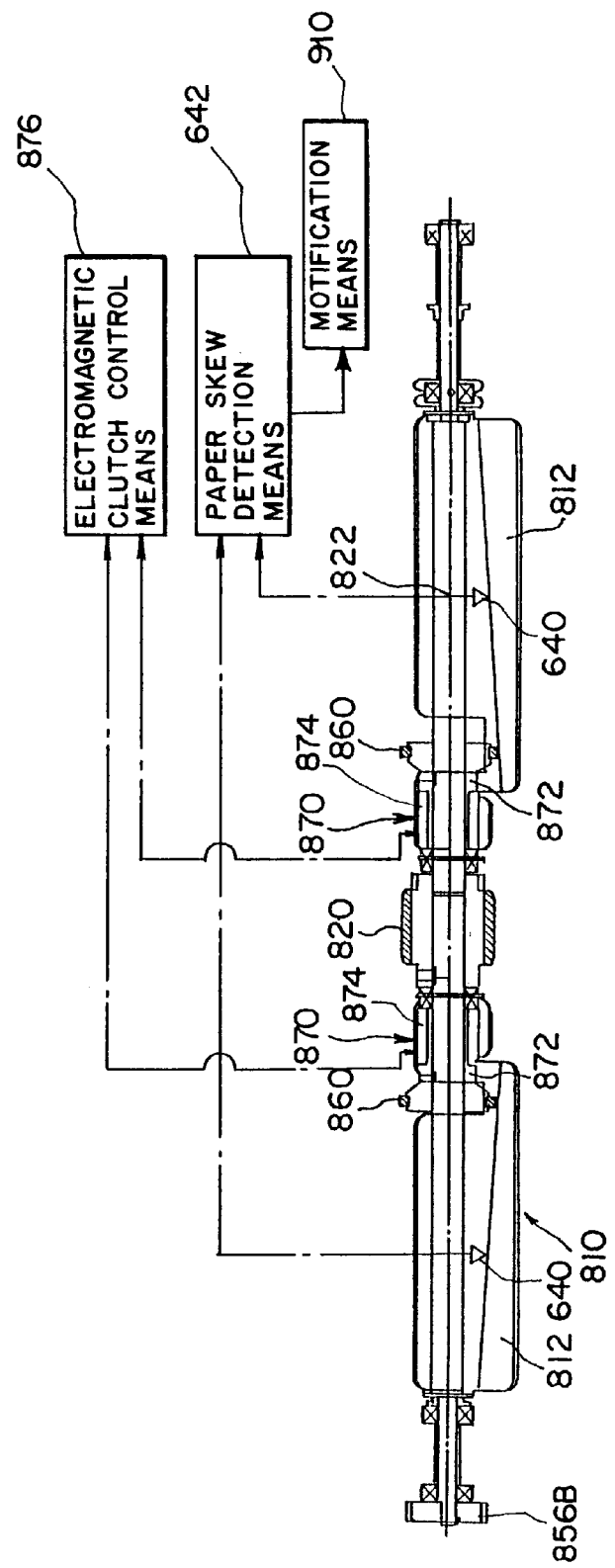
FIG. 59 is a plan view showing another form of a separation roller driving system of the image reading apparatus of FIG. 4.
Figure 60:
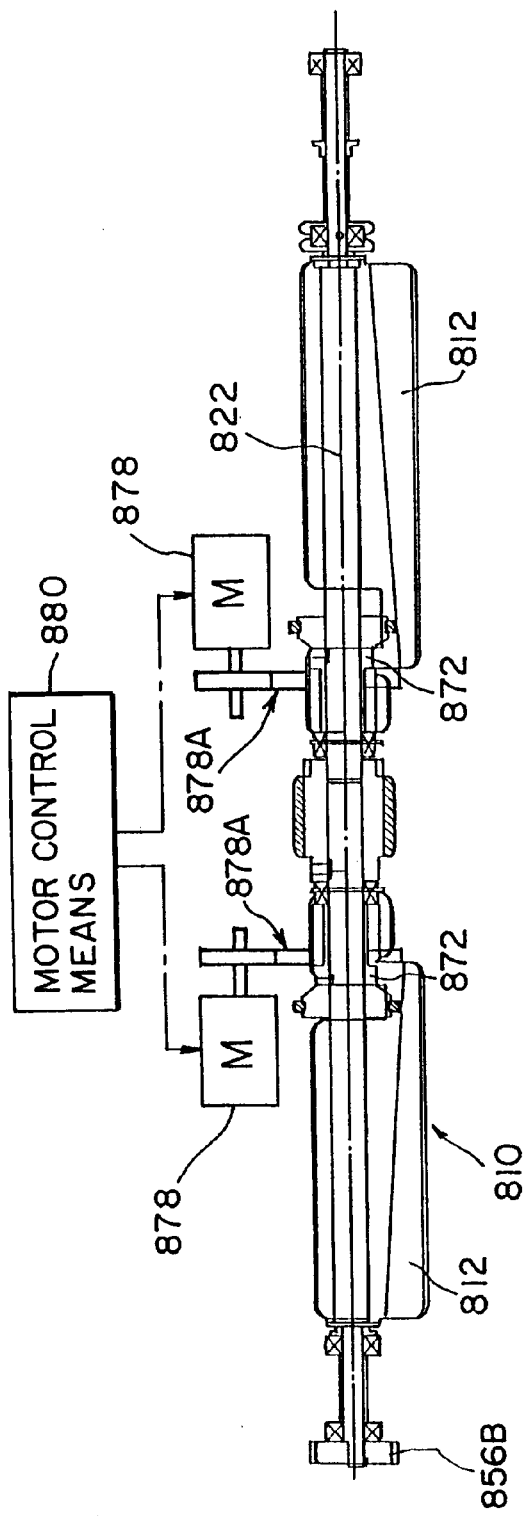
FIG. 60 is a plan view showing a further form of the separation roller driving system of the image reading apparatus of FIG. 4.

The paper skew prevention means may alternatively have such a construction as shown in FIG. 59 or 60. It is to be noted that FIGS. 59 and 60 correspond to FIG. 17(A).

Referring first to FIG. 59, in the paper skew prevention means of the construction shown, the auxiliary rollers 860 are loosely fitted on and coaxially with the axis 822 of the separation roller 820, and an electromagnetic clutch 874 is provided in each of the driving systems 870 for the auxiliary rollers 860. The paper skew prevention means further includes paper guiding condition detection means 640 for detecting paper guiding conditions of the movable guide members 812, and paper skew detection means 642 for detecting a paper skew condition from a difference between the paper guiding conditions of the movable guide members 812 detected by the paper guiding condition detection means 640. The paper skew prevention means further includes electromagnetic clutch control means 876 for controlling the electromagnetic clutches 874 by on/off control in response to a result of the detection by the paper skew detection means 642. Further, a pair of one-way clutches 872 are provided in series in addition to the electromagnetic clutches 874.

In the paper skew prevention means of the construction described above, if a paper skew condition occurs with a paper sheet being transported, differential movements can be provided to the left and right auxiliary rollers 860 thereby to positively correct the paper sheet from the paper skew condition to a correct paper condition. Consequently, a paper skew trouble can be prevented.

It is to be noted that the paper guiding condition detection means 640 may be constituted from a pair of photo-sensors which detect passage of an end of a paper sheet. In this instance, if there is a time lag between passages of an end of a paper detected by the left and right photo-sensors, how much skew the paper sheet has, that is, a paper skew condition, can be determined from a magnitude of the time lag by the paper skew detection means 642.

Further, the paper skew prevention means may further include notification means 910 for notifying, when a paper skew occurs, such occurrence of a paper skew based on detection by the paper skew detection means 642. While the notification means 910 may be considered unnecessary if such means for positively correcting a paper skew condition as the electromagnetic clutch control means 876 is provided, if such a case that correction of a paper skew cannot be performed sufficiently by the paper skew correction means is taken into consideration, it is effective to additionally provide the notification means 910 to the paper skew prevention means. It is to be noted that concrete notification means may be, for example, to sound an alarm, to light an alarming lamp or to display a message.

Referring now to FIG. 60, the paper skew prevention means shown includes a pair of motors 878 and associated gear mechanisms 878A for individually driving the auxiliary rollers 860, and, in place of the electromagnetic clutches 874 shown in FIG. 59, motor control means 880 for controlling operation of the motors 878.

In this instance, the motor control means 880 controls the speeds of rotation of the motors 878 of the auxiliary rollers 860 in response to a result of detection by the paper skew detection means 642. Consequently, control to prevent a paper skew can always be performed so that a paper skew condition may not occur.

It is to be noted that also the present paper skew prevention means may additionally include notification means 910 for notifying, when a paper skew occurs, occurrence of such paper skew.

4-6. Backing Portion for a Sheet Guide

The backing portion 712 or 752 of the sheet guide 710 or the auxiliary sheet guide 750 provided along the inclined transport path 312 in an opposing relationship to the image reading unit 410 may have such different forms as shown, for example, in FIGS. 61 to 70. It is to be noted that, while the different forms are described as different forms of the sheet guide 710 in the following description, they may be applied also as different forms of the auxiliary sheet guide 750.

Figure 61:
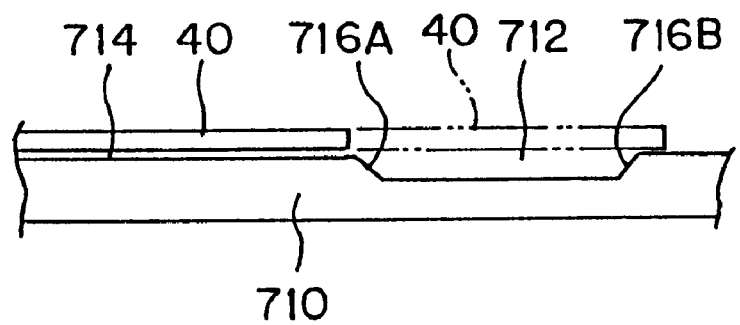
FIG. 61 is a schematic side elevational sectional view showing another form of a backing element and an adjacent member of the image reading apparatus of FIG. 4.

Referring first to FIG. 61, the backing portion 712 for providing a color reference to a paper sheet 40 is concaved with respect to the paper guiding portion 714 for guiding a paper sheet, similarly as in the embodiment described hereinabove. In the present form, however, the backing portion 712 is concaved by providing a pair of steps 716A and 716B, similarly as in the auxiliary sheet guide 750, and the paper guiding portion 714 is formed forwardly and rearwardly of the backing portion 712. Due to the construction, the backing portion 712 does not contact directly with a paper sheet. Further, the steps 716A and 716B are inclined at obtuse angles with respect to the backing portion 712 and the paper guiding portion 714, and consequently, particularly when a paper sheet 40 passes the step 716B on the downstream side (right side in FIG. 61) in the transporting direction, even if, for example, the leading end 46A of the paper sheet 40 contacts with the step 716B, it is guided by the inclined face of the step 716B so that the paper sheet 40 is transported smoothly along the step 716B.

Figure 62:
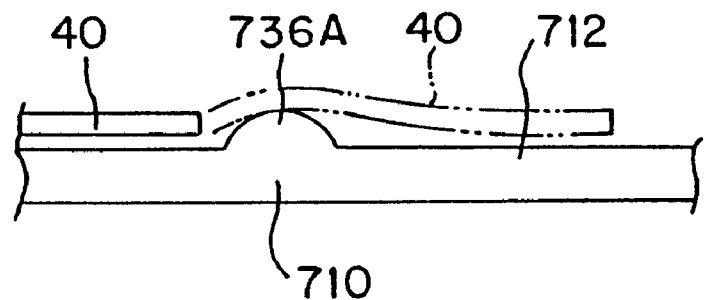
FIG. 62 is a schematic side elevational sectional view showing a further form of the backing element and adjacent member of the image reading apparatus of FIG. 4.
Figure 63:
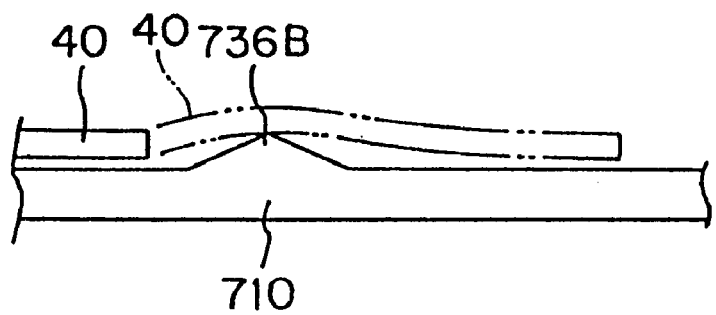
FIG. 63 is a schematic side elevational sectional view showing a still further form of the backing element and adjacent member of the image reading apparatus of FIG. 4.

Meanwhile, in the forms of the backing portion 712 shown in FIGS. 62 and 63, a protrusion 736A or 736B is provided on the paper guiding portion 714 immediately forwardly of the backing portion 712. The shape of the protrusion may be such a curved face shape as shown in FIG. 62 or such a roof-like shape as shown in FIG. 63. A paper sheet 40 is guided by the protrusion 736A or 736B such that it is not contacted directly with the backing portion 712.

Figure 64:
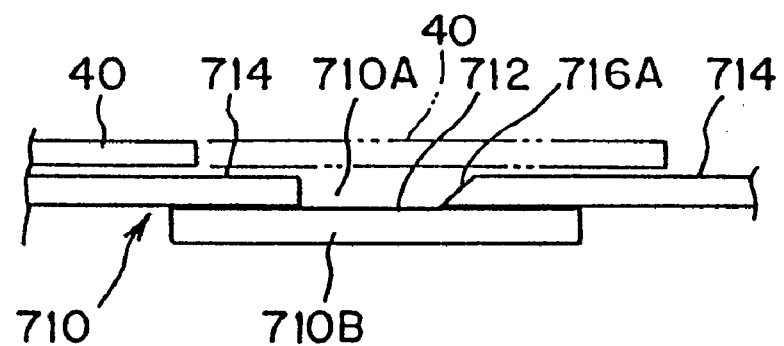
FIG. 64 is a schematic side elevational sectional view showing a yet further form of the backing element and adjacent member of the image reading apparatus of FIG. 4.

Or, the backing portion 712 may be concaved in such a manner as shown in FIG. 64 wherein a slit 710A is formed in the sheet guide 710 and a backing portion 710B of another member is securely mounted on the rear side of the slit 710A. Also in this instance, a step 716A of the backing portion 710B on the downstream side (right side in FIG. 64) in the transporting direction is formed in an obtuse angle so that a paper sheet 40 may be transported smoothly along the same.

In any of the forms described hereinabove, such a construction as described above prevents the backing portion 712 from contacting directly with a paper sheet and prevents sticking of paper powder or soiling substance to the backing portion 712. Consequently, the backing portion 712 can provide an appropriate color reference for a long period of time, which assures high performances and high reliability of the image apparatus and provides advantage in maintenance.

Meanwhile, in the forms shown in FIGS. 65 to 68, a slit 710A is formed in the sheet guide 710, and a backing member 720 formed as a rotary member is provided on the rear side of the slit 710A. In any of the forms, the backing member 720 in the form of a rotary member provides, at an outer circumferential face 720A thereof, a color reference to a paper sheet 40, and is supported for rotation so that the circumferential face 720A thereof may move in the paper transporting direction.

Figure 65:
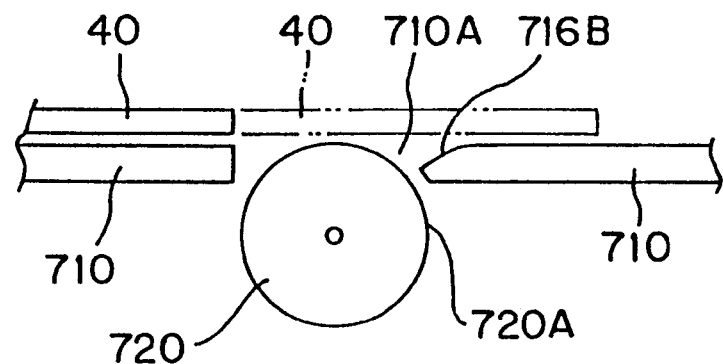
FIG. 65 is a schematic side elevational sectional view showing yet another form of the backing element and adjacent member of the image reading apparatus of FIG. 4.

In particular, in the form shown in FIG. 65, no particular driving means is provided, but the backing member 720 is supported for smooth rotation so that, when a paper sheet 40 being transported is contacted with the circumferential face 720A of the backing member 720, the circumferential face 720A is moved readily in the paper transporting direction by the paper sheet 40. Accordingly, the paper sheet 40 being transported does not contact with the circumferential face 720A of the backing member 720. Consequently, otherwise possible sticking of paper powder or soiling substance to the circumferential face 720A which provides a color reference is reduced, and accordingly, the backing member 720 can provide an appropriate color reference for a long period of time, which assures high performances and high reliability of the image apparatus and provides advantage in maintenance.

Figure 66:
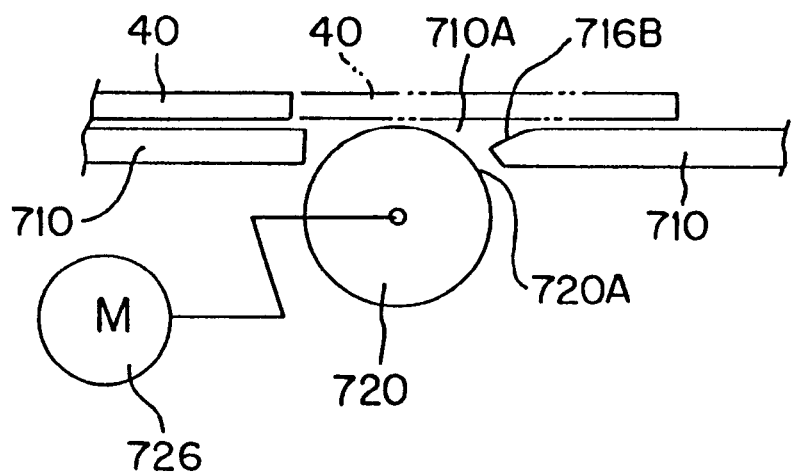
FIG. 66 is a schematic side elevational sectional view showing yet another form of the backing element and adjacent member of the image reading apparatus of FIG. 4.
Figure 67:
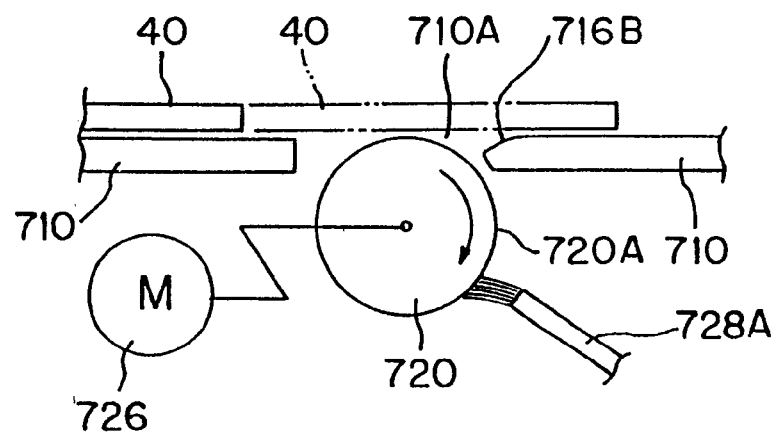
FIG. 67 is a schematic side elevational sectional view showing yet another form of the backing element and adjacent member of the image reading apparatus of FIG. 4.
Figure 68:
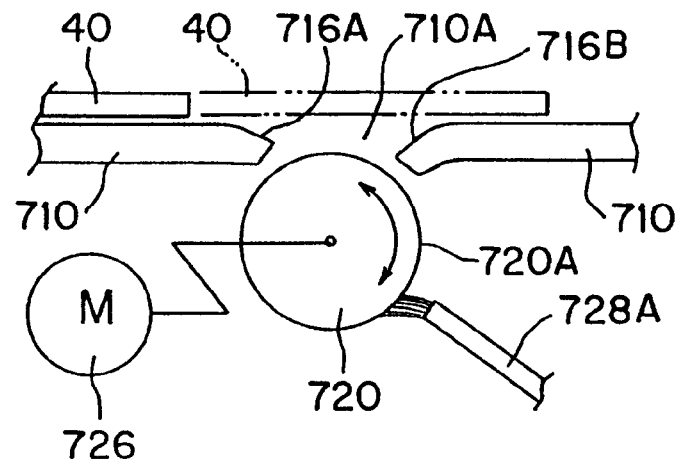
FIG. 68 is a schematic side elevational sectional view showing yet another form of the backing element and adjacent member of the image reading apparatus shown in FIG. 4.

On the other hand, the forms shown in FIGS. 66 to 68 include a motor 726 for driving the backing member 720 to rotate. In particular, at least in the forms shown in FIGS. 66 and 67, the motor 726 drives the backing member 720 to rotate such that the speed of movement of the backing member 720 may coincide with the transportation speed of a paper sheet 40 being transported. Accordingly, also in those forms, the paper sheet 40 being transmitted does not contact with the circumferential face 720A of the backing member 720. Consequently, otherwise possible sticking of paper powder or soiling substance to the circumferential face 720A which provides a color reference is reduced, and accordingly, the backing member 720 can provide an appropriate color reference for a long period of time, which assures high performances and high reliability of the image apparatus and provides advantage in maintenance.

Particularly in the form shown in FIG. 67, a brush 728A is provided for sliding contact with the circumferential face 720A of the backing member 720 so that paper powder or soiling substance sticking to the circumferential face 720A may be automatically removed by the brush 728A when the backing member 720 rotates. Consequently, the backing member 720 can provide an appropriate color reference for a longer period of time, which assures higher performances and higher reliability of the image apparatus and provides higher advantage in maintenance.

Meanwhile, in the form shown in FIG. 68, the backing member 720 is provided in a suitably spaced relationship from the inclined transport path 312 so that the circumferential face 720A thereof may not contact with a paper sheet 40 being transported. Also the backing member 720 is driven to rotate by a motor 726. In this instance, however, the backing member 720 need not specifically be driven to rotate such that the speed of movement of the circumferential face 720A thereof coincides with the transportation speed of a paper sheet 40 being transported. The reason why the backing member 720 is driven to rotate here is that it is intended to allow paper powder or soiling substance sticking to the circumferential face 720A of the backing member 720 being rotated to be automatically removed by a brush 728A provided for sliding contact with the circumferential face 720A of the backing member 720 similarly as in the several forms described above. In the form of the construction just described, since the circumferential face 720A of the backing member 720 does not contact with a paper sheet 40 being transported, soiling to the circumferential face 720A is naturally little, and besides, paper powder or soiling substance sticking to the circumferential face 720A is automatically removed by the brush 728A. Accordingly, the backing member 720 can provide an appropriate color reference for a very long period of time, which assures high performances and high reliability of the image apparatus and provides high advantage in maintenance.

Further, in the form shown in FIGS. 69(A) to 69(C) or 70(A) to 70(C), a backing member 722 or 724 is constructed for movement in an interlocking relationship with an opening or closing movement of the apparatus lid 20 by way of an interlocking mechanism 730 or 732. Also a brush 728B or 728C is provided for cleaning the backing member 722 or 724 in response to a movement of the backing member 722 or 724. Each of the backing members 722 and 724 is provided on the rear side of a slit 710A formed in the sheet guide 710.

Figure 69A:
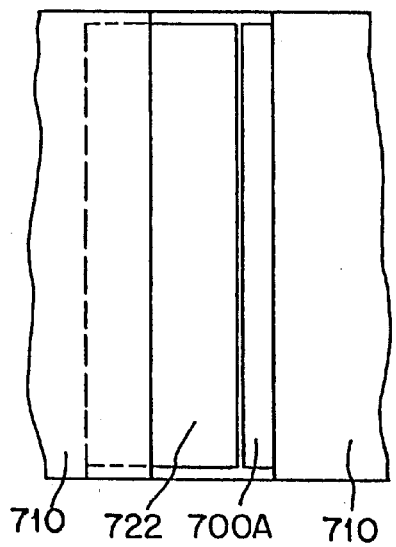
FIG. 69(A) is a schematic plan view showing a yet further form of the backing element and adjacent member of the image reading apparatus of FIG. 4, and FIGS. 69(B) and 69(C) are schematic side elevational sectional views the backing element and adjacent member shown in FIG. 69(A)
Figure 69B:
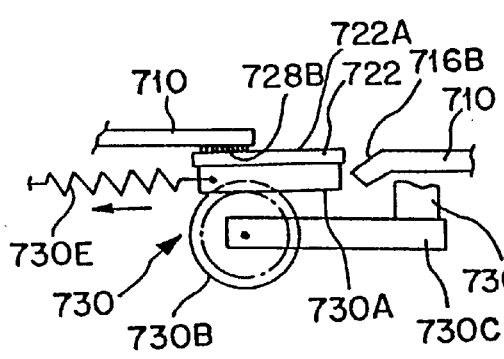
Figure 69C:
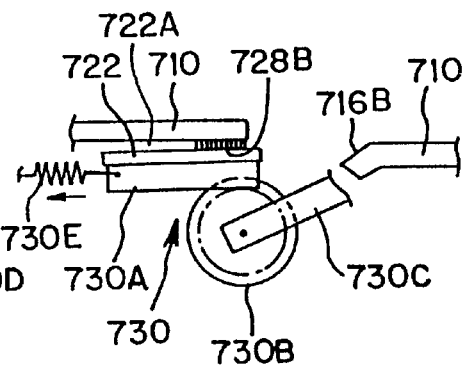

In particular, in the form shown in FIGS. 69(A) to 69(C), the backing member 722 provides, at a surface (upper face) 722A thereof formed as a plate, a color reference to a paper sheet.

The interlocking mechanism 730 for moving the backing member 722 includes a rack-and-pinion mechanism including a rack 730A provided on the rear face of the backing member 722 and a pinion 730B secured at a position at which it meshes for rotation with the rack 730A, an arm 730C provided integrally with the pinion 730B, a stopper 730D for contacting with an end portion of the arm 730C, and a spring 730E for biasing the backing member 722 in its opening (non-use) direction.

In the present form, the backing member 722 is used at such a position at which it covers over the slit 710A as seen from FIGS. 69(A) and 69(B). This position of the backing member 722 is realized by restricting pivotal motion of the arm 730C by means of the stopper 730D. In particular, the stopper 730D is provided on and for integral displacement with the apparatus lid 20. Here, when the apparatus lid 20 is closed so that the image reading apparatus may be used, the stopper 730D is displaced downwardly as seen in FIG. 69(B), but when the apparatus lid 20 is opened, the stopper 730D is displaced upwardly in FIG. 69(B) by the apparatus lid 20.

If the stopper 730D is displaced upwardly in this manner, then pivotal motion of the arm 730C is not restricted any more, and consequently, the arm 730C is rocked upwardly by the biasing force of the spring 730E, whereupon the pinion 730B is rotated in the counterclockwise direction in FIG. 69(B) to move the backing member 722 in the leftward direction in FIG. 69(B) to its opening position (non-use condition) as shown in FIG. 69(C).

On the contrary, if the apparatus lid 20 in the non-use condition is closed, then the stopper 730D is returned downwardly to displace the backing member 722 from the non-use condition shown in FIG. 69(C) to the use condition shown in FIG. 69(B).

The brush 728B is provided on the rear face of the sheet guide 710 for sliding contact with the surface 722A of the backing member 722 so that, when the backing member 722 is moved between the use condition and the non-use condition in this manner, it removes soiling substance to the surface 722A of the backing member 722.

Figure 70A:
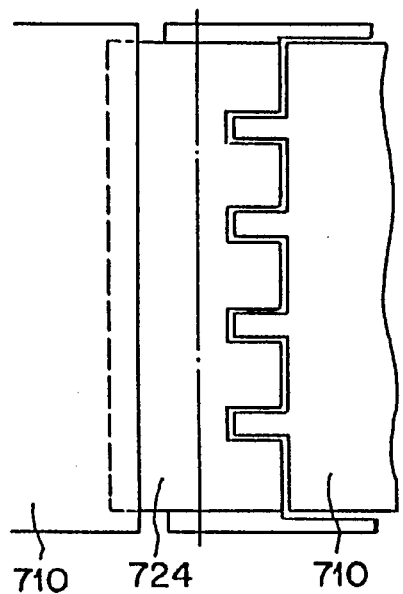
FIG. 70(A) is a schematic plan view showing a yet further form of the backing element and adjacent member of the image reading apparatus of FIG. 4, and FIGS. 70(B) and 70(C) are schematic side elevational sectional views the backing element and adjacent member shown in FIG. 70(A)
Figure 70B:
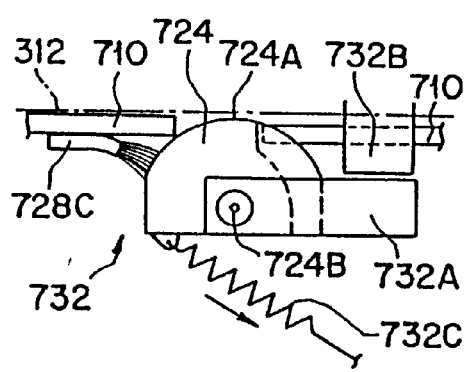

Meanwhile, in the form shown in FIGS. 70(A) to 70(C), the backing member 724 is constructed as a rotary member which has a semi-cylindrical circumferential face 724A and rotates around a shaft 724B, and it provides, at the circumferential face 724A thereof, a color reference to a paper sheet.

The interlocking mechanism 732 for moving the backing member 724 includes an arm 732A provided integrally with the backing member 724, a stopper 732B for contacting with an end portion of the arm 732A, and a spring 732C for biasing the backing member 724 to its non-use condition.

With the interlocking mechanism 732, the backing member 724 assumes its use condition in a posture in which the circumferential face 724A thereof is directed toward the slit 710A as seen in FIGS. 70(A) and 70(B). In this instance, the stopper 732B restricts pivotal motion of the arm 732A to hold the use condition of the backing member 724. In particular, the stopper 732B is provided on the apparatus lid 20 for integral displacement with the apparatus lid 20. Here, when the apparatus lid 20 is closed so that the image reading apparatus may be used, the stopper 732B is displaced downwardly as seen in FIG. 70(B), but when the apparatus lid 20 is opened, the stopper 732B is displaced upwardly in FIG. 70(B) by the apparatus lid 20.

If the stopper 732B is displaced upwardly in this manner, pivotal motion of the arm 732A is not restricted any more, and consequently, the arm 732A is rocked upwardly in FIG. 70(B) by the biasing force of the spring 732C to rotate the backing member 724 in the counterclockwise direction in FIG. 70(B).

On the contrary, if the apparatus lid 20 in the open condition is closed, then the stopper 732B is returned downwardly to displace the backing member 724 from the non-use condition shown in FIG. 70(C) to the use condition shown in FIG. 70(B).

It is to be noted that, as shown in FIG. 70(A), the backing member 724 and the sheet guide 710 have, at end faces adjacent the slit 710A thereof, complementary concave and convex portions which alternately enter each other so that a paper sheet 40 may be transported smoothly at a boundary location between the backing member 724 and the sheet guide 710 on the downstream side.

The brush 728C is provided on the rear face of the sheet guide 710 for sliding contact with the circumferential face 724A of the backing member 724 so that, when the backing member 724 moves between the use condition and the non-use condition in this manner, it may remove soiling substance to the circumferential face 724A of the backing member 724.

Figure 70:
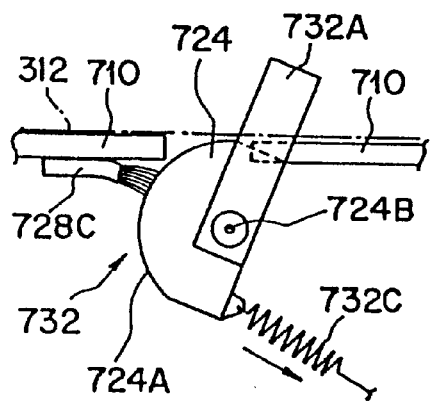

In this manner, with any of the forms shown in FIGS. 69 and 70, each time the apparatus lid 20 is opened and closed, paper powder or soiling substance sticking to the surface 722A or the circumferential face 724A of the backing member is automatically removed by the brush 728B or 728C. Accordingly, the backing member can provide an appropriate color reference for a very long period of time, which assures high performances and high reliability of the image apparatus and provides high advantage in maintenance.

Meanwhile, the image reading unit 410 may possibly be constructed such that, as shown in FIG. 71, a sheet guide 740 having an opening 742 is provided integrally with a casing 410A of the image reading unit 410 and a glass plate 742A is provided in the opening 742. In this instance, the lamp unit 420 has a socket element which is structured so as to allow the socket element to be pulled out from the casing 410A in order to replace a lamp. With the structure, however, when the inner side of the glass plate 742A is soiled, the soil cannot be removed readily.

Therefore, in this instance, a brush 728D is provided at an interior end portion of the socket element such that it may slidably contact with the inner side of the glass plate 742A. Thus, when the socket element is pulled out from the casing 410A in order to replace the lamp, the inner side face of the glass plate 742A is automatically cleaned by the brush 728D. Consequently, an appropriate color reference can be provided for a very long period of time, which assures high performances and high reliability of the image apparatus and provides high advantage in maintenance. In this instance, the brush 728D is located such that, when the socket element is set in position in the casing 410A, it does not make an obstacle to image reading.

4-7. Structure of the Paper Discharge Roller and Associated Elements

Figure 72:
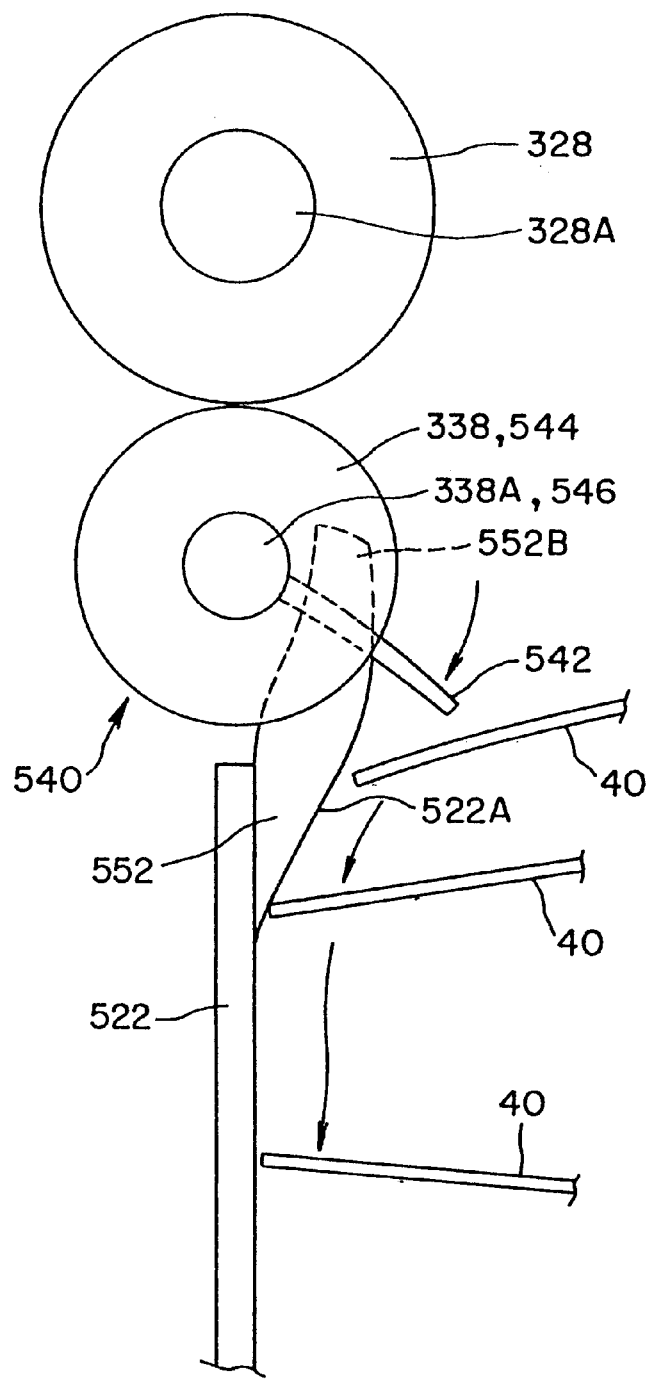
FIG. 72 is a schematic side elevational view showing another construction of the paper discharge roller mechanism in the image reading apparatus of FIG. 4.

While the paper discharge roller 544 of the paper discharge roller mechanism 540 in the embodiment is provided on the common shaft to the paper discharging roller 328, the paper discharge roller 544 may otherwise be provided on the common shaft to the idler roller 338 as shown, for example, in FIG. 72.

In particular, referring to FIG. 72, the rotary shaft 338A of the idler roller 338 serves also as the rotary shaft 546 of the paper discharge roller 544 so that the paper discharge roller 544 may be rotated integrally with the idler roller 338.

The paper discharge roller 544 is provided between each adjacent ones of a plurality of idler rollers 338 disposed in a suitably spaced relationship from each other on the rotary shaft 338A and has a projection 542 extending outwardly. The projection 542 is in the form of a tab extending outwardly farther than the outer peripheries of the idler rollers 338 and is made of a resilient flexible material so that it may be resiliently yielded when it is contacted with the opposing paper discharging roller 328 or the end frame 522.

Meanwhile, the paper trailing end guide members 552 are formed such that upper end portions 552B thereof extend by such a great extent as to project between gaps between the paper discharge roller 544 and the idler roller 338.

Due to the structure described above, the projections 542 project into the paper reversing transport path 314 of the paper transport path 310 so that, when a paper sheet 40 being transported comes there, they push up the trailing end of the paper sheet 40 to guide it so that it may be discharged into the paper stacking mechanism 500. Further, the thus discharged paper sheet 40 is guided at the trailing end thereof by the projections 542 and the guide face 552A of the paper trailing end guide member 552 so that it moves down along the end frame 522 as seen in FIG. 72. Consequently, the paper sheet 40 is stacked regularly on the paper stacker 510.

4-8. Image Reading Unit System

The discrimination mark 50 may be constructed in such a manner as described below.

In particular, the discrimination mark 50 may be constituted from a combination of a plurality of marks. In this instance, for example, when information on a read face of a paper sheet is read, some other information such as, for example, read area information can be read simultaneously. Consequently, reading of image information can be performed efficiently, and an increase in processing speed in image reading can be promoted while assuring the reliability.

Meanwhile, the discrimination mark 50 may be marked in a drop-out color which cannot be read by the optical image reading units 412 and 414. In this instance, an optical discrimination mark image reading unit 470 (refer to a chain line block in FIG. 7) for exclusive use for reading the discrimination mark 50 of the drop-out color may be provided so that control by the image information extraction control means 440 may be performed based on detection information of the optical discrimination mark image reading unit 470.

Where the construction just described is employed, since image information to be read originally which does not include image information of a discrimination mark is read by the optical image reading unit 410, appropriate image information can be obtained. Further, where a pair of such optical discrimination mark image reading units 470 are provided on the upstream side of the optical image reading units 412 and 414 along the paper transport path 310 as seen in FIG. 7, a discrimination mark can be read before a paper sheet 40 advances into the optical image reading unit 412 or 414. Consequently, it is advantageous also in that image information extraction control can be performed appropriately.

Naturally, the image information extraction control is performed based not only on a discrimination mark but also on a result of selection by the paper reading selection means 924L.

Further, while it depends upon setting of an indication of a discrimination mark, such optical discrimination mark image reading unit 470 may be provided on one side or both sides of the optical image reading unit 412 side and the optical image reading unit 414 side with respect to the paper transport path 310.

4-9. Paper Stacking Mechanism

Subsequently, alternative forms of the paper stacking mechanism 500 will be described.

Figure 73:
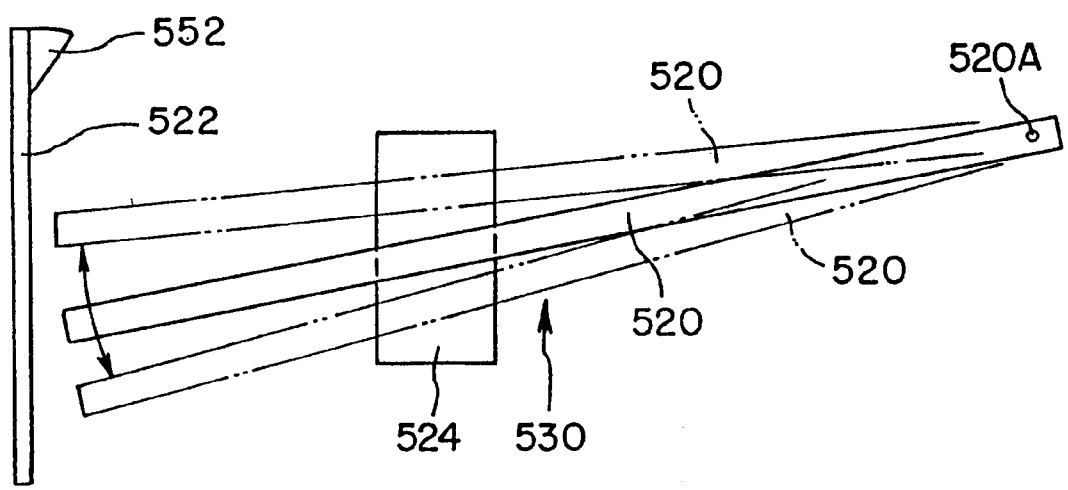
FIG. 73 is a schematic side elevational view showing another form of a paper stacking mechanism in the image reading apparatus of FIG. 4.

The paper stacking mechanism 500 in the embodiment includes the paper stacker position variation mechanism 530 in which the position of the paper stacker 510 is adjusted manually by selecting the insertion holes 522A into which the fitting projections 526 should be inserted. However, the paper stacker position variation mechanism 530 may be modified in such a manner as shown in FIG. 73 wherein the stacker table 520 of the paper stacker 510 is supported, at a base end portion (right end portion in FIG. 73) thereof, for pivotal motion around a fulcrum 520A such that a front end portion of the stacker table 520 may be moved upwardly or downwardly thereby to allow manual adjustment of the paper stacker 510.

In this instance, a latch mechanism 524 may be provided which allows a downward movement of the stacker table 520 but does not allow an upward movement of the stacker table 520 unless the stacker table 520 is unlatched from the latch mechanism 524. Thus, if the front end portion of the stacker table 520 is manually pushed downwardly, the stacker table 520 is moved down and thereafter held at the lowered position. Then, if the stacker table 520 is unlatched from the latch mechanism 524, the stacker table 520 is returned to its uppermost position. The construction just described is advantageous in that the stacker table 520 can be moved down to a suitable position readily by a simple operation.

Although the position of the paper stacker 510 can be adjusted in advance with the paper stacker position variation mechanism 530 of the embodiment or the paper stacker position variation mechanism 530 described just above, the amount of paper sheets which can be stacked in the paper stacker 510 varies depending upon the position of the paper stacker 510 adjusted in advance in this manner.

Thus, such a situation should be eliminated that the amount of paper sheets stacked in the paper stacker 510 exceeds the amount of paper sheets which can be stacked on the paper stacker 510 at the position adjusted in advance and some paper sheets may overflow from the paper stacker 510.

Figure 74:
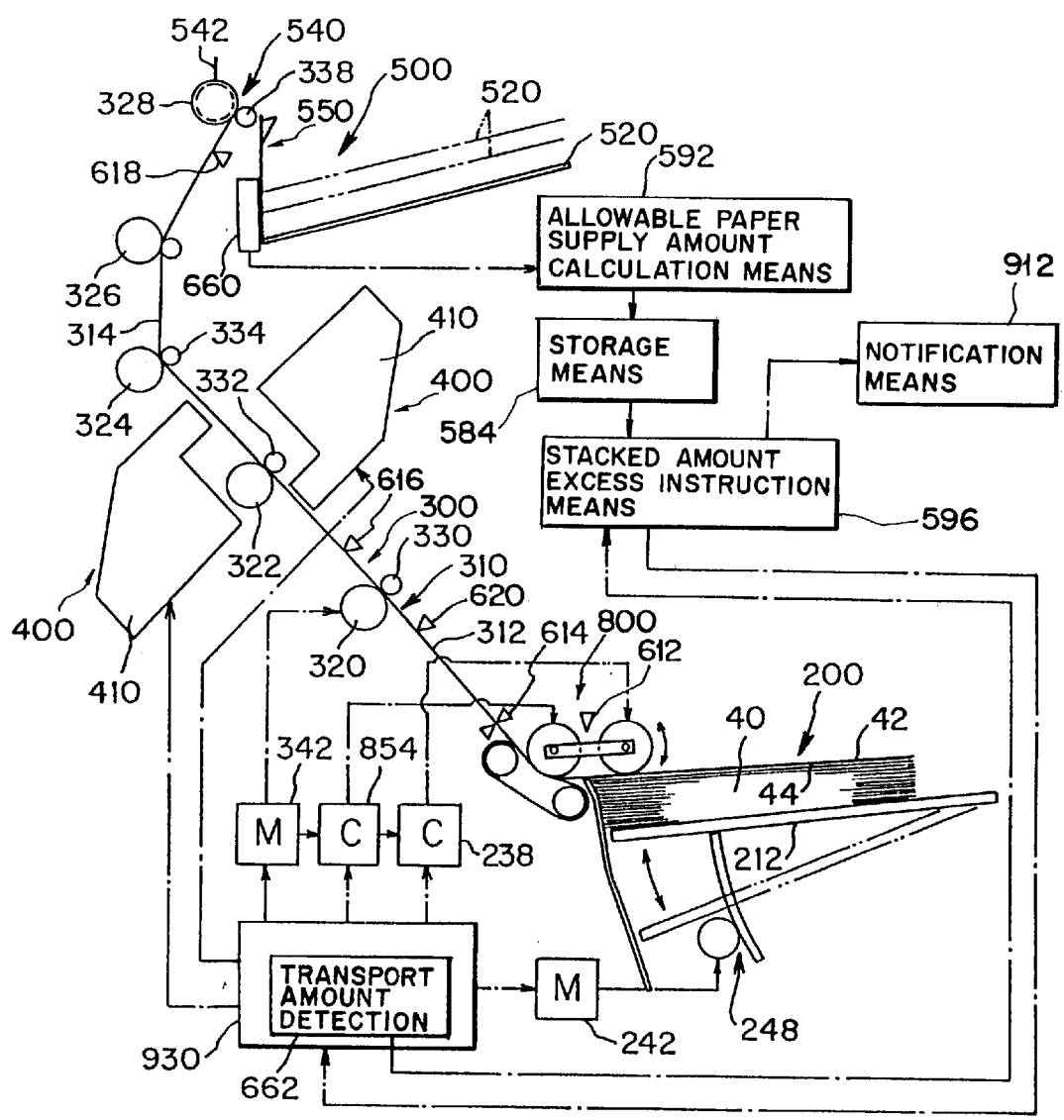
FIG. 74 is a schematic diagrammatic view showing a control system where the paper stacking mechanism shown in FIG. 73 is employed.

To this end, the image reading apparatus may additionally includes, for example, as shown in FIG. 74, paper stacker position detection means 660 for detecting the position of the paper stacker 510, allowable paper supply amount detection means 592 for calculating, based on a result of detection of the paper stacker position detection means 660, an allowable paper supply amount by which paper sheets can be supplied from the paper stacker 510 at the adjusted position, storage means 584 for storing the allowable paper supply amount calculated by the allowable paper supply amount detection means 592, transportation amount detection means 662 for detecting a transportation amount of paper sheets 40, and stacked amount excess instruction means 596 for comparing a detection amount detected by the transportation amount detection means 662 with the allowable paper supply amount stored in the storage means 584 and developing, when the detection amount exceeds the allowable paper supply amount, an instruction to render the notification means 912 operative to notify such excess and another instruction to stop transportation of paper sheets 40.

It is to be noted that the transportation amount of paper sheets can be detected, for example, by counting the number of transported paper sheets based on paper passage information from various sensors such as the transportation sensors 614 and 616 and the discharge sensor 618 or by counting the number of issued start commands for paper transportation or the like. Such a counter device which is generally provided in the control section 930 as mentioned above can be employed as the transportation amount detection means 662.

Generally, the allowable paper supply amount detection means 592, the storage means 584 and/or the stacked amount excess instruction means 596 are incorporated in the control section 930.

Due to the means described above, such a disadvantage that paper sheets overflow from the paper stacker 510 is eliminated.

The means described above may be modified such that, if the detection amount detected by the transportation amount detection means 662 exceeds a value smaller than the allowable paper supply amount stored in the storage means 584 (for example, available paper supply amount×0.9), this is notified from the stacked amount excess instruction means 596 by way of the notification means 912, and when the detection amount detected by the transportation amount detection means 662 thereafter reaches the allowable paper supply amount stored in the storage means 584, an instruction to stop transportation is developed.

Where the stacked amount excess instruction means 596 is constructed in such a manner described just above, if the paper stacking mechanism 500 is constructed such that the stacker table 520 can be moved downwardly to adjust its position readily by a simple operation (refer to FIG. 73) also while paper sheets are stacked on the stacker table 520, then if an operator manually adjusts the stacker table 520 in response to a notification from the notification means 912, then the allowable paper supply amount increases at this stage. Consequently, the disadvantage that paper sheets overflow from the paper stacker 510 can be eliminated without stopping operation of the image reading apparatus. In this instance, a transportation amount from starting of the operation is compared with the new allowable paper supply amount, and if a required condition is reached, then the notification means 912 is rendered operative again.

Alternatively, the transportation amount detection means 662 described above may be replaced by hopper vertical movement amount detection means 664 for detecting a vertical movement amount of the paper supply hopper 210 (a vertical movement amount of the hopper table 212) such that the paper stacker 510 is controlled in response to an amount of a vertical movement of the paper supply hopper 210 detected by the hopper vertical movement amount detection means 664.

Figure 75:
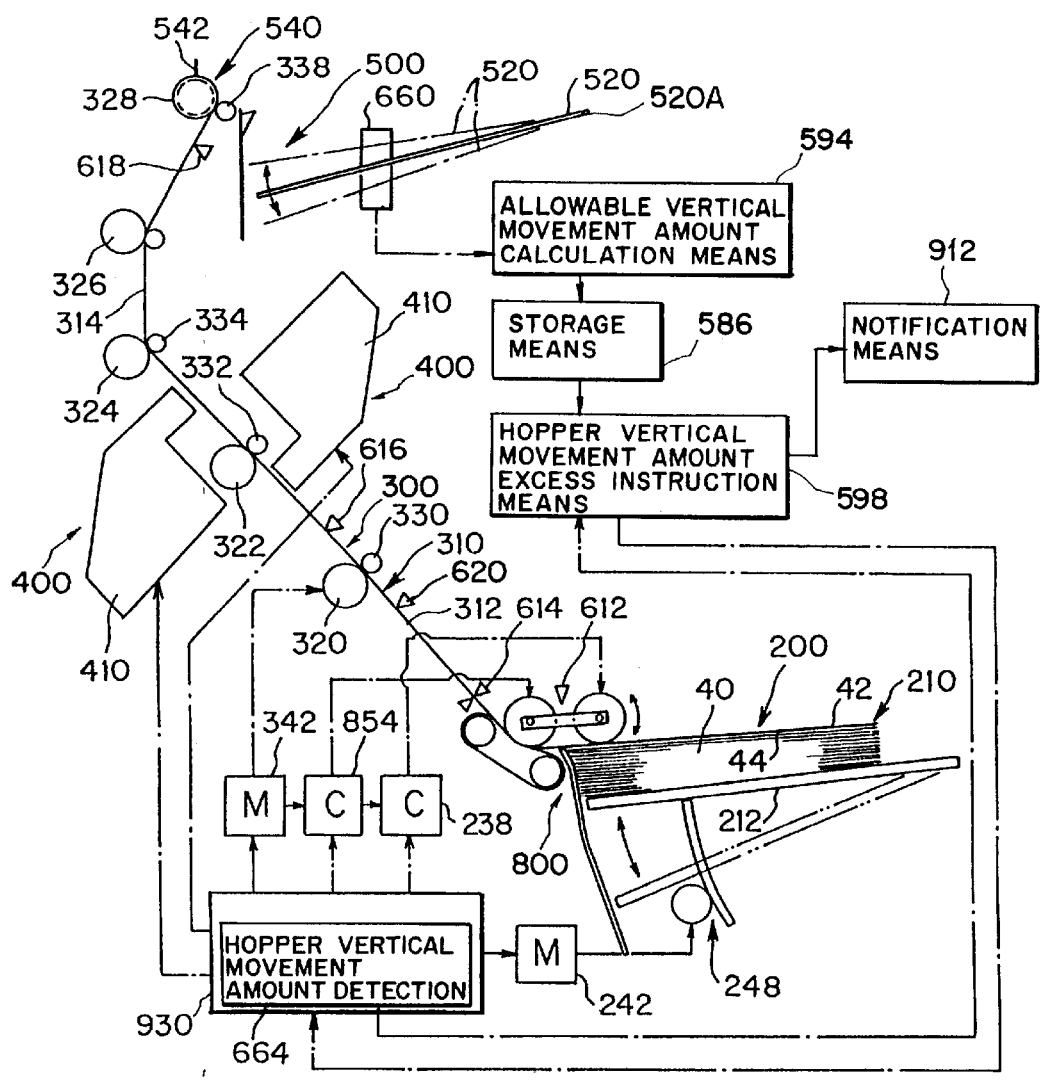
FIG. 75 is a similar view but showing another control system where the paper stacking mechanism shown in FIG. 73 is employed.

In particular, the image reading apparatus includes, as shown in FIG. 75, paper stacker position detection means 660 for detecting the position of the paper stacker 510, allowable vertical movement amount calculation means 594 for calculating an allowable vertical movement amount of the paper supply hopper 210 corresponding to the position of the paper stacker 510 based on a result of detection by the paper stacker position detection means 660, storage means 586 for storing the allowable vertical movement amount calculated by the allowable vertical movement amount calculation means 594, hopper vertical movement amount detection means 664 for detecting a virtual movement amount of the hopper table 212 of the paper supply hopper 210, and hopper vertical movement amount excess instruction means 598 for comparing a detection amount detected by the hopper vertical movement amount detection means 664 and the allowable vertical movement amount stored in the storage means 586 and developing, when the detection amount exceeds the allowable vertical movement amount, an instruction to render the notification means 912 operative to notify such excess and another instruction to stop transportation of a paper sheet.

It is to be noted that, since the vertical movement amount of the paper supply hopper 210 can be obtained by counting hopper vertical movement pulses outputted from the control section 930, such a counting function section which is generally provided in the control section 930 can be used as the hopper vertical movement amount detection means 664.

Further, the allowable vertical movement amount calculation means 594, the storage means 586 and/or the hopper vertical movement amount excess instruction means 598 are generally incorporated in the control section 930.

Due to the construction, such a disadvantage that paper sheets overflow from the paper stacker 510 is eliminated.

Also in this instance, the image reading apparatus may be constructed such that the notification means 912 is rendered operative at a stage before the vertical movement amount of the paper stacker 510 reaches the allowable vertical movement amount and then transportation of a paper sheet is stopped after the allowable vertical movement amount is reached. Where the construction just described is employed, the disadvantage that paper sheets overflow from the paper stacker 510 can be eliminated without stopping operation of the image reading apparatus.

By the way, while, in the various forms described above, the paper stacker position variation mechanism 530 is constructed such that the position of the stacker table 520 can be moved upwardly and downwardly by manual operation, the paper stacker position variation mechanism 530 may otherwise be constructed so as to operate automatically.

Figure 76:
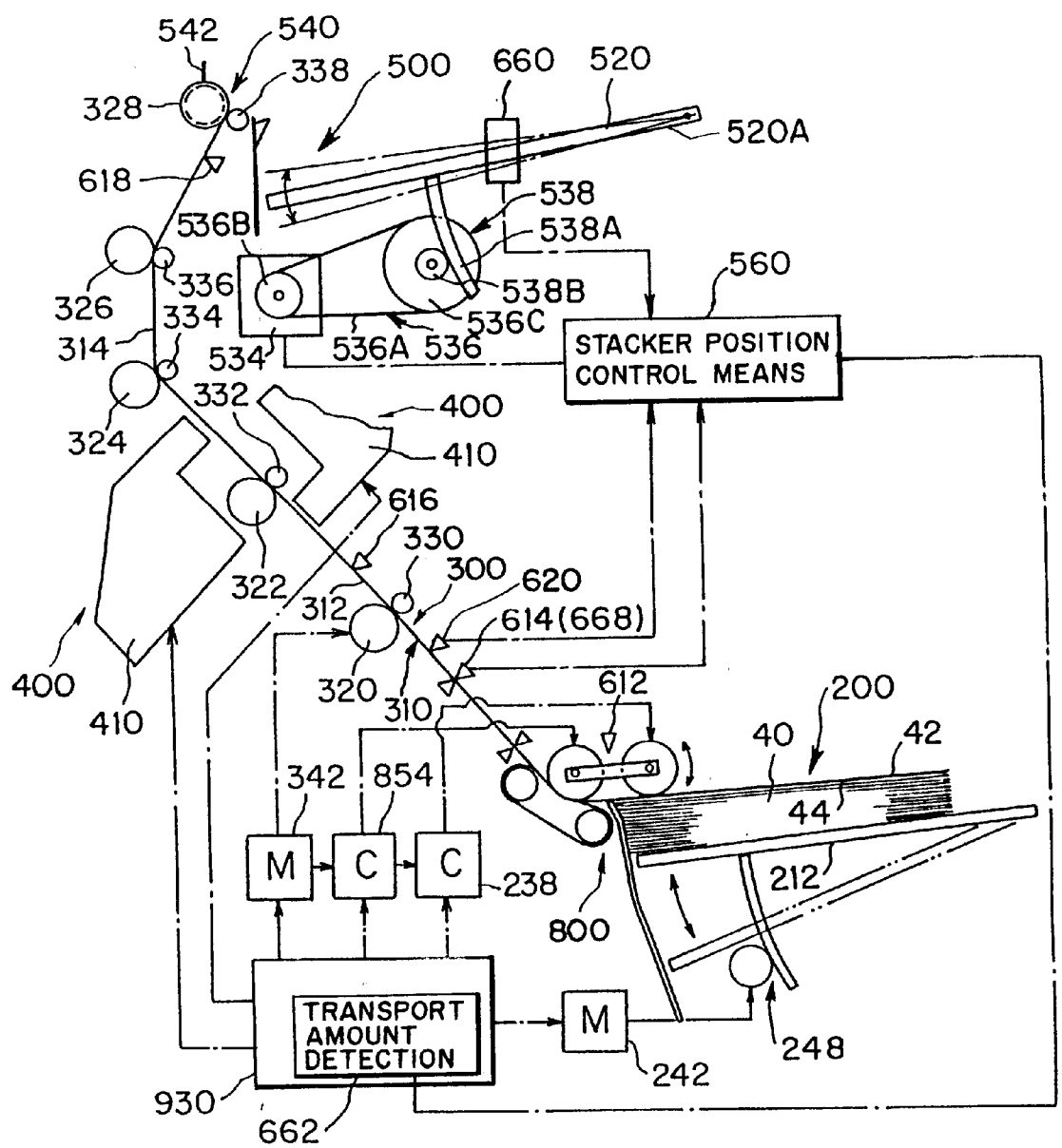
FIG. 76 is a similar view but showing a further form of the paper stacking mechanism in the image reading apparatus of FIG. 4 and a control system for the paper stacking mechanism.

For example, the paper stacker position variation mechanism 530 may be constructed in a similar manner to the paper supply hopper driving mechanism 240 as shown in FIG. 76. In particular, referring to FIG. 76, the paper stacker position variation mechanism 530 is constructed such that the stacker table 520 is mounted for pivotal motion around a fulcrum 520A at a rear or trailing end portion thereof in the paper discharging direction (at a right end portion in FIG. 76), and a driving motor (stacker motor) 534 serving as a stacker table pivoting driving mechanism for driving the stacker table 520 to pivot is provided.

A stepper motor may be employed as the driving motor 534, and the driving motor 534 and the stacker table 520 are connected to each other by way of a belt-and-pulley mechanism 536 including a belt 536A and a pair of pulleys 536B and 536C, and a rack-and-pinion mechanism 538 including a rack 538A and a pinion 538B. In particular, the pulley 536B is mounted on a rotary shaft of the driving motor 534 while the other pulley 536C is mounted on a rotary shaft of the pinion 538B, and the rack 538A is provided on the stacker table 520. It is to be noted that, similarly as in the form of the paper supply hopper driving mechanism 240 described hereinabove with reference to FIG. 58, the rotary shaft of the driving motor 534 and the rotary shaft of the pinion 538B may be connected to each other by way of a gear mechanism.

The paper stacker position variation mechanism 530 which employs the driving motor 534 described above requires means (stacker position control means) for controlling operation of the mechanism paper stacker position variation mechanism 530. The control means may be constructed, for example, in such a manner as shown in FIG. 76.

In particular, referring to FIG. 76, the control means shown includes paper stacker position detection means 660 for detecting the position of the paper stacker 510, that is, the vertical position of the stacker table 520, transportation amount detection means 662 for detecting a transportation amount of paper sheets 40, paper size detection means 620 for detecting the size of a paper sheet 40 transported, and paper thickness detection means 668 for detecting the thickness of a transported paper sheet 40. The stacker position control means 560 thus controls the driving motor 534 of the paper stacker position variation mechanism 530 in response to results of detection of the detection means 660, 662, 620 and 668 so that the vertical position of the stacker table 520 may be a suitable position corresponding to the paper transport amount, the paper size and the paper thickness.

It is to be noted that the paper thickness detection means 668 may include a light transmission sensor and detect an approximate thickness of a paper sheet from an amount of transmission light detected by the light transmission sensor. Further, the stacker position control means 560 is normally incorporated in the control section 930.

Meanwhile, in control based on the size of a paper sheet, for example, when the size of a paper sheet is small, a paper sheet discharged likely "dances", and if the plane onto which the thus discharged paper sheet is to be stacked (the plane corresponds to the top face of paper sheets stacked already; the plane will be hereinafter referred to as stack plane) is excessively low with respect to the discharging position of the paper sheet from the discharge roller, the paper sheet is not in most cases stacked in position. Therefore, where paper sheets of a small size are used, the stacker table 520 is adjusted to a comparatively high position so that the stack plane may be located near to the discharging position.

In contrast, when paper sheets of a large size are used, if the plane (stack plane) onto which a discharged paper sheet is to be stacked is near to the discharging position, the discharge paper sheet is acted upon by a sliding resistance from the stack plane and is not stacked well in position. Therefore, where the size of paper sheets used is large, the stacker table 520 is adjusted to a comparatively low position so that the stack plane may be spaced by a great distance from the discharging position.

Naturally, in any case, the stacker table 520 is controlled to be moved down based on the thickness of a paper sheet and the number of transported paper sheets so that the stack plane may always be positioned suitably for the size of paper sheets with respect to the discharging position.

In particular, since the stack plane, that is, the top face of paper sheets stacked on the stacker table 520, rises as paper sheets are successively stacked, in order to keep the stack plane at a predetermined position, the stacker table 520 should be moved down by a distance corresponding to a total thickness of paper sheets stacked on the stacker table 520 from its initial position.

Since the total thickness of paper sheets stacked on the stacker table 520 is calculated as a product of the thickness of a single paper sheet (paper thickness) and the number (transportation paper number) of paper sheets stacked on the stacker table 520, the stacker table 520 can be controlled to be moved down appropriately in response to the thickness of a paper sheet and the transportation paper number.

With the paper stacker position variation mechanism 530 of the construction described above, a paper sheet discharged can always be stacked smoothly for various paper sizes from a small size to a large size.

It is to be noted that, since standard paper sheets having a standard thickness which is not particularly thick nor particularly thin are generally used, if this is presupposed, even if position control of the stacker table 520 based on the transport paper number is performed without taking the paper thickness into consideration, discharged paper sheets can be stacked sufficiently well.

Further, also with regard to the paper size, if paper sheets used do not have an extremely large or small size, discharged paper sheets can be stacked sufficiently well even if position control of the stacker table 520 is performed without taking the paper size into consideration.

Figure 77:
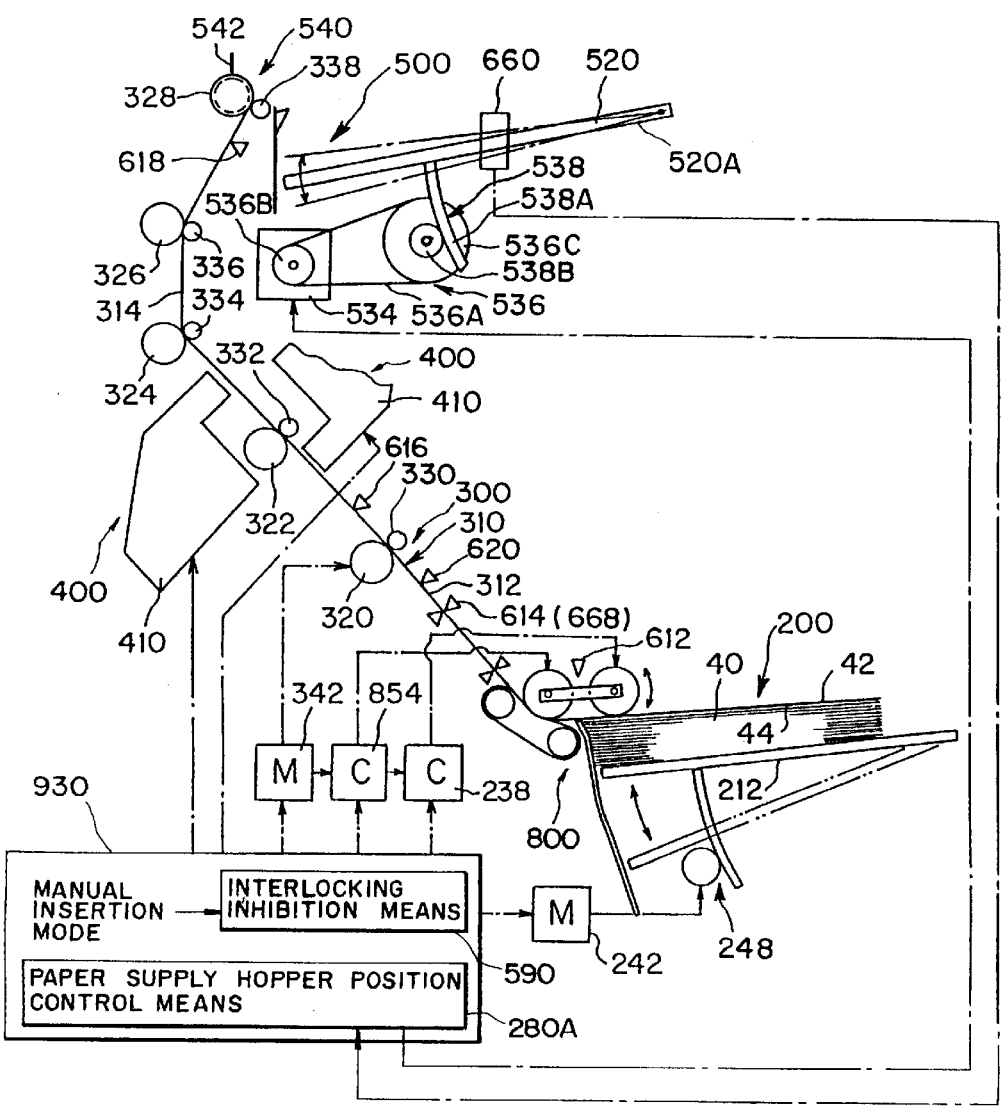
FIG. 77 is a similar view showing the paper stacking mechanism shown in FIG. 76 and another form of the control system for the paper stacking mechanism.

Further, the image reading apparatus may include, as shown in FIG. 77, interlocking means 580 for interlocking the position control of the stacker table 520 with a paper supply position adjusting operation of the paper supply mechanism 200 to operate the paper stacker position variation mechanism 530.

In particular, referring to FIG. 77, the paper supply mechanism 200 raises the position of the hopper table 212 as paper sheets 40 in the paper supply hopper 210 decrease. In contrast, in the paper stacking mechanism 500, as paper sheets 40 in the paper supply hopper 210 decrease, the paper sheets are stacked into the paper stacker 510. Accordingly, the position of the stacker table 520 should be moved down in response to the movement of the position of the hopper table 212.

Here, paper supply hopper position control means 280A outputs to the hopper motor 242 a control signal to raise the position of the hopper table 212 and outputs to the driving motor 534 another control signal to lower the position of the stacker table 520. Thus, the interlocking means 580 is constituted from the paper supply hopper position control means 280A.

Also the position control of the stacker table 520 may be performed in response to an actual stacker position detected by the paper stacker position detection means 660.

By the way, while the amount of the upward movement of the hopper table 212 and the amount of the downward movement of the stacker table 520 have a relationship to each other, the weight of paper sheets stacked on the stacker table 520 when air is included between the paper sheets is considerably greater than the weight of the paper sheets which were originally accommodated in the hopper table 212. Such difference in paper weight can be eliminated by setting the amount of downward movement of the stacker table 520 considerably greater than the amount of upward movement of the hopper table 212.

It is to be noted that the interlocking means 580 may be modified such that the paper stacker 510 is driven simultaneously with the paper supply hopper 210 by the hopper motor 242. In particular, the hopper motor 242 and the pinion 538B on the paper stacker 510 side are connected to each other by way of, for example, a gear mechanism so that, when the paper supply hopper 210 is moved upwardly, the paper stacker 510 is moved down at a required rate. In this instance, the driving motor 534 is eliminated naturally.

Further, while the image reading apparatus has the manual insertion mode in addition to the automatic modes in which a paper sheet is automatically supplied and transported, since, in the manual insertion mode, the position adjustment of the hopper table 212 is not performed and the top face of the hopper table 212 is kept at a prescribed height, if position control of the stacker table 520 is performed in an interlocking relationship with a paper supply position adjustment operation, then also the position of the stacker table 520 is kept fixed. However, also in the manual insertion mode, paper sheets are successively stacked onto the stacker table 520. Accordingly, it is inconvenient if the position of the stacker table 520 is fixed. Therefore, such interlocking means 580 must include means for inhibiting an interlocking operation in the manual insertion mode.

In the manual insertion mode, the position of the stacker table 520 may be adjusted manually as in the image reading apparatus of the embodiment described above, or the position of the stacker table 520 may be automatically controlled in response to a transportation number of paper sheets as described above or additionally taking the thickness or the size of a paper sheet into consideration.

Figure 78:
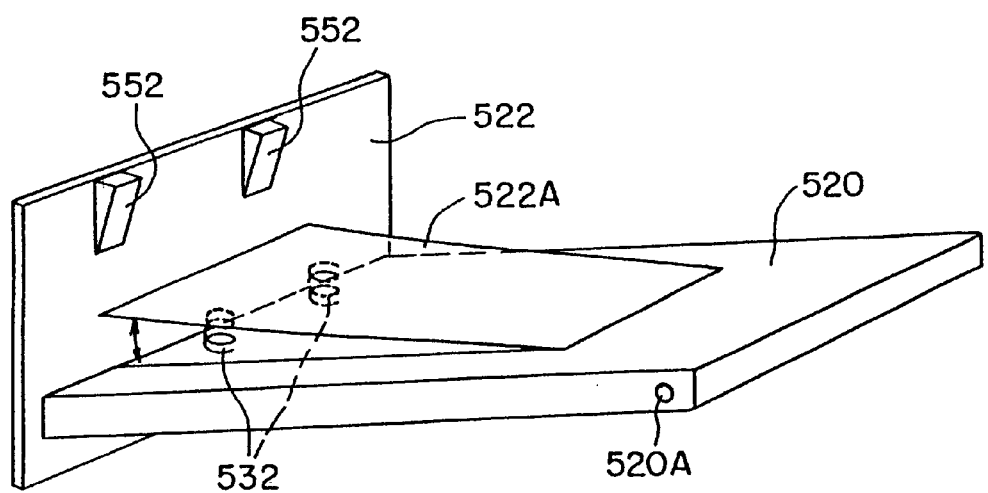
FIG. 78 is a schematic perspective view showing a still further form of the paper stacking mechanism in the image reading apparatus of FIG. 4.

Further, the stacker table 520 may be constructed so as to be partially or entirely movable by way of a resilient member 532 (FIG. 78).

For example, as shown in FIG. 78, a central portion of the stacker table 520 on the front end side is divisionally formed as a movable table 520B of a small size. The movable table 520B is, for example, supported at a rear end thereof for pivotal motion and is normally biased upwardly by a pair of spring (resilient members) 532 provided on the lower face of a front end portion of the movable table 520B.

With the stacker table 520 of the construction just described, when the amount of paper sheets stacked thereon is small, the movable table 520B is positioned at an upward position by the biasing forces of the springs 532, but when the amount of stacked paper sheets increases, the movable table 520B is moved down by the weight of the thus stacked paper sheets against the biasing forces of the springs 532. When the movable table 520B is moved down to its lowermost position, the movable table 520B cooperates with a stacker table body 520C, which is the remaining portion of the stacker table 520, to present a flat upper face.

Accordingly, the plane on which a paper sheet is to be stacked (the top face of stacked paper sheets) can be maintained at an optimum position by suitably setting the springs 532.

Figure 79A:
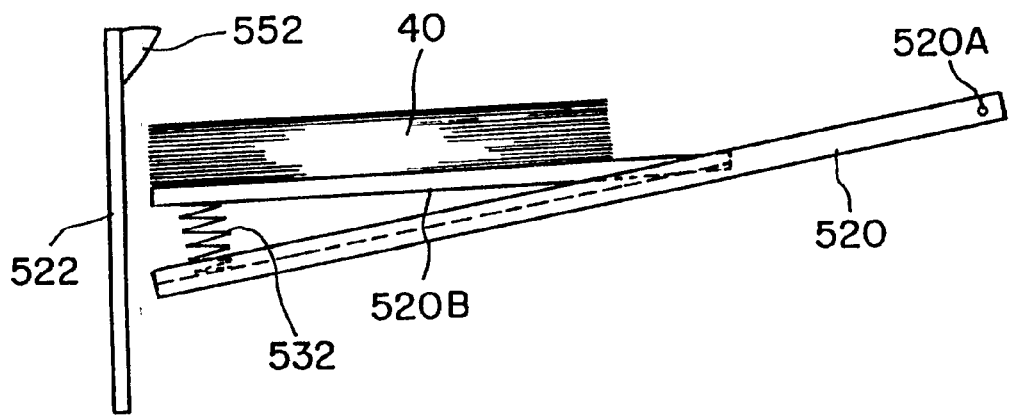
FIG. 79(A) is a schematic side elevational view of the paper stacking mechanism shown in FIG. 78 when it accommodates paper sheets of a small size.
Figure 79B:
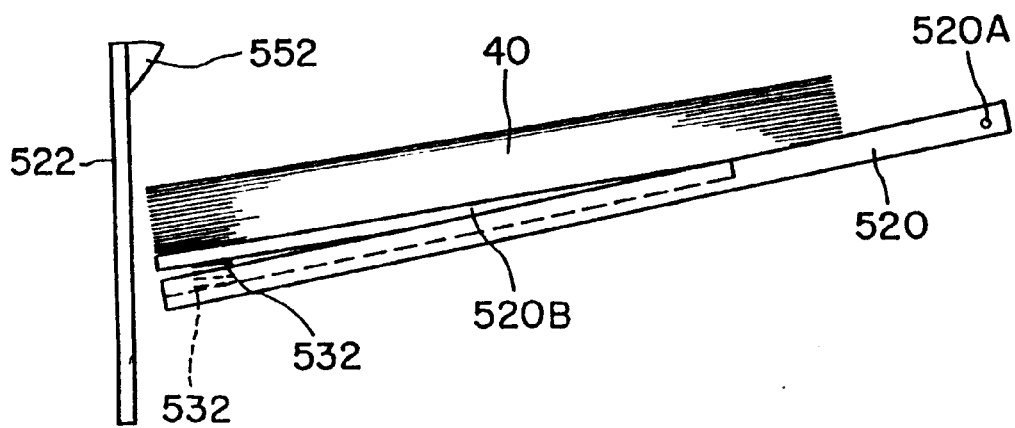
FIG. 79(B) is a similar view but showing the paper stacking mechanism when it accommodates paper sheets of a large size.

Further, as described above, when the paper size is small, the stack plane should be high, but when the paper size is large, the stack plane should be low. With the resilient supporting structure of the movable table 520B described above, if the size of a paper sheet itself is small (here it is considered that the paper thickness is fixed), even if the number of stacked paper sheets increases, the amount of downward movement of the movable table 520B is small as seen in FIG. 79(A), but if the size of a paper sheet itself is large (here it is considered that the paper thickness is fixed), the movable table 520B moves down by a great amount as the number of stacked paper sheets increases as seen in FIG. 79(B).

Accordingly, there is an advantage in that also adjustment of the height of the stack plane takes place automatically in response to a paper size.

Naturally, a similar moving down operation can be obtained even where the entire stacker table 520 is supported resiliently.

Further, if the resilient supporting structure for the movable table 520B or the movable stacker table 520 is combined with the paper stacker position variation mechanism 530 which includes the driving motor 534, since adjustment of the height of the stacker plane in response to a paper size is performed automatically by the resilient supporting structure, only if operation of the paper stacker position variation mechanism 530 is performed in response to the transportation paper number, the height of the stack plane can be performed suitably for both of the paper size and the transportation paper number.

5. Read Image Data Processing System

Here, a read image data processing system which is not described in the foregoing description of the preferred embodiment will be described.

5-1. Outline of the Read Image Data Processing System

Referring to FIG. 80, the image reading apparatus includes a first image data processing system D1 for processing image data read by the first optical image reading unit 412 for reading information on the surface of a paper sheet, and a second image data processing system D2 for processing image data read by the second optical image reading unit 414 for reading information on the rear face of the paper sheet.

The first image data processing system D1 includes a CCD (charge couple device) array 436AA of the first optical image reading unit 412, an amplification circuit (AMP) 64A, a sample hold circuit 66A, an analog to digital (A/D) conversion circuit 60A, and an image processing section 68A. Meanwhile, the second image data processing system D2 includes a CCD array 436AB of the second optical image reading unit 414, an amplification circuit 64B, a sample hold circuit 66B, an analog to digital conversion circuit 60B and an image processing section 68B.

The CCD arrays 436AA and 436AB read image data of a paper sheet by way of the image reading units 412 and 414, respectively, as described hereinabove. The amplification circuits 64A and 64B amplify the image data of the paper sheet obtained from the CCD arrays 436AA and 436AB, respectively, and the sample hold circuits 66A and 66B sample and hold the image data of the paper sheet after amplified by the amplification circuits 64A and 64B, respectively.

The analog to digital conversion circuits 60A and 60B convert analog data obtained from the image reading units 412 and 414 into digital data using white level information and black level information of the image information of the paper sheet as indices for a conversion criterion. The image processing sections 68A and 68B process the digital data from the analog to digital conversion circuits 60A and 60B, respectively, by various processes such as binary digitization, emphasis and smoothing.

The image data processing system further includes an outputting section 90 for selectively sending out paper front face image data and paper rear face image data to a host computer (not shown) in response to an instruction from an output control circuit 100 which is part of the image information extraction control means 440. In particular, in the present embodiment, since the image reading units 412 and 414 are provided in the proximity of each other as described hereinabove, it sometimes occurs that the image reading units 412 and 414 read images simultaneously. Therefore, information from the second optical image reading unit 414 for reading information on the rear face of a paper sheet is stored once into a buffer storage apparatus (DRAM) of the rear face reading board 944 (refer to FIG. 37) and, after information from the first optical image reading unit 412 is sent to the host computer, the information from the second optical image reading unit 414 is sent from the buffer storage apparatus to the host computer. Such control means is provided in the outputting section 90, and details of the same will be hereinafter described.

In this manner, image information read by the image reading units 412 and 414 is read out under the control of the output control circuit 100 of the image information extraction control means 440 as seen from FIG. 80. In this instance, in the image information extraction control means 440, transfer control of image information to the host computer and like control are performed in response to results of detection of a paper leading end detection circuit (paper leading end detection means) 450 and a paper trailing end detection circuit (paper trailing end detection means) 451 provided similarly to the paper leading end detection circuit 450. It is to be noted that the paper leading end detection circuit 450 and the paper trailing end detection circuit 451 will be hereinafter described.

Further, the image information extraction control means 440 controls extraction of image information obtained from the first optical image reading unit 412 and the second optical image reading unit 414 in response to a result of selection by the original selection switch 924L serving as the paper reading selection means and a discrimination mark 50 applied to a paper sheet paper sheet 40 as described hereinabove. The image information extraction control means 440 uses information detected by the front/rear face detection means 630 in the extraction control of image information.

The image data processing system shown in FIG. 80 further includes a pair of timing circuits 55A and 55B which define, for example, sample holding timings of the sample hold circuits 66A and 66B.

5-2. White Level Information Used upon Analog to Digital Conversion of Image Data and Associated Factors As shown in FIG. 80, each of the analog to digital conversion circuits 60A and 60B includes a white level information correction circuit 70A or 70B (white level information correction apparatus) and a black level setting circuit 61A or 61B.

The white level information correction circuits 70A and 70B individually set white level information to be used as indices for a conversion criterion of the analog to digital conversion circuits 60A and 60B, respectively, and suitably correct the thus set while level information. The black level setting circuits 61A and 61B individually set black level information to be used as indices for a conversion criterion of the analog to digital conversion circuits 60A and 60B, respectively. It is to be noted that the black level setting circuits 61A and 61B are each constructed as a sample hold circuit.

The white level information correction circuits 70A and 70B will be described in more detail below.

Here, since the white level information correction circuits 70A and 70B have a same construction, reference characters to components of the white level information correction circuits 70A and 70B are not distinguished between A and B.

Figure 81:
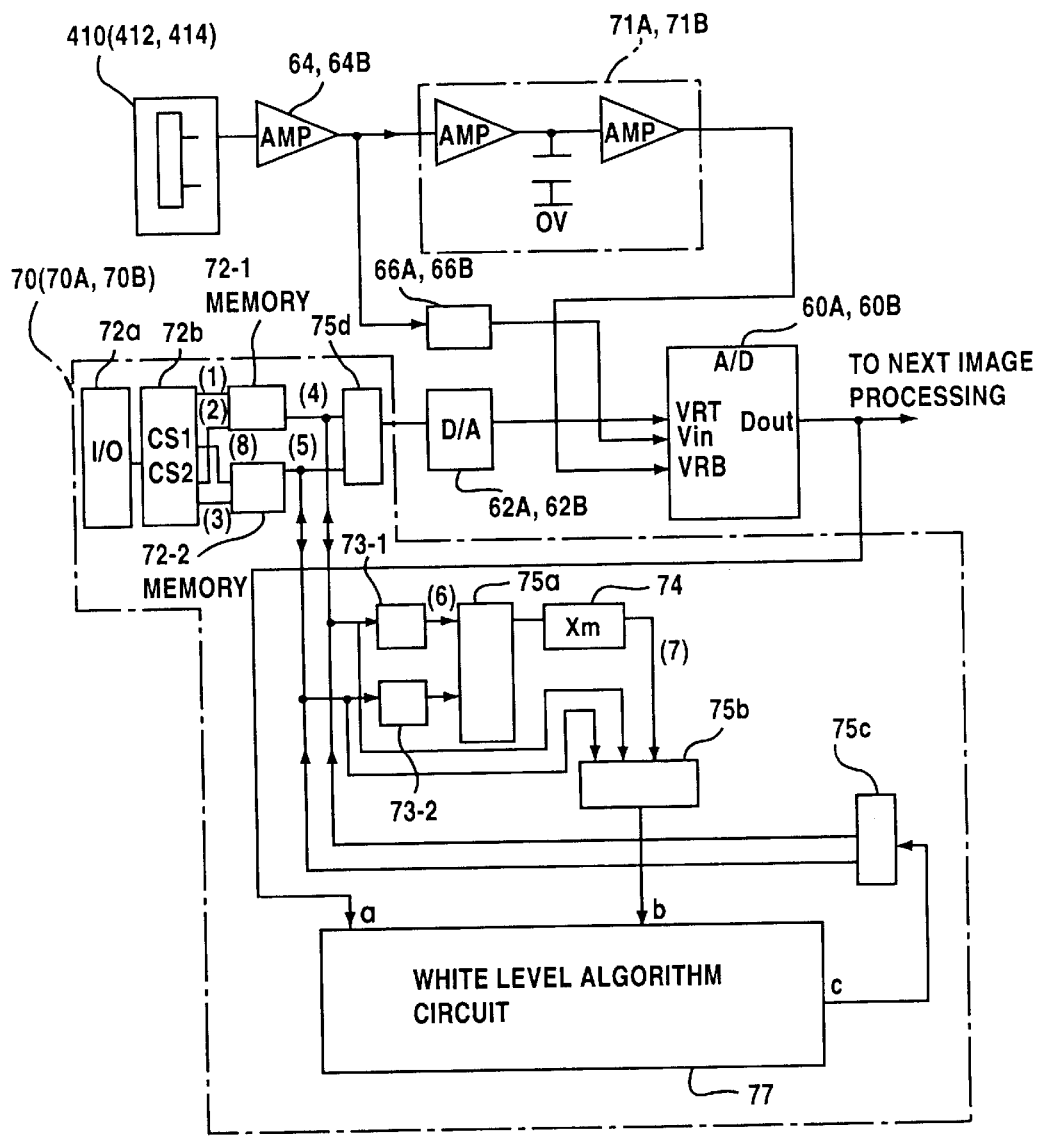
FIG. 81 is a block diagram showing the construction of a white level information correction apparatus of the image data processing system shown in FIG. 80.

In particular, referring to FIG. 81, the white level information correction circuit 70 includes a plurality of (for example, two) memory circuits 72-1 and 72-2 and registers 73-1 and 73-2, selection circuits 75a, 75b, 75c and 75d, a data magnification variation circuit 74, and a white level algorithm circuit 77.

The memory circuits 72-1 and 72-2 store a plurality of pieces of white level information (individual pieces of white level information correspond to originals having different ground colors) to be used as indices for a conversion criterion. Write/read control of each of the memory circuits 72-1 and 72-2 is performed in response to an instruction which is received from an MPU circuit (microprocessor unit) 150 by an address controller 72b by way of an input/output port (I/O port) 72a. It is to be noted that a RAM (random access memory) may be employed for the memory circuits 72-1 and 72-2.

The registers 73-1 and 73-2 serve as buffer circuits for temporarily storing the outputs of the memory circuits 72-1 and 72-2, respectively. Each of the selection circuits 75a, 75b, 75c and 75d selectively outputs desired data to a required output line. For example, a multiplexer is used for the selection circuits 75a, 75b, 75c and 75d.

In particular, the selection circuit 75a selectively outputs data from the register 73-1 or 73-2 to the data magnification variation circuit 74 side. The selection circuit 75b selectively outputs white level information varied by magnification variation by the data magnification variation circuit 74 or white level information from the memory circuit 72-1 or 72-2. The selection circuit 75c stores the output of the white level algorithm circuit 77 into and updates a required one of the memory circuits 72-1 and 72-2. The selection circuit 75d supplies the output of one of the memory circuits 72-1 and 72-2 to the analog to digital conversion circuit 60 side by way of a digital to analog conversion circuit 62 (actually, analog to digital conversion circuits 62A and 62B are provided in the data processing systems D1 and D2, respectively).

The data magnification variation circuit 74 varies data by magnification variation by multiplying white level information from the memory circuit 72-1 or 72-2 by a desired coefficient (m: in order to lower the white level, a value between 1 and 0 is selected for m, but in order to raise the white level, a value higher than 1 is selected for m). For example, a digital multiplier is used for the data magnification variation circuit 74. Further, the magnification variation coefficient m of the data magnification variation circuit 74 can be varied by an instruction from the MPU circuit 150.

The white level algorithm circuit 77 compares white level information and data obtained from the optical image reading unit 410 with each other and corrects the white level information in accordance with a result of the comparison. Referring to FIG. 82, the white level algorithm circuit 77 includes a video signal comparator 77a serving as a digital comparison circuit for comparing digital white level information selected by the selection circuit 75b and digital data obtained from the optical image reading unit 410 with each other, and an addition circuit 77b serving as a white level information correction circuit for correcting the white level information in accordance with a result of the comparison by the video signal comparator 77a.

The white level information correction circuit 70 will be described in more detail.

Referring first to FIG. 81, analog video signals from the CCD arrays 436AA and 436AB are amplified by the amplification circuits 64A and 64B, respectively, and, for example, those analog video signals of the outputs of the amplification circuits 64A and 64B in portions (bits) in which photosensitive portions of the CCD arrays 436AA and 436AB are masked are sampled and held by black level setting circuits (sample hold circuits) 71A and 71B, respectively. The thus held analog video signals are connected as reference signals for a black level to the lower limit sides (VRB) of the analog to digital conversion circuits 60A and 60B. Meanwhile, reference signals for a white level are obtained by converting white level values in lines obtained in the last scanning cycle and stored in the memory circuit 72-1 or 72-2 into analog signals by means of the digital to analog conversion circuits 62A and 62B, and are connected to the upper limit sides (VRT) of the analog to digital conversion circuits 60A and 60B, respectively.

Consequently, the analog to digital conversion circuits 60A and 60B output digital signals on the scale of 256 gradations between the white reference level (VRT) and the black reference level (VRB). In this instance, for the white reference level, an analog value of a white level produced corresponding to a white level obtained in the last scanning cycle for an image is used, and for the black reference level, an analog value of a dot at which the photosensitive portion of the CCD array 436AA or 436AB is masked is used.

By the way, white reference level data extracted from the memory circuit 72-1 or 72-2 is fetched into the corresponding register 73-1 or 73-2, and one of the outputs of the registers 73-1 and 73-2 is selected by the selection circuit 75a and then multiplied by m by the data magnification variation circuit 74.

Further, the output of the data magnification variation circuit 74 or data extracted from the memory circuit 72-1 or 72-2 is selected by the selection circuit 75b and inputted to the terminal b of the white level algorithm circuit 77.

Meanwhile, a digital value of a video signal which is the output of the analog to digital conversion circuit 60 is inputted to the other terminal a of the white level algorithm circuit 77. Consequently, the thus inputted digital value is inputted to comparators (COMP) 77a-0 to 77a-2 of the video signal comparator 77a shown in FIG. 82 and then outputted from the video signal comparator 77a as one of, for example, three different outputs including X"FF" (white represented by X"FF" by the 256 gradation representation), X"F7" to X"FE" (a little dark white represented by X"F7" to X"FE" by the 256 gradation representation) and X"F6" or less (white represented by X"F6" or less by the 256 gradation representation).

In the video signal comparator 77a, when the comparators 77a-0 to 77a-2 (COMP) detect that the digital output of the analog to digital conversion circuit 60 is X"FF" mentioned above (that is, when a coincidence output is obtained), it is recognized that the analog video signal obtained by scanning of the current scanning line of the image is equal to or much higher than a white level obtained by scanning in the last scanning cycle, and the white level value of the preceding cycle is incremented, for example, by one.

However, when it is detected that the digital output of the analog to digital conversion circuit 60 falls within the range from X"FE" to X"F7", it is recognized that the analog video signal is a little lower than the white level obtained in the last scanning cycle, and the white level value of the last cycle is incremented by, for example, "−1", that is, decremented by one. Particularly, since no carry need be taken into consideration, X"FF", which is a complementary number on 2, should be added.

Further, when it is detected that the digital output of the analog to digital conversion circuit 60 is equal to or lower than X"F6", it is recognized that not the white level varies but the image now is on the gray level and is considered that it is not related to correction of the white level, and such control as to perform nothing (particular, to add X"00") is performed to calculate a new white level and determine the new white level as a correction value for scanning of the present scanning line.

When one of the comparators 77a-0, 77a-1 and 77a-2 outputs "1", only a corresponding one of gate circuits (DV) 77a-3 to 77a-5 in the video signal comparator 77a outputs the value to be added (X"01", X"FF" or X"00" in FIG. 82) while the other gate circuits (DV) exhibit a high impedance state. For example, when the output is extracted from the gate circuit 77a-3, the other gate circuits 77a-4 and 77a-5 exhibit a high impedance state. Thus, the gate circuits 77a-3 to 77a-5 operate as tri-state elements.

Then, the output from one of the gate circuits (DV) 77a-3 to 77a-5 outputted from the video signal comparator 77a is added to a digital value (W0 to W7 in the last cycle) of the white level of the last cycle, which is the output of the selection circuit 75b, by the addition circuit 77b. Then, a result of the addition is outputted as a correction value (W0 to W7 in the present cycle) of the white level for the present scanning cycle from the terminal c of the white level algorithm circuit 77 and is stored into the memory circuit 72-1 or 72-2 selected by the selection circuit 75c. It is to be noted that, as shown in FIG. 82, the addition circuit 77b is constituted from an adder 77b-0 and a flip-flop 77b-1 of one stage. The flip-flop (FF) 77b-1 operates as a hazard prevention mechanism when the correction value in the present cycle is added to the white level corrected in the last scanning cycle and a result of the addition is stored into the memory circuit 72-1 or 72-2.

Such new white level values based on analog video signals of picture elements of a line obtained by scanning the image by means of the CCD array 436A in such a manner as described above are stored into an area of one of the memory circuits for corresponding picture elements of the line selected by the selection circuit 75d. Then, each time a next line is read and analog to digital conversion is performed, the white level values are read out as correction values and are each used as the upper limit value (VRT) for the analog to digital conversion circuit 60 and further referred to for correction of the white level of each picture element of the line.

Naturally, processing of scanning a certain line of the image by means of the CCD array 436A and reading out analog video signals of the individual picture elements and processing of reading out values of white levels of a line scanned in the last scanning cycle from the memory circuit 72-1 or 72-1 are synchronized with a shift pulse signal used to scan the image by means of the CCD array 436A, and the address in the scanning line and the address of the memory circuit 72-1 or 72-2 described hereinabove (the address of the memory circuit of the 8 Kword capacity) are synchronized with each other with an offset of one address.

Further, in the white level information correction circuit 70, for example, in such a case that paper sheets whose ground color is white have been read till now and blue print paper sheets of a different ground color are to be read subsequently, the white level value to be provided to the analog to digital conversion circuit 60A or 60B is varied in response to an instruction signal from the MPU circuit 150 when a manual instruction or an automatic instruction is provided to the MPU circuit 150. To this end, white level information stored in the memory circuit 72-1 (or 72-2) is taken out and stored into the register 73-1 (or 73-2), and then the output of the register 73-1 is selected by the selection circuit 75a so that it is subsequently multiplied by m by the data magnification variation circuit 74. The magnification variation factor m can be modified freely in response to an instruction from the MPU circuit 150. This increases the degree of freedom in correction of a white level.

Then, the output of the data magnification variation circuit 74 is selected by the selection circuit 75b and then processed by required processing by the white level algorithm circuit 77, and then the white level of the thus varied magnification is stored into the other memory circuit 72-2 (or 72-1) by way of the selection circuit 75c. Then, the white level of the varied magnification is used as a conversion reference of the analog to digital conversion circuit 60.

Figure 85:
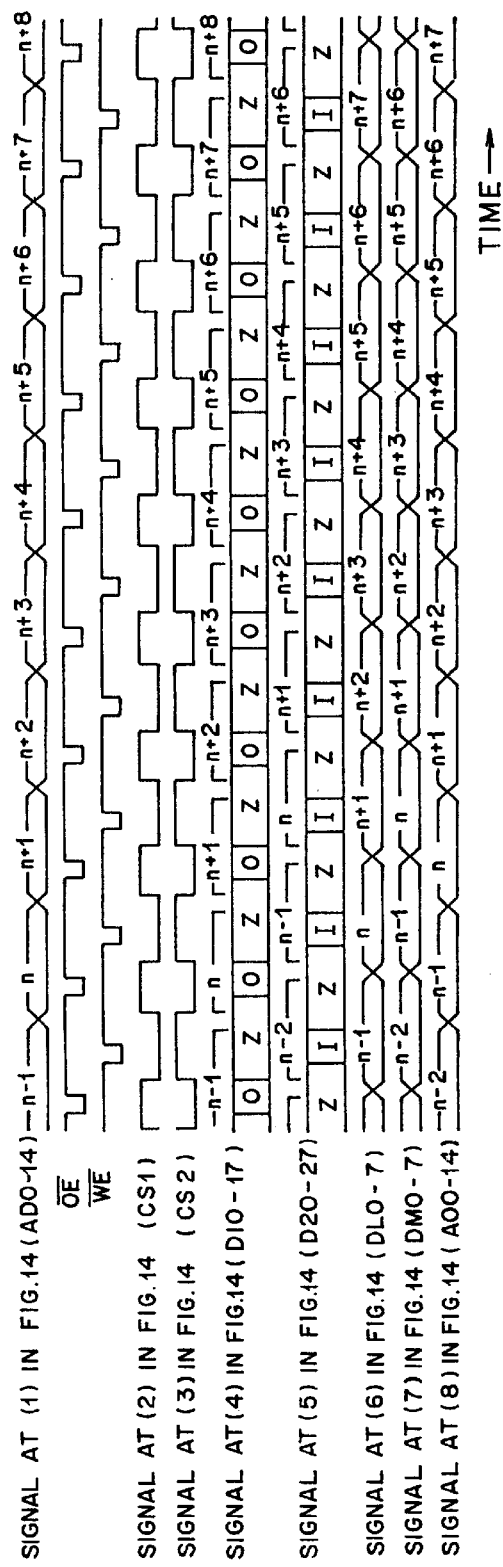
FIG. 85 is a timing chart illustrating operation of the while level information correction apparatus shown in FIG. 81.

It is to be noted that signals at several locations of the circuitry shown in FIG. 81 in this instance (locations denoted at (1) to (8) in FIG. 81, and the output enable signal OE and the write enable signal WE for a memory circuit) are illustrated in the time chart of FIG. 85.

Thereafter, so far as such blue print paper sheets are used, white level information from the memory circuit 72-2 (or 72-1) in which data of the white level information multiplied by m is stored is extracted, and now, the output of the memory circuit 72-2 (or 72-1) is inputted by way of the selection circuit 75b to the white level algorithm circuit 77, by which the processing described above is performed subsequently so that the white level value may have an appropriate value to update the white level.

Consequently, even in such a case that paper sheets whose ground color is white have been read till now and blue print paper sheets of a different ground color are to be read subsequently, the white level information correction apparatus copes with this sufficiently and can perform analog to digital conversion with a high degree of accuracy. Besides, by constructing the correction circuit for a white level from a digital circuit, analog parts in the entire circuit and patterns of a printed circuit board of an image inputting device can be reduced to the minimum. Further, since correction of a white level is performed by digital processing, no oscillation occurs in a high frequency band whereas it occurs often with an analog comparator. Accordingly, the advantage that an increase in stability of operation and in efficiency and certainty in designing can be achieved is obtained.

Figure 83:
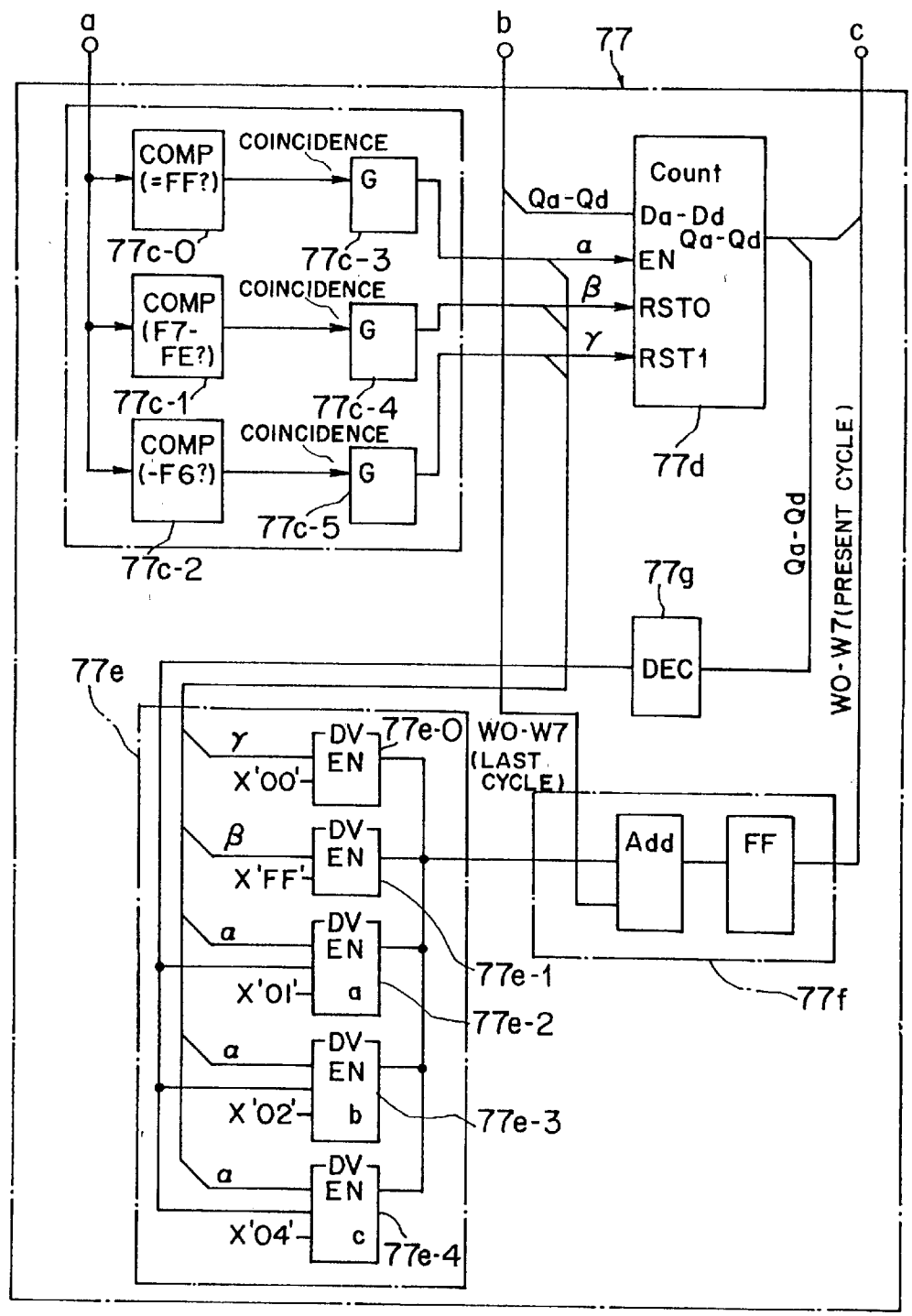
FIG. 83 is a block diagram showing another form of the white level algorithm circuit of the white level information correction apparatus shown in FIG. 81.

Further, the white level algorithm circuit 77 may include, as shown in FIG. 83, a video signal comparator 77c serving as a control signal generation circuit for comparing digital white level information selected by the selection circuit 75b and digital data obtained from the optical image reading unit 410 with each other and outputting, in accordance with a result of the comparison, a control signal representing that the digital data is a predetermined value, a counting section (counting circuit) 77d for counting the number of times by which a control signal is successively outputted in the direction of a line from the video signal comparator 77c, an addition value selecting multiplexer 77e serving as a white level information correction circuit for correcting white level information in accordance with a counted value of the counting section 77d, and an addition circuit 77f.

In particular, also in this instance, a digital signal from the analog to digital conversion circuit 60 is inputted to comparators (COMP) 77c-0 to 77c-2 in the video signal comparator 77c, by which it is divided, for example, into three different outputs (X"FF", X"F7" to X"FE", and X"F6" or less) by similar operation to that described hereinabove with reference to FIG. 82.

The outputs of the comparators (COMP) 77c-0 to 77c-2 in the video signal comparator 77c in this instance are outputted by way of gate circuits 77c-3 to 77c-5 (G) and inputted to the counting section (Count) 77d as seen from FIG. 83.

In this instance, each of the memory circuits 72-1 and 72-2 stores information of 8 bits (W0 to W7) necessary to store digital values of white levels of ordinary picture elements obtained by scanning in the last scanning cycle. The 8 bits mentioned above are a new white level signal to be used for a next line which has been produced from a digital value outputted from the analog to digital conversion circuit 60 described hereinabove and an upper limit signal used thereupon by the analog to digital conversion circuit 60. Each of the memory circuits 72-1 and 72-2 further stores, for example, the output of four bits (Qa to Qd) of the counting section (Count) 77d corresponding to each bit of the line.

The output signal of the comparator (COMP) (=FF?) 77c-0 mentioned above is connected to a count enable (EN) terminal of the counting section (Count) 77d, and the four bits (Qa to Qd) of the count value for each picture element obtained by scanning in the last scanning cycle and stored in the memory circuit 72-1 or 72-2 are inputted to terminals Da to Dd of the counting section (Count) 77d. While the count value (Da to Dd) is inputted, when the output of the analog to digital conversion circuit 60A or 60B in the present scanning cycle is X"FF" and consequently a coincidence signal is outputted from the comparator (COMP) (=FF?) 77c-0 so that the count enable (EN) terminal of the counting section (Count) 77d is energized, the counting section (Count) 77d counts up the input value (Da to Dd). However, when the count enable (EN) terminal is not energized and the output signal of one of the other comparators (COMP) (=F7 to FE?, −F6?) 77c-1 and 77c-2 is energized, the reset terminal (RST0 or RST1) of the counting section (Count) 77d is energized so that the count value (Da to Dd) for each picture element is cleared.

In particular, in the counting section (Count) 77d, the count value (Qa to Qd) in the last scanning line for each dot of the CCD array 436A is read out from a corresponding address of the memory circuit 72-1 or 72-2 in synchronism with a shift pulse for shifting the CCD array 436A and is loaded to the Da to Dd terminals of the counting section (Count) 77c so that X"FF" which represents a white level is counted for each dot to determine by what number of success lines X"FF" appears. When the digitally converted value of the dot falls within the range of X"F7" to X"FE" or X"F6" or less, the count value for the dot loaded to the Da to Dd terminals of the counting section (Count) 77d is cleared.

In the addition value selecting multiplexer (correction value conversion circuit) 77e shown in FIG. 83, one of gate circuits (DV) 77e-0 to 77e-4 is selected in response to a signal obtained from a decoder (DEC) 77g by decoding an output value of the counting section (Count) 77d and signals $\alpha$, $\beta$ and $\gamma(7)$ outputted from the comparators (COMP) 77c-0, 77c-1 and 77c-2 of the video signal comparator 77c by way of the gate circuits (G) 77c-3, 77c-4 and 77c-5, respectively, to select an addition value (X"01", "X02" or X"04") to be added to a white level of each picture element of a line obtained by the line scanning in the last scanning cycle and stored in the memory circuit 72-1 or 72-2.

The decoded signal from the decoder 77g is "01" when the count value of the counting section 77d is "1", that is, when the count value signifies that the white level corrected in the last scanning cycle is not X"FF" but the white level in the present scanning cycle is X"FF"; the decoded signal is "02" when the count value is "02", that is, when the count value signifies that the white level corrected in the last scanning cycle is X"FF" and also the white level in the present scanning cycle is X"FF"; and the decoded signal is "03" when the count value is "03", that is, when the count value signifies that the white level corrected in the second last scanning cycle is X"FF" and also the white level corrected in the last scanning cycle is X"FF" and besides also the white level in the present scanning cycle is X"FF".

Accordingly, when the count value (Qa to Qd) of the counting section (Count) 77d is, for example, "01", it is recognized that the corrected white level value in the last scanning cycle was not X"FF", and the gate circuit (DV) 77e-2 of the addition value selecting multiplexer 77e is selected. Consequently, the input a to the gate circuit (G) 77e-2 is energized to determine "+1" as the correction value for the white level value of the last scanning cycle so that the correction value "+1" may be added by the addition circuit 77f.

Similarly, when the count value (Qa to Qd) of the counting section (Count) 77d is, for example, "02", it is recognized that the corrected white level value in the last scanning cycle was X"FF" and then the white level of the dot in the present scanning cycle is X"FF", and the gate circuit (DV) 77e-3 is selected. Consequently, the input a to the gate circuit (G) 77e-3 is energized to determine "+2" as the correction value for the white level value of the last scanning cycle.

Further, similarly, when the count value (Qa to Qd) of the counting section (Count) 77d is, for example, equal to or higher than "03", it is recognized that the successive corrected white level values in the last scanning cycle and the second last scanning cycle were X"FF" and then also the white level of the dot in the present scanning cycle is X"FF", and the gate circuit (DV) 77e-4 is selected. Consequently, the input $\alpha$ to the gate circuit (G) 77e-4 is energized to determine "+4" as the correction value for the white level value of the last scanning cycle.

In any other instance, depending upon whether an output is outputted from the comparator (=F7 to FE?) 77c-1 or the comparator (−F6?) 77c-2 of the video signal comparator 77c, the corresponding gate circuit (DV) 77e-0 or 77e-1 is selected so that the input $\beta$ or $\gamma(7)$ of the gate circuit (G) 77e-1 or 77e-0 is energized. Consequently, same correction as that described hereinabove with reference to FIG. 82 is performed.

In particular, the control method in the present example described above is characterized in that, when X"FF" as a white level successively appears in successive lines at a certain dot, it is recognized that a sudden variation in white has occurred and thus such a correction is performed that the white level value is raised progressively in accordance with such sudden variation in white.

Figure 84:
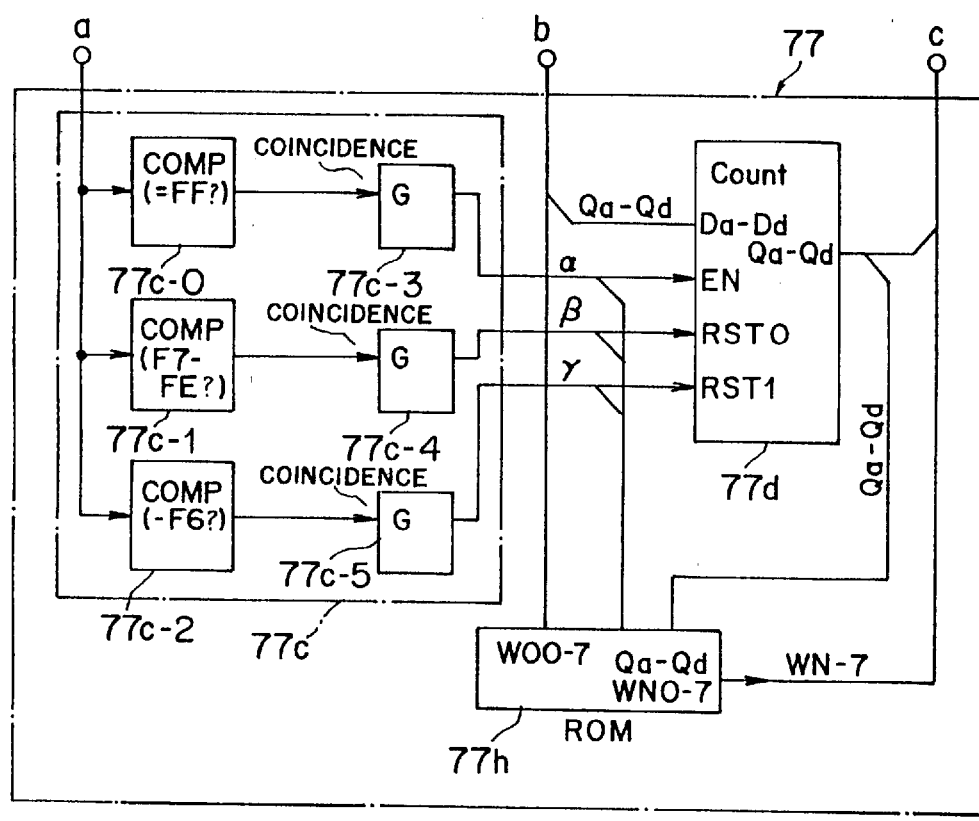
FIG. 84 is a block diagram showing a further form of the white level algorithm circuit of the white level information correction apparatus shown in FIG. 81.

FIG. 84 shows a modification to the white level algorithm circuit 77 shown in FIG. 83. In particular, referring to FIG. 84, the modified white level algorithm circuit 77 includes, for example, a read-only memory (ROM) 77h in place of the addition value selecting multiplexer 77e and the addition circuit 77f of the white level algorithm circuit 77 shown in FIG. 83. In particular, the output value (4 bits) of the counting section (Count) 77d, the output (3 bits) of the video signal comparator 77c and a white level value (8 bits) in the memory circuit 72-1 or 72-2 obtained by scanning in the last scanning cycle are applied as an address signal to the ROM 77h so that a white level value calculated and stored in advance in the ROM 77h is outputted from the ROM 77h.

The white level value outputted in this manner is stored into the position corresponding to the dot together with the value (Qa to Qd) of the counting section (Count) 77d and then used for calculation for white level correction upon analog to digital conversion in a next line.

Then, also in this instance (in the case of FIG. 83 or 84), in such a case that paper sheets whose ground color is white have been read till now and blue print paper sheets of a different ground color are to be read subsequently, the white level value to be provided to the analog to digital conversion circuit 60 is varied in response to an instruction signal from the MPU circuit 150 by the white level information correction circuit 70 in a similar manner as described above. In particular, white level information stored in the memory circuit 72-1 (or 72-2) is taken out and stored into the register 73-1 (or 73-2), and then the output of the register 73-1 (or 73-2) is selected by the selection circuit 75a so that it is subsequently multiplied by m by the data magnification variation circuit 74. Then, the output of the data magnification variation circuit 74 is selected by the selection circuit 75b and then processed by required processing by the white level algorithm circuit 77, and then the white level of the thus varied magnification is stored into the other memory circuit 72-2 (or 72-1) by way of the selection circuit 75c. Then, the white level of the varied magnification is used as a conversion reference of the analog to digital conversion circuit 60.

Thereafter, so far as such blue print paper sheets are used, the white level from the memory circuit 72-2 (or 72-1) is extracted, and now, the output of the memory circuit 72-2 (or 72-1) is inputted by way of the selection circuit 75b to the white level algorithm circuit 77. Then, the processing described above is performed subsequently by the white level algorithm circuit 77 shown in FIG. 83 or 84 so that the white level value may have an appropriate value to update the white level.

Consequently, even in such a case that paper sheets whose ground color is white have been read till now and blue print paper sheets of a different ground color are to be read subsequently, the white level information correction apparatus copes with this sufficiently and can perform analog to digital conversion with a high degree of accuracy. Besides, by constructing the correction circuit for a white level from a digital circuit, analog parts in the entire circuit and patterns of a printed circuit board of an image inputting device can be reduced to the minimum. Further, since correction of a white level is performed by digital processing, no oscillation occurs in a high frequency band whereas it often occurs with an analog comparator. Accordingly, the advantage that an increase in stability of operation and in efficiency and certainty in designing can be achieved is obtained.

Further, in the case described above, since the digital circuit portion of the white level algorithm circuit 77 can be constructed only from ordinary logical OR and AND gate circuits, it can be included readily into a large scale integrated circuit (LSI).

Further, in the arrangement shown in FIG. 84, since the addition value selecting multiplexer 77e and the addition circuit 77f described hereinabove with reference to FIG. 82 are replaced, for example, with the ROM 77h, the number of parts can be reduced, and higher density mounting can be anticipated.

Figure 86:
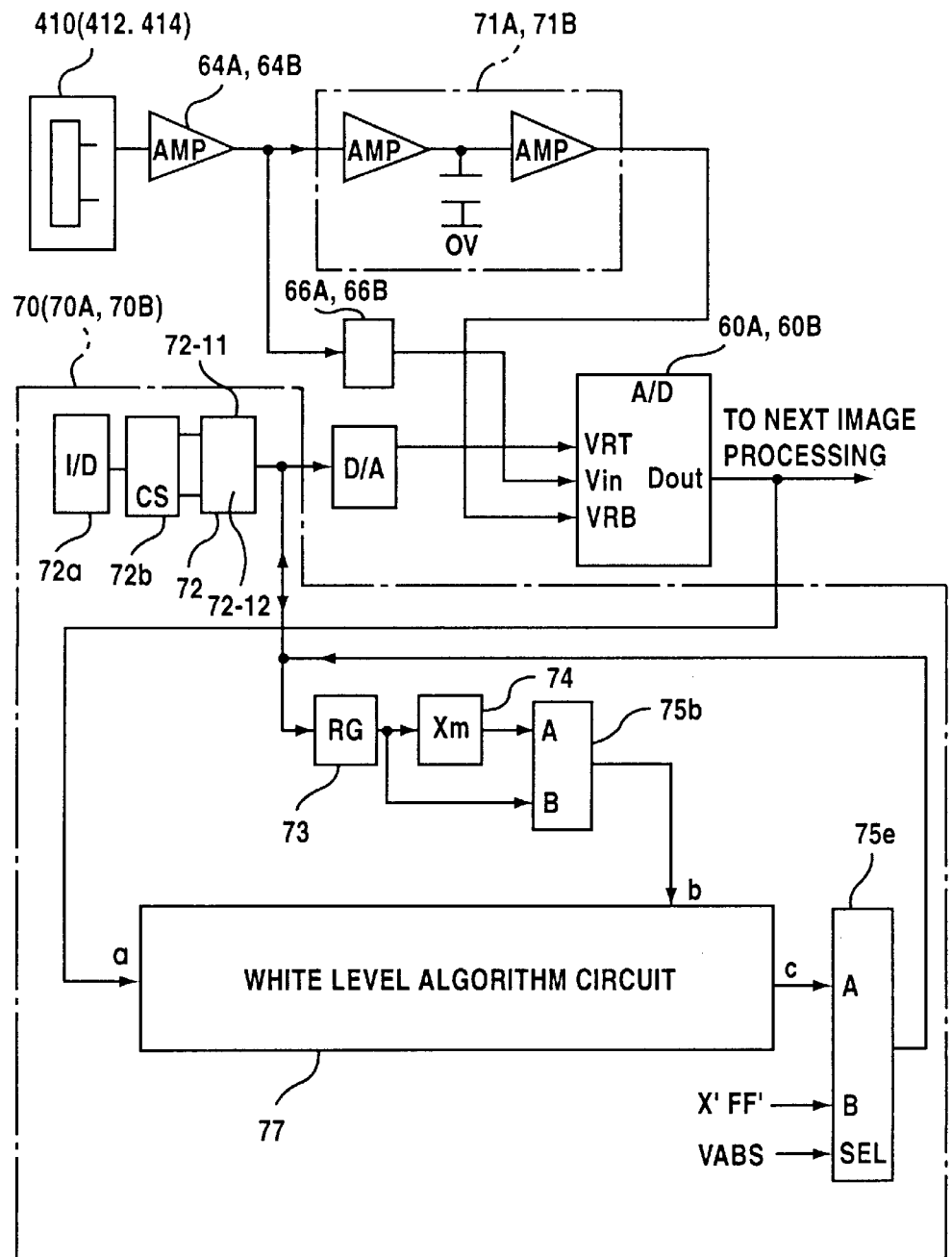
FIG. 86 is a block diagram showing the construction of another form of the white level information correction apparatus and associated elements of the image data processing system shown in FIG. 80.

By the way, in the arrangement shown in FIG. 81, the plurality of (two) memory circuits 72-1 and 72-2 are used in order to store white level information, and the memory circuits 72-1 and 72-2 are selectively used using a chip selection function of the address controller 72b. However, such an alternative arrangement as shown in FIG. 86 may be employed wherein a single memory circuit 72 is employed and an address of the memory circuit 72 is designated by the address controller 72b so as to selectively use a pair of different storage areas 72-11 and 72-12 of the memory circuit 72.

Also in this instance, for example, in such a case that paper sheets whose ground color is white have been read till now and blue print paper sheets of a different ground color are to be read subsequently, the white level value to be provided to the analog to digital conversion circuit 60 is varied by the white level information correction circuit 70 in a similar manner as described above. In particular, white level information stored in a certain storage area 72-11 (or 72-12) of the memory circuit 72 is taken out and stored into the register 73, and then the output of the register 73 is subsequently multiplied by m by the data magnification variation circuit 74. Then, the output of the data magnification variation circuit 74 is selected by the selection circuit 75b and then processed by required processing by the white level algorithm circuit 77 (refer to FIGS. 82 to 84), and then the white level of the thus varied magnification is stored into the other storage area 72-12 (or 72-11). Then, the white level of the thus varied magnification is used as a conversion reference of the analog to digital conversion circuit 60.

Thereafter, so far as such blue print paper sheets are used, white level information from the storage area 72-12 (or 72-11) is extracted, and now, the output of the storage area 72-12 (or 72-11) is inputted by way of the selection circuit 75b to the white level algorithm circuit 77. Then, the processing described above is performed subsequently by the white level algorithm circuit 77 shown in FIGS. 82 to 84 so that the white level value may have an appropriate value to update the white level.

In this manner, also in this instance, the effects or advantages achieved by the embodiment described above can be achieved. Further, since the single memory circuit 72 is employed and the storage area 72-11 and 72-12 of the memory circuit 72 are selectively used by designating the address by means of the address controller 72b, there is no necessity any more of preparing a plurality of independent memory circuits. Consequently, handling of the white level information correction circuit 70 is facilitated.

Figure 87:
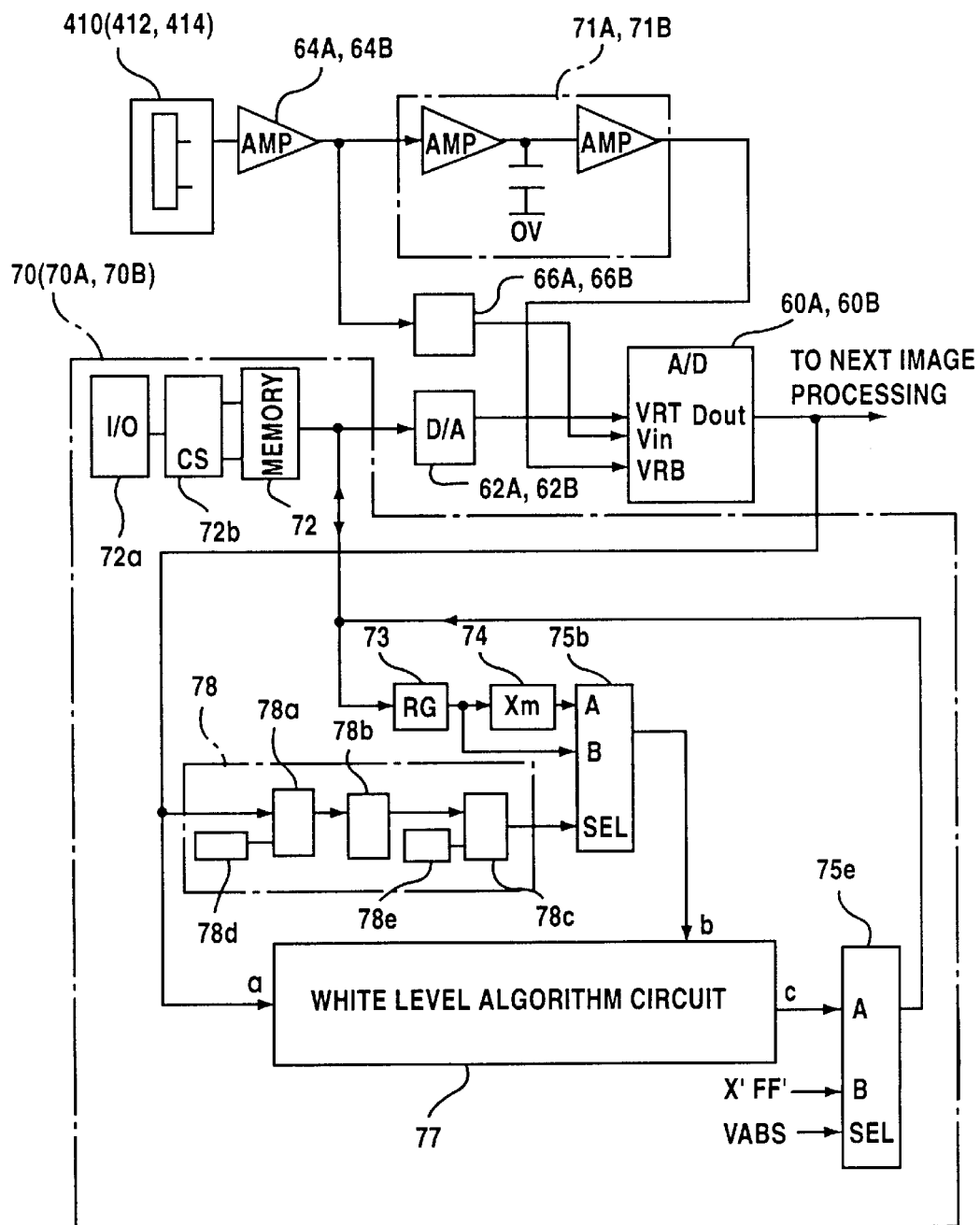
FIG. 87 is a block diagram showing the construction of a further form of the white level information correction apparatus and associated elements of the image data processing system shown in FIG. 80.

Such another alternative arrangement as shown in FIG. 87 may be employed wherein a switching control circuit 78 is additionally provided for automatically controlling selective switching of the selection circuit 75b in accordance with a result of determination which is conducted by the data magnification variation circuit 74 based on data obtained from the optical image reading unit 410 to determine whether white level information should be varied by magnification variation.

In particular, the switching control circuit 78 includes a pair of comparators 78a and 78c and a counter 78b. In the switching control circuit 78, the output of the analog to digital conversion circuit 60 is first compared with a reference value from reference value setting means 78d by the comparator 78a, and if the output of the analog to digital conversion circuit 60 is higher than the reference value, the counter 78b counts up by one. Further, the output of the counter 78b is compared with a dot reference value from dot reference value setting means 78e by the comparator 78c. If the output of the analog to digital conversion circuit 60 is higher by more than a predetermined line number than the reference value, then since the output of the counter 78b is higher than the dot reference value, a signal to instruct the selection circuit 75b to select the data magnification variation circuit 74 is developed from the comparator 78c. In response to the signal, the selection circuit 75b selects the output of the data magnification variation circuit 74, and consequently, the white level is varied more suddenly than that by variation by the white level algorithm circuit 77. Then, the variation is performed automatically based on data obtained from the optical image reading unit 410 as described above. It is to be noted that, when the output of the analog to digital conversion circuit 60 is still higher by more than the predetermined line number than the reference value even after the selection circuit 75b is switched to the data magnification variation circuit 74 side, the white level varied once is further varied by the data magnification variation circuit 74. In particular, if the white level is varied, for example, twice, then the white level is varied to $m^2$ times.

It is to be noted that, in FIG. 87, a selection circuit 75e is further provided. The selection circuit 75e selects the output of the white level algorithm circuit 77 or predetermined value data (X"FF" which corresponds to the maximum value). In particular, a control signal VABS is supplied from the MPU circuit 150 to the selection circuit 75e so that, in an initial state, the predetermined value data is outputted from the selection circuit 75e, and thereafter, the output of the white level algorithm circuit 77 is outputted from the selection circuit 75e.

In this manner, also with the white level information correction circuit 70 shown in FIG. 87, the effects or advantages which can be achieved by the embodiment described above can be achieved. Further, since it is determined by the data magnification variation circuit 74 based on data obtained from the optical image reading unit 410 whether or not white level information should be varied by magnification variation and then selective switching of the selection circuit 75b is automatically controlled in accordance with a result of the determination, even when paper sheets used are changed, the white level can be automatically varied rapidly.

It is to be noted that, while, in the several arrangements described above, the white level is varied for each picture element, it need not necessarily be corrected for each picture element, but may naturally be corrected, for example, for each line.

Referring back to FIG. 80, an image signal after digital conversion by the analog to digital conversion circuit 60 is transferred to the image processing section 68A or 68B for next image processing such as, for example, emphasis processing to emphasize the contrast between white and black or "dither processing or binary digitization processing" for a net point image (which is constituted from a large number of fine dots; dot image) such as a photograph image.

5-3. Outputting Section and Output Control Circuit

In each of the image data processing systems D1 and D2, information digitized by the analog to digital conversion circuit 60A or 60B is sent, after it is processed by emphasis processing and/or binary digitization processing by the image processing section 68A or 68B, to the outputting section 90 as seen from FIG. 80, and paper front face data and paper rear face data are transferred from the outputting section 90 to the host computer (not shown).

Figure 88:
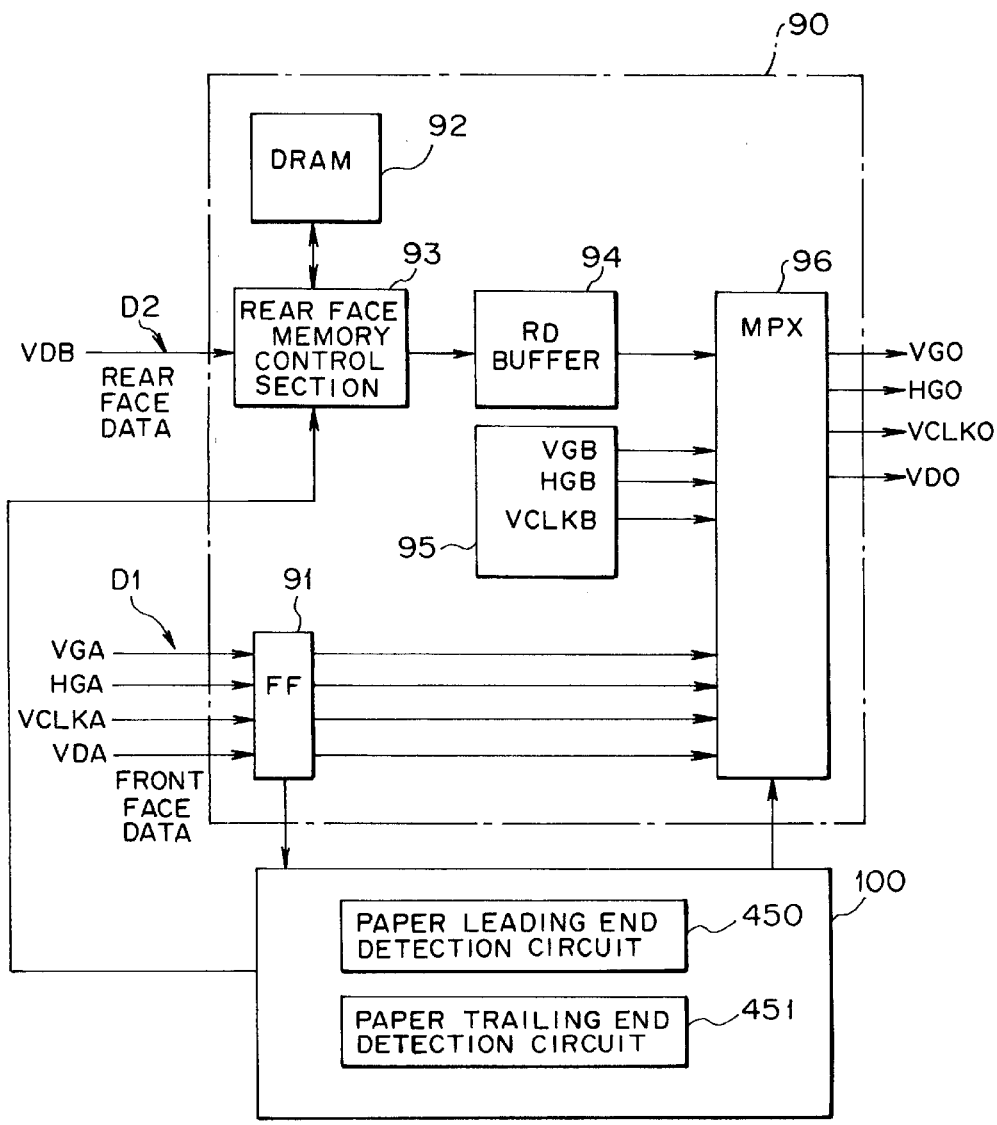
FIG. 88 is a block diagram showing the construction of an outputting section and an output control circuit of the image data processing system shown in FIG. 80.

Referring now to FIG. 88, the outputting section 90 includes a latch circuit 91, a DRAM (buffer storage apparatus) 92, a rear face memory control section 93, a read data buffer 94, a rear face timing generation section 95 and a selection circuit 96.

The latch circuit 91 latches paper front face data VDA and front face timing signals VGA, HGA and VCLKA from the image data processing system D1 for processing paper front face data and notifies to the output control circuit 100 that the paper front face data and the surface timing signals have been latched by the latch circuit 91. It is to be noted that a flip-flop may be used for the latch circuit 91.

The timing signal VGA is a gate signal in a horizontal direction (direction of a line; main scanning direction), and the timing signal HGA is a gate signal in a vertical direction (paper transporting direction; sub-scanning direction). One bit of a picture element in one line on the front face of a paper sheet can be extracted using the timing signal VGA and the timing signal HGA. Further, the timing signal VCLKA is a clock signal which defines the transfer rate of front face data.

The DRAM 92 is a memory circuit for storing paper rear face data VDB. Storage and read-out control of the DRAM 92 is performed by the rear face memory control section 93. In particular, the rear face memory control section 93 is constructed as a dynamic memory access controller (DMAC) and stores paper rear face data VDB sent thereto into the DRAM 92. After paper front face data VDA for one sheet are sent, the rear face memory control section 93 controls the DRAM 92 so that, between successive storing operations of paper rear face data VDB into the DRAM 92, the paper rear face data VDB are read out from the DRAM 92 (in this instance, the paper rear face data VDB are read out in units of one bit).

It is to be noted that all data for one full paper sheet from the later operating image reading unit 414 need not necessarily be stored into the DRAM 92, and actually, those data obtained after outputting of data for one full paper sheet from the first operating image reading unit 412 is completed until all information stored in the DRAM 92 is sent out are stored.

The read data buffer 94 temporarily stores, between successive storing operations of paper rear face data VDB into the DRAM 92, paper rear face data VDB partially read out from the DRAM 92 and produces arranged data to be sent.

It is to be noted that the rate at which data are read out from the DRAM 92 and the read data buffer 94 is set equal to twice the writing rate, that is, the transfer rate of front face data to the host computer.

The rear face timing generation section 95 generates rear face timing signals VGB, HGB and VCLKB. Also in this instance, the timing signal VGB is a gate signal in a horizontal direction (direction of a line; main scanning direction), and the timing signal HGB is a gate signal in a vertical direction (paper transporting direction; sub-scanning direction). One bit of a picture element in one line on the rear face of a paper sheet can be extracted using the timing signal VGB and the timing signal HGB. Further, the timing signal VCLKB is a clock signal which defines the transfer rate of front face data. In this instance, the rate of the rear face timing signal VCLKB is set to twice that of the front face timing signal VCLKA. Due to the rate and also due to the data read-out data rate from the DRAM 92 and the read data buffer 94, rear face data are transferred at the rate equal to twice that of front face data.

The selection circuit 96 receives a control signal from the output control circuit 100 and selectively outputs paper front face data or paper rear face data in accordance with the control signal. In this instance, after paper front face data are transferred for one full paper sheet, the data to be outputted are switched so that paper rear face data are thereafter transferred for one complete paper sheet.

It is to be noted that the output control circuit 100 is switched to the paper front face data side in response to paper leading end detection information but is switched to the paper rear face data side in response to paper trailing end detection information. Such detection of a leading end or a trailing end of a paper sheet will be hereinafter after described.

Therefore, it is considered that the outputting section 90 includes the storage means (DRAM) 92 for storing data (paper rear face data) from that one of the first optical image reading unit 412 and the second optical image reading unit 414 which serves as a later operating image reading unit (in the present example, the second optical image reading unit 414) from which paper image information is read out later than from the other image reading unit.

Also it is considered that the outputting section 90 further includes first data transfer means (the latch circuit 91 and the selection circuit 96) for successively transferring, by way of a data transfer line, paper front face data from that one of the first optical image reading unit 412 and the second optical image reading unit 414 which serves as a first operating image reading unit (in the present example, the first operating image reading unit 412) from which paper image information is read out first, and second data transfer means (the rear face memory control section 93, the rear face timing generation section 95 and the selection circuit 96) for successively transferring, by way of another data transfer line, after paper front face data from the first operating image reading unit 412 are transferred by the first data transfer means, paper rear face data from the later operating image reading unit 414 stored in the storage means 92 at a rate (in the present example, at the twice rate) higher than the data transfer rate by the first data transfer means.

Further, it is also considered that the outputting section 90 further includes auxiliary storage means (the read data buffer 94) for storing partial paper image information read out from the storage means 92 between successive writing operations of data into the storage means (DRAM) 92.

It is to be noted that the reason why paper rear face data are sent at a rate twice that of paper front face data is that it is desired that paper rear face data be transferred to the host computer side before the paper sheet 40 whose front face and rear face have been read is thereafter discharged to the stacking mechanism 500. This is because, if a paper sheet is discharged to the stacking mechanism 500, then transportation of a new paper sheet is started and reading of data of the paper sheet is started. In other words, paper rear face data are transferred at the rate twice that of paper front face data because it is desired to complete transfer of rear face data before transportation of a next paper sheet is started. Accordingly, naturally the value "twice" may possibly be varied depending upon the length of the paper transport path, the paper transport velocity or the like of the image reading apparatus.

Figure 89:
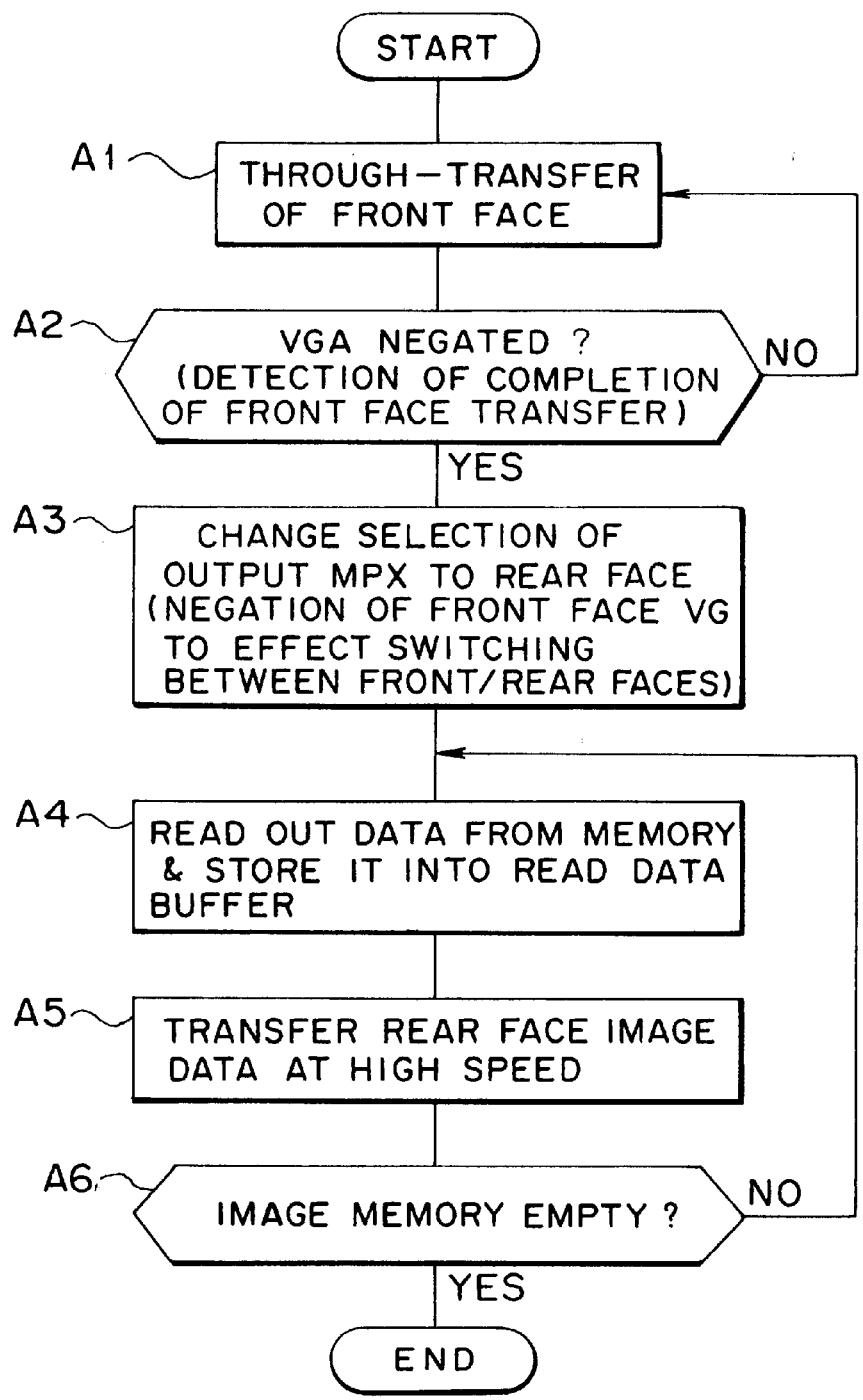
FIG. 89 is a flow chart illustrating operation of the outputting section and the output control section shown in FIG. 88.

Accordingly, the outputting section 90 operates in such a manner as illustrated in FIG. 89.

Referring to FIG. 89, since the selection circuit 96 is initially switched to the paper front face data side, paper front face data are transferred by through-transfer (step A1). Thereafter, when the signal VGA becomes negated, that is, when transfer of the front face data is completed, the route of "YES" is taken at step A2, and then the selection circuit 96 is switched to the paper rear face data side (step A3). Then, at step A4, paper rear face data are read out from the DRAM 92 and transferred at a high rate to the read data buffer 94 (step AS). Then, this operation is repeated until the DRAM (image sensor) 92 becomes emptied (step A6).

Due to the construction described above, data (paper front face data) from the first operating image reading unit 412 from between the first optical image reading unit 412 and the second optical image reading unit 414 from which paper image information is to be read out first are first transferred successively by way of a data transfer line, and data (paper rear face data) from the later operating image reading unit 414 from between the first optical image reading unit 412 and the second optical image reading unit 414 from which paper image information is to be read out later are temporarily stored into the DRAM 92 and, after the data from the first operating image reading unit 412 are transferred completely, the stored data from the later operating image reading unit 414 are successively transferred at a rate higher than the transfer rate of the data from the first operating image reading unit 412 by way of another data transfer line. Consequently, the following advantages can be obtained.

In particular, even if image reading by the later operating image reading unit 414 is started before image reading by the first operating image reading unit 412 is completed, data within the overlapping period can be held with certainty. Besides, data from the later operating image reading unit 414 from which data are transferred later can be transferred rapidly to the host computer side.

Accordingly, even where the image reading units 412 and 414 are disposed in the proximity of the paper transport path in order to achieve minimization, reduction in weight and compaction of the apparatus, data of the front and rear faces of a paper sheet can be transferred to the host computer side before the paper sheet is discharged to the stacking mechanism 500. Consequently, even if paper sheets are successively transferred at a high speed while achieving minimization, reduction in weight and compaction of the apparatus, data of the front and rear faces of each paper can be read and transferred to the host computer side satisfactorily.

By the way, the output control circuit 100 includes, as described hereinabove, the paper leading end detection circuit 450 for detecting paper leading end information and the paper trailing end detection circuit 451 for detecting paper trailing end information.

Figure 90:
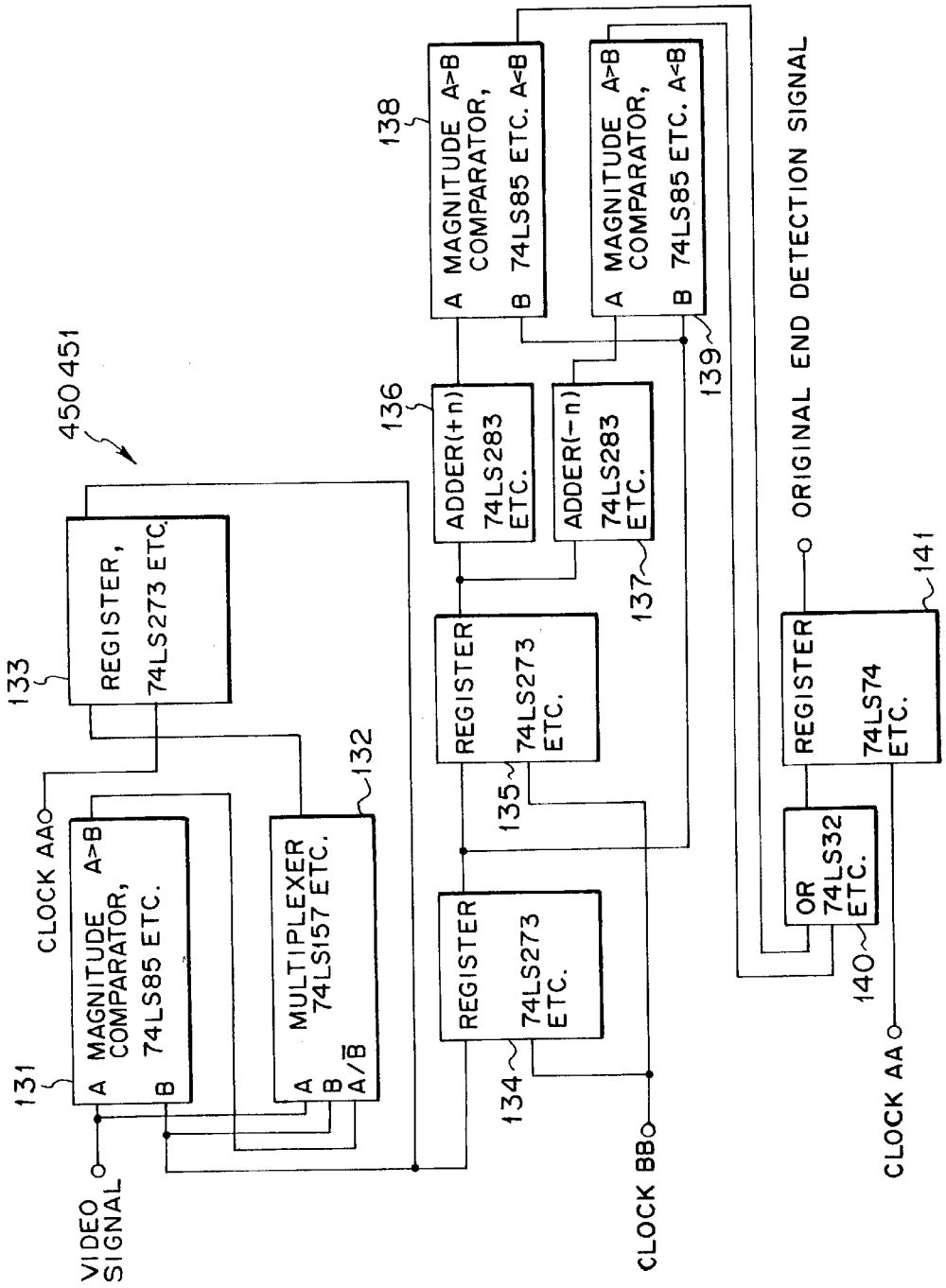
FIG. 90 is a block diagram showing the construction of an original end detection circuit of the image data processing system shown in FIG. 80.

The paper leading end detection circuit 450 and the paper trailing end detection circuit 451 have a same circuit construction and each includes, as shown in FIG. 90, magnitude comparators 131, 138 and 139, a multiplexer 132, registers 133, 134, 135 and 141, adders 136 and 137, and an OR gate 140.

Due to the construction, a video signal (paper front face data) from the image reading unit 412 is inputted to an input terminal A of the magnitude comparator 131. The magnitude comparator 131 thus compares the video signal from the image reading unit 412 with the output of the register 133 which is inputted to the magnitude comparator 131 by way of another input terminal B. In this instance, if the video signal is higher, then the video signal is outputted from the multiplexer 132 so that it is latched by the register 133. On the contrary if the output of the register 133 is higher, then the output of the register 133 is outputted from the multiplexer 132 so that it is latched by the register 133. Such comparison in magnitude is repeated. Consequently, at the end of the line, a maximum value (peak value) of the line is latched in the register 133.

Therefore, it can be understood that the magnitude comparator 131, the multiplexer 132 and the register 133 construct one-line peak value detection means for detecting a peak value in one line along the direction perpendicular to the paper transporting direction based on an image signal from an optical image reading unit.

Further, a clock BB (this clock BB is developed once for one line at the end of the line) causes the register 134 to latch a maximum value (peak value) in one line latched in the register 133 and simultaneously causes the register 135 to latch a maximum value (peak value) of the last line. Consequently, the registers 133 and 134 construct a shift register for storing both of a current peak value detected by the one-line peak value detection value and a past peak value in one line detected prior to the current peak value.

Meanwhile, the register 135 is constructed as storage means for storing a past peak value in one line detected prior to a current peak value detected by the one-line peak value detection means.

Thereafter, +n (n is a natural number) is added to a maximum value (peak value) of a preceding line by the adder 136, and −n is added to (that is, n is subtracted from) the maximum value by the adder 137. Then, the output of the adder 136 and the maximum value (peak value) of the current line from the register 134 are compared with each other by the magnitude comparator 138, and the output of the adder 137 and the maximum value (peak value) of the current value from the register 134 are compared with each other by the magnitude comparator 139.

Then, if the maximum value of the current line is higher than the sum of the maximum value of the preceding line and n, the magnitude comparator 138 outputs "1", but if the maximum value of the current line is lower than the difference of n from the maximum value of the preceding line, the magnitude comparator 139 outputs "1". Consequently, if the maximum value of the current line is higher than the sum of the maximum value of the preceding line and n or lower than the difference of n from the maximum value of the preceding line, then the OR gate 140 outputs "1".

Then, the output of the OR gate 140 is latched by the register 141 which operates in response to a clock AA (the clock AA is outputted once for one dot) in order to prevent fluctuation, and the output of the register 141 is used as a paper leading end detection signal or a paper trailing end detection signal. Then, such paper leading or trailing end detection signal is used as an interruption requesting signal (IRQ) to the MPU circuit 150.

Consequently, it can be seen that the magnitude comparators 138 and 139 cooperatively construct comparison means for comparing a current peak value detected by the one-line peak value detection means and a past peak value from the storage means with each other and outputting a result of the comparison as a paper leading or trailing end detection signal.

Meanwhile, the adder 136 constructs addition means for adding a predetermined value (n) to a past peak value from the register (storage means) 135. Thus, the magnitude comparator (comparison means) 138 is constructed so as to compare a current peak value detected by the one-line peak value detection means and an addition correction past peak value from the adder 136 with each other and output a result of the comparison as a paper leading or trailing end detection signal.

Further, the adder 137 constructs subtraction means for subtracting a predetermined value (n) from a past peak value from the register (storage means) 135. Thus, the magnitude comparator (comparison means) 139 is constructed so as to compare a current peak value detected by the one-line peak value detection means and a subtraction correction past peak value from the adder 137 with each other and output a result of the subtraction as a paper leading or trailing end detection signal.

Meanwhile, the magnitude comparator 138 constructs first comparison means for comparing a current peak value detected by the one-line peak value detection means and an addition correction past peak value from the adder (addition means) 136 with each other. The magnitude comparator 139 constructs second comparison means for comparing a current peak value detected by the one-line peak value detection means and a subtraction correction past peak value from the adder (subtraction means) 137 with each other. The OR gate 140 constructs outputting means for outputting, when a paper end detection signal is outputted from at least one of the first comparison means and the second comparison means, the paper end detection signal as a paper end detection signal.

Further, the register 141 constructs latching means for latching the outputs of the comparison means.

Figure 91:
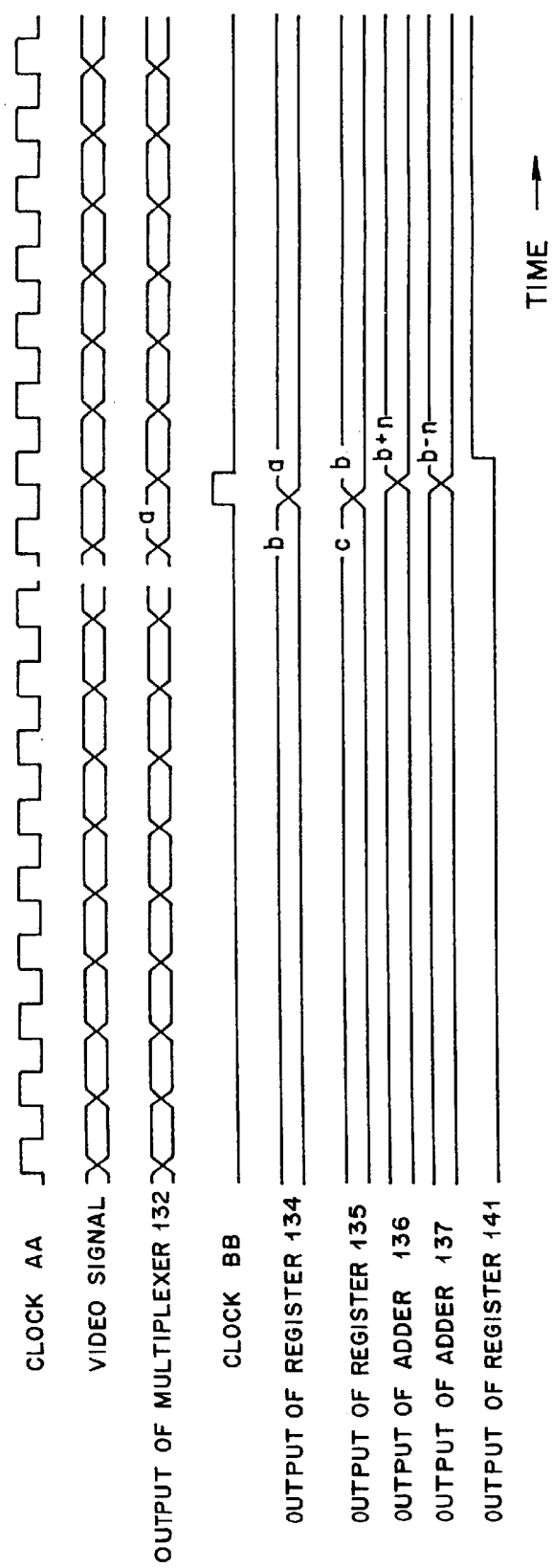
FIG. 91 is a timing chart illustrating operation of the original portion detection circuit shown in FIG. 90.

It is to be noted that FIG. 91 illustrates, in time chart, signal waveforms at several locations of the circuit shown in FIG. 90.

The leading end or the trailing end of a paper sheet is detected in such a manner as described above. The paper leading end detection circuit 450 detects the leading end of a paper sheet based on a paper end detected for the first time, and when the MPU circuit 150 receives such paper leading end detection signal as an interruption requesting (IRQ) signal from the paper leading end detection circuit 450, the MPU circuit 150 develops, in response to the interruption requesting (IRQ) signal, a command signal to read the front face of the paper sheet. As a result, also the selection circuit 96 is switched to the paper front face data side.

Meanwhile, the paper trailing end detection circuit 451 detects the trailing end of the paper sheet based on a paper end detected for the second time, and when the MPU circuit 150 receives such paper trailing end detection signal as an interruption requesting (IRQ) signal from the paper trailing end detection circuit 451, the MPU circuit 150 develops, in response to the interruption requesting (IRQ) signal, a command signal to read the rear face of the paper sheet. As a result, also the selection circuit 96 is switched to the paper rear face data side.

Where the paper leading end detection circuit 450 and the paper trailing end detection circuit 451 of such circuit construction as described above are employed, the leading end and the trailing end of a paper sheet can be detected with certainty with a common circuit construction and with a simple construction. Consequently, reading timings of paper front face data and paper rear face data or reading switching timings between them can be controlled precisely irrespective of the type of a paper sheet being transported. As a result, it is comparatively simple for the image reading apparatus to allow paper sheets of various sizes to be transported to read information on them.

It is to be noted that, while any of the leading end and the trailing end of a paper sheet can be detected by the construction shown in FIG. 90, where the ground color of a paper sheet 40 is brighter than the color of the backing member provided on the paper transport path 310, if it is intended to only detect the leading end of the paper sheet 40, then the adder 137, the magnitude comparator 139 and the OR gate 140 can be omitted. Similarly, if it is intended to only detect the trailing end of the paper sheet 40, then the adder 136, the magnitude comparator 138 and the OR gate 140 can be omitted. On the contrary, where the ground color of a paper sheet 40 is darker than the color of the backing member provided on the paper transport path 310, if it is intended to only detect the leading end of the paper sheet 40, then the adder 136, the magnitude comparator 138 and the OR gate 140 can be omitted. Similarly, if it is intended to detect only the trailing end of the paper sheet 40, then the adder 137, the magnitude comparator 139 and the OR gate 140 can be omitted.

5-4. Operation of the Read Image Data Processing System

By the way, referring back to FIG. 80, analog video signals from the CCD arrays 436AA and 436AB of the image reading units 412 and 414 are amplified by the amplification circuits 64A and 64B, respectively, and the analog video signals of the outputs of the amplification circuits 64A and 64B in portions (bits) in which, for example, the photosensitive portions of the CCD arrays 436AA and 436AB are masked are sampled and held by the black level setting circuits (sample hold circuits) 71A and 71B and are connected as reference signals for a black level to the lower limit sides (VRB) of the analog to digital conversion circuits 60A and 60B, respectively. For a reference signal for a white level, a signal obtained by digital to analog conversion of a white level value of each bit of each line obtained by scanning in the last scanning cycle and stored in the memory circuit 72-1 or 72-2 by the digital to analog conversion circuit 62A or 62B is used and connected to the upper limit side (VRT) of the analog to digital conversion circuit 60A or 60B.

Consequently, the analog to digital conversion circuit 60A or 60B outputs a multiple value digital signal on the scale of 256 gradations between the reference level (VRT) for white and the reference level (VRB) for black. In this instance, for the reference level for white, an analog value of a white level produced with reference to a white level obtained by scanning of the image in the last scanning cycle is used, and for the reference value for black, an analog value at a dot at which the photosensitive element of the CCD array 436AA or 436AB is masked is used.

It is to be noted that, in this instance, for example, in such a case that paper sheets whose ground color is white have been read till now and blue print paper sheets of a different ground color are to be read subsequently, the white level value to be provided to the analog to digital conversion circuit 60 is varied in response to an instruction signal from the MPU circuit 150 by the white level information correction circuit 70. In particular, as seen from FIGS. 81 to 87, white level information stored in the memory circuit 72-1 (or 72-2) or the storage area 72-11 (or 72-12) is taken out and stored into the register 73-1 (or 73-2) or 73, and then the output of the register 73-1 (or 73-2) or 73 is multiplied by m by the data magnification variation circuit 74. Then, the output of the data magnification variation circuit 74 is selected by the selection circuit 75b and then processed by required processing by the white level algorithm circuit 77, and then the white level of the thus varied magnification is stored into the other memory circuit 72-2 (or 72-1) or the other storage area 72-12 (or 72-11) by way of the selection circuit 75c. Then, the white level of the varied magnification is used as a conversion reference of the analog to digital conversion circuit 60.

Thereafter, so far as such blue print paper sheets are used, the white level from the memory circuit 72-2 (or 72-1) or the storage area 72-12 (or 72-11) is extracted, and now, the output of the memory circuit 72-2 (or 72-1) or the storage area 72-12 (or 72-11) is inputted by way of the selection circuit 75b to the white level algorithm circuit 77. Then, the processing described above is performed subsequently by the white level algorithm circuit 77 so that the white level value may have an appropriate value to update the white level.

Consequently, even in such a case that paper sheets whose ground color is white have been read till now and blue print paper sheets of a different ground color are to be read subsequently, the white level information correction apparatus copes with this sufficiently and can perform analog to digital conversion with a high degree of accuracy.

Then, the image signal after digital conversion by the analog to digital conversion circuit 60A or 60B is transferred to the image processing section 68A or 68B for next image processing such as, for example, emphasis processing to emphasize the contrast between white and black or "dither processing or binary digitization processing" for a net point image such as a photograph image as described hereinabove.

Further, in each of the image data processing systems D1 and D2, digital information obtained from the analog to digital conversion circuit 60A or 60B is sent, after it is processed by emphasis processing and/or binary digitization processing by the image processing section 68A or 68B, to the outputting section 90 as seen from FIG. 80, and paper front face data and paper rear face data are transferred from the outputting section 90 to the host computer (not shown).

Upon such transfer, data (paper front face data) from the first operating image reading unit 412 from between the first optical image reading unit 412 and the second optical image reading unit 414 from which paper image information is to be read out first are first transferred successively by way of a data transfer line. Meanwhile, data (paper rear face data) from the later operating image reading unit 414 from between the first optical image reading unit 412 and the second optical image reading unit 414 from which paper image information is to be read out later are temporarily stored into the DRAM 92, and, after the data from the first operating image reading unit 412 are transferred completely, the stored data from the later operating image reading unit 414 are successively transferred at a rate higher than the transfer rate of the data from the first operating image reading unit 412 by way of another data transfer line.

Consequently, even if image reading by the later operating image reading unit 414 is started before image reading by the first operating image reading unit 412 is completed, data within the overlapping period can be held with certainty. Besides, data from the later operating image reading unit 414 from which data are to be transferred later can be transferred rapidly to the host computer side.

Accordingly, even where the image reading units 412 and 414 are disposed in the proximity of the paper transport path in order to achieve minimization, reduction in weight and compaction of the apparatus, data of the front and rear faces of a paper sheet can be transferred to the host computer side before the paper sheet is discharged to the stacking mechanism 500. Consequently, even if paper sheets are successively transferred at a high speed while achieving minimization, reduction in weight and compaction of the apparatus, data of the front and rear faces of each paper can be read and transferred to the host computer side satisfactorily.

In this instance, the paper leading end detection circuit 450 detects a leading end of a paper sheet based on a paper end detected for the first time, and then when the MPU circuit 150 receives such paper leading end detection signal as an interruption requesting (IRQ) signal from the paper leading end detection circuit 450, the MPU circuit 150 develops, in response to the interruption requesting (IRQ) signal, a command signal to read the front face of the paper sheet. As a result, also the selection circuit 96 is switched to the paper front face data side.

Meanwhile, the paper trailing end detection circuit 451 detects a trailing end of the paper sheet based on a paper end detected for the second time, and then when the MPU circuit 150 receives such paper trailing end detection signal as an interruption requesting (IRQ) signal from the paper trailing end detection circuit 451, the MPU circuit 150 develops, in response to the interruption requesting (IRQ) signal, a command signal to read the rear face of the paper sheet. As a result, also the selection circuit 96 is switched to the paper rear face data side.

Where the paper leading end detection circuit 450 and the paper trailing end detection circuit 451 of such circuit construction as described above are employed, the leading end and the trailing end of a paper sheet can be detected with certainty with a common circuit construction and with a simple construction. Consequently, reading timings of paper front face data and paper rear face data or reading switching timings between them can be controlled precisely irrespective of the type of a paper sheet being transported. As a result, it is comparatively possible for the image reading apparatus to allow paper sheets of various sizes to be transported to read information on them.

The present invention is not limited to the specifically described embodiment, and variations and modifications may be made without departing from the scope of the present invention.

What is claimed is:

1. An image reading apparatus, comprising:

a paper supply mechanism for successively supplying paper sheets set in position;

a paper transport mechanism for transporting a paper sheet supplied thereto from said paper supply mechanism;

an optical image reading mechanism for optically reading information on a paper sheet being transported by said paper transport mechanism; and a paper stacking mechanism for stacking paper sheets discharged from said paper transport mechanism, said paper transport mechanism including a paper transport path including a steeply inclined transport path for transporting a paper sheet supplied thereto from said paper supply mechanism in a forward direction in an inclined condition and a paper reversing transport path continuous to said inclined transport path for transporting a paper sheet in a reverse direction having first been transported in said forward direction by said inclined transport path a plurality of paper transport rollers disposed in a spaced relationship from each other by a distance less than the length of a paper sheet in said forward direction along said paper transport path, a roller driving mechanism for driving said paper transport rollers, and roller driving mechanism control means for controlling said roller driving mechanism, said optical image reading mechanism including an optical image reading unit for optically reading information on a paper sheet being transported along said inclined transport path, and image information extraction control means for controlling extraction of image information obtained by said optical image reading unit, wherein said optical image reading mechanism includes a first optical image reading unit and a second optical image reading unit for optical reading information on a front face and a rear face of a paper sheet being transported along said inclined transport path, respectively, in order to optically read information on the front and rear faces of the paper sheet being transported along said paper transport mechanism, and image information extraction control means for controlling extraction of image information obtained by said first optical image reading unit and said second optical image reading unit.

2. An image reading apparatus as claimed in claim 1, wherein said first optical image reading unit and said second optical image reading unit have common specifications.

3. An image reading apparatus as claimed in claim 1, further comprising an additional optical image reading unit having a common profile and structure with but having different specifications from the first-mentioned optical image reading unit, any of the first-mentioned optical image reading unit and said additional optical image reading unit being capable of being selectively mounted in said image reading apparatus.

4. An image reading apparatus as claimed in claim 1, further comprising a sheet guide disposed along said inclined transport path in an opposing relationship to said optical image reading unit and having a backing portion for providing a color reference to a paper sheet, said backing portion being offset from a paper guiding portion of said sheet guide, which is provided for guiding a paper sheet, with a step defined therebetween.

5. An image reading apparatus as claimed in claim 1, further comprising a backing member located along said inclined transport path in an opposing relationship to said optical image reading unit for providing a color reference to a paper sheet, said backing member being formed as a rotatable member.

6. An image reading apparatus as claimed in claim 1, further comprising an apparatus body and an apparatus lid unit connected for pivotal motion to each other so as to be opened or closed relative to each other from or to the plane of said paper transport path, a backing member located adjacent said inclined transport path in an opposing relationship to said optical image reading unit for providing a color reference to a paper sheet, an interlocking mechanism for interlocking said backing member with an opening or closing movement of said apparatus lid unit to move, and a brush for contacting, when said backing member is moved by a closing movement of said apparatus lid unit, with said backing member to clean said backing member.

7. An image reading apparatus as claimed in claim 1, further comprising a sheet guide disposed along said inclined transport path in an opposing relationship to said optical image reading unit and having a backing portion for providing a color reference to a paper sheet, said sheet guide further having a protrusion provided at a portion thereof immediately prior to said backing portion.

8. An image reading apparatus as claimed in claim 1, further comprising a sheet guide with an opening disposed in an opposing relationship to said optical image reading unit at a location along said inclined transport path corresponding to an image reading point by said optical image reading unit, and a backing member disposed at a location in said opening on the opposite side to the location of said optical image reading unit with respect to said inclined transport path for providing a color reference to a paper sheet.

9. An image reading apparatus, comprising:

a paper supply mechanism for successively supplying paper sheets set in position;

a paper transport mechanism for transporting a paper sheet supplied thereto from said paper supply mechanism;

an optical image reading mechanism for optically reading information on a paper sheet being transported by said paper transport mechanism; and a paper stacking mechanism for stacking paper sheets discharged from said paper transport mechanism;

said paper transport mechanism including a paper transport path including a steeply inclined transport path for transporting a paper sheet supplied thereto from said paper supply mechanism in a forward direction in an inclined condition and a paper reversing transport path contiguous to said inclined transport path for transporting a paper sheet in a reverse direction having first been transported in said forward direction by said inclined transport path, a plurality of paper transport rollers disposed in a spaced relationship from each other by a distance less than the length of a paper sheet in said forward direction along said paper transport path, a roller driving mechanism for driving said paper transport rollers, and roller driving mechanism control means for controlling said roller driving mechanism;

said optical image reading mechanism including an optical image reading unit for optically reading information on a paper sheet being transported along said inclined transport path, and image information extraction control means for controlling extraction of image information obtained by said optical image reading unit, further comprising a sheet guide disposed along said inclined transport path in an opposing relationship to said optical image reading unit and having a backing portion for providing a color reference to a paper sheet, said backing portion being offset from a paper guiding portion of said sheet guide, which is provided for guiding a paper sheet, with a step defined therebetween.

10. An image reading apparatus as claimed in claim 9, wherein said sheet guide is resiliently biased toward said optical image reading unit.

11. An image reading apparatus as claimed in claim 10, wherein said sheet guide resiliently biased toward said optical image reading unit is contacted with and stopped at a predetermined position by a contacting member on said optical image reading unit.

12. An image reading apparatus as claimed in claim 9, further comprising a sheet guide disposed along said inclined transport path in an opposing relationship to said optical image reading unit and having a backing portion for providing a color reference to a paper sheet, said sheet guide further having a protrusion provided at a portion thereof immediately prior to said backing portion.

13. An image reading apparatus, comprising:

a paper supply mechanism for successively supplying paper sheets set in position;

a paper transport mechanism for transporting a paper sheet supplied thereto from said paper supply mechanism;

an optical image reading mechanism for optically reading information on a paper sheet being transported by said paper transport mechanism; and a paper stacking mechanism for stacking paper sheets discharged from said paper transport mechanism, said paper transport mechanism including a paper transport path including a steeply inclined transport path for transporting a paper sheet supplied thereto from said paper supply mechanism in a forward direction in an inclined condition and a paper reversing transport path contiguous to said inclined transport path for transporting a paper sheet in a reverse direction having first been transported in said forward direction by said inclined transport path, a plurality of paper transport rollers disposed in a spaced relationship from each other by a distance less than the length of a paper sheet in said forward direction along said paper transport path, a roller driving mechanism for driving said paper transport rollers, and roller driving mechanism control means for controlling said roller driving mechanism, said optical image reading mechanism including an optical image reading unit for optically reading information on a paper sheet being transported along said inclined transport path, and image information extraction control means for controlling extraction of image information obtained by said optical image reading unit, further comprising a backing member located along said inclined transport path in an opposing relationship to said optical image reading unit for providing a color reference to a paper sheet, said backing member being formed as a rotatable member.

14. An image reading apparatus as claimed in claim 13, wherein said rotatable member of said backing member is rotated at an equal speed to the speed of and in a same direction as the direction of transportation of a paper sheet by said paper transport mechanism.

15. An image reading apparatus as claimed in claim 13, further comprising a brush provided in sliding contact with an outer circumferential face of said backing member for cleaning the outer circumferential face.

16. An image reading apparatus, comprising:
a paper supply mechanism for successively supplying paper sheets set in position;
a paper transport mechanism for transporting a paper sheet supplied thereto from said paper supply mechanism;
an optical image reading mechanism for optically reading information on a paper sheet being transported by said paper transport mechanism; and
a paper stacking mechanism for stacking paper sheets discharged from said paper transport mechanism,
said paper transport mechanism including a paper transport path including a steeply inclined transport path for transporting a paper sheet supplied thereto from said paper supply mechanism in a forward direction in an inclined condition and a paper reversing transport path contiguous to said inclined transport path for transporting a paper sheet in a reverse direction having first been transported in said forward direction by said inclined transport path, a plurality of paper transport rollers disposed in a spaced relationship from each other by a distance less than the length of a paper sheet in said forward direction along said paper transport path, a roller driving mechanism for driving said paper transport rollers, and roller driving mechanism control means for controlling said roller driving mechanism,
said optical image reading mechanism including an optical image reading unit for optically reading information on a paper sheet being transported along said inclined transport path, and image information extraction control means for controlling extraction of image information obtained by said optical image reading unit,
further comprising an apparatus body and an apparatus lid unit connected for pivotal motion to each other so as to be opened or closed relative to each other from or to the plane of said paper transport path, a backing member located adjacent said inclined transport path in an opposing relationship to said optical image reading unit for providing a color reference to a paper sheet, an interlocking mechanism for interlocking said backing member with an opening or closing movement of said apparatus lid unit to move, and a brush for contacting, when said backing member is moved by a closing movement of said apparatus lid unit, with said backing member to clean said backing member.

17. An image reading apparatus as claimed in claim 6, wherein said backing member is constructed as a rotatable member, and further comprising an interlocking mechanism for interlocking said backing member with an opening or closing movement of said apparatus lid unit to rotate, said brush being constructed so as to contact, when said backing member is rotated by an opening or closing movement of said apparatus lid unit, with said backing member to clean said backing member.

18. An image reading apparatus, comprising:
a paper supply mechanism for successively supplying paper sheets set in position;
a paper transport mechanism for transporting a paper sheet supplied thereto from said paper supply mechanism;
an optical image reading mechanism for optically reading information on a paper sheet being transported by said paper transport mechanism; and
a paper stacking mechanism for stacking paper sheets discharged from said paper transport mechanism,
said paper transport mechanism including a paper transport path including a steeply inclined transport path for transporting a paper sheet supplied thereto from said paper supply mechanism in a forward direction in an inclined condition and a paper reversing transport path contiguous to said inclined transport path for transporting a paper sheet in a reverse direction having first been transported in said forward direction by said inclined transport path, a plurality of paper transport rollers disposed in a spaced relationship from each other by a distance less than the length of a paper sheet in said forward direction along said paper transport path, a roller driving mechanism for driving said paper transport rollers, and roller driving mechanism control means for controlling said roller driving mechanism,
said optical image reading mechanism including an optical image reading unit for optically reading information on a paper sheet being transported along said inclined transport path, and image information extraction control means for controlling extraction of image information obtained by said optical image reading unit,
further comprising a sheet guide disposed along said inclined transport path in an opposing relationship to said optical image reading unit and having a backing portion for providing a color reference to a paper sheet, said sheet guide further having a protrusion provided at a portion thereof immediately prior to said backing portion.

19. An image reading apparatus, comprising:
a paper supply mechanism for successively supplying paper sheets set in position;
a paper transport mechanism for transporting a paper sheet supplied thereto from said paper supply mechanism;

an optical image reading mechanism for optically reading information on a paper sheet being transported by said paper transport mechanism; and a paper stacking mechanism for stacking paper sheets discharged from said paper transport mechanism, said paper transport mechanism including a paper transport path including a steeply inclined transport path for transporting a paper sheet supplied thereto from said paper supply mechanism in a forward direction in an inclined condition and a paper reversing transport path contiguous to said inclined transport path for transporting a paper sheet in a reverse direction having first been transported in said forward direction by said inclined transport path, a plurality of paper transport rollers disposed in a spaced relationship from each other by a distance less than the length of a paper sheet in said forward direction along said paper transport path, a roller driving mechanism for driving said paper transport rollers, and roller driving mechanism control means for controlling said roller driving mechanism, said optical image reading mechanism including an optical image reading unit for optically reading information on a paper sheet being transported along said inclined transport path, and image information extraction control means for controlling extraction of image information obtained by said optical image reading unit, further comprising a sheet guide with an opening disposed in an opposing relationship to said optical image reading unit at a location along said inclined transport path corresponding to an image reading point by said optical image reading unit, and a backing member disposed at a location of said optical image reading unit with respect to said inclined transport path for providing a color reference to a paper sheet.

20. An image reading apparatus, comprising:

a paper supply mechanism for successively supplying paper sheets set in position;

a paper transport mechanism for transporting a paper sheet supplied thereto from said paper supply mechanism;

an optical image reading mechanism for optically reading information on a paper sheet being transported by said paper transport mechanism; and a paper stacking mechanism for stacking paper sheets discharged from said paper transport mechanism, said paper transport mechanism including a paper transport path including a steeply inclined transport path for transporting a paper sheet supplied thereto from said paper supply mechanism in a forward direction in an inclined condition and a paper reversing transport path contiguous to said inclined transport path for transporting a paper sheet in a reverse direction having first been transported in said forward direction by said inclined transport path, a plurality of paper transport rollers disposed in a spaced relationship from each other by a distance less than the length of a paper sheet in said forward direction along said paper transport path, a roller driving mechanism for driving said paper transport rollers, and roller driving mechanism control means for controlling said roller driving mechanism, said optical image reading, mechanism including an optical image reading unit for optically reading information on a paper sheet being transported along said inclined transport path, and image information extraction control means for controlling extraction of image information obtained by said optical image reading unit, wherein said image information extraction control means includes paper leading end detection means for detecting a leading end of a paper sheet from an amount of variation of the output of said optical image reading unit, said image information extraction control means controlling extraction of image information from optical image reading unit in response to a result of detection by said paper leading end detection means.

21. An image reading apparatus, comprising:

a paper supply mechanism for successively supplying paper sheets set in position;

a paper transport mechanism for transporting a paper sheet supplied thereto from said paper supply mechanism;

an optical image reading mechanism for optically reading information on a front face and a rear face of a paper sheet being supplied by said paper transport mechanism;

a paper stacking mechanism for stacking paper sheets discharged from said paper transport mechanism;

said paper transport mechanism including a paper transport path including an inclined transport path for transporting a paper sheet supplied thereto from said paper supply mechanism in an inclined condition and a paper reversing transport path contiguous to said inclined transport path for reversing a paper sheet having been transported by said inclined transport path, a plurality of paper transport rollers disposed in a spaced relationship from each other by a distance smaller than the length of a paper sheet in its transportation direction along said paper transport path, a roller driving mechanism for driving said paper transport rollers, and roller driving mechanism control means for controlling said roller driving mechanism;

said optical image reading mechanism including a first optical image reading unit for optically reading information on a front face of a paper sheet being transported along said inclined transport path, a second optical image reading unit for optically reading information on a rear face of a paper sheet being transported along said inclined transport path, and image information extraction control means for controlling extraction of image information obtained by said first optical image reading unit and said second optical image reading unit; and paper reading selection means for selecting whether one or both of front and rear faces of a paper sheet should be read;

said image information extraction control means controlling extraction of image information obtained by said first optical image reading unit and said second optical image reading unit in response to a result of selection by said paper reading selection means.

22. An image reading apparatus as claimed in claim 21, wherein each of paper sheets has a discrimination mark applied thereto and indicative of whether one or both of front and rear faces of the paper sheet should be read, and said image information extraction control means controls extraction of image information obtained by said first optical image reading unit and said second optical image reading unit in response to a result of selection by said paper reading selection means and the discrimination mark read from the paper sheet.

23. An image reading apparatus as claimed in claim 22, wherein the discrimination mark is applied at a leading end including the leading end of each of paper sheets.

24. An image reading apparatus as claimed in claim 22, wherein the discrimination mark is constituted from a combination of a plurality of marks.

25. An image reading apparatus as claimed in claim 22, wherein said image information extraction control means includes discrimination mark image erasure means for erasing an image of the discrimination mark.

26. An image reading apparatus as claimed in claim 22, wherein the discrimination mark is recorded in a drop-out color which cannot be read by any of said first optical image reading unit and said second optical image reading unit, and further comprising an optical discrimination mark image reading unit for reading the discrimination mark, said image information extraction control means controlling extraction of image information obtained by said first optical image reading unit and said second optical image reading unit in response to a result of selection by said paper reading selection means and the discrimination mark read by said optical discrimination mark image reading unit.

27. An image reading apparatus as claimed in claim 22, wherein said first optical image reading unit and said second optical image reading unit are constructed as optical image reading units having common specifications, and further comprising detection means for detecting whether each of said optical image reading units has been used to read a front face or a rear face of a paper sheet, said image information extraction control means controlling extraction of image information in response to a result of detection by said detection means.

28. An image reading apparatus as claimed in claim 21, further comprising an apparatus body and an apparatus lid unit connected for pivotal motion to each other so as to be opened or closed relative to each other from or to the plane of said paper transport path, and a body-lid unit locking mechanism for holding the closed condition of said apparatus body and said apparatus lid unit at a plurality of different closed condition holding stages.

29. An image reading apparatus, comprising:

a paper supply mechanism for successively supplying paper sheets set in position;

a paper transport mechanism for transporting a paper sheet supplied thereto from said paper supply mechanism;

an optical image reading mechanism for optically reading information on a paper sheet being transported by said paper transport mechanism; and a paper stacking mechanism for stacking paper sheets discharged from said paper transport mechanism, said paper transport mechanism including a paper transport path which is steeply inclined along its entire length for transporting a paper sheet supplied thereto from said paper supply mechanism in a forward direction in an inclined condition and a paper reversing transport path continuous to said inclined transport path for transporting a paper sheet in a reverse direction having first been transported in said forward direction by said inclined transport path, a plurality of paper transport rollers disposed in a spaced relationship from each other by a distance less than the length of a paper sheet in said forward direction along said paper transport path, a roller driving mechanism for driving said paper transport rollers, and roller driving mechanism control means for controlling said roller driving mechanism, said optical image reading mechanism including an optical image reading unit for optically reading information on a paper sheet being transported along said inclined transport path, and image information extraction control means for controlling extraction of image information obtained by said optical image reading unit, said image reading apparatus further comprising an apparatus body and an apparatus lid unit connected for pivotal motion to each other so as to be opened or closed relative to each other from or to the plane of said paper transport path, and a body-lid unit locking mechanism for holding the closed condition of said apparatus body and said apparatus lid unit at a plurality of different closed condition holding stages.

* * * * *